(12) United States Patent
Wilkerson

(10) Patent No.: US 12,373,213 B2
(45) Date of Patent: Jul. 29, 2025

(54) HARDWARE ENFORCEMENT OF BOUNDARIES ON THE CONTROL, SPACE, TIME, MODULARITY, REFERENCE, INITIALIZATION, AND MUTABILITY ASPECTS OF SOFTWARE

(71) Applicant: WHOLE SKY TECHNOLOGIES COMPANY, Mill Valley, CA (US)

(72) Inventor: Daniel Shawcross Wilkerson, Berkeley, CA (US)

(73) Assignee: WHOLE SKY TECHNOLOGIES COMPANY, Mill Valley, CA (US)

( * ) Notice: Subject to any disclaimer, the term of this patent is extended or adjusted under 35 U.S.C. 154(b) by 442 days.

(21) Appl. No.: 17/461,563

(22) Filed: Aug. 30, 2021

(65) Prior Publication Data
US 2021/0389946 A1    Dec. 16, 2021

Related U.S. Application Data

(63) Continuation-in-part of application No. PCT/US2020/029406, filed on Apr. 22, 2020.
(Continued)

(51) Int. Cl.
*G06F 9/30* (2018.01)
*G06F 8/51* (2018.01)
(Continued)

(52) U.S. Cl.
CPC .............. *G06F 9/3005* (2013.01); *G06F 8/51* (2013.01); *G06F 9/30054* (2013.01);
(Continued)

(58) Field of Classification Search
CPC .... G06F 8/51; G06F 12/0882; G06F 12/1009; G06F 12/14; G06F 21/52; G06F 8/44; G06F 21/54
See application file for complete search history.

(56) References Cited

U.S. PATENT DOCUMENTS 4,408,274 A    10/1983   Wheatley et al.
4,434,464 A    2/1984    Suzuki et al.
(Continued)

FOREIGN PATENT DOCUMENTS

GB    2576506 A  *  2/2020   ........... G06F 12/023
JP    07006095 A     1/1995
(Continued)

OTHER PUBLICATIONS

Robert Wahbe, Steven Lucco, Thomas E. Anderson, Susan L Graham "Efficient Software-Based Fault Isolation", ACM SIGOPS Operating Systems Review, Dec. 1993, vol. 27, No. 5, pp. 203-216.
(Continued)

*Primary Examiner* — Matthew T Henning
(74) *Attorney, Agent, or Firm* — Brown & Michaels, PC

(57) ABSTRACT

Modifications to existing computer hardware, compiler changes or source-to-source transforms performed during the software build process, and a collection of libraries and modifications to existing standard system software and libraries. The invention allows a program author to enforce various kinds of locality of causality in software to provide enforcement of boundaries for the following aspects of a computer program: control, space, time, modularity, reference, initialization, and mutability. Where these properties do not suffice to guarantee a property at static time, dynamic checks may be added and the constraints on control flow prevent such dynamic checks from being avoided by the program.

3 Claims, 105 Drawing Sheets

Related U.S. Application Data

(60) Provisional application No. 63/071,934, filed on Aug. 28, 2020, provisional application No. 62/837,145, filed on Apr. 22, 2019.

(51) Int. Cl.

| | | |
|---|---|---|
| *G06F 9/32* | (2018.01) | |
| *G06F 9/34* | (2018.01) | |
| *G06F 9/50* | (2006.01) | |
| *G06F 12/0882* | (2016.01) | |
| *G06F 12/1009* | (2016.01) | |
| *G06F 12/14* | (2006.01) | |
| *G06F 21/52* | (2013.01) | |
| *G06F 21/54* | (2013.01) | |

(52) U.S. Cl.
CPC ............... *G06F 9/323* (2023.08); *G06F 9/34* (2013.01); *G06F 9/5044* (2013.01); *G06F 12/0882* (2013.01); *G06F 12/1009* (2013.01); *G06F 12/14* (2013.01); *G06F 21/52* (2013.01); *G06F 21/54* (2013.01)

(56) References Cited

U.S. PATENT DOCUMENTS

| | | | |
|---|---|---|---|
| 4,442,484 A | 4/1984 | Childs et al. | |
| 4,525,780 A | 6/1985 | Bratt et al. | |
| 4,701,846 A | 10/1987 | Ikeda et al. | |
| 5,075,842 A | 12/1991 | Lai | |
| 5,075,845 A | 12/1991 | Lai et al. | |
| 5,075,848 A | 12/1991 | Lai et al. | |
| 5,157,777 A | 10/1992 | Lai et al. | |
| 5,563,843 A | 10/1996 | Fackenthal et al. | |
| 5,627,987 A | 5/1997 | Nozue et al. | |
| 5,845,129 A | 12/1998 | Wendorf et al. | |
| 5,890,189 A | 3/1999 | Nozue et al. | |
| 5,892,944 A | 4/1999 | Fukumoto et al. | |
| 6,542,919 B1 | 4/2003 | Wendorf et al. | |
| 6,615,340 B1 | 9/2003 | Wilmot | |
| 6,854,039 B1 | 2/2005 | Strongin et al. | |
| 6,873,993 B2 | 3/2005 | Charlesworth et al. | |
| 6,941,473 B2 | 9/2005 | Etoh et al. | |
| 7,134,050 B2 | 11/2006 | Wenzel | |
| 7,197,502 B2 | 3/2007 | Feinsmith | |
| 7,287,140 B1 | 10/2007 | Asanovic et al. | |
| 7,467,272 B2 | 12/2008 | Genty et al. | |
| 7,584,461 B2 | 9/2009 | Plum | |
| 7,882,318 B2 | 2/2011 | Savagaonkar et al. | |
| 7,917,710 B2 | 3/2011 | Freeman et al. | |
| 8,136,091 B2 | 3/2012 | Erlingsson et al. | |
| 8,364,910 B2 | 1/2013 | Wilkerson et al. | |
| 8,495,036 B2 | 7/2013 | Calder et al. | |
| 9,524,163 B2 | 12/2016 | Godard et al. | |
| 9,569,612 B2 | 2/2017 | Wilkerson et al. | |
| 9,747,218 B2 | 8/2017 | Godard et al. | |
| 9,934,166 B2 | 4/2018 | Wilkerson et al. | |
| 9,935,975 B2 | 4/2018 | Wilkerson et al. | |
| 10,678,700 B2 | 6/2020 | Godard et al. | |
| 11,797,398 B2 | 10/2023 | Sutherland et al. | |
| 2002/0123981 A1 | 9/2002 | Baba et al. | |
| 2003/0120888 A1* | 6/2003 | Huang | G06F 7/026 711/E12.022 |
| 2003/0172246 A1 | 9/2003 | Tessarolo | |
| 2008/0222397 A1 | 9/2008 | Wilkerson et al. | |
| 2012/0102268 A1 | 4/2012 | Smith et al. | |
| 2012/0151184 A1 | 6/2012 | Wilkerson et al. | |
| 2012/0198139 A1 | 8/2012 | Tanaka et al. | |
| 2012/0255001 A1 | 10/2012 | Sallam | |
| 2013/0205285 A1 | 8/2013 | Pizlo | |
| 2013/0283017 A1* | 10/2013 | Wilkerson | G06F 9/322 712/225 |
| 2014/0201422 A1 | 7/2014 | Tseng et al. | |
| 2014/0258635 A1 | 9/2014 | Hong et al. | |
| 2016/0094552 A1* | 3/2016 | Durham | G06F 21/00 713/171 |
| 2016/0147811 A1 | 5/2016 | Eluri et al. | |
| 2018/0278714 A1 | 9/2018 | Das | |
| 2020/0073822 A1* | 3/2020 | Wallach | G06F 12/1009 |
| 2021/0182390 A1* | 6/2021 | Winterrowd | G06F 21/56 |
| 2021/0200546 A1* | 7/2021 | Lemay | G06F 12/145 |

FOREIGN PATENT DOCUMENTS

| | | |
|---|---|---|
| JP | H8077023 | 12/1996 |
| JP | 2000322260 A | 11/2000 |
| JP | 2003296128 A | 10/2003 |
| JP | 2019505052 A | 2/2019 |

OTHER PUBLICATIONS

Warg et al., Rounding pointers: type safe capabilities with C++ meta programming, Oct. 2011, 5 pages.

Witchel et al. "Mondrian Memory Protection"; ACM SIGPLAN Notices; vol. 37Issue 10pp. 304-316; Oct. 2002.

[Dhawan-2015] "Architectural Support for Software-Defined Metadata Processing", Udit Dhawan and Catalin Hritcu and Nikos Vasilakis and Raphael Rubin and Silviu Chiricescu and Jonathan M. Smith and Thomas F. Knight and Jr. and Benjamin C. Pierce and Andre DeHon, ASPLOS 2015: Proceedings of the International Conference on Architectural Support for Programming Languages and Operating Systems, Mar. 14-18, 2015, pp. 487-502.

[EKO-1995]: Dawson R. Engler, M. Frans Kaashoek, James O'Toole "Exokernel: An Operating System Architecture for Application-Level Resource Management", Symposium on Operating Systems Principles, 1995, pp. 251-266.

[Lamport-1979] L. Lamport. "How to make a multiprocessor computer that correctly executes multiprocess programs". Computers, IEEE Transactions on, 100(9):690-691, 1979.

[OSSNMS-1992]: T. Okamoto, H. Segawa, S. H. Shin, H. Nozue, Ken-Ichi Maeda, M. Saito, "A Micro-Kernel Architecture for Next Generation Processors", Proceedings of the Workshop on Microkernels and Other Kernel Architectures, 1992, pp. 83-94.

[WCA-2002]: Emmett Witchel, Josh Cates, Krste Asanovic, "Mondrian Memory Protection", ASPLOS-X: Proceedings of the 10th international conference on Architectural support for programming languages and operating systems, San Jose, California, 2002, pp. 304-316.

[WS-1992]: John Wilkes, Bart Sears, "A comparison of Protection Lookaside Buffers and the PA-RISC protection architecture", HP Laboratories Technical Report HPL-92-55, Mar. 1992, pp. 1-11.

"The Intel iAPX 432"—"Capability-based Computer Systems", chapter 9, pp. 159-186, Henry M. Levy, Digital Press, 1984.

Bennet Yee, David Sehr, Gregory Dardyk, J. Bradley Chen, Robert Muth, Tavis Ormandy, Shiki Dkasaka, Neha Narula, Nicholas Fullagar, "Native Client: A Sandbox for Portable, Untrusted x86 Native code," sp, pp. 79-93, 2009 30th IEEE Symposium on Security and Privacy, May 17, 2009.

Bojinov et al., Address space randomization for mobile devices, Jun. 2011, 11 pages.

Nicholas P. Carter, Stephen W. Keckler, William J. Dally. "Hardware Support for Fast Capability-based Addressing", ASPLOS-VI Proceedings—Sixth International Conference on Architectural Support for Programming Languages and Operating Systems, San Jose, California, Oct. 4-7, 1994. ACM SIGPLAN Notices 29(11) pp. 319-327.

E.J. Koldinger, J.S. Chase, S.J. Eggers, "Architectural Support for Single Address Space Operating Systems", Architectural Support for Programming Languages and Operating Systems (ASPLOS) V, pp. 175-186, 1992.

Hertz et al. "Quantifying the Performance of Garbage Collection vs. Explicit Memory Management"; SIGPLAN Not.,40 (10):313-326, 2005.

Intel, "Intel Itanium Architecture Software Developer's Manual, vol. 2: System Architecture", Revision 2.3, May 2010, pp. 2:59-2:60, pp. 2:564-2:565.

(56) References Cited

OTHER PUBLICATIONS

Intel, "Intel Itanium Architecture Software Developer's Manual, vol. 3: Intel Itanium Instruction Set Reference", Revision 2.3, May 2010, p. 3:29, p. 3:53.
International Search Report for PCT/US2020/29406 dated Jul. 17, 2020.
Jeffrey S. Chase, Henry M. Levy, Michael J. Feeley, Edward D. Lazowska, "Sharing and Protection in a Single-Address-Space Operating System", ACM Transactions on Computer Systems 1994, vol. 12, No. 4, pp. 271-307.
Joe Devietti, Colin Blundell, Milo M. K. Martin, Steve Zdancewic. "HardBound: Architectural Support for Spatial Safety of the C Programming Language", ASPLOS-XIIII Proceedings—Thirteenth International Conference on Architectural Support for Programming Languages and Operating Systems, Seattle, Washington, Mar. 1-5, 2008. AMC SIGARCH Computer Architecture News 36(1) pp. 103-114.
Nagarakette et al., WatchdogLite: Hardware-Accelerated Compiler-Based Pointer Checking, Feb. 2014, 10 pages.

\* cited by examiner

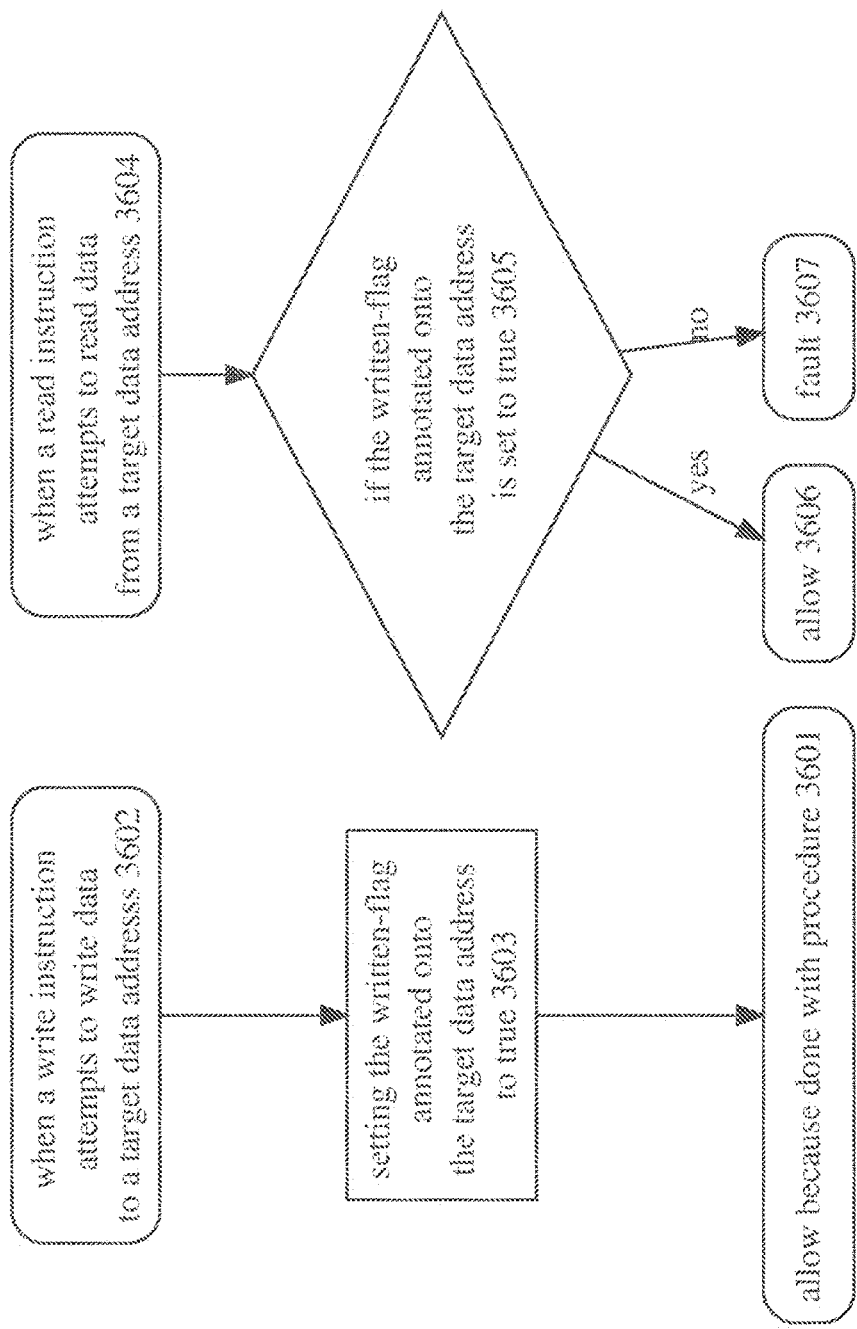

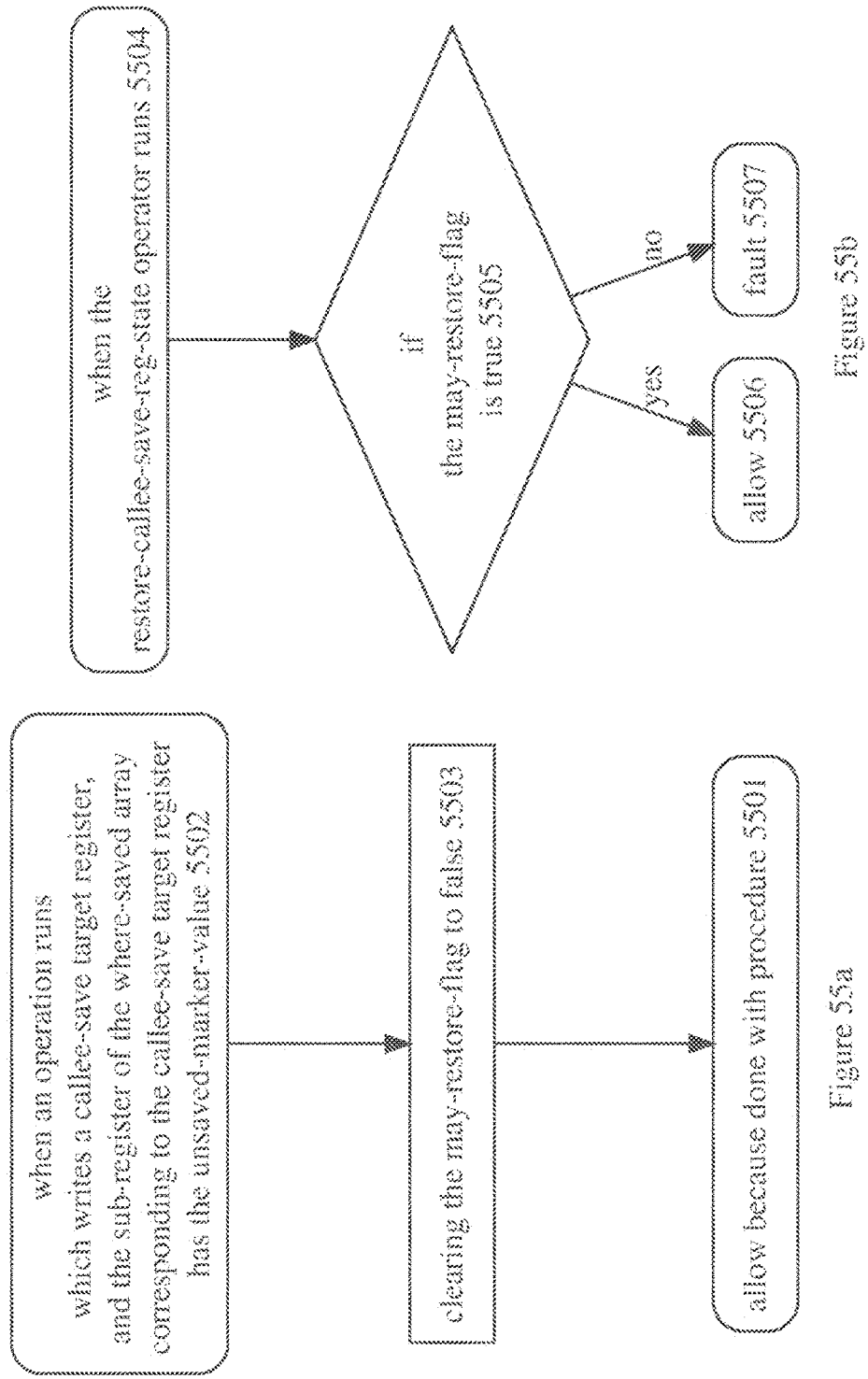

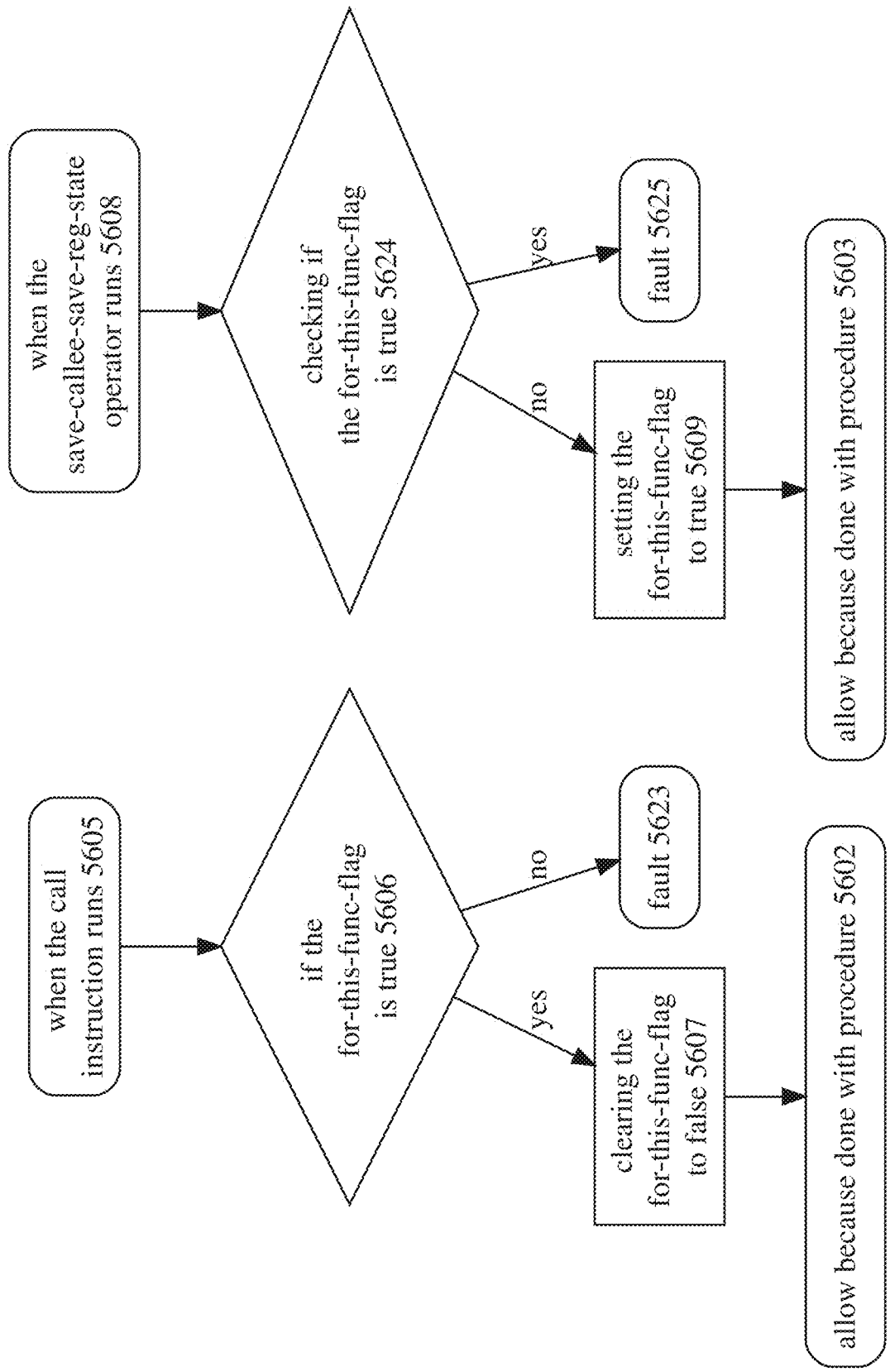

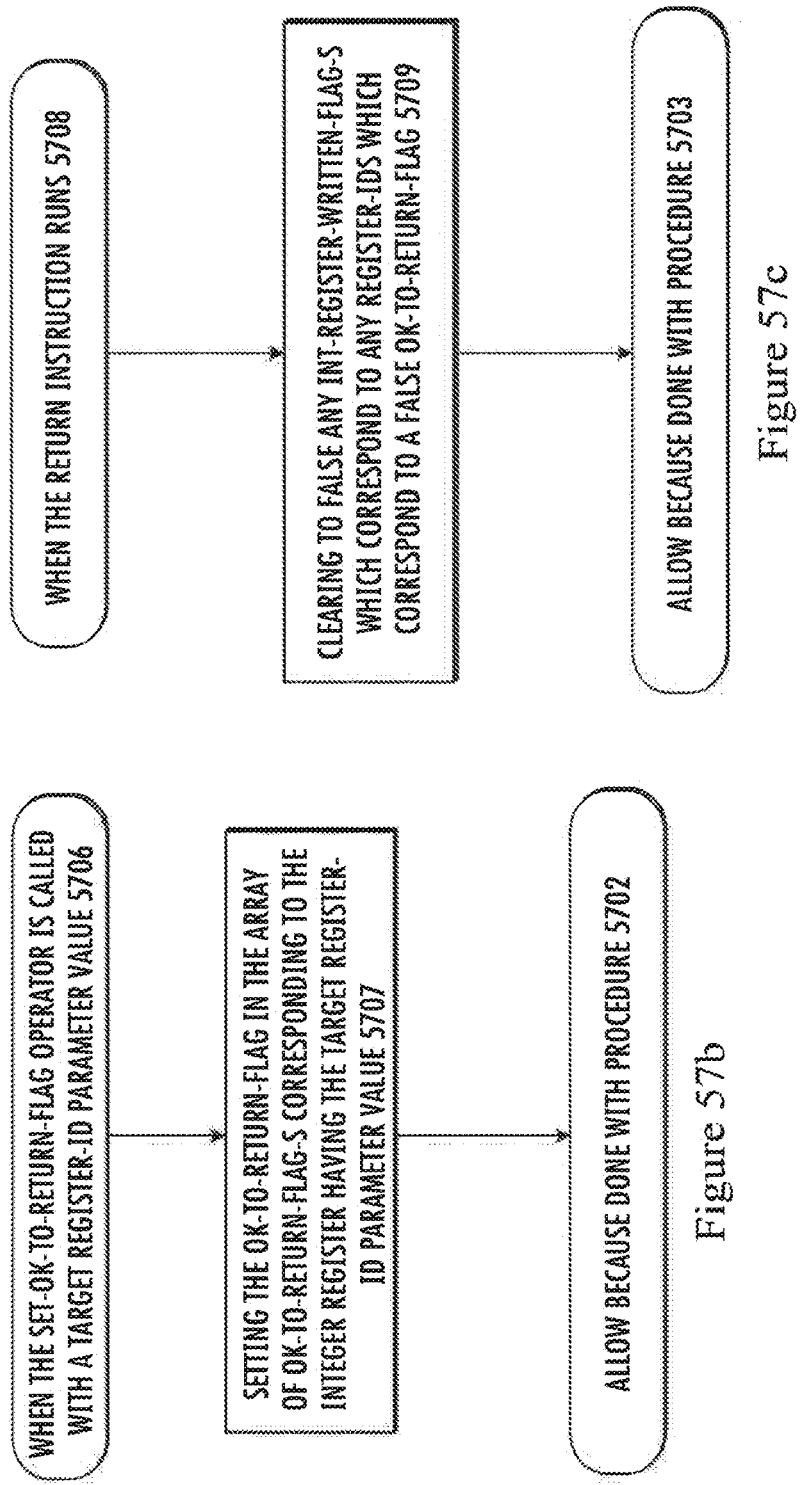

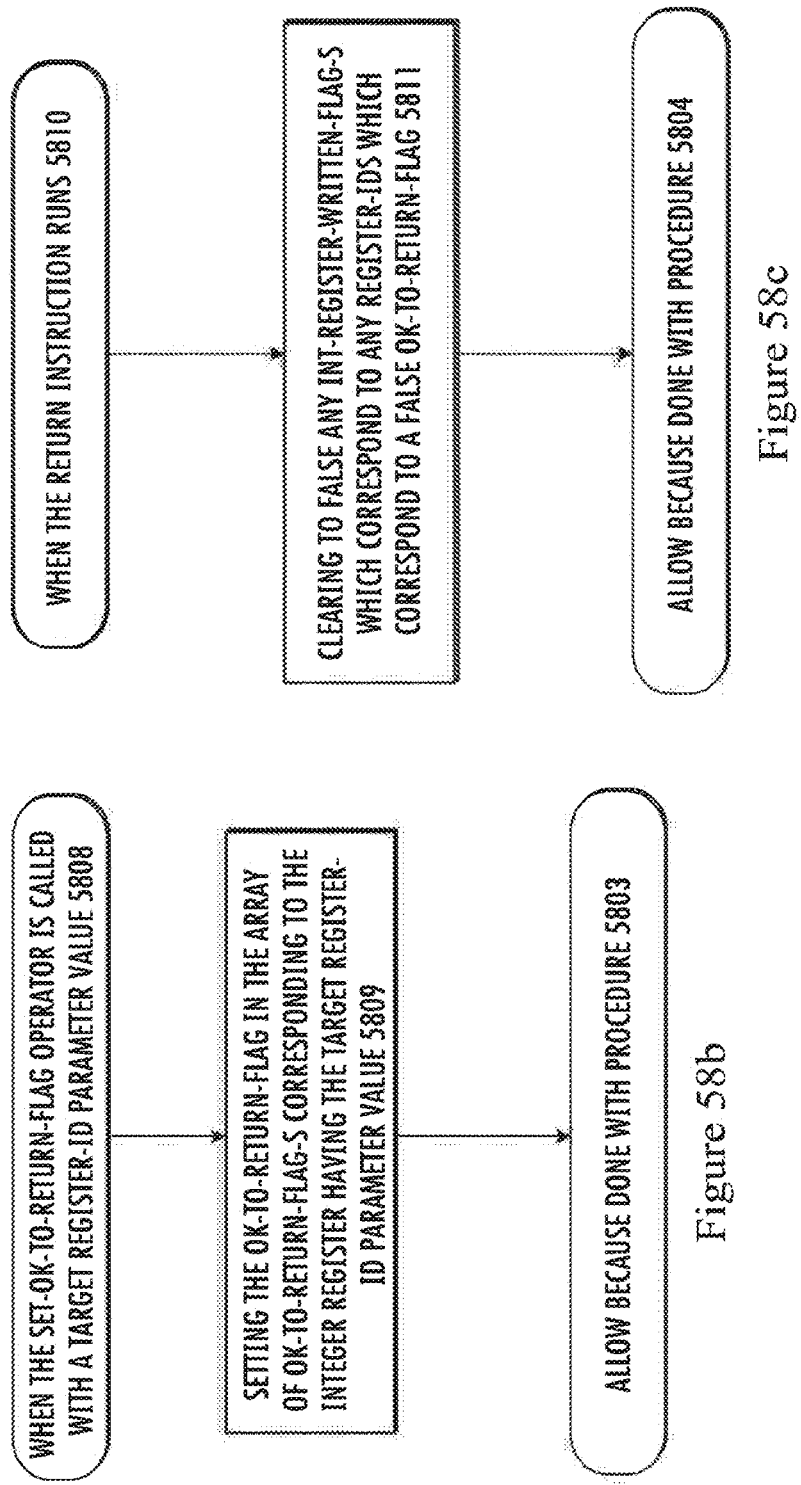

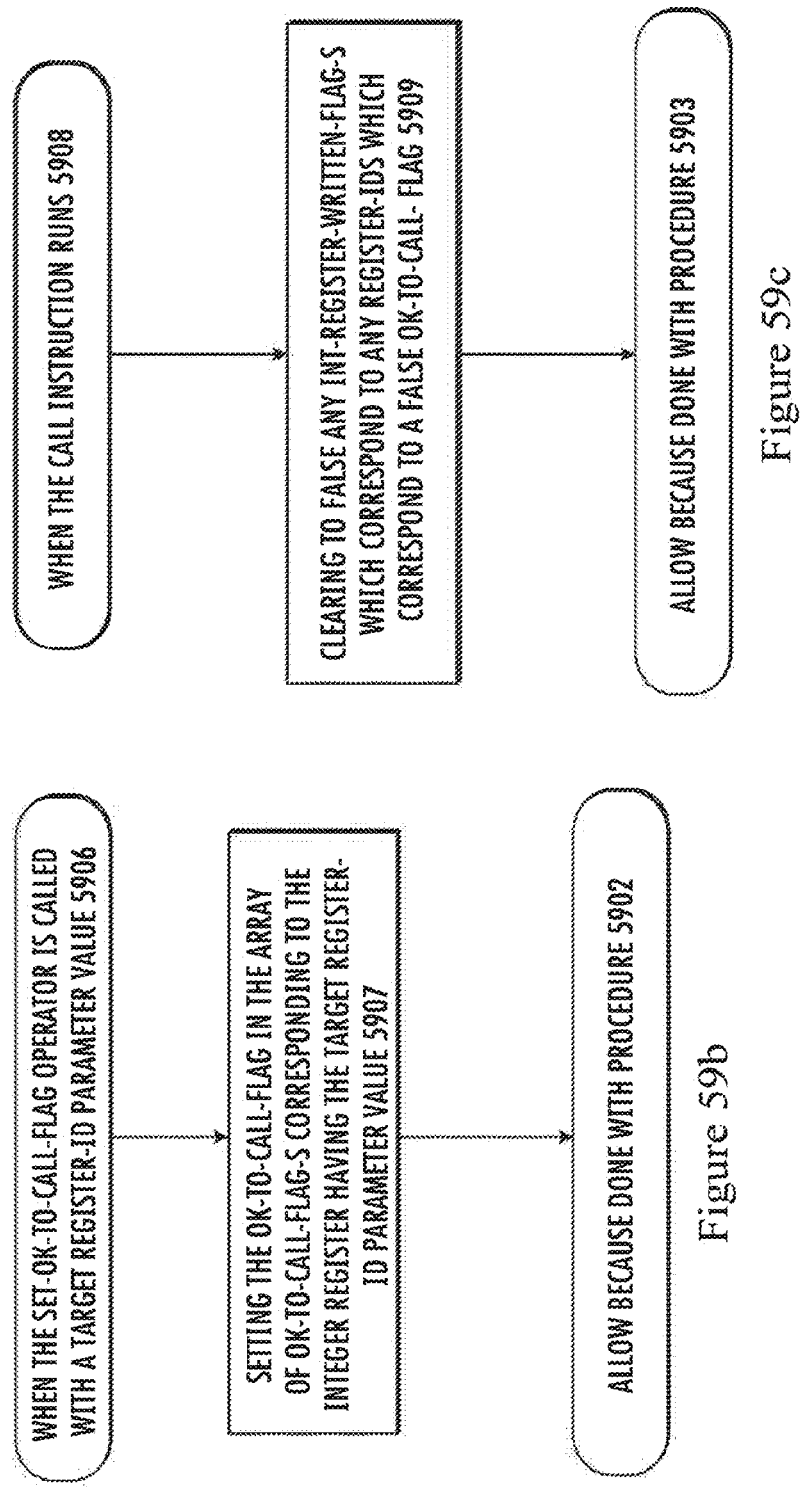

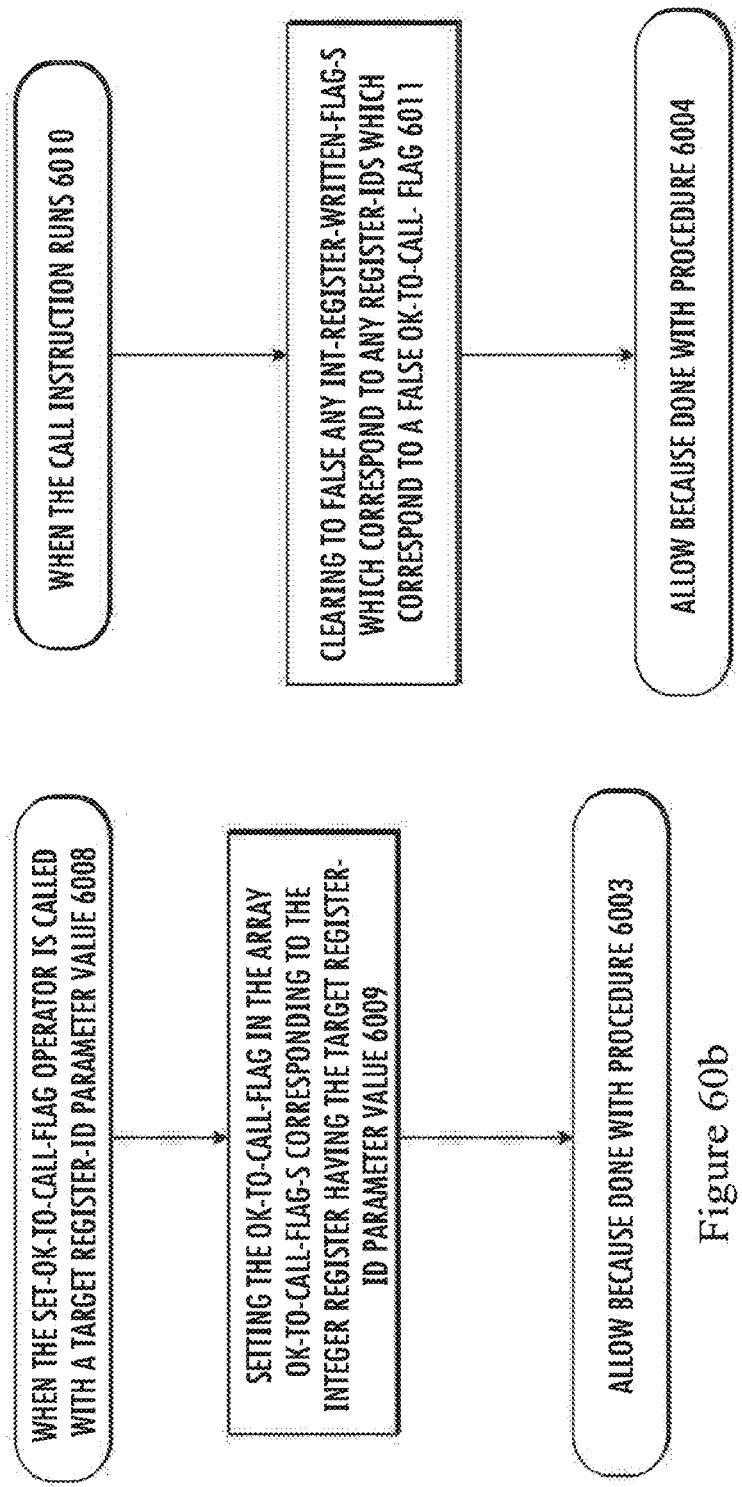

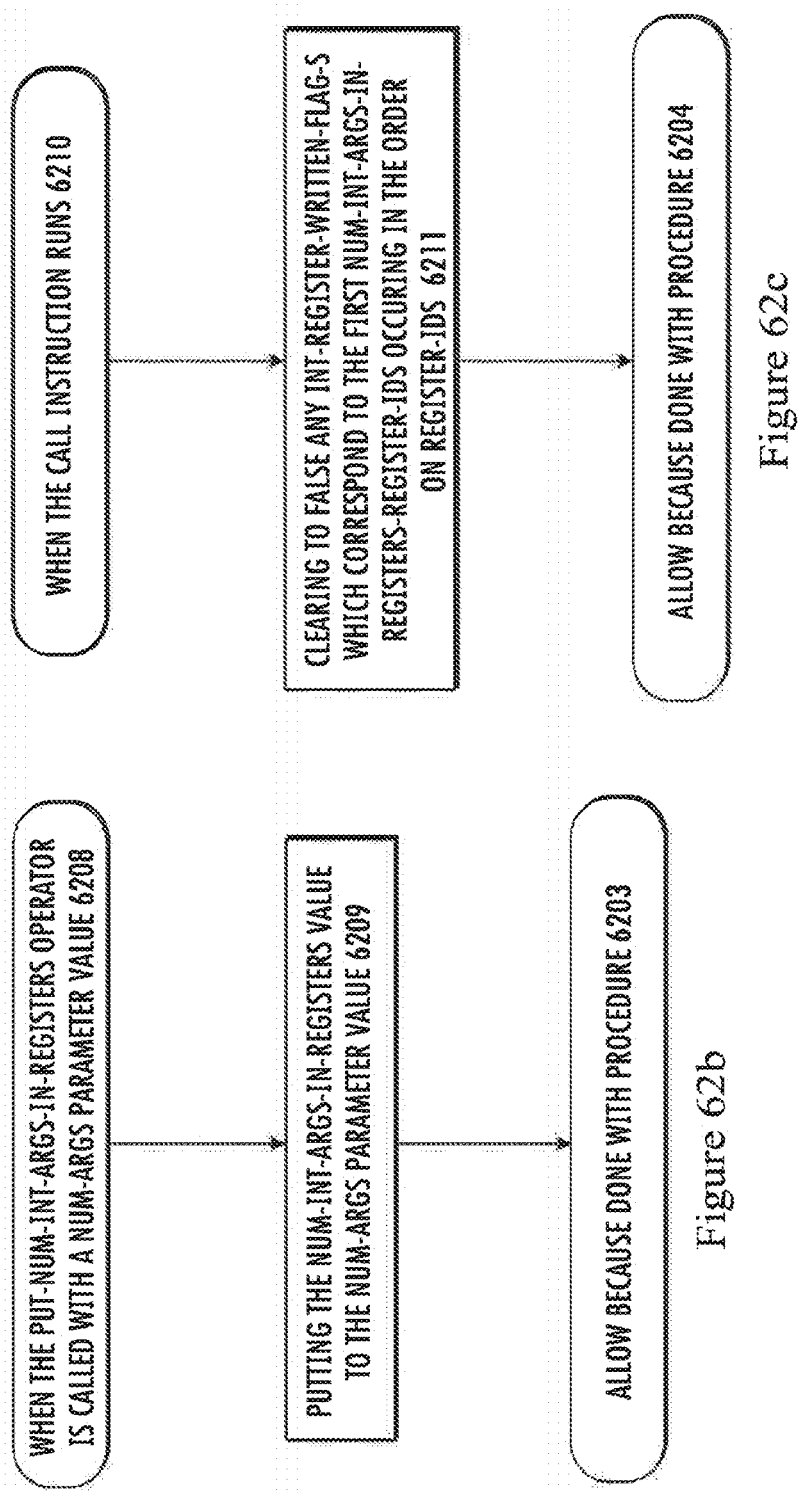

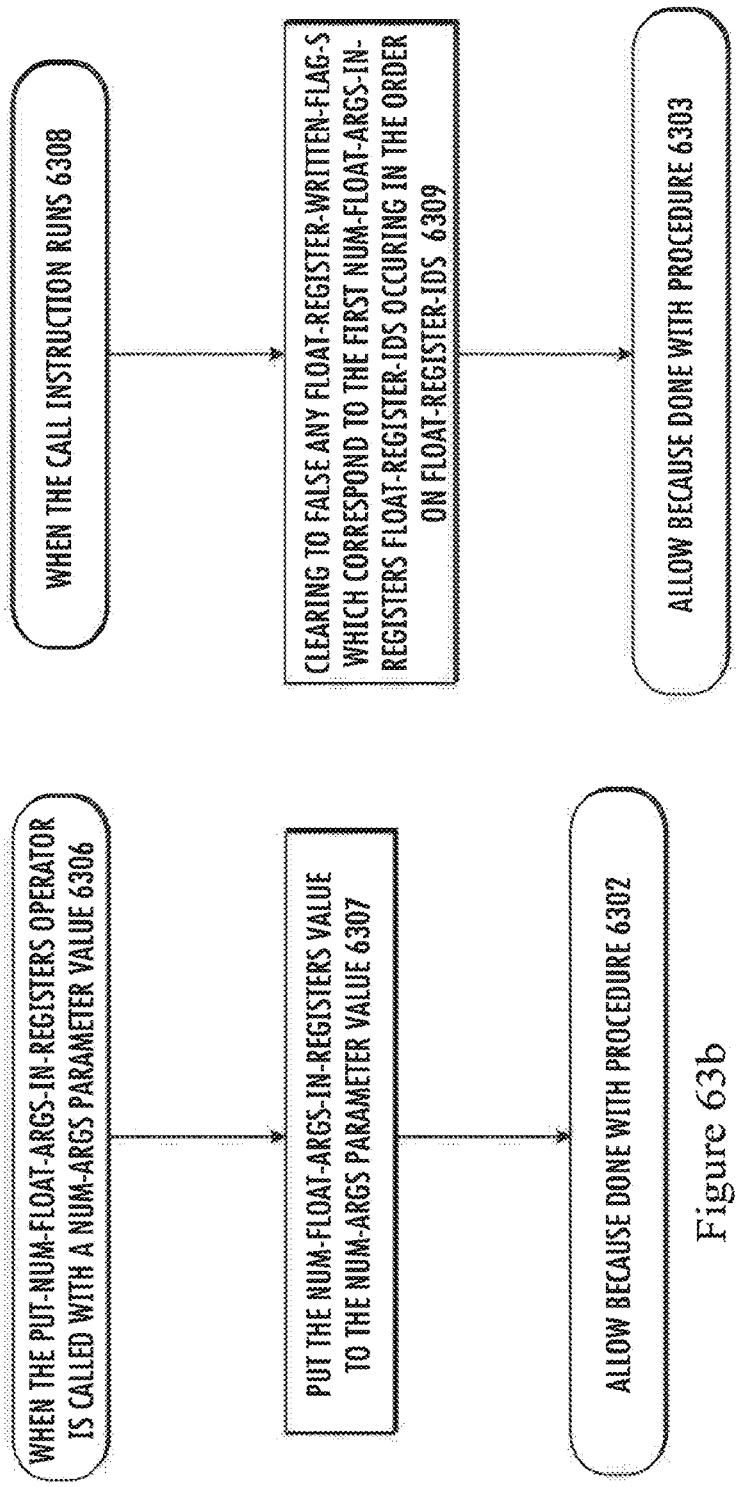

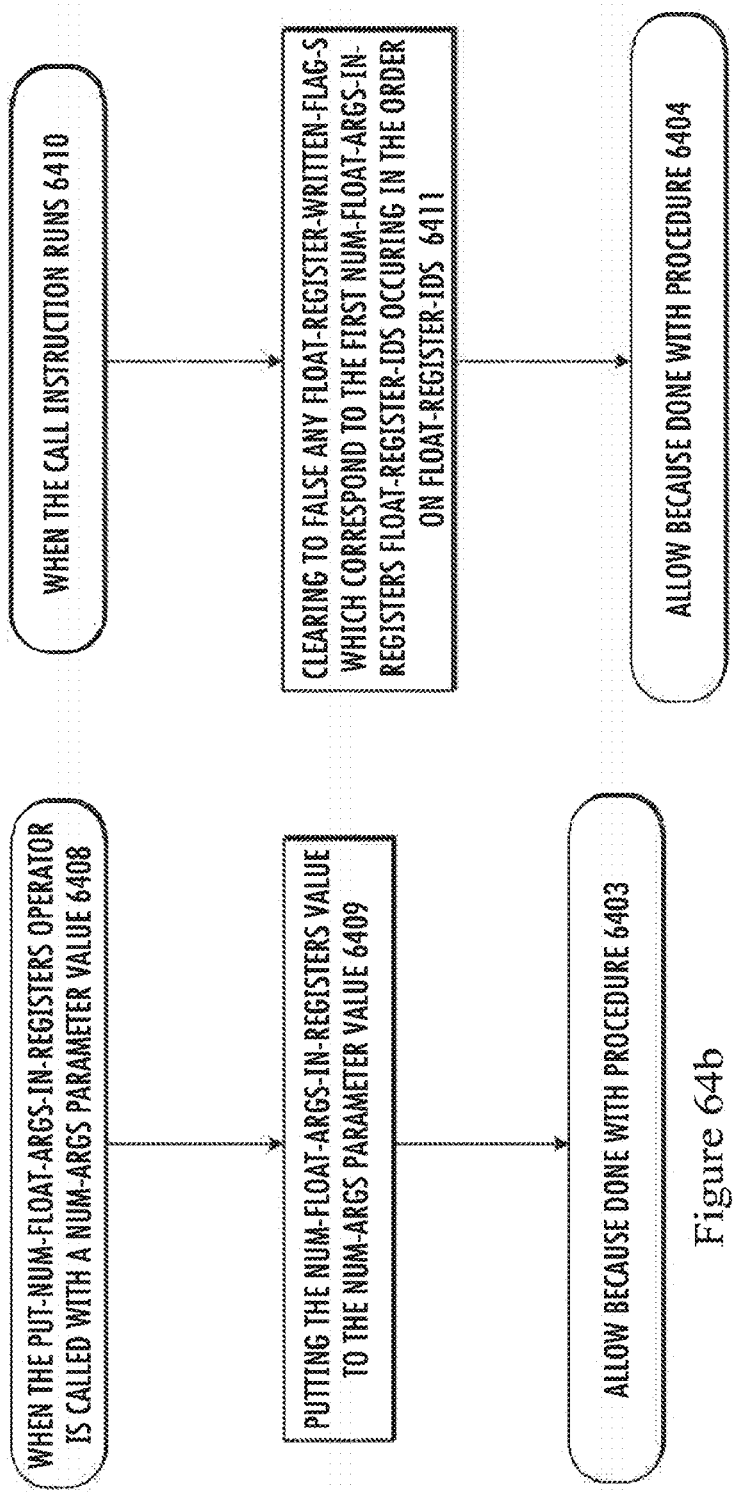

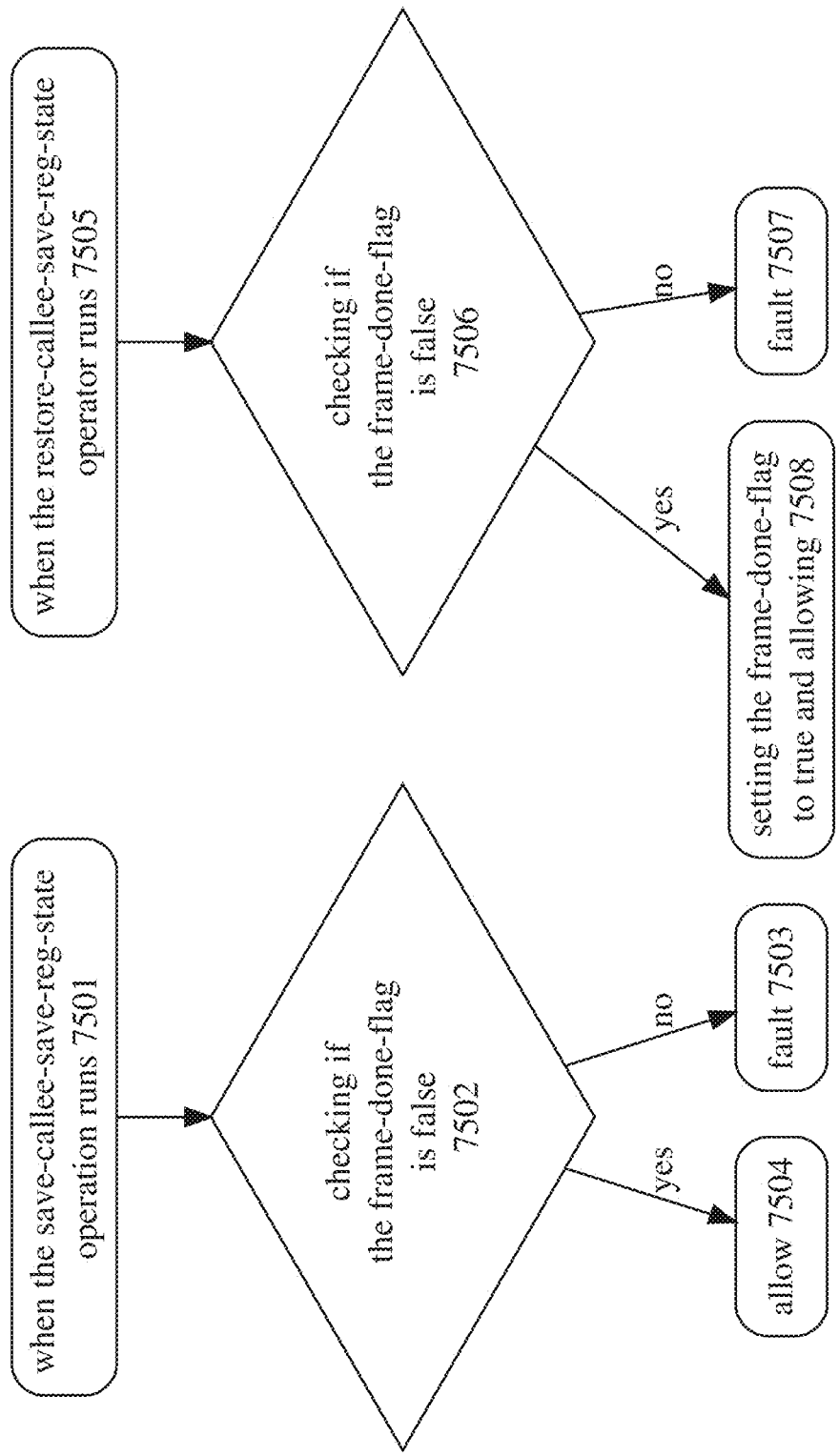

HARDWARE ENFORCEMENT OF BOUNDARIES ON THE CONTROL, SPACE, TIME, MODULARITY, REFERENCE, INITIALIZATION, AND MUTABILITY ASPECTS OF SOFTWARE

CROSS-REFERENCE TO RELATED APPLICATIONS

This application is a continuation-in-part which claims priority from International Application No. PCT/US20201029406, entitled "HARDWARE ENFORCEMENT OF BOUNDARIES ON THE CONTROL, SPACE, TIME, MODULARITY, REFERENCE, INITIALIZATION, AND MUTABILITY ASPECTS OF SOFTWARE", which was filed on Apr. 22, 2020, which claims the benefit of Provisional Application No. 62/837,145, filed Apr. 22, 2019, entitled "Hard Object: Hardware Enforcement of Boundaries on the Control, Space, Time, Modularity, Reference, and Mutability Aspects of Software", The aforementioned applications are hereby incorporated herein by reference.

This application also claims one or more inventions which were disclosed in Provisional Application No. 63/071,934 filed Aug. 28, 2020, entitled "HARDWARE ENFORCEMENT OF BOUNDARIES ON THE CONTROL, SPACE, TIME, MODULARITY, REFERENCE, INITIALIZATION, AND MUTABILITY ASPECTS OF SOFTWARE". The benefit under 35 USC § 119(e) of the United States provisional application is hereby claimed, and the aforementioned application is hereby incorporated herein by reference.

BACKGROUND OF THE INVENTION

Field of the Invention

The invention pertains to the field of microprocessor systems, more particularly, the invention is directed to hardware enforcement of boundaries on the control, space, time, modularity, reference, initialization, and mutability aspects of software implemented within the microprocessor.

Description of Related Art

This application is related to the following patents filed by one of more of the present inventors, which are hereby incorporated herein by reference: U.S. Pat. Nos. 8,364,910, 9,934,166, 9,569,612, and U.S. Pat. No. 9,935,975.

Software correctness and security are critical to modern computing infrastructure: people now use mobile phones for banking and computers now drive cars. Further, in a networked world, software by different authors often intimately cooperates on the same machine: plug-ins, mash-ups, and mobile code are increasingly common examples.

It is currently beyond the state of the art to construct software such that abstraction violations, whether errant or malicious, never occur. Today all attempts to achieve partial solutions to this problem exhibit one of three pathologies: the extreme isolation of separate address spaces, the clumsy bluntness of a type-safe runtime, or the nightmarish tedium of formal verification.

As a result, the domain of software is buggy and unsafe. Engineers who build machines made of atoms (rather than of bits) rely on locality of causality to make machines behave correctly in the presence of failure or attack: cars have a firewall between the engine and the driver; houses have walls and a lock-able door between inside and the outside. However, hardware engineers have worked diligently to eliminate all locality of causality within software: that is, on a modern computer, within a given memory space, any instruction can access any data. Hardware engineers did this because giving software engineers such freedom makes it easy for them to write programs that do what you want; however, having this much freedom also makes it easy to write programs that do what you really do not want.

The problem of correctness is intractable at scale. Therefore, a strategy is needed that gives software engineers the power to enforce sufficient locality of causality upon software such that the problem of correctness becomes tractable.

SUMMARY OF THE INVENTION

According to one embodiment of the present invention, a method for regulating an execution of a program on a computer is disclosed, wherein the computer has instruction addresses and data addresses. The method comprises: providing at least some of the instruction addresses with instructions, wherein at least some of the instruction addresses are annotated with a module identifier; providing at least some of the data addresses with data, wherein at least some of the data addresses are annotated with a mod-module identifier and at least some of the data addresses are annotated with a text data operation suffix length; conducting a text data operation of at least one of the instruction addresses with a target data address from among the data addresses; checking if the module identifier annotated onto the instruction address matches a module identifier annotated onto the target data address, except for rightmost bits of a length of the text data operation suffix length bits annotated onto the target data address; and raising a fault if the module identifier annotated onto the instruction address does not match the module identifier annotated onto the target data address.

According to another embodiment of the present invention, a method for regulating an execution of a program on a computer with memory locations, wherein the computer has instruction addresses, data addresses, and memory locations and an absolute pointer with a target data address and an operator target flag is disclosed. The method comprising: providing at least some of the data addresses with data and at least some of the data is annotated with a module owner identifier; providing at least some of the instruction addresses with instructions and at least some of the instructions are annotated with a module owner identifier that includes a memory access instruction that accesses at least some of the data through the absolute pointer; conducting a memory access instruction to access data through the absolute pointer; determining if the module owner identifier annotated onto the instruction address equals the module owner identifier annotated onto a target data address of the absolute pointer as a first check; and checking if the operator target flag annotated onto the absolute pointer is set to true as a second check, such that if both of the first check and the second check fail, raising a fault.

According to another embodiment of the present invention, a method for regulating an execution of a program on a computer with memory locations, wherein the computer has instruction addresses, data addresses, and data pointers is disclosed. The method comprising: providing at least some of the data addresses with data wherein at least some of the data addresses are annotated as stack memory; providing at least some of the instruction addresses with instructions, wherein at least some of the instructions are annotated with a module owner identifier that includes a memory access instruction that accesses at least some data through at least one of the data pointers; providing at least some of the data pointers with a referable flag annotation; conducting a memory access instruction to access data through at least one of the data pointers checking if the data address is annotated as stack memory and checking if the data pointer is annotated with the referable flag annotation set to true; such that a fault is raised if the data address is annotated as stack memory and the data pointer is not annotated with the referable flag annotation set to true.

According to another embodiment of the present invention, a method for regulating an execution of a program on a computer with multiple integer registers each having a unique register identifier memory locations is disclosed. The method comprising: providing an array of integer register written flags, each integer register written flag corresponding to at least one of the integer registers; providing an array of ok-to-call flags, each ok-to-call flag corresponding to each of the at least one integer registers; providing a set ok-to-call flag operator having a target register identifier parameter for a target register; providing at least one operator which reads a value of the target register, the target register having a target register identifier corresponding to the target register identifier parameter; providing an unwritten indicator datum; conducting a call instruction, such that when an operator runs which reads the value of the target register, the integer register written flag is checked to determine if the integer register written flag is set to false; if the integer register written flag is set to false: reading the unwritten-indicator-datum instead of the value in the target register when the set-ok-to-call flag operator is called with a value of the target register identifier parameter, setting the ok-to-call flag in the array of the ok-to-call flags corresponding to the at least one integer registers having the target register identifier parameter, and when the call instruction runs, clearing to false any integer register written flags which correspond to the at least one of the integer registers which correspond to a false ok-to-call flag.

BRIEF DESCRIPTION OF THE DRAWING

FIG. 36a shows when writing heap-global and selling the written

FIG. 36b shows when reading heap-global, faulting unless the written-flag is set.

FIG. 55a shows if a callee-save register is written before it is saved, clearing the may-restore-flag FIG. 55b shows when the restore-callee-save-reg-state operator runs, either allowing or faulting if the may-restore-flag is true.

FIG. 56a shows when the call instructions runs, maintaining the for-this-func-flag.

FIG. 56b shows when the save-callee-save-reg-state operator runs, setting the for-this-func-flag to true.

FIG. 57b shows using the ok-to-return-flag-s to express which int registers are allowed to be returned.

FIG. 57c shows clearing any int-register-written-flag corresponding to a clear ok-to-return-flag upon a return.

FIG. 58b shows using the ok-to-return-flag-s to express which int registers are allowed to be returned.

FIG. 58c shows clearing any int-register-written-flag corresponding to an ok-to-return-flag upon a return.

FIG. 59b shows when the set-ok-to-call-flag operator is called with a target register-id parameter value, setting the ok-to-call-flag in the array of ok-to-call-flag-s corresponding to the integer register.

FIG. 59c shows when calling a function, clearing the int-register-written-flag on any register that does not have a set ok-to-call-flag.

FIG. 60b shows when the set-ok-to-call-flag operator is called with a target register-id parameter value, setting the corresponding ok-to-call-flag.

FIG. 60c shows when calling a function, clearing the int-register-written-flag on any register that does not have a set ok-to-call-flag.

FIG. 62b shows when the put-num-int-args-in-registers operator is called with a num-args parameter value, putting the num-int-args-in-registers value to the num-args parameter value.

FIG. 62c shows when calling a function, clearing the int-register-written-flag on the first num-int-args-in-registers argument registers.

FIG. 63b shows when the put-num-float-args-in-registers operator is called with a num-args parameter value, putting the num-float-args-in-registers value to the num-args parameter value.

FIG. 63c shows when calling a function, clear the float-register-written-flag on the first num-float-args-in-registers float argument float-registers.

FIG. 64b shows when the put-num-float-args-in-registers operator is called with a num-args parameter value, putting the num-float-args-in-registers value to the num-args parameter value.

FIG. 64c shows when calling a function, clearing the float-register-written-flag on the first num-float-args-in-registers float argument float-registers.

FIG. 75a shows the relationship between the frame-done-flag and the save-callee-save-reg-state operator.

FIG. 75b shows the relationship between the frame-done-flag and the restore-callee-save-reg-state operator.

DETAILED DESCRIPTION OF THE INVENTION

Figure 1A:
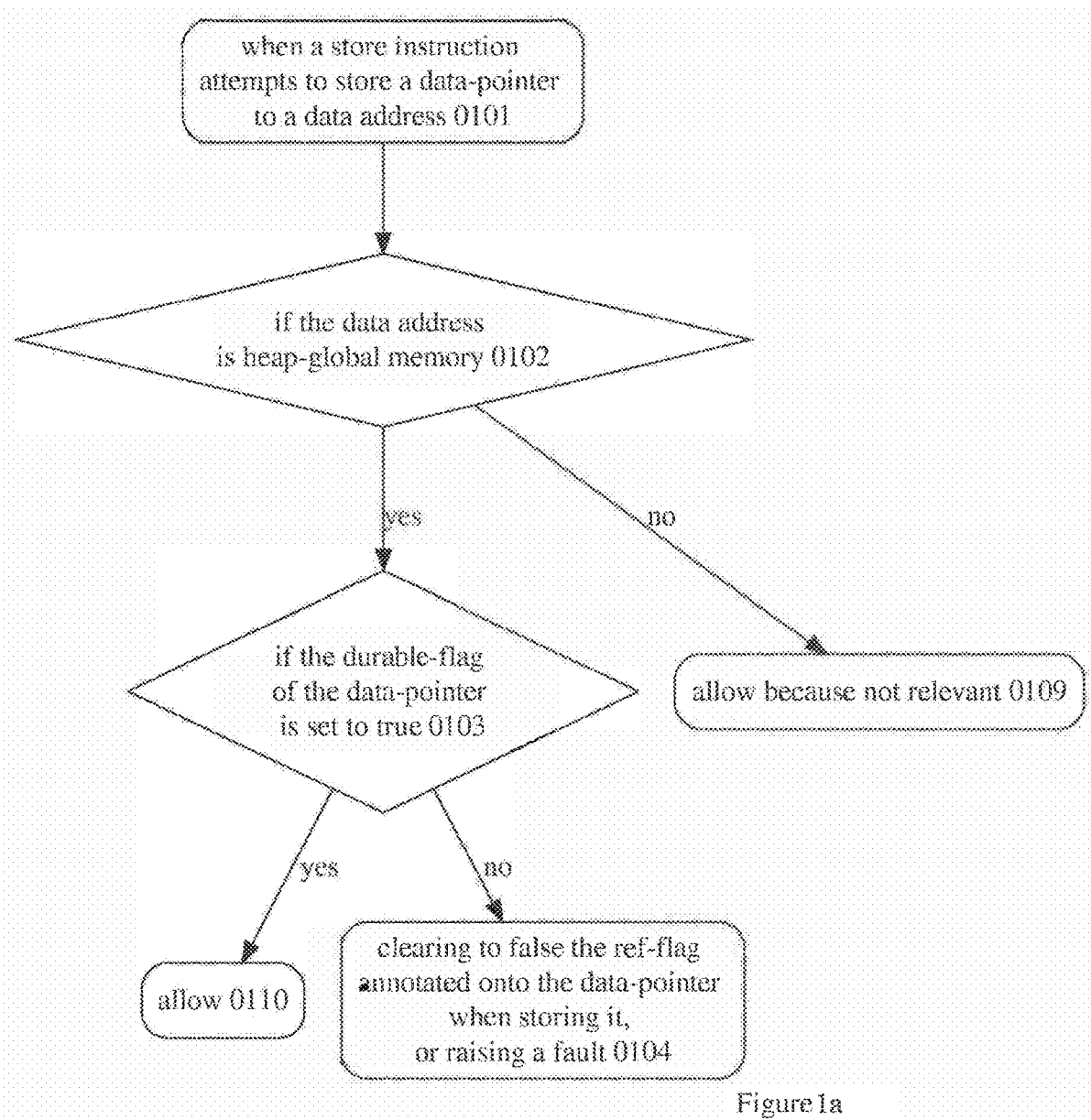
FIG. 1a shows enforcing the heap-global data pointer durable-flag.

The invention disclosed herein is called "Hard Object" ("HO") and a specific implementation embodiment of it referred to as "Dewdrop".

Hard Object is:
a lightweight modification to existing computers,
compiler changes or source-to-source transforms performed during the software build process, and
a small collection of libraries and minor modifications to existing standard system software and libraries, such as the loader, CRT0, and libc.

Hard Object allows a program author to enforce various kinds of locality of causality in software, comprising the following properties:
1. Control: association of code with other code so that dynamic control flow transfers go only to targets specified at static time, providing a kind of locality called structured control flow, which includes the function call graph;
2. Space: association of data with other data, providing a kind of locality called an object;
3. Time: association of data and the temporal range between allocation and destruction, providing a locality called a lifetime;
4. Modularity: association of data and code that operates on it, providing a kind of locality called a module;
5. Reference: association of name (pointer) and the value to which it refers, providing a locality called a capability;
6. Initialization: association of reads and writes, providing a kind of locality called an initialization where all reads must occur after an initial write; and
7. Mutability: association of construction and computation, providing a kind of locality called "an (immutable/const) construction where all writes must occur before any reads; even if an object is mutable, a pointer or reference to it may be made a pointer-to-const where write access through that pointer is prohibited.

Some perhaps non-obvious consequences of those properties:
Function-call safety: Hard Object makes it safe for functions to call or be called by other functions they do not trust. Caller and callee cannot access each other's stack. They cannot corrupt each other's registers. The callee must honor the callee-save register contract.

Optional capabilities: Data and function capabilities may be used, but are not required: the requirement to use a capability to access an object can be turned off per object and if that object is also private or immutable another module cannot use this situation to hurt the first module. The flagship example is that Hard Object enables an xor bidirectional list module that is fully protected from other modules.

Unavoidable dynamic checks: Where these properties do not suffice to guarantee a property at static time, dynamic checks may be added to the program and the constraints on control flow enforced by Hard Object prevent such dynamic checks from being avoided by the program, in a manner similar to the prior art Google® Native Client [google-native-client] system. In fact, the Undecidability of the Halting Problem guarantees that such dynamic checks will always be required.

Some platforms speak only in the familiar: in a C program running on Unix®, any data can be touched by any code in the process. Other platforms speak only in the formal: in a Java® program, a programmer cannot implement an xor bidirectional list, as pointers may not be xor-ed in Java®. In contrast, Hard Object speaks both the familiar and the formal, allowing the program authors to decide where the boundaries are. Consider, for example, an xor-bidirectional-list module which exports pointers to list objects and also maintains internal node objects.

Formal: unlike C, the module may export formal pointers to public list objects to the client which cannot be forged.

Informal: unlike Java®, the module max use internal pointers to internal Node objects which may be xor-ed.

Hard Object is a software platform that can speak in both the formal and the informal in this way, just as human natural languages do. As the external pointers may not be forged, they may act as object-granularity capabilities. Further, although the informal pointers may be forged, the modularity aspect of Hard Object prevents the client from using these informal pointers to access the module-internal objects. The point is that, if desired, Hard Object provides a way to be creative by turning off the formal constraints locally. While the resulting module would need to use another method to ensure correctness locally, such as a theorem prover, the theorem it would need to prove would be local.

Hard Object protects you from others; Hard Object does not necessarily protect you from yourself (though sometimes it does anyway). Hard Object assumes that module authors will act in their own self-interest and therefore if given the tools to protect themselves will do so. This assumption vastly simplifies the problem and allows the programmer to control the transition between the familiar and formal modes above. That said, memory-safety is guaranteed by default, and if a module turns off any aspects of memory-safety, such as is required for the internal nodes of an xor-bidirectional-list, doing this cannot compromise the safety of another module. This familiar-and-formal feature of Hard Object removes the brittleness which defeats all other competing prior art systems. All systems guaranteeing properties of the execution of a program both (a) provide constraints that the user wants and (b) require further constraints so that those provided can be made to work; the tension between these two kinds of constraints is the heart of the problem. Competing prior art systems attempting to provide similar guarantees to those of Hard Object are either (1) weak: provide to few constraints and therefore do not solve the problem (e.g. Crash-safe/Dover Microsystems®, Mondriaan Memory Protection) or (2) brittle: require too many constraints and therefore become unusable for certain necessary tasks (e.g. Java®), and then, recognizing this, provide an escape hatch (e.g. Java® Native Interface calls) which when used causes all guarantees to be lost all at once. Hard Object does not exhibit this brittleness. Do note that in computing this simultaneous combination of both soundness of guarantee and flexibility of expression (that is, strength without brittleness) is a property more difficulty to achieve than one may at first imagine, and yet is critical to any infrastructure that is going to be entrusted with our whole lives, as we have done with computing.

This familiar-and-formal feature alone makes the difference between Hard Object and all other competing prior art systems. All systems guaranteeing properties of the execution of a program both (a) provide constraints that the user wants and (b) require further constraints so that those provided can be made to work; the tension between these two kinds of constraints is the heart of the problem. Competing prior art systems attempting to provide similar guarantees to those of Hard Object are either (1) weak: provide to few constraints and therefore do not solve the problem (e.g. Crash-safe/Dover Microsystems®, Mondriaan Memory Protection) or (2) brittle: require too many constraints and therefore become unusable for certain necessary tasks (e.g. Java®), and then, recognizing this, provide an escape hatch (e.g. Java® Native interface calls) which when used causes all guarantees to be lost all at once.

Hard Object is a very lightweight intervention to the hardware and software of existing system design. The current Dewdrop design and software embodiment/implementation of Hard Object is a modification of the 64-bit version of the prior art RISC-V® instruction set architecture ("RV64"), riscv-gnu-toolchain, the RISC-V® support libraries, and the must libc [must-libc] C library. Throughout, this detailed description speaks of an embodiment of Hard Object implemented as an augmentation/modification of the prior art RISC-V® system; this detailed description does not explicitly repeat the phrase "in one embodiment" in each such case, and therefore it is made explicit here that the fact that the RISC-V® embodiment is only one embodiment of Hard Object is to be understood every time RISC-V® is mentioned.

The modifications Hard Object makes to a standard prior art system amount to the following:

Observer interface to the Central Processing Unit (CPU): Hard Object need not integrate deeply throughout the CPU; instead the Hard Object machine observes and intercepts the operation of the CPU at well-defined points, observing and intercepting the state of the CPU, faulting if the RISC-V® machine does something illegal:

Hard Object watches the control flow (instruction start/stop, calls, returns, branches, jumps);

Hard Object watches and intercepts any register data flow (reads/writes from/to registers), Hard Object watches and intercepts the Arithmetic Logic Unit (ALU) input and output, hiding formal pointer metadata on the way into the ALU and restoring it again on the way out (in one embodiment, faulting if Hard Object is unable to do this, such as due to the user putting their own metadata there);

Hard Object watches and intercepts the memory traffic (loads and stores);

Hard Object also adds instructions/operations, hard-object-calls (or Dewdrop calls or "dcalls"); note that there are many possible embodiments of these Hard Object operations, such as: new hardware instructions, implied behavior by read/writing control status registers, or system calls (syscalls or ecalls) implemented in hardware; further, some such instructions/operations could be implemented in software using other such instructions/operations.

In one embodiment, toolchain modifications are implemented entirely as source-to-source transforms. Hard Object is so lightweight that it does not alter the base compiler toolchain at all (there is not even a Hard-Object-specific compiler: the Hard Object system just uses the standard riscv-gcc compiler, albeit the build process augmented by being interleaved with Hard Object source-to-source transforms). Though the standard compiler toolchain is not altered, the whole build-load-run process is altered by adding further stages, most of them using source-to-source transforms; note that, while doing so, Hard Object supports nearly all of the 134 optimization flags turned on by gcc-O2:

C source-to-source transform run after the preprocessor, assembly source-to-source transform run after the compiler, linker script modified to manage Hard Object metadata sections, executable source-to-source transform: run after linking to "link" the metadata added during the previous transforms, and hard-object-sysruntime: runs before the C-runtime (crt0) which runs before main( ); this code annotates the hard-object metadata onto the program before it runs.

Minor Changes to Standard System Software and Libraries:

modify the prior art RISC-V® pk proxy-kernel used by the prior art RISC-V® spike simulator, mostly changing the loader and prohibiting memory allocation syscalls (brk, mmap, etc.) from non-system code.

link against the must libc, mostly changing CRT0 and low-level memory routines, such as memory( ), and turning off the default memory allocator, malloc( ) (and its related functions).

Observer design: The observer design allows the original chip design to remain almost unchanged and therefore allows Hard Object to be merely attached to any CPU, such as a prior-art RISC-V® machine. This factoring is realized as a software hard-object-observer simulator that observers/intercepts the riscv-spike simulator.

Low to zero programmer annotation burden: Porting C code to Hard Object to the point of having memory safety amounts to changing a single line in the Makefile to replace gcc with the Hard Object compiler-driver script. The only C idioms that Hard Object currently does not support automatically, and that would therefore require a manual porting process, are if the program has written its own memory allocator, did non-pointer like things with pointers (xor-ing them), or did some other very rare things that even real-world highly-optimized C does not seem to ever do that would trigger Hard Object corner cases. If the programmer gets more clever the changes required to the user program are proportional to the desired cleverness.

Hard Object is absolute: when Hard Object guarantees a property, that guarantee is absolute, not best-effort: the enforcement of the Hard Object properties do not depend on an assumption that a hash function will never collide or that a counter will never roll over. Further, correctness does not rely on the toolchain modifications; if the user does not use the modifications to the Hard Object software toolchain but runs the Hard object hardware, the Hard Object properties will be enforced, but the program will not run as it will very likely violate a Hard Object check. Further, one module need not trust the compiler of another module: multiple mutually-untrusting C modules may run and interact within the same address space and yet be protected from each other.

Hard Object is hardware-naive: All of Hard Object is "naive" in the sense that Hard Object assumes that the abstraction layers below Hard Object do not fail. While Hard Object does not introduce Spectre/Meltdown-style vulnerabilities, Hard Object does not attempt to enforce/maintain the instruction/data abstraction, so Hard Object does not protect against, say, hardware side-channel attacks that leak crypto keys through process timing or the heat signature of the processor. Hard Object also does not attempt to maintain the transistor/electronics abstraction, so Hard Object does not protect against attacks that abuse the hardware itself, such as row-hammer, or attacks that use the effects of external radiation, such as a hair-dryer or cosmic rays.

Hard Object not only improves the correctness and security of existing software, just as virtual memory before it, but enables software to be architected in a new way.

Hard Object makes sandboxing untrusted code straightforward. The module is the granularity of trust: the correctness of a module depends on everyone who is an author of the module and all the tools used to build the module; further the correctness of a module does not depend on the authors or tools used to build other modules, other than the trusted system modules.

Factoring a program into even just two modules can make a dramatic difference in reliability. Consider factoring a complex editor into two modules: (1) a pretty graphical user interface (GUI) having only ephemeral state and (2) a database holding the important document state. The GUI module can export a restart( ) function that forgets all its state and re-queries it from the database module. Now, when the GUI module faults, the kernel sees its restart function and so just reboots the GUI module, leaving the database running, and thereby preserving the important document state. By putting the screen and cursor positions into the database as well and using video double-buffering to hide the screen flash, one can envision an editor getting multiple null-pointer exceptions per second while the user does not even notice and simply keeps working. Editors could be designed this way now, but doing this is so heavyweight due to the coding and performance impact of factoring the program across processes, that programmers mostly just do not go to the trouble.

The Hard Object design separates the problem of use-after-free from the problem of garbage, thereby removing garbage collection as a necessary mechanism for providing memory safely. Garbage collectors can never be made to work well: Hertz and Berger [hertz-Merger-2005] estimate that the Java® garbage collection means three to five times as much memory is required to obtain performance equivalent to a program without garbage collection. Hertz and Berger states:

"We compare explicit memory management to both copying and non-copying garbage collectors across a range of benchmarks using the oracular memory manager, and present real (non-simulated) runs that lend further validity to our results. These results quantify the time-space tradeoff of garbage collection: with five times as much memory, an Appel-style generational collector with a non-copying mature space matches the performance of reachability-based explicit memory management. With only three times as much memory, the collector runs on average 17% slower than explicit memory management. However, with only twice as much memory, garbage collection degrades performance by nearly 70%. When physical memory is scarce, paging causes garbage collection to run an order of magnitude slower than explicit memory management."

The resulting version collector is a better than garbage collector in several algorithmically fundamental ways: unlike, garbage collection, version collection is easily made parallel, concurrent, memory-hierarchy-friendly, and if done often enough, never leaves dead memory in the client program (whereas garbage collection requires dead memory before it can even do something useful). That is, by separating the use-after-free problem from the garbage problem, Hard Object has fundamentally improved the situation.

Providing capabilities: Hard Object makes it straightforward to turn normal objects into capabilities. Using capabilities, Hard Object eliminates ambient authority: code may not access any object to which it has not been explicitly given a reference (formal pointer); doing this alone is a dramatic improvement in computer security. Hard Object allows building software using the prior art Capabilities design at the object granularity, however Hard Object does not require software to use Capabilities.

Deconstructing the kernel: Hard Object system, or "dangerous", code is much safer than prior art kernel mode. Hard Object dangerous code can alter metadata on any code, but its loads and stores are still subject to the constraints on said metadata Therefore, a static analysis of a Hard Object kernel can use the fact that the Hard Object boundaries are still enforced. While dangerous system code is trusted, it is much less likely to accidentally change any metadata than it is to accidentally make a wild write.

Hard Object makes it dramatically easier to build a micro-kernel:
  user code and all of the kernel share one address space eliminating the "distributed transactions" criticism Linus Torvalds has of micro-kernels built on standard hardware;
  all calls/messages are simple cross-module function calls (no messages queues), thereby eliminating one major difficulty of micro-kernel design;
  code in kernel mode gains the ability to alter metadata (which is always done using special-purpose instructions not otherwise used in ordinary code), but all its other usual operations (such as loads and stores) are still just as constrained as for user code;
  memory-mapped input/output (I/O) ports or instructions may be annotated (in the hardware) as being owned by their corresponding driver modules so that even device drivers can be run in user mode.

Hard Object also makes it straightforward to build an exo-kernel: software running on a Hard Object system has no need for the narrow user-kernel boundary, allowing the user code direct access to kernel data-structures in a safe way, as, again, the kernel is just another module. Large buffers of data corning off of disk or network no longer need be copied from kernel space to user space; instead the kernel can just transfer the ownership of the object to the user program. Further, note that there is no need to throw an existing monolithic kernel out and write a new one as an existing kernel can simply be factored gradually into a micro-exo-kernel.

One may envision a "micro operating system" comprising a micro-kernel, drivers, a scheduler, a file system, a network stack, and a portable user interface (UI) library (web browser widgets), and not much else. When the kernel is tiny and, say, also formally (machine-checked) proven correct, why not simply burn it into the firmware? When web apps are native apps, why have installed apps? When all the refactoring is done, a Hard Object system ends up resulting in something much closer to the dream of an information appliance.

Design Aesthetics

Here are some of the design aesthetics or meta-idioms that were used while making choices in the construction of Hard Object:
  Being lightweight: Hard Object tries to not be noticed at all in either hardware or software; in particular, for user software:
    no user annotation burden is required for normal C programs to have C semantics enforced automatically, and
    if a program does not get a Hard Object fault, then it is guaranteed to run the same as it would without Hard Object being present at all.
  Being absolute; no best effort: all guarantees are absolute; they do not depend on the absence of a hash value collision or a counter from rolling over, etc.
  Small pieces, loosely joined, no dark corners: as much as possible each semantically independent aspect of Hard Object is mapped to an independent mechanism and these mechanisms are localized metadata with the code or data they manage. Doing this makes features locally and orthogonally configurable.
  Hard Object is a toolbox, not a straight jacket; Hard Object protects you from others, but not from yourself: the unit of trust is the module, so within a module the author can turn off all protections of access to its own data. In this way Hard Object ensures that any program that can be implemented on a standard general purpose machine can be implemented on a machine augmented with Hard Object.
  When in doubt, zero it out: Hard Object attempts to name metadata so that the safest value is zero/false.
    For some parameters of Hard Object, for now it is much easier to make the default C behavior the default Hard Object configuration; for example, by default Hard Object configures pointers by default to have a set writable-target-flag, that is, pointer to non-const, rather than a clear writable-target-flag, pointer to const, the safer option.
    However, Hard Object can eventually be changed so that these parameters to default to the safer configuration in hardware, but still provide the C default behavior in software by making the compiler changes or source-to-source transforms automatically add explicit Hard-Object calls in the client software to do so.
  Simple is not minimal, simple is well factored: Hard Object restores locality of causality to software. Viewed from a correctness perspective, by providing these primitives Hard Object factors the proof of correctness of a program so that
    checks easily done in software are done in software and checks easily done in hardware are done in hardware.

Hard Object refactors the responsibilities between software and hardware in a way that removes far more complexity from the software than it adds to the hardware. This complexity removed is quite significant, complexity for which the undecidability of the halting problem means there is no answer. A premise of Hard. Object is that the resulting whole is much simpler than the current organization of software and hardware, that is, that simple is not minimal, simple is well-factored. Hard Object provides properties very similar to what Java® attempted to provide, only in a lightweight/deconstructed manner that also works in the kernel and admits of a smooth path to adoption for C and C++ programmers. Hard Object is what Java® should have been.

Semantics of software locality provided by Hard Object: Here are the semantic properties provided by Hard Object in terms familiar to a C programmer. All memory pages are marked as data or text (code). Some operations are "dangerous" (dangerous operation) in that they are powerful enough to destroy the guarantees provided by Hard Object altering metadata and saving ephemeral data to heap/global memory; these dangerous operations are intended to be used only by trusted system code. Some functions are labeled as "dangerous", meaning Hard Object allows them to perform dangerous operations.

Constraints of Hard Object are conjunctive: each aspect of Hard Object puts constraints on an action by a program and for an action to be allowed all of the relevant constraints must be satisfied (a more flexible system could be easily built by simply being less strict about this requirement, but such a system might be annoying for the user). Throughout this detailed description, the phrases "check that P(x)" or "x must be P" (where P(x) is some predicate) mean "if not P(x) then the Hard Object system faults to a trusted system handler and this handler gets all the details of the fault".

Each flow-chart figure demonstrates only one aspect of Hard Object being operated/enforced, but a given instruction or operation by the computer is operated/enforced by many aspects of Hard Object. If one were to attempt to make figures which showed for a given instruction or operation all of the Hard Object aspects which are checked when that instruction or operation is performed then the figures would be unreadably complex and would not fit on a page and no benefit would come from looking at them.

Therefore, instead the figures depict how the checking of one part of one aspect of Hard Object is done. This means, however, that since a single instruction or operation has multiple aspect of Hard Object checking it and that these multiple aspects are depicted in multiple figures, that there must be some way to combine the results from the multiple checking illustrated for a single instruction or operation.

Depicted visually across many figures, this means that when a given instruction or operation runs, when considering all of the relevant checking of the various Hard Object aspects illustrated in multiple figures, if any of the relevant figures follow a control path which terminates with "fault", then the instruction or operation faults, and only if all of the relevant figures follow a control path which terminates with some form of "allow" is the instruction or operation allowed.

Further, even the processing done for one part of one aspect may be too complex to illustrate in one figure. As there may be multiple parts to the checking of even one Hard Object aspect, so some flow chart control paths terminate in a box that says "allow because not relevant"; which does not mean that the aspect passes, but only that the checking, even for this aspect, may be illustrated in a different flow chart and that this flow chart is not relevant in the situation which leads to the given terminating box labelled as such.

Further, Hard Object does not always fault. Some control paths terminate with "allow because done with procedure" because, while the Hard Object operations did not result in a fault, such control paths still resulted in changed to the Hard Object metadata. Even in these situations, other figures of Hard Object may also operate to alter other metadata or to generate a fault.

Figure 32A:
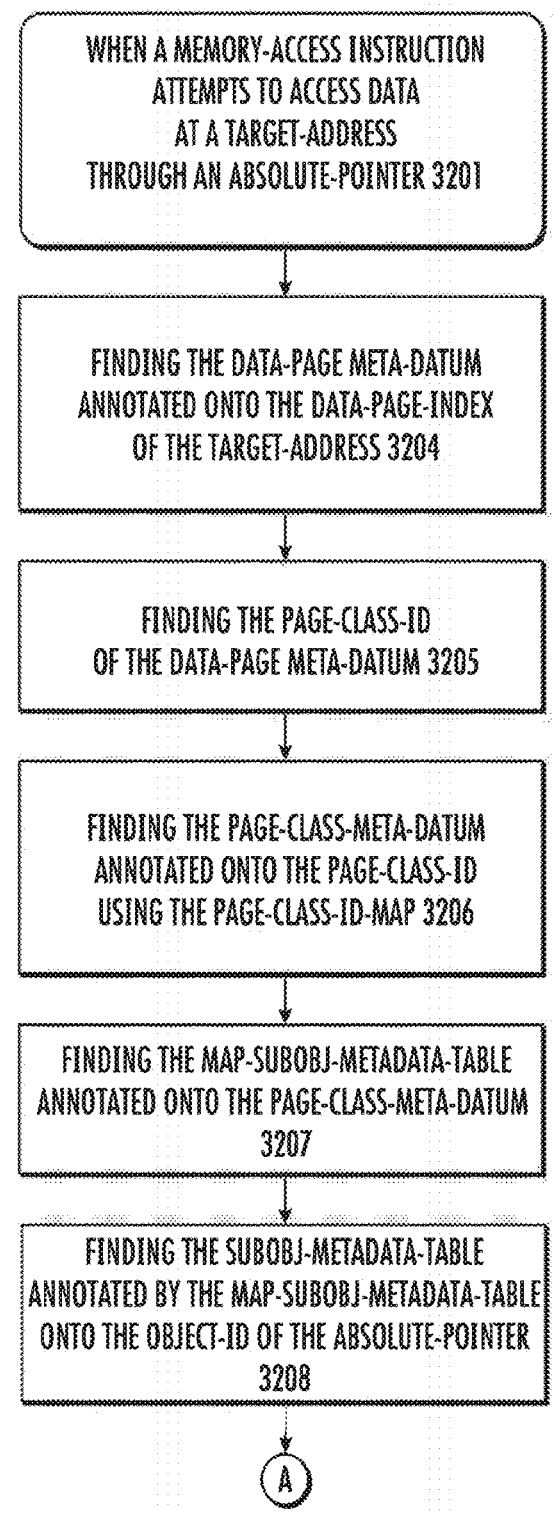
FIGS. 32a-32c shows when accessing heap-global memory, checking the sub-object-start and the sub-object-length, computing an absolute sub-object-id as the sum of the sub-object-id of the absolute-pointer, and the pagesubobj-id-abs-base annotated onto the data-page annotated onto the data-page-index of the target-data-address.
Figure 32B:
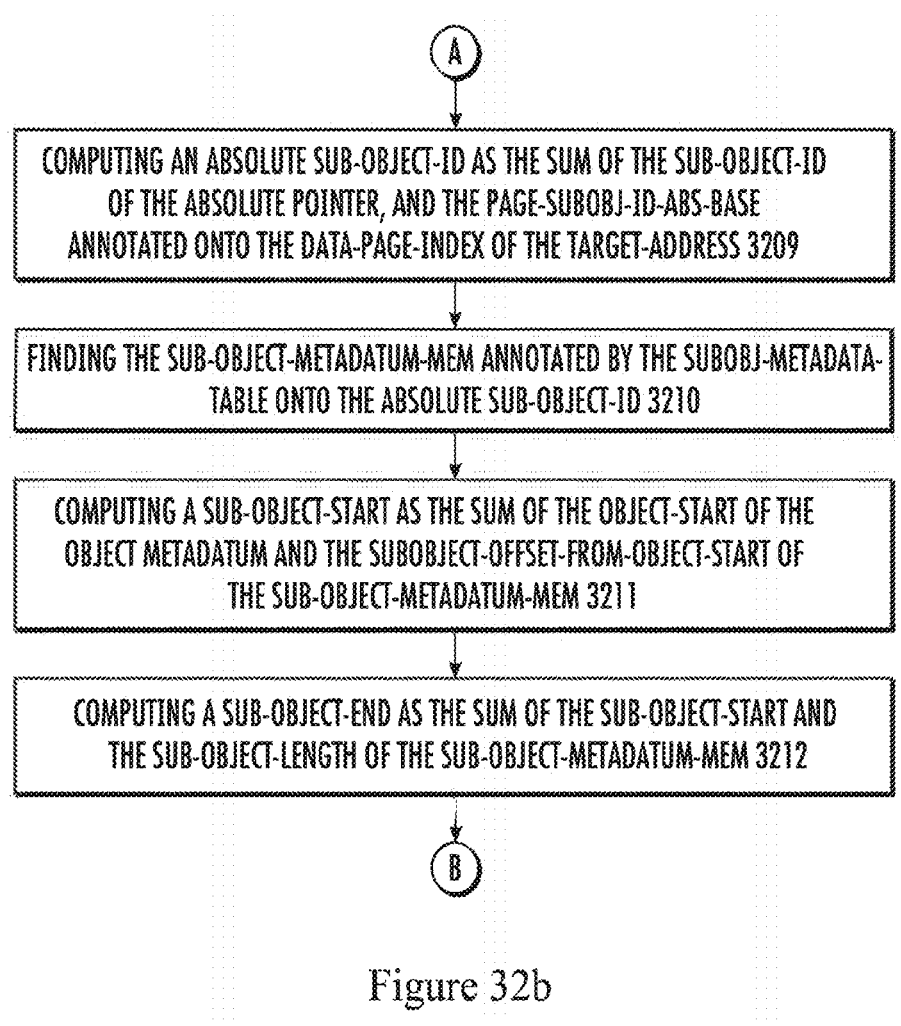
Figure 33A:
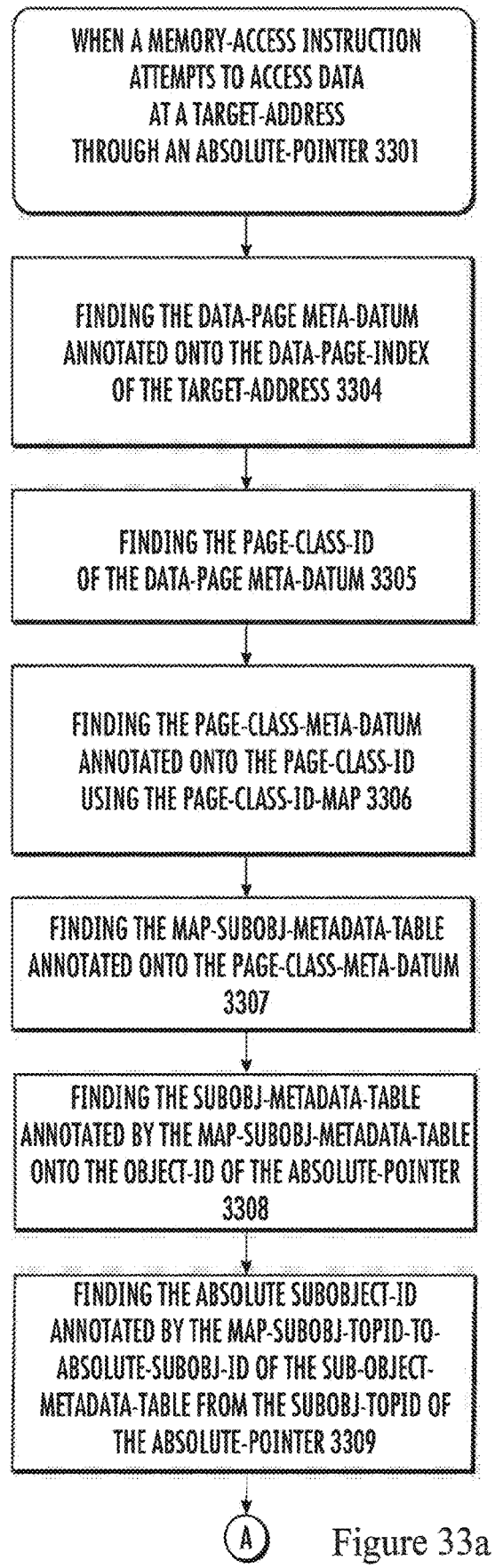
FIGS. 33a-33c shows when accessing heap-global memory, finding the absolute sub-object-id annotated by the map-subobj-topid-to-absolute-subobj-id of the sub-object-metadata-table onto the subobj-topid of the absolute-pointer.

Further, if the checking of one particular aspect of Hard Object has a branch that could go one way or the other, and different checking is done on each branch, sometimes the branch is just elided and only one path or the other is provided in the figure and the whole processing can be obtained only by combining multiple figures. For example, FIG. 32*b* shows computing 3209 an absolute sub-object-id given some inputs and FIG. 33*a* shows looking up 3309 an absolute sub-object-id in a table given some other inputs. Which of these figures is used depends on what kind of inputs are available in the context where the absolute sub-object-id is wanted. That choice is implied and not shown in the figures. The operation in a real machine would be a combination of these two figures with a step choosing between the two figures based simply on which figure operates on the inputs which are available. Again, to not write the figures in this way would make them unreadably complex.

When describing Hard Object, this detailed description often refers to "pages" of memory, by which this detailed description means the standard prior art partitioning of memory into pages (such as in a system using prior art virtual memory). However, in this detailed description pages are used only for annotating metadata onto ranges of memory, and any other system allowing for the annotation of metadata onto ranges of memory could possibly do the same job and thus be usable in conjunction with Hard Object. So by "pages" this detailed description means any mechanism of annotating metadata onto ranges of memory addresses.

When describing Hard Object, this detailed description often refers to "registers", by which this detailed description means the standard prior art practice of collecting bits of state in a CPU and naming them so they at times may be thought of or operated on as a single noun/object. This detailed description refers to two kinds of registers: those that are part of the CPU that Hard Object observers/intercepts ("CPU registers"), and those that are added by Hard Object ("HO registers"). Some CPU designs have instructions that are register-oriented, using registers for the input and output of most operations ("register machines"), such as the prior art RISC-V® 64 system, whereas other CPU designs may organize computation differently, not necessarily using registers as the organizing paradigm for moving data around, such as pushing and popping data to/from the stack ("stack machines") or flowing the output of one operation directly into another, or possibly some other paradigm.

Hard Object annotates metadata onto user text and data, and it is these annotations and the properties that are used to enforce the heart of the Hard Object system. This detailed description refers to an embodiment that is natural for a register machine, such as the prior art RISC-V® 64 machine, and therefore uses register-machine (and in particular RISC-V® 64) terminology. That said, any other system that allows annotations of Hard Object metadata onto the relevant data and text could possibly be made to work with Hard Object. So by "register" this detailed description means any method of collecting data and treating it as a unit of data., text, or metadata, independent of whether that collection of data is manifested literally as a prior art register mechanism, as long as it serves at function of providing semantics as a unit when its value is needed by the operation that needs it.

Control

Call and Return:

A (function) call may only target the top of a function.

A return must target the instruction after the corresponding call (unless the function called has dangerous system powers, so setjmp/longjmp can work).

Other than interrupts/exceptions, there are no other ways to transfer control to another module.

Unavoidable Dynamic Checks

Suppose a static analysis was unable to prove a fact upon which the correctness or security of the program depends. Such an analysis could insert a dynamic check for the relevant fact at the relevant point in the code.

What if the program jumps over this dynamic check, thereby defeating it? The static analysis can check any static control flow transfers to make sure that this does not happen, however, programs may also make dynamic control flow transfers, that is, jump through pointers, the value of which are not known at static time. Currently dynamic control flow transfers of any kind may only go to the top of a function, thus preventing a program from avoiding any inserted dynamic checks.

A possible future extension is to allow dynamic control flow transfers into the middle of a function and require that they must use a formal text pointer (see Reference below), which only dangerous system code can make and upon which pointer arithmetic is not allowed. The static analysis can then emit instructions to trusted system code to constrain dynamic control flow transfers and thereby prevent the avoidance of such dynamic checks.

Space

Objects: A contiguous region of a data page may be annotated as an object. Objects are not intended to overlap. For C code the objects are used to model globals, the memory reserved by malloc( ), and an automatic variable on the stack. A heap/global pointer is associated with a specific object. It may point anywhere within or just off the end of the object. Pointer arithmetic pointing any where else may fault. A de-reference/memory-access (load/store) that does not point within the object region will fault. In contrast the prior-art Valgrind system [valgrind] easily misses errors that Hard Object catches, such as going off the end of one global onto another (at least in Valgrind's default configuration).

Sub-objects: An object may be overlayed with sub-objects. A pointer may be annotated with a sub-object (using, say, some form of sub-object ID which may select a sub-object from a collection of those annotated onto an object). Sub-objects are comprised of spatial bounds for a view onto an object that constrain the access of a pointer annotated with one of them to only part of the object (unless they are the improper sub-object, which means the constraint contains the whole object). If an access is attempted outside of the bounds of the constraint, Hard Object issues a fault. Sub-objects may nest or overlap. Sub-objects can be used to model the members of objects. When modeling the C language, one embodiment is to generate a sub-object tree to mirror the structure of the C type tree for the type of the object, and so a sub-object is generated for each struct, union, or array, and the members thereof recursively. This sub-object tree may be refined to have more parts than the C tree, such as for arrays, generating two sub-objects: an array and an iterator. A sub-object iterator through an array is a sub-object that:

does not have the type of the array, but the type of an element of the array, and however, still allows access to the entire array, rather than constraining access to only one element of the array.

A sub-object iterator is indicated by annotating the sub-object with an iterator-flag that is set. A heap/global pointer is associated with a specific sub-object, initially defaulting to the whole object. A sub-object reference may be obtained by narrowing an object or sub-object pointer, to constrain it to the range of the sub-object. As with objects, a sub-object pointer may point within or just off the end of the sub-object, may fault if made to go outside that range, and will fault if de-referenced outside that range.

Stack bounds: The stack is delimited by the stack-base-ptr (stack-base register) and stack-limit-ptr (stack-limit register) Hard Object registers. The stack pointer is a formal ephemeral Abs-Ptr which points into the stack. In one embodiment, heap/global Abs-Ptrs cannot be made to point into the stack using pointer arithmetic as they would go out of their page-class-id range. Hard Object maintains a formal frame-pointer on calls and returns that mirrors the user frame-pointer, but cannot be corrupted.

Accesses to the stack must use a formal pointer. The only pointers that can even point into the stack for this purpose are: (1) a copy of the original stack pointer (usually changed by pointer arithmetic) or (2) a stack-obj-pointer (see below). The Hard Object system maintains its own framepointer that cannot be written by user code, the Hard Object frame-pointer/frame-pointer (or shadow-frame-pointer). If a stack pointer attempts to access the stack, and the access is above the Hard Object framepointer, the access faults. A stack-obj-pointer can allow access above the Hard Object frame-pointer (if it is passed down to a callee). A stack-obj-pointer can only be made using a special Hard Object instruction to "narrow" the stack pointer to a range of the stack; this narrowing operation/make stack object operation takes two parameters, (1) a stack pointer and (2) a stack-object size, both of which are encoded into the resulting stack-obj-pointer as a stack-object-bottom and a stack-object-size. This is the instruction used when the compiler encounters the expression "&x" taking the address of a stack variable "x". Stack objects have spatial bounds. Stack object bounds are always annotated immediately in the stack-obj-pointer; that is, no indirection through a table is required to find them. A callee cannot access its caller's frame unless that caller has explicitly narrowed the stack pointer to a particular one of its stack objects and then passed a pointer to that stack object to the callee.

Time

Register calling convention and callee-save safety: It is usual for a CPU (such as RISC-V®) to mark each user general purpose register as callee-save or caller-save. During a function call the hardware clears the ref-flag on caller-save registers. Hard Object requires a call-return pair to preserve the integrity and privacy of the caller's callee-save registers and return address register by requiring any such registers that are accessed by the callee to have their value saved (to the stack) before the first use, protected (not corrupted while saved), and restored (from the stack) after the last use and before the function returns. During a function call a hardware automaton ensures callee-save registers (in which Hard Object also includes the return address (ra) register) are handled correctly. If a callee-save register R1 is accessed, hardware ensures the following.

R1 is saved first;

R1 is restored afterward, before the callee returns (except that the register may be overwritten without being saved but then the function may never return);

R1 is restored from the same location to where it was saved;

the stack location where R1 is saved cannot be corrupted; and

R1's ref-flag is cleared so that no formal pointers can leak from the caller to the callee.

Further, the same mechanism saves (using the save-callee-save-reg-state operator), restores (using the restore-callee-save-reg-state operator), and protects while saved the automaton state itself by treating its own state as another callee-save register.

Register privacy-after-call and privacy-after-return: Functions may zero their caller-save registers before calling and zero their non-return-value/non-callee-save registers before returning, but doing this is expensive. Hard Object annotates a written-flag onto every user integer register (integer-register) and float register (float-register) using special Hard Object registers for that purpose, the int-register-written-flags (an array of int-register-written-flag-s) and float-register-written-flags (an array of float-register-written-flag-s) registers, respectively. Every integer-register and float-register has a unique register-id. Hard Object clears this register written-flag (and the parallel/corresponding ref-flag) when the value of the given register is not expected to propagate to the next function receiving control on a call or a return. Specifically:

On a call, clearing the register written-flag (and the parallel/corresponding ref-flag) on the non-argument caller-save registers. The program can mark the argument to not be cleared registers by various means, such as by setting a special Hard Object num-int-args-in-registers (or num-float-args-in-registers) register in advance using a special put-num-int-args-in-registers (or put-num-float-args-in-registers) instruction/operator (taking a num-args parameter) to put the number of registers, or by the number of arguments being annotated onto the metadata of the function being called, or by annotating the registers with an ok-to-call-flag in a register-ok-to-call-flags register (and similarly for float argument registers).

On the saving of a callee-save register to the stack, clearing the register written-flag (and ref-flag) of the register being saved so that the callee can no longer read it.

On a return, clearing the register written-flag (and ref-flag) on the registers that are not callee-save registers and that have not been marked as return values. As with a call, the program can mark the return value registers by various means, such as by setting a special Hard Object num-int-ret-vals-in-registers register in advance using a special instruction (or just be re-using num-int-args-in-registers), or by the number of return values being annotated onto the metadata of the function returning, or by annotating the registers with a ok-to-return-flag in a register-ok-to-return-flags (array of ok-to-return-flag-s) register (and similarly for float return value registers).

In one embodiment, without the ok-to-return-flag set on any caller-save register, Hard Object clears the ref-flag and the written-flag on that register at function return, thereby rendering any formal pointer of that register into a useless integer and also rendering the register unreadable. Hard Object provides a special instruction that the program can use to set the ok-to-return-flag on a register, the set-ok-to-return-flag instruction/operator, but that instruction only sets the flag if Hard Object allows the value in that register to be returned. Here is what is checked on the register value to allow it to be ok to return (recall that a register contains a formal value exactly when the ref-flag of that register is set):

if the register value is a formal ephemeral pointer, it is not ok to return;

if the register value is a formal function pointer, it is ok to return exactly when it has the durable-flag;

if the register value is a formal return pointer, it is not ok to return;

if the register value is a formal stack-obj-pointer, it may be returned as long as the framepointer annotated onto it (its stack time) is strictly greater than the current Hard Object framepointer for the current frame; that is, as long as the stack object pointed to by the stack-obj-pointer lives longer than the current frame (which is returning);

any other formal pointer and any non-formal value (not having the ref-flag) is ok to return.

Hard Object sets this register written-flag when the register is written. If a register having a clear written-flag is read, the result depends on the read-unwritten-int-reg-policy or read-unwritten-float-reg-policy, respectively. This policy can be: (1) allow, just read the word as usual, (2) read-zero, return a zero no matter the actual memory value (or, more generally, return an unwritten-indicator-datum to indicate that the memory read is unwritten, where one embodiment uses zero for the unwritten-indicator-datum), or (3) fault, raise a fault.

The register data of a function of Hard Object may not leak to the subsequent function gaining control on a call or return. A similar policy can be followed on a context-switch to the kernel to allow propagation of the values of registers intended for use by the kernel and those that are not.

Preventing stack use-after-free: Using a special Hard Object instruction, a program may make a formal pointer to a stack object: a stack-obj-pointer. Such stack-obj-pointer contain (or are annotated with) an encoding of the framepointer of the frame of the object to which they point. Hard Object uses this framepointer part of a stack-obj-pointer as a form of stack time. Hard Object prevents use-after-free through such formal stack-obj-pointers by preventing any stack-obj-pointer from being stored anywhere lasting longer than the frame of the object to which they point: if there is no pointer to a stack object after the lifetime of the frame of the stack-object to which it points, then there is no way to attempt to access the stack object, that is, no way to attempt a use-after-free of the stack-object. This is done as follows:

Hard Object prevents stack-obj-pointers from being stored in heap/global memory (except by code having dangerous powers).

Hard Object prevents the storing of stack-obj-pointers into other stack objects on frames that live longer than the frame of the object to which they point. Specifically, when storing a stack-obj-pointer, the only way to attempt to store it onto the stack in a frame that will last longer than the current frame is to store it through a second stack-obj-pointer. Both of these stack object pointers have a framepointer annotated onto them. Thus Hard Object does not allow this store unless the second stack-obj-pointer points to an object that is no longer lived than the object pointed to by the first stack-obj-pointer being stored. Again, since both stack-obj-pointers have a framepointer annotation, this property can be checked by just comparing the two framepointer annotations of the two stack-obj-pointers at the time of the store.

Hard Object prevents a stack-obj-pointer from being returned by a function where the frame to which they are returning lives longer than the stack object pointed to by the stack-obj-pointer. That is, for any caller-save register to not have a ref-flag cleared on a return, that register must have an ok-to-return-flag set. When the ok-to-return-flag is set on a register containing a stack-obj-pointer, the framepointer annotated onto that stack-obj-pointer is checked vs the current Hard Object framepointer; if the frame that is about to expire is strictly shorter lived than the framepointer of the stack-obj-pointer, then the ok-to-return-flag is set and the stack-obj-pointer may be returned (because the stack object to which the stack-obj-pointer being returned points is on a frame which is still live after the return; note that frames may not be empty so two framepointers of two distinct live frames must be distinct); otherwise, it is not. Again, without the ok-to-return-flag set any caller-save register, hard-object (1) clears the ref-flag on that register at function return, thereby rendering the stack-obj-pointer into a useless integer, and also (2) clears the written-flag, thereby rendering the register unreadable. Doing this ensures that if a function attempts to return a stack-obj-pointer through a register to a caller having a frame which has a longer lifetime than the frame of the object to which the stack-obj-pointer being returned points (which would allow a use-after-free once the lifetime ends of the frame of the stack object pointed to by the stack-obj-pointer), that the register being used for the return will not be readable by the caller.

Therefore, it is not possible to obtain a stack-obj-pointer that is stale, that is, that points to a stack object where the lifetime of the frame of the stack object pointed to by the stack-obj-pointer has ended. Hard Object thus ensures no use-after-free for stack objects.

Note that, in one embodiment, stack prevention of use-after-free is at the frame granularity. Thinking in C++ for the moment, when a function ends, the objects on its stack frame have their destructors called in the reverse order in which the constructors were called. It is possible to take the address of a first stack object and assign it to a field of a second stack object. If the first object has its destructor run first, then
  during the destructor of the second object it will be in a state where it has a pointer to the first object and may still access it, even though
  the first object has been destructed and should no longer be accessed.

That is, when accessing a stack object, it is guaranteed that it has not been free( )-ed in the sense that the memory is still allocated, and so we know that another object has not been allocated using the same memory. Therefore we may call this prevention of use-after-free, but it is not prevention of use after destruction. Some responses to this situation:
  when allocating an object on the stack (here the first object), ensure that even after the destructor runs it is still in some semantically well-defined state;
  ensure that the destructor of a stack object (here the second object) does not access other objects;
  if it is critical to not access an object (here the first object) after its destruction, then another option is to heapify the object and ensure the compiler-generated cleanup function is called immediately after the destructor (whether the gcc compiler does this or not I do not know, but it could).

Stack privacy-after-free: To prevent a caller from reading what is left of their stack frame, functions may zero their stack before returning, however, doing this is expensive as it is many additional writes. The insight used by the Hard Object design is that this stack memory is about to be overwritten anyway, so why not just use the hardware to guarantee that? To this end, Hard Object provides a stack-floor register:
  the stack-floor is raised to the Hard Object framepointer (of the callee) upon return (from the callee);
  the stack-floor may only be lowered by a write to the stack where the target address of the write plus the data width (the write-top) of the write equals the (current) stack-floor, and doing so lowers the stack-floor to the target address of the write; note that the write also has the effect of clearing any previous data on the stack in the new memory made accessible by the lowering of the stack-floor, which is the whole point.

Doing this guarantees that the stack data of a callee may not leak to the caller or a subsequent callee.

A compiler may occasionally generate code that skips a few stack locations, so when working with Hard Object its behavior must be changed to not miss any, unless the sub-stack-floor-init-flags register is used. This register holds written-flags for a window of registers below the stack-floor that were written out of order. User code may use a special Hard Object operator to programmatically raise (but not lower) the stack-floor as long as they do not raise it above the Hard Object framepointer.

Preventing heap/global use-after-free: A heap/global object has a version (or refable-version) and a pointer to a heap/global object has a time (or time address/time-address). At an access (read or write) to a data object through the heap/global pointer/reference (a de-reference), the time address of the pointer/reference must match the version of the object or Hard Object raises a fault. When a heap object is de-allocated, its version is incremented (and similarly if a global, in, say, a dynamically-loaded executable and linkable format (ELF) library, were unloaded). Therefore, as long as the allocator does not re-use an object version that is still in-use as the time address of some outstanding reference, a use-after-free to heap/global data may never occur.

Version collection of heap/global objects: Hard Object requires collecting stale references (where the reference time does not equal the object version). Hard Object does not require garbage collection. Garbage collectors can never be made to work well. Hertz and Berger [hertz-berger-2005] estimate that the Java® garbage collection means three to five times as much memory is required to obtain performance equivalent to a program without garbage collection. The resulting version collector is a better than garbage collector in several algorithmically fundamental ways: unlike, garbage collection, version collection is easily made parallel, concurrent, memory-hierarchy-friendly, and if done often enough, never leaves dead memory in the client program (whereas garbage collection requires dead memory before it can even do something useful). That is, by separating the use-after-free problem from the garbage problem, Hard Object fundamentally improves the situation.

Heap/global privacy-after-free: Hard Object does not currently guarantee that the contents of a heap/global object do not leak to the subsequent user of the object across a free-then-allot object reuse. Clearly a module may zero an object before free( )-ing it or the allocator could do this, but it proves to be expensive in time.

Formal pointers of Hard Object cannot leak across a free-then-alloc object reuse. All that is required to do this is when the object is de-allocated to clear the ref-flag on the memory of the object. Given that the metadata flags for multiple contiguous data words are all stored in a single metadata word, this is an order of magnitude faster than zeroing the data.

Hard Object has a mechanism for annotating memory with a written-flag, which can be similarly be cleared when the object is de-allocated and which is set on a machine word when the memory is written (note that when part of a machine word is written, the rest must be zeroed if the written-flag was clear before the write). If memory having a clear written-flag is read, the result depends on the read-unwritten-mem-policy, which can be "allow", just read the word as usual, "read-zero", return a zero no matter the actual memory value, or "fault", raise a fault. Given that the written-flag is, like the ref-flag, also a metadata flag annotating the same memory, when the ref-flag is cleared, clearing the written-flag requires no additional time as it can be cleared in the same pass as the ref-flag.

Modularity

Module-owners and module-ownables: A module is expressed as a module-id (a string of bits). Interpret a module-id as path from a root to a leaf in a full binary tree. Select a subset of internal nodes of this binary tree to be modules and call the leaves of its subtree its sub-modules. Do not allow two internal module nodes where one is an ancestor of the other.

Code is annotated with an internal node of this tree, called a mod-owner, comprising a module-id and a module-owner-suffix-length. Heap/global data is annotated with a leaf of this tree, called a mod-ownable, comprising a module-id. When code accesses data, the data mod-ownable must be a leaf in the subtree under the internal node of the code mod-owner; equivalently, to allow the access, the module-id of the mod-owner of the code must match the module-id of the mod-ownable of the data, except for (that is, ignoring) the rightmost bits of length of the module-owner-suffix-length of the mod-owner of the code.

Modules are the unit of trust. Modules cannot touch each other's data unless that data is marked public.

Sub-modules of a module-owner are just the collection of mod-ownable module-ids which is all a mod-ownable is) that differ from the module-id of the module-owner only by the rightmost bits of length of the module-owner-suffix-length. That is, one mod-owner can have many mod-ownables; these are called the sub-modules of the mod-owner. See below for more.

Public and private data: Data can be annotated as public; access to such public data by code in other modules is therefore not prevented by the modularity aspect of Hard Object. Data is annotated with a public-flag at both the machine word (RISC-V®: double-word) granularity and at the object granularity. Access to public data can also be constrained in other ways, such as requiring an unforgeable formal pointer provided by the constructor of the object, which amounts to capabilities. Stack data is protected a different way and one function may pass a pointer to one of its stack objects to another function in a different module. Modularity has effects even when the data is public as modularity also constraints who can change the metadata on that globally. In particular, this constraint prevents one module from deleting the object of another.

Public and private pointer targeting: A pointer has a public-target-flag, which, when clear, does not allow access to the data of another module, even if that data is public.

Public and private functions: Functions are annotated as public or private: A cross-module call may target only the top of a public function. Therefore cross-module control flow is restricted to only calls to public functions and their corresponding returns. (All functions of a module may access the data of the module; public/private of a module concerns who may call it, not what data it may access.)

Sub-modules: Sub-modules are useful for one module to use as class-ids to distinguish different classes within the same module, in a manner similar to C++ runtime type identifiers (RTTI). Thinking in C++ for a moment, using sub-modules a module having two classes Foo and Bar can easily prevent a method on class Foo from operating on a pointer to an instance of class Bar by inserting at the top of each method a check that the sub-module annotated onto the object pointed to by the "this" pointer implicit parameter is the one the method expects.

Module-groups: Module-groups allow the main program module group to exclude untrusted other collections of modules, such as a dynamically-loaded untrusted ELF downloaded over the Internet, from the access modules normally entrusted to one another. Such excluded modules can be prevented from making or using capabilities even in a capabilities-based system. Modules in other groups are thereby auto-sandboxed with no additional effort at all on the part of the main program. Data objects are annotated with the following metadata:

may-read-suff-len: when a read from an instruction at a text address targets a data address, if the mod-owner-id of the text address does not match the mod-owner-id of the mod-ownable of the target data address, except for the rightmost bits of length of the may-read-suff-len of the target data address, Hard Object faults;

may-write-suff-sen: when a write from an instruction at a text address targets a data address, if the mod-owner-id of the text address does not match the mod-owner-id of the mod-ownable of the target data address, except for the rightmost bits of length of the may-write-suff-len of the target data address, Hard Object faults; and may-make-ref-suff-len: when a formal data pointer/data reference is made of a target data address by an instruction at an instruction text address, if the mod-owner-id of the instruction text address does not match the mod-owner-id of the mod-ownable of the target data address, except for the rightmost bits of length of the may-make-ref-suff-len of the target data address, Hard Object faults.

Functions are annotated with the following metadata:

may-call-suff-len: when a call from an instruction at a text address in a caller function targets a text address of a callee function, if the mod-owner-id of the caller function does not match the mod-owner-id of the callee function, except for the rightmost hits of length of the may-call-suff-len of the canoe function, Hard Object faults; and may-make-ref-suff-len: when a formal function pointer/ function reference is made of a target text address by an instruction at an instruction text address, if the mod-owner-id of the instruction text address does not match the mod-owner-id of the target text address, except for the rightmost bits of length of the may-make-ref-suff-len the callee function, Hard Object faults.

Caller-mod-owner register: When a function call is made, the caller-mod-owner register is set to the mod-owner annotated onto the code making the call. When a function return is made, the caller-mod-owner is set to the nobody mod-owner. That is, at the start of a function, the module of the caller is available to a callee as the value of the caller-mod-owner register. Though using the caller-mod-owner as a kind of authentication exhibits the Confused Deputy Problem, it can nevertheless be useful for additional authentication in certain circumstances.

Integrity flag: Thinking in C++ for a moment, a typical method of establishing and maintaining correctness of a data-structure is to:

wrap it in a class, establish its invariants in the constructor, assume the invariants at the top of each method, and ensure the invariants again at the bottom of each method.

However, it is important to know if the invariant has been fully established, or if the state of the object temporarily does not satisfy the invariants.

One module may transfer the ownership of an object to another module. This admits of a Trojan Horse attack [homer-8th-cent-bc] of a module M1 on module M2, as follows:
1. Module M1 makes a subtly-corrupt object O1,
2. M1 transfers the ownership to module M2,
3. M1 calls a method M2::foo( ) on M2, passing a pointer to O1, as the "this" pointer,
4. M2::foo( ) is tricked into trusting O1, thinking O1 is one of its own objects, but the subtle corruption causes it to fail in some way.

To address this attack, Hard Object annotates each heap/global object with an integrity-flag.

When the integrity flag is clear, normal memory-access (load/store) instructions may not access the object, instead only special non-integrity memory-access (load/store) instructions/operations may do so (that would not be used accidentally).

The owner of an object can transfer the ownership of the object to another module using the Hard Object transfer ownership instruction. When the ownership of an object is transferred, the integrity-flag is also cleared.

Only the (new) owner may set the integrity-flag again (for it to be usable by normal code), and presumably would do this only after ensuring that its invariants hold on the object.

An owner also might want to keep the integrity-flag clear until after initialization/construction is finished, that is, until the invariants are guaranteed to hold.

Reference: A pointer may be annotated with a ref-flag, making it a formal pointer, also known as "reference" or "ref". A pointer has embedded or is annotated with a Ptr-Kind-Enum and possibly a Abs-Ptr-Kind-Encoding indicating what kind of structured pointer it is. There are several kinds of structured pointers (and each packs multiple fields of metadata within it):
absolute heap/global data pointer and the stack pointer, having sub-kinds of (a) durable, and (b) ephemeral (including the stack pointer),
stack object pointer (narrowed from the stack pointer),
function pointer/forward text pointer, and
return pointer,
otherwise it is an unstructured-lo pointer or an unstructured-hi pointer. That is, at times this detailed description speaks of the structured pointer kind or the Ptr-Kind-Enum of a structured pointer as just being unstructured-lo or unstructured-hi, meaning the structure of the pointer is the empty structure; we will call such a pointer a "raw" pointer or an "unstructured pointer", even though these are just one kind of structured pointer; by contrast, we may call other kinds of structured pointers "strictly structured" (or, perhaps confusingly, simply "structured") when emphasizing the contrast is desired.

Encoding of a structured pointer cannot be forged by user code when the pointer is also a formal pointer.

In one embodiment Hard Object does not allow raw pointers unstructured-lo or unstructured-hi) to be formal pointers, so in places in this detailed description where the phrase "formal pointer" is used without mentioning whether the pointer in question is strictly-structured or raw, it is usually implied that the formal pointer is also strictly-structured.

Absolute heap/global references: A heap/global object must be accessed through an absolute heap/global formal pointer/reference (unless annotated with the refable-informally-targetable-flag).

Stack and stack-object references: The stack pointer is an (ephemeral) absolute formal pointer. The stack must be accessed through a formal pointer, such as the stack pointer. Recall that stack objects and stack object pointers are created through narrowing the stack pointer. A stack object above the Hard Object framepointer must be accessed through a stack-object reference; note that this assumes that the stack grows down, as it does on many prior-art systems, so "above the frame pointer" means stack frames of suspended caller functions.

Function pointers/Forward text pointers/Function capabilities: A control flow transfer that is not a program-counter-relative (PC-relative) increment nor a PC-relative jump or branch and is forward, that is, not a return, must be made through a formal forward text pointer. When combined with constraints on the creation of such formal pointers (more precisely, constrains on the annotation of the refflag onto them), this mechanism provides function capabilities.

A function pointer/forward text pointer is annotated with a function-body-target-flag. When set, this formal pointer may be used to call within a function and when clear it must be used to call only to the top of a function. When jump tables are not used, function pointers that call anywhere other than the top of a function would only be needed for jumps within very large functions where in some architectures the distance cannot be expressed as a PC-relative offset. A function pointer/forward-text-pointer is annotated with a cross-module-target-flag. When set, this formal pointer may be used to call across modules and when clear it must be used to call only within a module.

Return pointers/return-pointers/Ret-and-frame pointers: A control flow transfer that is a function return must be made through a formal return pointer; since such a pointer also contains information about the frame it returns to, a return pointer is also called a ret-and-frame.

Hard Object maintains an incorruptible Hard Object framepointer/frame-pointer (or shadow-frame-pointer) independent of the user framepointer of the program. This must be restored upon a return, so to this end the ret-and-frame pointer contains an encoding of the framepointer of the frame to which it returns so that the Hard Object framepointer may be restored upon return. Hard Object maintains a current-function-start, a pointer to the top of the current function. This must be restored upon a return, so to this end the ret-and-frame pointer contains an encoding of the current-function-start of the function to which it returns.

Creation and propagation of references: The intention is to constrain the creation and propagation of references so that they always point to a live and genuine object of the intended class.

Creation:
A heap/global reference may be made only by the allocator at allocation (except if the object is configured otherwise).
A stack reference may be made only by narrowing the stack pointer to a sub-range of the current frame.
Any other kind of reference may be made only by dangerous system code.

Propagation:
A reference/formal pointer may be propagated only by a move instruction; further this move instruction must move data of the size of a whole pointer-sized machine word (moving part of a machine word does not copy the ref-flag and therefore, in one embodiment, cannot move a formal pointer in parts: that is, the move must be pointer-atomic).

Any other operation on a reference removes it reference-ness.

Propagation of stack object references: A stack object reference cannot escape the liveness context of the object to which it points:
- A stack object reference may be returned from a function as long as it is return to a frame that is not longer-lasting than the object to which the stack object reference points.
- A stack object reference may be saved to the stack as long as the stack object reference is saved to a frame that is not longer-lasting than the frame of the stack object to which the stack object reference points.
- A stack object reference may not be saved in heap/global data except by dangerous code (to allow for setjmp/longjmp).

Propagation of heap/global references and formal function pointers: ephemeral references: Function and heap/global pointers are annotated with a durable-flag. When this flag is set, the pointer is "durable" and when it is clear, the pointer is "ephemeral". Ephemeral function or data references may not be saved in heap/global data and may not be returned from a function. A durable heap/global reference may be attenuated to an ephemeral reference, but not the reverse (without using dangerous powers). Ephemeral reference allow a client to pass an ephemeral "capability" to a library and know that when the library returns that it has not squirreled away a copy of the capability for later use.

Using both formal and informal pointers: Objects are annotated with multiple metadata flags which provide multiple modes of who may annotate a reference to an object that has just been allocated, change metadata, etc. The module author may use this flexibility to configure an object to be accessible only by the code of its module and to allow code within the module to make formal pointers from informal (int) pointers as necessary. Using this technique, a programmer can make an XOR bi-directional list of
- a doubly-linked list that saves space by XOR-ing the forward and backward pointers, an operation not allowed on formal pointers, and
- due to its data being protected from other modules, still has a local proof of correctness.

This technique passes, rather than failing when demonstrating a boundary enforcement. In contrast to Hard Object, such a thing cannot be done in either a fully formal language such as Java®, nor in a fully informal language such as C. Hard Object is a platform that can speak in both the formal and the informal like this, just as human natural languages do.

Initialization

At times data is semantically deleted, but mechanically still exists, such as:
- the contents of an object after it has been freed,
- the contents of a stack frame after its function has returned,
- the contents of a caller-save register that is not being used to pass an argument after a call,
- the contents of any register that is not being used to return a value after a return,
- the contents of a callee-save register while it is value is saved to the stack.

It is an error to read an uninitialized value. If uninitialized data is read, Hard Object responds according to the read_unwritten_mem_policy, which can be one of the following:
fault,
read_zero,
allow.

Note that there are circumstances where the policy of 'fault' will not allow legitimate programs to run(such as realloc( )), so we often use read_zero.

Mutability: Making data immutable greatly improves the ability to reason about the semantics of a program. Once an immutable object has meaning (has been initialized/constructed), that meaning never changes. Hard Object annotates machine words and (semi-redundantly) objects with a writable-flag to allow making them immutable (by clearing the writable-flag). Hard Object also annotates heap/global/stack object pointers with a writable-target-flag to allow making an immutable view onto a mutable object.

One embodiment for enforcing the semantic properties: This section presents an embodiment for enforcing the semantic properties of Hard Object given above. When this detailed description says one element "has" or "annotates" or "is associated with" another element, there are many ways to implement that annotation that; this section provides one such embodiment. If this detailed description says "Hard. Object checks/asserts", implicitly it is meant that if the check or assertion fails (evaluates to something other than true), then Hard Object raises a fault, Hard Object checks/constraints/conditions/invariants are conjunctive: any operation that is constrained by multiple aspects must satisfy all of them to be allowed, so even if this detailed description says "operation X is allowed when condition Y", implicitly it is meant that operation X is allowed only if operation X also satisfies all other Hard Object conditions of all other aspects of Hard Object. That is, if any required check/condition/constraint/invariant relating to an operation is not satisfied, then Hard Object raises a fault (or just "Hard Object faults").

When this detailed description says one noun "annotates" another, what is meant is that these nouns are associated in some way, but the mechanism of this association is deliberately left unspecified, thereby allowing that mechanism to be chosen independently as a separate implementation concern. To say that one noun has or comprises fields/members/parts really just means to annotate the noun with the field/member/part in some way. Further the realization of any annotation, even one of having/comprising/being-part-of, need not be realized/implemented in a way exhibiting any sort of mechanical connection or locality, in particular the association need not exhibit spatial locality (embedding or other forms of memory address locality or physical wire locality) nor temporal locality (being computed at or near the same or locality in time), nor any other form of mechanical connection or locality. Throughout this detailed description "put a:=b" means to take the value of register/field/annotation b and put its value into register/field/annotation a. This detailed description tends to use the RISC-V®-64 terminology (see [RISCV]). One quirk of this terminology is that a pointer/machine word is sometimes called a "double-word" or "dword" (which is 8 bytes in RISC-V®, where a "word" is 4 bytes in RISC-V®).

Terminology: Any instruction which accesses memory is a memory access instruction, including the load and store instructions. A load instruction may also be called a read instruction. A store instruction may also be called a write instruction. The register that gets the value of a load from memory may be called the load-destination-register. The register that provides the value of a store to memory may be called the store-source-register. Forward references likely still exist, despite my attempt to minimize them.

Control: Control flow transfer kinds (kinds of control-transfer instructions) in the RISC-V® architecture are as follows (other architectures may have subtle differences from this organization, but those differences end up not being fundamentally important, so this detailed description uses the RISC-V® organization):

fallthrough: increment to next instruction;

jump-or-branch-static: a jump/branch where the target is known at static time and often expressed as a literal or a literal offset from the program counter;

jump-dynamic: a jump to the value in a register;

call: a jump that also stores the next address (to which a return would return) somewhere for a return to use, such as into a ra (return address) register or onto the stack (or similar);

return: a return to an address created by a call to the address after the call instruction.

Some prior art instruction set architectures have a jump-register instruction or jump-and-link-register instruction that can be used to implement a jump-dynamic, a call, or a return, depending on how it is configured. In Hard Object, both calls and dynamic-jumps also have two further configuration aspects:

module change aspect, which has these possible values: (a) mod-same: must call to the same module, (b) mod-cross: may call across modules; and function part target aspect, which has these possible values: (a) to-func-top: must call only to the function top, (b) to-func-body: may call to anywhere within the function.

Constraints on control flow can be implemented by various embodiments:

The instruction that initiates the control flow (branch/jump/call/return) do the check.

The instruction that initiates the control flow sets a control-flow-kind Hard Object register. At the start of every instruction Hard. Object reads the value of control-flow-kind register (which was put there by the previous instruction) and does whatever that value says (such as performing some checks) before running the instruction proper. The checks described below could be done in the above embodiment as well.

Useful information to include in the control-flow-kind includes:

whether the control-flow transfer is a fall-through to the next instruction, a static jump/branch, a dynamic forward jump (through a function pointer), or a return (through a ret-and-frame);

whether the control-flow transfer is allowed to go into the body of a function or must go only to the top; and whether the control-flow transfer is allowed to cross modules or must go only to within the same module.

Current function bounds:

Hard Object maintains the Function-Metadata for the currently executing function in local registers.

When that Function-Metadata is loaded, the function start is known (as it is necessary to look up the current Function-Metadata), either (a) because control just transferred to the top of the function (and so the address of the top of the function is immediately available, as it was just used in the jump to the top of the function), or (b) because control just returned to the function by a return through a return pointer, which, together with the Text-Page-Metadata of the target address of the return, contains enough information to compute the top of the function.

From the function top and the function length, which can be obtained from the Function-Metadata, the function end can be computed.

Store the function start in a local current-function-start register and store the function end in a local current-function-end register.

Fallthrough: Absent an explicit control flow transfer (not a branch, jump, call, or return), an instruction by default puts the control-flow-kind register to fallthrough.

At the top of every instruction where the control-flow-kind is fallthrough (the previous instruction fell-through): Check that the current program counter is still within the range delimited by the current-function-start register and the current-function-end register.

Therefore, a fallthrough cannot take control out of the current function.

Since a fallthrough is constrained within a function and a function is entirely within one module, therefore a fallthrough cannot transfer control to another module.

Jump-or-branch-static:

At the top of every instruction where the control-flow-kind is jump-or-branch-static (the previous instruction did a static jump or branch): Check that the current program counter is still within the range delimited by the function start register and the function end register.

Therefore, a jump-or-branch-static cannot take control out of the current function.

Since a jump-or-branch-static is constrained within a function and a function is entirely within one module, therefore a jump-or-branch-static cannot transfer control to another module.

At the start of an instruction (at observe instruction start), if the control flow kind is jump-or-branch-static and the new instruction address has the func-top-flag, then fault( ).

Jump-dynamic:

At the top of every instruction where the control-flow-kind is jump-dynamic (the previous instruction did a dynamic jump, that is, a jump through a register): (1) Check if the new program counter (the target of the jump) is at the top of a function by checking the func-top-flag of the program counter. If the program counter is at the top of a function, then this jump is really a call (such as a tail call/sibling call) therefore raise a fault (in another embodiment, treat it as one: go to the "on a call" paragraph below; otherwise, this jump is not a call, which is what the rest of this paragraph (including bullet points) assumes.); (2) Control must remain within the same function, so if the control-flow-kind annotates the transfer as to-func-top (rather than to-func-body), then fault.

Extension: in one embodiment, f the target of the jump does not have the intra-func-dyn-target-flag annotated onto it, then fault.

Therefore, a jump-dynamic (that is not a call) cannot take control out of the current function. (In one embodiment however, it is possible for a jump to be interpreted as a tail call or sibling call.)

Since a jump-dynamic is constrained within a function and a function is entirely within one module, therefore a jump-dynamic (that is not a call) cannot transfer control to another module.

At the start of an instruction (at observe instruction start), if the control flow kind is jump-dynamic and the new instruction address has the func-top-flag, then fault( ).

On a call:

As detailed elsewhere, when a call constructs the return pointer, annotate that return pointer with a function-top-offset such that on a return the current-function-start may be reconstructed from that function-top-offset and from the func-at-page-start annotated onto the Text-Page-Metadata of the target program counter of the return pointer.

At the top of every instruction where the control-flow-kind is call (the previous instruction did either a call or a dynamic jump to the top of a function): (1) Check if the new program counter (the target of the call/jump) is at the top of a function by checking the func-top-flag of the new program counter. If the new program counter is not at the top of a fiction, then fault. (2) If the control-flow-kind annotates the transfer as mod-same (rather than mod-cross), then after loading the Function-Metadata for the new function, check that the mod-owner-id of the Function-Metadata is the same as the mod-owner-id of the previous instruction, and if not, fault.

Get the metadata for the new current Function-Metadata registers by looking it up from the program counter.

Maintain the stack-floor invariant: (1) check that stack-floor new-stack-floor (assuming stack grows down); (2) put stack-floor=stack pointer; (3) clear the sub-stack-floor-init-flags register.

Enforce that the caller frame is not empty: that is, enforce that the stack pointer is strictly less than the Hard Object framepointer (assuming the stack grows down); note that this will not be checked for leaf function frames as they, by definition, are never the caller frame for a function call.

Enforce the stack-obj-floor invariant: check that the new stack pointer>=stack-obj-floor (assuming stack grows down); see below for the stack obj-floor.

Clear the written-flag and ref-flag (1) of all caller-save registers not marked as arguments and (2) of all Hard Object general-purpose (including scratch and argument) control status registers.

Put caller-mod-owner:=previous current-mod-owner and put the new current-mod-owner:=the mod-owner of the new Function-Metadata.

Check if said for-this-func-flag is true, and if not, raise a fault; then clear the for-this-func-flag to false.

On a return:

Since the callee-save aspect of Hard Object guarantees that the value of the return register may not be corrupted from the value initially set by the call (see callee-save mechanism below), a return is guaranteed to target the address intended by the call.

A return may only be made through a formal return pointer (see references below).

As detailed elsewhere, reconstruct the current-function-start from the function-top-offset annotated onto the return pointer and from the func-at-page-start annotated onto the Text-Page-Metadata annotated onto the new program counter targeted by the return.

Get the metadata for the new current Function-Metadata registers by looking it up from the current-function-start.

Clear the written-flag and ref-flag (1) of all caller-save registers not marked as return values (that do not have the ok-to-return-flag) and (2) of all Hard Object general-purpose (including scratch and argument) control status registers.

Maintain the stack-floor and stack-obj-floor invariant: (1) put caller stack-floor:=Hard Object framepointer (which cannot be corrupted as it is maintained by Hard Object); (2) put stack-obj-floor:=caller stack-floor; (3) clear the sub-stack-floor-init-flags register.

Maintain the Hard Object framepointer: (1) this was encoded into the ret-and-frame formal pointer generated by the call/jal/jalr) instruction; (2) upon return, restore it from (a) the stack-limit-ptr and (b) the framepointer-uprelto-stack-in-qwords field of the Ret-And-Frame-Ptr (through which control is returning): specifically compute the new framepointer by adding (a) the stack-limit-ptr and (b) the framepointer-uprelto-stack-in-qwords times the number of bytes in a qword (a "quad-word", which is 16 bytes in RISC-V).

Put caller-mod-owner:=nobody-Mod-Owner.

Check if said for-this-func-flag is false, and if not, raise a fault; then set said for-this-func-flag to true.

Hard Object provides unavoidable dynamic checks:

The Hard Object hardware requires that all dynamic control flow to be made through formal text pointers; these can only be made by special Hard Object instructions as the Hard Object refflag must be annotated onto them if they are to be formal pointers.

Control flow transfers may only transfer control within a function, call the top of a function, or return to the address immediately after a call. (1) Calling the top of a function requires a formal pointer that can only be made by an approved Hard Object instruction; Hard Object enforces that such a pointer cannot be later modified. (2) Returning requires a formal return pointer that can only be made by a Hard Object-modified call instruction; Hard Object enforces that such a pointer cannot be later modified; further, the callee-save-reg-state mechanism (below) treats the return address (ra) register as a callee-save register and requires it to be correctly saved and restored and not otherwise read; further, a formal return pointer cannot be stored in heap/global memory (except by code having dangerous powers) and cannot be returned (without losing its formality), so it cannot escape the stack frame of the callee function of the call that creates the formal return pointer.

Those control flow transfers that transfer control within a function can be constrained to target only statically known addresses. (1) A simple way to do this is to not allow dynamic jumps to ever have the to-func-body annotation (that is, either faulting if they do or not allowing their creation), which means they can only call the top of a function, not somewhere in the body; recall that calls must call the top of a function and returns may return only to the address immediately after the function call that created them. That is, any control transfer not to the top of a function, not having a statically-known target, and that is not a return, faults. The required modifications to client software so that it can run under this restriction (so that correct software does not fault) are pretty easy to accomplish; this has been done using a standard compiler by simply turning off the generation of jump tables (further techniques may be necessary to allow for very large functions, but these are rare and the workaround is that the programmer can simply break them up). (2) More sophisticated methods are possible using a static analysis.

Knowing statically all of the targets of control flow transfers means the trusted system can add dynamic checks to a program which the program cannot avoid. Thus, the dynamic analysis of a program can be extended to indefinite sophistication in software without adding further hardware.

Space: Partition space into objects, such as a global, the result of malloc( ), or an automatic stack variable. Overlay objects with sub-objects, such as a member of a struct, union, or array; sub-objects may overlap. There are two kinds of objects:
- heap/global, and
- stack.

Heap/global objects: Annotate heap/global objects with object metadata (see elsewhere for further semantics of other fields of this metadata besides space bounds enforcement):
- absolute start,
- length relative to object start.
- Annotate sub-objects with sub-object metadata:
- start relative to object start,
- length relative to sub-object start.

Annotate heap/global pointers with (a) obj-id (object-id) and (b) either a subobj-id (sub-object-id) or, if the sub-object metadata is sufficiently small, an immediate encoding of the sub-object metadata. When accessing an object and sub-object thereof:
- (a) for objects, use the obj-id to look up the object metadata in object metadata tables (likely cached);
- (b) for sub-objects, if the sub-object metadata is encoded in the Abs-Ptr as an immediate, find it there, otherwise use the subobj-id to look up the sub-object metadata in sub-object metadata tables (likely cached); note that some sub-object IDs can be annotated as page-relative, allowing multi-page large objects to re-use such sub-object IDs for such small sub-objects on different pages; further note that artifacts at page boundaries may be prevented by use of a page-overflow-flag.

Require that the target address of any access through an absolute heap/global pointer (see references below), which is the only way to access heap/global memory be constrained as follows:

The target required to be within the bounds of the object metadata annotated onto the pointer; that is, Hard Object requires that:
- start<=target &.& target<start+length,
- where start is the object start, length is the object length, as provided in the object meta-data;
- however, in another embodiment, bounds checking for object hounds could be done parallel to how they are done for sub-object bounds; see below.

The target is required to be within the bounds of the sub-object metadata annotated onto the pointer; that is Dewdrop requires that:
- start<=target &.& (target+access-width)<=(start+length),
- where start is the sub-object meta-data start=(object start+offset-from-object-start) and length is the sub-object length, as provided in the object and sub-object metadata, and where access-width is the number of bytes being accessed (for example, 8 for a double-word access).

Note the asymmetry for the end of range check for objects and sub-objects:
- Object bounds are double-word aligned at both ends, double-word access width is the maximum allowed access width (on RISCV-64), and unaligned accesses are not allowed; therefore it is not possible for an access to cross a double-word boundary and so there is no need to add the access-width when checking the object bounds. Therefore we can avoid the add of the access width and just check that the target is less-than the object end. However, in another embodiment, hounds checking for object hounds could be done parallel to how they are done for sub-object bounds, specifically checking start<=target && (target+access-width)<= (start+length), where start is the object-start and length is the object length, as provided in the object meta-data, and where access-width is the number of bytes being accessed (for example, 8 for a double-word access).
- Sub-object bounds are byte-aligned, so we need to be more careful because a wide access could go off the end of the sub-object; for example, a double-word access near the end of a sub-object byte array that is not double-word aligned could access past the end of the sub-object. Therefore, we add the access width to the target and then check the result is less-than-or-equal-to the sub-object end.

Heap global pointers lack sufficient bits for this to be feasible without an indirection through a page class mechanism:
- Annotate each data page with a page_class_id. Each pointer has a page_overflow_flag to indicate that it belongs to the previous page so that one object can leak onto another page if that is useful; thus object of different page classes need not have their mutual boundary on a page boundary.
- Make the object and sub-object IDs page-class-local (that is, these IDs can be re-used in another page-class). The natural way to organize memory is to group contiguous pages that all share the same object and sub-object metadata into a range of pages annotated with the original page-class-id; for example, doing this is natural for an object that is multiple pages in size, or for a slab allocator of objects all sharing the same sub-object structure (and therefore same sub-object metadata).
- This embodiment requires hitting the object and sub-object metadata caches after getting the return value from the Page Table Entry (PTE); another embodiment does not require this serialization of hitting the PTE and then hitting the object/sub-object caches if the information in question is redundantly stored in the PTEs of the relevant pages for objects and sub-objects which span multiple pages; note that doing this may increase complexity (such as when updating values in the caches), but also may increase performance.
- Optimization: note that the in-memory sub-object metadata is all object-relative, so for a slab allocator having uniform objects the sub-object table can be re-used across all objects.

The object metadata mechanism is completely independent of the sub-object metadata mechanism and therefore the entire sub-object metadata subsystem can be completely fumed off either at runtime or when fabricating the chip itself.

Stack objects: In one embodiment the whole stack is constrained to be 8 megabytes (MB) in size; further, in this embodiment, due to the encoding of stack object pointers, their size must be less than ½ kilobytes (KB). Any larger stack objects are automatically heapified by the compiler changes or source-to-source transforms at compile time, where an object is heapified by allocating it in the heap instead of the stack, but also deleting it at the return of the function that created its stack frame, just as it would be if it had remained allocated on the stack.

By constraining the size of the whole stack, the pointer may be efficiently encoded using coordinates relative to the stack bounds, that is, as a pointer-uprelto-stack-in-bytes: other Hard Object registers (stack-base-ptr, stack-limit-ptr) delimit the stack, the stack pointer may be expressed relative to them, thereby saving bits in the encoding. By constraining the stack object size, the three related pointers to a stack object, specifically the object start, the object end, and the current pointer within the object, may be encoded efficiently together by expressing some of them relative to each other:
the object start (stack-object-bottom) can be expressed relative to the pointer using a start-dnrelto-pointer-in-bytes and
the object end can be expressed relative to the object start using a size-in-bytes (that is, by recording just the size).

C Stack objects not having a size known at static time are also a problem for other parts of the Hard Object compiler changes or source-to-source transforms as they make the stack layout unpredictable, so in this embodiment they are also heapified by the transforms.

Time: Enforcing time bounds amounts to preventing various kinds of use-after-free, though this section also includes enforcement of the integrity of callee-save registers (which could be thought of as a kind of stack time bounds on registers). Again, there are two kinds of objects:
heap/global, and
stack.

Further, callee-save registers are also a kind of memory shared across time.

Register callee-save safety: Hard Object requires a function call-then-return to preserve the integrity and privacy of the caller's callee-save registers (and return address register and the callee-save-reg-state itself) by:
requiring any such registers that are accessed by the callee to have their caller value saved (to the stack) before the first use,
protecting the caller values of such registers while saved on the stack (not allowing them to be corrupted while saved), and
requiring the caller value of any such saved registers be restored (from the stack) (a) after the last use by the calico of the register and (b) before the function returns.

Below this detailed description refers to all such registers which Hard Object requires to be thus saved-then-restored as "callee-save registers" further additional registers are also included under this term which are not official "callee-save registers" in the nomenclature of RISC-V®, namely:
the return address register and
the state of the caller's callee-save-reg-state automaton itself.

In RISC-V®, there are both caller-save integer and floating point registers. However, caller-save floating point registers are likely only useful if a function call is made in the inner loop of a floating-point oriented program (a "scientific code"). In contrast, just about all code uses the integer registers. Therefore, in one embodiment, the compiler is configured to just treat all floating point registers as caller-save. Doing this reduces the number of callee-save registers to the point where the entire callee-save-reg-state (below) can fit into 64 bits.

Make a callee-save-reg-state (a finite state automaton) register having the following sub-registers:
a where-saved array sub-register, which, in one embodiment, for each user register in question, allocates a 4 bit sub-register to record either (a) where it is saved relative to the Hard Object framepointer, or (b) a special marker value (unsaved-marker-value) indicating that the user register is unsaved (which includes before it has been saved and also after it has been restored);
a protected-range-max sub-register which counts the size of the protected range at the top of the stack frame (recall that we assume that stack grows down, which is typical) on the stack where callee-save registers have been saved; note that this count is more efficiently maintained as a count of machine words rather than of bytes; call the address at the bottom of the protected range (at a distance down from the frame-pointer value, measured in double words, of the value stored in the protected-range-max sub-register) the protected-range-bottom (inclusive); the frame pointer is the protected range top (exclusive);
a may-restore-flag sub-register: see below;
a for-this-func-flag sub-register: see below;
a made-stack-obj-flag sub-register; see below.

Also maintain a which-register inverse map register mapping (a) from the stack locations to (b) the ID of the register saved there; update the which-register inverse map whenever the callee-save finite state automaton is updated. Since the which-register inverse map is the inverse map of where-saved, it contains only information that is also contained in the where-saved sub-register, the value of the which-register inverse map can be therefore be reconstructed from the value of the where-saved sub-register and therefore need not be saved/restored when the callee-save-reg-state automaton is saved/restored; that is,
when the callee-save-reg-state is saved, discard the value of the which-register inverse map and
when the callee-save-reg-state is restored, recreate the value of the which-register inverse map by inverting the where-saved map.

Another embodiment of the which-register map is to just make a content-addressable array in hardware that can look up from a value the index of the array which holds that value. This should be possible in hardware given the small size of the array. Now no which-register map need be manifested separately in hardware nor saved/restored to/from the stack. Use the where-saved array sub-register and the which-register inverse map to maintain a bisection between (a) the callee-save registers and (b) a block of stack addresses just below the framepointer: each callee-save register must remain either (1) untouched or (2) be saved before use and restored before return. That is, check the above maps on each stack memory access:
Do not allow (a) access to an unsaved callee-save register or (b) the stack location where it is saved, except for when saving or restoring the register.
Do not allow multiple callee-save registers to be saved in the same location.
Do not allow the corruption of saved registers when the stack is accessed for other purposes.

We want to prevent a function from attempting to re-use the callee-save-reg-state after its normal cycle of being saved once and then restored once. To this end maintain a frame-done-flag (not part of the callee-save-reg-state); the intent is for the frame-done-flag to be false for the entire life cycle of the function until the callee-save-reg-state is restored and then become true; at that point, the only operations that are allowed are those strictly necessary to finish returning from the function.
initialize the program with frame-done-flag to false,
on a call, check the frame-done-flag is false;
on a return, put frame-done-flag=false;
when save or restore callee save reg state, check the frame-done-flag is false;
when restore callee save reg state, put frame-done-flag=true;
when access (load/store) memory, check the frame-done-flag is false.

If a callee-save register is written without being saved, information is lost and there is no way to correctly return to the caller. Rather than faulting, simply clear a may_restore_flag register, thereby prohibiting the function from ever returning by faulting if that flag is clear on the return; note that there are some no-return functions (such as exit( )) where the compiler may make this optimization, so Hard Object allows for that using this mechanism. Use the ee-save-reg-state mechanism to force the state of the callee-save finite state automaton itself to also be saved (using special Hard Object operator save-callee-save-reg-state), protected, and restored (using special Hard Object operator restore-callee-save-reg-state) by treating it like a callee-save user register (including giving it a register ID). The hardware needs to know if the current value of the callee-save-reg-state register(s) reflects the current function, or is the state from the caller function (such as before saving it or after restoring it). Hard Object tracks this using a for-this-func-flag register and thus when this flag is clear Hard Object does not allow any operations that would require the callee-save-reg-state to be initialized. In one embodiment, except when saving the callee-save-reg-state, there is no reason to allow memory access at all unless the for-this-func-flag is set.

At a function call, check the for-this-func-flag is true and then clear the for-this-func-flag to false.

When the callee-save-reg-state is saved to the stack, re-initialize its state for the new callee and set the for-this-func-flag; that is: After checking if the for-this-func-flag is already set, fault (prevents saving the callee_save_reg_state after it is already saved), re-initialize its state for the new callee and set the for-this-func-flag.

After the callee-save-reg-state is restored, note that a consequence is that the for-this-func-flag is also cleared.

At a function return, check the for-this-func-flag is false and then set the for-this-func-flag to true.

Do not allow saving or restoring a callee-save register or a return address register (a "callee-save-or-ra" register) while the for-this-func-flag is false.

In one embodiment, when the memory access operation runs, but the memory access is not part of a save-callee-save-reg-state operation, check the for-this-func-flag is true.

In one embodiment, when an operation runs which accesses a target register, if the target register is annotated as a callee-save register, then check if the for-this-func-flag is true, and if it is not, raise a fault.

When we use the narrow_pointer operation to make a stack-object-pointer, we need to ensure that the accessible range of the resulting stack-object-pointer (from its stack-object-bottom (inclusive) to its stack-object-top (exclusive)) does not overlap with the protected range. This is checked above when the narrow_pointer operation is run, however if the protected range were to grow after the narrow_pointer operation had made a stack-object-pointer, then the resulting larger protected range could overlap the accessible range of a stack-object-pointer. To prevent this we create a made_stack_obj_flag in the callee-save-reg-state, which is initially false.

When the first narrow_pointer operation runs in this frame, the made_stack_obj_flag on the callee-save-reg-state for this frame is set to true.

If an instruction runs which would extend the protected range, such as saving the callee-save-reg-state or saving a callee-save-or-ra register, then Hard Object checks that the made_stack_obj_flag is set on the callee-save-reg-state for this frame is false, and if not, Hard Object faults. The compiler or modifications on the assembly it generates must ensure that 4 bits suffices to record their location as a distance from the framepointer; one way to do that is for the compiler to emit code to save all the callee-save registers in a contiguous block just under the framepointer.

Heap/Global Time

Annotation:
  Annotate heap/global pointers and function pointers with a time.
  Annotate heap/global objects and functions with a version, a version-ceiling (or refable-version-ceiling), and a version-next-ceiling (or refable-version-next-ceiling).

Time:
  Perform all time/version arithmetic modulo the number of time bits (which depends on the page class).
  Maintain the invariant that there are no outstanding formal pointers to the object that have a time greater than the version and less than the version_ceiling.

Operation:
  When accessing an object through a pointer, require the pointer time to equal the object version. When calling a function through a pointer, require the pointer time to equal the function version.
  When allocating an object, just return a pointer to it from the free list; only the allocator can make a pointer to an object having a new version, so until the allocator returns the pointer, the object is not accessible to non-system code.
  When freeing an object, (1) increment its version, making it instantly inaccessible, and (2) further, do not put the object back on the allocator free list if its new version plus 1 equals the version ceiling, as, otherwise, if it were allocated again, it could not be freed.

In one embodiment, the system allocator (sysalloc) owns (in the modularity sense) the un-allocated objects. When sysalloc allocates an object (using, say, malloc( )), it transfers ownership of it to the new owner (such as by getting that new owner from the caller-mod-owner register). Before the client deallocates the object (using, say, free( )), the client first transfers the ownership back to sysalloc. Sysalloc has dangerous powers, so Hard Object allows it to increment the object version, and, in this embodiment, non-dangerous user code would not be allowed to increment the version. In another embodiment, an object may be configured to allow its owner to increment the version of the object.

Periodically or on demand, perform version collection so the memory allocation library can re-use objects which have exhausted their versions.
  Perform a ref-scan-phase which clears the ref-flag on every stale pointer (a pointer where the pointer time address does not equal the refable-version of the object/function to which it points) in registers, stack, global, and heap memory. (Clearing the ref-flag makes the pointer no longer formal and therefore no longer usable (except for objects that are annotated to allow access by non-formal pointers, which is not the default); see references below).
  Perform an obj-scan-phase which "rotates" the version clock on every heap/global object, as follows: (1) put the object.version-ceiling:=object.version-next-ceiling; (2) put the object.version-next-ceiling:=object.version.
  During allocation, when looking for an unused object slot to re-allocate, the memory allocator does not use an object slot where (during a subsequent free( )) its version cannot be incremented without remaining less-than its object.version-ceiling. That is, ensure that, during free( ), the object can be made inaccessible by incrementing its version without first waiting for a version collection pass.

Another way to do it that might be more efficient is to put the object.version-next-ceiling=object.version just before doing the ref-scan-phase rather than just after it.

Version collection can be made concurrent with a running program as long as care is taken to not allow the running program to copy a formal pointer from an un-ref-scanned page to a ref-scanned-page:

Annotate (a) every data page PTE and (b) every register with a version-scan-state-enum having one of three values: to-be-collected, collecting, collected. (1) Before starting a version collection, annotate every page as to-be-collected. (2) When the ref-scan-phase of a page is started, annotate that page as collecting. (3) When the ref-scan-phase of a page is ended, annotate that page as collected.

When loading a formal pointer from a data page into a register, copy the annotation of its page.

When saving a formal pointer from a register to a data page, if the data page has annotation collecting or collected and the register has annotation to-be-collected or collecting (if an un-scanned reference could be copied to scanned memory), either: (a) scan the formal pointer again ("just-in-time") before saving it, or (b) remove the target page from the subsequent object-scan phase by clearing its obj_scan_active_flag (below).

Optimization: Multiple ref-scan-phase-s may be made before performing an obj-scan-phase and all but the last of the ref-scan-phase-s can be "best effort", that is, the can elide the above mechanism, possibly allowing some stale formal pointers to survive, but greatly reducing them without inducing any just-in-time scans above and reducing the incidence of just-in-time scans for the final non-best-effort ref-scan-phase.

Version collection can be made memory-hierarchy-friendly:

(1) The ref-scan-phase scan of a formal pointer has two parts:
from-part: finding the pointer and asking if it is formal,
to-part: finding the object to which it points and asking if the pointer is stale relative to the object.
(2) The from-part can be made memory-hierarchy-friendly by scanning pages in memory order, the preferred method of scanning through memory (allowing pre-fetching), and, depending on the architecture, only affecting the cache of the core doing the scan.
(3) The to-part can be made memory-hierarchy-friendly as follows:
1. Annotate every data page with an obj-scan-active-flag; do this using a bitmap instead of a bit on the PTE so that software does not have to swap in the page to access the bit. Note that the array of these flags is much smaller than memory: it has one bit per data page, a reduction factor of 32 thousand to 1 (when using 4K-byte pages). Therefore, one could contemplate keeping the array in physical memory at all times, of course eliminating any paging when it is accessed. The purpose of the obj-scan-active-flag is knowing when we may look up the meta-data on a target object without inducing a virtual memory page-in. Therefore, when paging, swap in the meta-data for a data page synchronously with swapping in the data for that page.
2. Before starting the ref-scan-phase, set the obj-scan-active-flag on every page that is resident in memory.
3. During the from-part of the scan of a formal pointer, do not perform the scan if the object pointed to is on a page (a) that has a clear obj-scan-active-flag, or (b) that is not resident in memory (got paged out since the start of the scan), and in this second case, also clear the obj-scan-active-flag for this page.
4. During the obj-scan-phase, only scan pages where the obj-scan-active-flag is still set, and that are also resident in memory. The obj-scan-active-flag updates the version numbers, and the constraint on only scanning pages that have the obj-scan-active-flag set is a requirement for correctness: the pages having the obj-scan-active-flag set at the end of the ref-scan-phase are the pages containing objects Where the to-part of the ref-scan-phase was done for the entire ref-scan-phase; that is, these are the only objects for which the obj-scan-phase can be certain that if there is a stale outstanding formal pointer to the object then it got visited during the ref-scan-phase and (since it is stale) got its ref-flag cleared, and therefore there are no outstanding stale formal pointers to this object.
(4) Further, if objects are grouped by class, such as when using a slab allocator, the objects missed on pages due to their having a clear obj-scan-active-flag likely do not belong to a class that is "hot" (frequently used), and therefore not likely to often need a scan, as their version numbers are not being rapidly used-up. It might make sense to make an exception for a page where all of the objects have had their usable versions consumed and it is therefore no longer being used at all (as it has entirely gone cold: there are no recent uses of any of its objects); the version collection process might deliberately swap such a page into memory so that it will be scanned, and therefore its object versions updated, and the objects made usable again.

The version collection is also embarrassingly parallel (a term of art)/concurrent with itself: for both the ref-scan-phase and the obj-scan-phase, it is straightforward for multiple threads to partition the work and do it in parallel. In contrast, this is not the case for garbage collection.

Since Hard Object solves the use-after-free problem independently from the garbage problem. Hard Object therefore does not require garbage collection. The Hard Object version collection algorithm is a better than garbage collection in several algorithmically fundamental ways, having the following properties that garbage collection does not, being:
embarrassingly parallel,
concurrent with the execution of the user process,
memory-hierarchy-friendly, and
if done often enough, never leaving dead memory,
whereas garbage collection requires a substantial amount of memory to be dead before it can do anything something useful at all.

Stack time: Hard Object makes use of the fact that the stack addresses exhibit a total order, here called newer-than-or-equal-to. The present invention also assumes that the stack grows downward (which it does in many, if not all prior art systems). This assumption therefore connects stack frame position in space with stack frame relationship in time. Therefore, for stack addresses S1 and S2, define S1 to be newer-than-or-equal-to S2 when S1 is less-than-or-equal-to S2; recall that a total order is a binary relation that is
reflexive (for all, a, a<=a),
anti-symmetric (for all a, b: a<=b and b<=a implies a=b), transitive (for all a, b, c: a<=b and b<=c implies a<=c), and
and/connected-in-the-undirected-sense (for all a, b: a<=b or b<=a).
Require formal pointers for stack access.
Do not allow writing them to heap/global memory unless the function doing so has dangerous (system) powers.
Make two kinds of formal stack pointers: (a) stack-pointer and (b) stack-object-pointer.
Frame pointer:
Hard Object maintains an incorruptible Hard Object framepointer independent of the user framepointer of the program. This is encoded into the ret-and-frame formal pointer generated by a call (jal/jalr) instruction. It is restored by the return (jalr) instruction from that encoding.
Stack pointer:
Is ephemeral: therefore cannot be returned to the caller.
Stack object pointer:
Use the framepointer of the frame containing the stack object pointed to in the stack object as a kind of stack time on the stack object pointer. (This detailed description may refer to this framepointer annotated onto a stack object pointer as a stack-object-pointer-framepointer; when it is annotated onto a target of a memory access, this detailed description may refer to it as a target-frame-pointer, when it is the frame pointer annotated onto a value being loaded/stored, this detailed description may refer to it as a value-frame-pointer).
Annotate this stack time onto the formal stack object pointer. Hard Object does this efficiently using a frame-pointer-uprelto-stack-in-qwords, as usually frames are quad-word aligned and other hard-object registers (stack-base-ptr, stack-limit-ptr) contain stack delimiters so the framepointer may be expressed relative to them.
Stack time is a more flexible kind of ephemeral: Hard Object does not allow stack-object pointers to escape the time duration of the frame containing the stack object to which they point; note that this property is easy to enforce because saving a stack pointer (to a stack object S1) to the stack does the save through one of the following two kinds of pointers: (a) saving through the stack pointer, in which case saving is allowed only to the current frame, or (b) saving through a second stack object pointer (to a stack object S2), which also has stack time, in which case saving is not allowed of the stack object pointer (to a stack object S1) to the (second) stack object (S2) when the second stack object (S2) is longer-lived than the object (S1) pointed to by the stack object pointer being saved.
Due to the above dynamic escape analysis of stack object pointers, there will never be any ambiguity when using such frame pointers as a form of time, as a stack object pointer will not last longer than the frame of the object to which it points.
This process works for normal C code in the case where one stack frame for a caller function passes a pointer to one of its stack objects to a callee function and then that callee function reads/writes the body of that object in the caller without faulting. Specifically, this case works because: (a) when the software build toolchain (compiler, etc.) sees the address of a stack object being taken, it automatically transforms the caller code to insert a call to a special Hard Object narrow-pointer operation; (b) at runtime, this Hard Object narrow-pointer operation makes a stack-obj-pointer; the narrow-pointer operation has two parameters: a stack-pointer value (stack-object-bottom) and an object size (given a pointer to a stack object, the size can be inserted by the compiler from static information in the program, which for programs in the C language would be the size of the type of the object being allocated); (c) at runtime, in the callee, when the callee accesses the caller stack object it does so through a stack-object-pointer (note: not the stack-pointer), which (unlike accesses through the stack-pointer) is not subject to the constrains of the Hard. Object framepointer.

Narrow-pointer operation/make stack-obj-pointer operation:
  allow this narrow-pointer operation only when the for-this-func-flag is true;
  allow this narrow-pointer operation only when the top bound (exclusive) of the new stack-object-pointer being created (the pointer plus the size, the stack-object-top) is less-than-or-equal-to the protected-range-bottom (that is, the new stack-object-pointer range does not intersect with the protected range);
  allow this narrow-pointer operation only when the stack-floor register value is less-than-or-equal-to the narrow-pointer operation stack-pointer parameter value (also called the new stack-object-pointer bottom or stack-object-bottom);
  when this narrow-pointer operation runs, set the made-stack-obj-flag (above).

Heapified stack objects: For various reasons, in this embodiment, some stack objects must be "heapified" (allocated on the heap) even though they still act as stack objects, in that they are deleted when the function that allocated them returns (these objects are semantically on the stack while mechanically being on the heap), if these heapified stack objects were allocated as usual heap objects, as part of the dynamic escape analysis preventing stack-obj-pointers from escaping the lifetime of their frame, Hard Object would prevent a stack-obj-pointer from being stored into such heapified stack objects. This constraint prevents some correct programs from running without faulting, and so is problematic.

To solve this, one embodiment of Hard Object annotates the framepointer/stack time onto the Abs-Ptr of the heapified stack object; Hard Object then treats this pointer as a stack-obj-pointer:
  When a stack-object pointer is stored into a heap object. Hard Object checks for this framepointer/stack time annotation on the heap object being stored into, and if it is present, treats the heap object as a stack object, using that annotated stack time just as it would if it were storing into a stack object, that is, not allowing the storage if the object being stored into lasts longer than the stack-obj-pointer being stored into it.
  Similarly, when the abs pointer to the heapified stack object is written somewhere, it is subject to the same escape analysis constraints as a stack-obj-pointer.

One embodiment of this annotation of stack time onto a heapified stack object abs pointer (heap pointer) is to put the stack time into the heap object metadata and just read it when the stack time of the heap object is needed. Another embodiment is to just maintain a map from abs pointers to stack time using, say, a red-black tree or a skip list. However, implemented, this mapping from abs pointers (heap pointers) to stack time may be cached in a heap-to-stack-time cache. (When de-allocating or reallocating the heap object, the system allocator can update this cache entry, thereby preventing cache poisoning even if the user function never deletes the heapified stack object.)

Preventing Data Leakage Across Memory Re-Use

Heap: the memory allocator library wants to prevent leaking across free-then-alloc object reuse. Clearing metadata tags annotate on machine words is much more efficient than actually writing to all of the data, as, in one embodiment 16 machine words are annotated by 1 tag metadata machine word (that is, when one 64-bit machine word has 4 bits of metadata tags).

Clear ref-flag-s annotated onto the machine words of the object data; doing this prevents formal pointer leakage;
Clear the written-flag-s annotated onto the machine words of the object data; doing this prevents data leakage.
Stack: Make a stack-floor register:
Do not allow access to stack data below the stack-floor.
Only decrement it when the stack is written below the stack-floor.
Increment it to the new stack pointer upon a return.

The stack-floor register therefore forces re-initialization of the frame before reading it and in a natural way that programs usually do anyway.

However, when using an unmodified compiler, sometimes the stack frame writes are not quite initialized predictably by the compiler, such as if the compiler skips a stack word thereby leaving a gap in what stack memory is written, therefore a static analysis can be required to force the stack frame writes to be in actual stack order and to not leave gaps in stack memory that is written. Since this static analysis is of assembly or machine language, and since variable sized objects can be removed from the stack using heapification, it seems straightforward for this static analysis to be made sound without an unusable amount of conservative approximation.

It may be helpful to be able to accommodate a "frayed edge" to the user's notion of a stack floor by allowing for some out-of-stack-frame-order writes. Make a sub-stack-floor-init-flags register which operates as an array of init-flags, where the array coordinates are relative to the stack-floor:

Use this register to flag some machine words just below the stack floor when they are written, and when so flagged, treat them in the same way as if they were at or above the stack-floor even though they are below it.
When the stack-floor moves, update the origin of the coordinates of the sub-stack-floor-init-flags, of course shifting all of the flags when doing so; that is, sub-stack-floor-init-flags have a shift operation that shifts each index such that afterward each init-flag has the value of the previous index plus one, shifting on a false init-flag value where the index plus is not within the range of the array; after setting a sub-stack-floor-init-flag if the first init-flag in the array is true, repeatedly decrement the stack-floor (assuming stack grows down) and performing the sub-stack-floor-init-flags shift operation and until the first init-flag in the array is false,
Maintain the flags array and the stack-floor in a canonical state where the stack-floor is as low as possible (again assuming the typical configuration where stack grows down): if the first flag in the array were set, then the stack-floor could just be lower, so implicitly the first flag is never set; however, if the corresponding stack data word to that flag is ever written, which would therefore set this first flag, then (1) move the stack-floor down and (2) shift the flags array as far as necessary so as to "clear out" all of the set flags and again restore the invariant that the first flag is implicitly unset.

The sub-stack-floor-init-flags is optional if the program always writes the stack monotonically downward (again assuming the typical configuration where stack grows down); in a simple implementation, it can be omitted.

Software engineers want to prevent a callee stack frame from aliasing an object in a caller stack. To this end, make a stack-obj-floor (stack-object-floor) register and maintains the following invariant: the stack-obj-floor is maintained to point at or below the bottom of the lowest (assuming stack grows down) stack object that has had its address taken.

Making a stack-obj-pointer requires a special Hard Object narrow-pointer operation; when performing this operation. Dewdrop maintains this stack-obj-floor invariant by lowering the stack-obj-floor at least to the stack-object-bottom address of the newly-narrowed stack-obj-pointer (if not further); specifically, at a narrow-pointer operation, put the stack-obj-floor=min of the following values (1) the current stack-object-floor, (2) the stack-object-bottom address of the newly narrowed stack-obj-pointer, and (3) the protected-range-bottom.
narrow-pointer operation, so Hard Object can maintain this invariant within that instruction by lowering the stack-obj-floor to the bottom of the newly-narrowed stack object.
On a return, Hard Object puts the stack-floor:=Hard Object framepointer and then puts the stack-obj-floor:= the caller stack-floor (that is, the caller function to which the return is returning), which is now the same value.

On a call, Hard Object asserts that the stack pointer must be at or below (less-than-or-equal-to) the stack_obj_floor; the callee is thereby ensured that its stack frame is not aliased by any stack-object-pointer, already extant at the time of the call to the callee.

Modularity

Module identity is expressed as a module ID; think of the space of module IDs as forming a binary tree:
a module owner is an internal node in the tree (a module-id/mod-owner-id and a module-owner-suffix-length/mod-owner-suff-len),
a module ownable is a leaf of the tree (a module-id),
where no module owner (mod-owner) internal node may be an ancestor of another, so the sets of module ownables (mod-ownable) of different modules are therefore disjoint.

Annotate:
code (text) with a module owner, and
data with a module ownable.
Registers:
current-mod-owner: the mod owner annotated onto the current function: maintained by the hardware;
caller-mod-owner: the module owner of the immediate caller; guaranteed to be correct by the hardware at the first instruction of a function, however, this register is caller-save, so it will be lost at the next call if not saved by the client code,
Annotate a public-flag onto each:
heap/global machine word (data Dword-Meta-Datum),
heap/global object,
Annotate a public-target-flag onto each
absolute pointer (durable and ephemeral).
A memory access (load/store) is public if
all of the relevant public-flag-s on the data being accessed (both the public-flag on the Object-Metadata. and the public-flag in the Dword-Metadata) are set, and any public-target-flag on the pointer through which the access is being made is set.

Text/code (annotated with a module-owner) may not access data (annotated with a module-ownable) unless:
   the access is public, or
   the module-id of the text matches the module-id of the mod-ownable of the data, except for the last module-owner-suffix-length bits of the mod-owner of the code (that is, the module ownable of the data is a leaf in the subtree of the module owner internal node of the text).

In one embodiment, the fields of the module-owner, the above fields use the following bits: mod-owner: 19 bits, which comprises:
   mod-owner-id: 15 bits
   mod-owner-suff-len: 4 bits:

Ownership transfer and integrity: The owner of an object may transfer the ownership of the object to another module. Annotate each object with an integrity-flag.
   Only the owner of an object can set the integrity-flag of the object.
   When the ownership of an object is transferred, Hard Object clears the integrity-flag of the object.

Normal load/store instructions may not access an object having a clear integrity-flag. Special non-integrity load/store instructions/operations may access an object having a clear integrity-flag, and may not access objects having a set integrity-flag. These special non-integrity memory-access operations may not be implemented as hardware instructions. Besides preventing the use of ownership transfer to conduct a Trojan Horse attack [homer-8th-cent-bc], the integrity-flag is also potentially useful to prevent access to an object (say by another thread) while it is being initialized, or any other time it is in a state where it does not satisfy its invariants.

REFERENCE

Make a ref-flag follows all data machine words everywhere.

Annotation:
   a ref-flag is annotated onto each machine word in heap/global/stack data using a corresponding flag in metadata memory;
   a ref-flag is annotated onto: (a) each user integer register, using a corresponding flag in a special int-register-ref-flags, and (b) each control status register that can hold a user pointer, using special flags registers;

Propagation:
   a ref-flag may be set on a non-reference machine word only by sysalloc (except under some configurations where the module itself is configured to also be allowed to do this);
   a ref-flag is copied in parallel to the data copied by the move instruction;
   a ref-flag is cleared on any other operation setting the value of a machine word.

A ref-flag set on a machine word means it is a formal pointer or a reference (ref).
   Formal pointers contain various metadata fields as well as their pointer value, which may also be specially encoded.
   All formal pointers references contain or are annotated with a Ptr-Kind-Enure and possibly an Abs-Ptr-Kind-Encoding saying which kind of pointer they are.

There are two aspects to Hard Object pointers:
   formality: formal vs informal: whether the pointer has a ref-flag annotated onto it;
   structured-ness: structured vs unstructured: what the bits of the Ptr-Kind-Enum and Abs-Ptr-Kind-Encoding embedded (or annotated onto) the pointer indicate as how the pointer is encoded.

Kinds of structured pointers:
   absolute heap/global (heap-global memory): either (a) durable or (b) ephemeral (including the stack pointer),
   stack object,
   function pointers/forward text pointers,
   return pointers,
   unstructured-lo pointers and unstructured-hi pointers: Hard Object supports raw pointers which have no annotated metadata other than a Ptr-Kind-Enum saying that they are raw pointers; note that it is convenient to make the encoding of this Ptr-Kind-Enum all zeros or all ones so that sign-extended raw integers are by default raw pointers; when the address bits are sign-extended to fill the word; (for example the prior art x86-64 design requires that the high bits of a pointer be the sign-extended copy of the highest bit used for actual addressing).

Unstructured-lo pointers and unstructured-hi pointers are also known as raw pointers. The encoding of a structured pointer cannot be forged by user code when the pointer is also a formal pointer.

Return pointers/Ret-and-frame pointers: Hard Object encodes the framepointer in a ret-and-frame; it initializes this encoded ret-and-frame from the stack pointer at the time of the call (when the ret-and-frame is made by the call/jal/jalr instruction). Hard Object reduces the number of bits needed for encoding the framepointer by encoding it as a framepointer-uprelto-stack-in-qwords, as follows:
   express the framepointer in units of quad-words (as compilers ensure that frames are quad-word aligned, or likely can be configured to do so) and
   express the framepointer relative to the other hard-object stack delimiting registers (stack-base-ptr, stack-limit-ptr), rather than as an absolute pointer.

Consider returning through a return pointer/ret-and-frame to a target address. After the return, Hard Object needs to know the function start of the function to which control has just returned so it may set the current-function-start to point to it. This is done as follows:
   Annotate a return pointer with a function-top-offset: the page-local part (usually the low 12 bits) of the current-function-start of the target address.
   If the function-top-offset is non-zero, then the current-function-start is (1) the target address (2) with the page-local part (usually the low 12 bits) replaced with the function-top-offset of the return pointer.
   Otherwise, if the function-top-offset is zero, then look up the Text-Page-Metadata of the target address; from that find its func-at-page-start field; use this as the current-function-start.

On a call, when constructing the return pointer (in RISC-V® to be saved in the ra register), do so such that the above plan will work on a return. That is, look up the Text-Page-Metadata of the instruction to which the return pointer will return (usually the address of the next instruction); from that find its fame-at-page-start.
   If that func-at-page-start is the current value of the current-function-start register, then make a return pointer having a function-top-offset of zero.
   Otherwise, if that func-at-page-start is not the current value of the current-function-start register, then the current function starts on the current page, so set the function-top-offset to the page-local part (usually the low 12 bits) of the current-function-start.

In order to constrain the control flow, Hard Object needs to ensure that a return pointer does not escape, so Hard Object enforces the invariant that a return pointer (1) may not be returned from a function and (2) may not be stored in heap/global memory, with exceptions made for code having dangerous powers (so that features such as setjmp/longjmp can be made to work).

Ephemerality: An ephemeral absolute pointer may not be stored in heap/global memory, even by dangerous system code (by a normal store instruction in normal execution mode; an exception may be made using a special mode or a special store instruction), and may not be returned from a function. A durable pointer may be copied to produce an attenuated ephemeral pointer otherwise having the same properties by any code. An ephemeral pointer may be copied to produce an amplified durable pointer otherwise having the same properties only by the owner of the object pointed to by the ephemeral pointer. Ephemerality solves one of the major problems with capabilities: once a client gives a capability to a library, unless that capability is ephemeral, when the library returns, the client has no way to know if the library has squirreled away a copy of the capability for later use.

A library expects to pass around an absolute ephemeral pointer that was passed by the client, sometimes returning it internally; however, that return will not be allowed by Hard Object. One workaround is to have the top library function save the client ephemeral pointer on the stack and then pass that stack pointer around internally.

Initialization

For heap/global data Hard Object tracks initialized values using a written-flag. When an object is free( )-ed, sysalloc clears this flag, but given that one meta-data tag doubleword annotates 16 meta-data double-words, doing this is 16 times faster than clearing normal memory.

On the stack, Hard Object tracks what part of the frame has been written using a stack_floor register. In registers, Hard Object tracks which are written using a register written-flag.

Callee-save registers (including the return address register) are especially tricky as they are visible to the calico, but it must save and restore them but not look at them. This is tracked using a complex mechanism detailed elsewhere called the callee-save-reg-state.

Mutability

Making data immutable greatly improves the ability to reason about the semantics of a program: once an immutable object has meaning (has been initialized/constructed), that meaning never changes.

Functional programming is a style of programming where objects are allocated but never mutated, that is, they are never written after they are first initialized. Making programs even partially functional can greatly increase the ability of programmers to reason about their correctness. To this end, Hard Object provides the ability to make data read-only/immutable (which in the C programming language is known as "const").

Annotate a writable-flag onto each
heap/global machine word (Data-Dword-Metadata
heap/global object (Object-Metadata).
Annotate a writable-target-flag onto each
absolute pointer (durable and ephemeral), and
stack object pointer.

An access is writable if
all of the relevant writable-flag-s on the data being accessed (both the writable-flag on the Object-Metadata and the writable-flag in the Dword-Metadata) are set, and
any writable-target-flag on the pointer through which the access is being made is set.
Require any write to be writable.

Mechanics of Annotation of Hard Object Metadata onto Data or Code

Hard Object provides the above semantics as follows:
annotating data and code with metadata,
then checking this metadata when the data and/or code is accessed or run.

This subsection enumerates the various mechanism for annotating metadata onto data.

All of these mechanisms are "cache-able" in the sense that for each one it is possible to find a key that Hard Object can use to cache each one; this was proven by actually implementing each cache in a Hard Object software simulator. Further the simulator gets high cache hit rates and the fraction of the total cache memory traffic (to memory, on the far side of the cache) that is Hard Object metadata is a low fraction of the total memory traffic. The caching strategies for each kind of metadata are detailed below.

Additional registers: Hard Object uses several additional special-purpose registers. One way to do this is to use the RISC-V® Control Status Register extension mechanism.

Hard Object adds registers which delimit various bounds, such as the ranges of various kinds of special memory, such as the stack and the metadata tables.

Hard Object delimits the stack using stack-base-ptr (semantic bottom of stack, which is the top of stack memory when the stack grows down) and stack-limit-ptr (semantic top of the stack, which is the bottom of the stack memory, and therefore less than stack-base-ptr, when the stack grows down); these registers need be saved/restored only on a context switch.

If metadata tables are embedded into virtual memory. HO delimits them so it can protect them from the user program: for each such kind of metadata, HO delimits them using a pair of pointers a metadata-array-hi-ptr and metadata-array-lo-ptr these registers need be saved/restored only on a context switch.

Hard Object maintains temporary state relevant to the current module (current-mod-owner); this is updated at a call and return from the current function Function-Metadata, and need not be saved/restored on the stack.

Hard Object maintains temporary state relevant to the origin of a control flow transfer, such as the module of the caller (caller-mod-owner), information about the origination of the control flow transfer (control-flow-kind), and a callee-ret-and-frame-ptr which is the Ret-And-Frame-Ptr of the just-returned function, which is useful in computing the current-function-start after a return; this is updated on every instruction, and so need not be saved/restored on the stack.

Using a simple bit-flag array registers, Hard Object annotates onto (a) integer user registers, (b) floating-point user registers, and (c) control status registers, the following metadata, except where some combinations do not make sense and so would therefore not be provided, such as a ref-flag on a user floating-point register; these registers annotate user registers and are therefore are updated in place never need to be saved/restored on the stack:
a ref-flags register (int-register-ref-flags, csr-ref-flags),
a written-flags register (int-register-written-flag-s, float-register-written-flag-s, csr-written-flag-s Hard Object maintains registers for the user program to use to communicate which registers are allowed to pass through a call or a return these registers are not saved/restored across a call/return and the software toolchain is expected to not insert a call/return in between the setting of these registers and their use for the call/return which they are intended to annotate:
  a register-ok-to-return-flags register, and
  a num-int-args-in-registers register and a num-float-args-in-registers register (note that another embodiment replaces these flags with a register-ok-to-call-flags register).

Hard Object maintains a Hard Object framepointer (or shadow-frame-pointer) parallel to the user framepointer, which cannot be written by user code, which is saved within the Ret-And-Frame-Ptr made by a call/jal/jalr instruction (at least in RISC-V®), and is restored on a return from (a) the stack-limit-ptr and (b) the framepointer-uprelto-stack-ingwords field of the Ret-And-Frame-Ptr.

Hard Object maintains stack-floor and stack-obj-floor registers. Hard Object also maintains a sub-stack-floor-init-flags for annotating stack machine words as initialized even when they are below the stack-floor. These stack-floor mechanisms are updated in place never needs to be saved/restored on the stack: the stack-floor is updated by user writes and is put to the callee framepointer on a return; the stack-obj-floor is put when a Hard Object narrow-pointer call is made to create a new stack object and is restored to the stack-pointer on a return; the sub-stack-floor-init-flags are updated by user writes and are cleared on a return.

Hard Object annotates the callee-save-reg-state mechanisms in registers as finite state machine describing the current frame. The state of this automaton must be saved/restored to/from the stack on each call/return, however, the callee-save mechanism itself guarantees the integrity of this stack state in the same way that it guarantees that of the user callee-save registers (and the return address register).

Hard Object provides registers to allow turning off parts of Hard Object while bootstrapping. Hard Object in a new process while still setting up some metadata, or while switching into kernel mode: hard-object-active-flag, callee-save-active-flag; these registers might be update after program initialization by the C runtime (CRT0) or turned off or on a context switch into or out of the kernel, to indicate that parts of Hard Object are active or not while in kernel mode.

Embedding metadata into structured pointers: Multiple kinds of structured pointer encoding are possible, as long as a Ptr-Kind-Enum field is shared across all of these structured pointer encodings which can be used to distinguish the encoding kind. Encoding kinds use various techniques for annotating metadata onto data.
  Typically, prior art 64-bit machines do not require all 64-bits to encode addressing, and therefore these bits may be used for other purposes, such as encoding metadata. If only, say 39 bits of a 64-bit pointer are used to encode the address being pointed to by the pointer, then the remaining 64−39=25 bits ("hi bits") are available to annotate metadata onto the pointer.
  The decoding of metadata into a structured pointer can further require a decoding stage that also consults other metadata, such as other Hard Object registers and metadata maps.

Wherever a formal pointer is located, its machine word is annotated with a ref-flag, indicating that it is a formal pointer; therefore, the machine word is never confused with an integer.

A ref-flag annotated onto the pointer tells the hardware that the machine word in question is not a normal integer but a formal pointer.

When a formal pointer is a structured pointer, the structure of the structured pointer can be trusted, as user code cannot modify it directly (see ALU interception below).

Whenever the program tries to "look at" a formal pointer, it uses an ALU operation to do so. Hard Object intercepts all dataflow in and out of the Arithmetic Logic Unit (ALU), so when the Hard Object machine detects the formal pointer ref_flag, it can modify what the ALU sees going in and what comes back out. The Hard Object encodings are therefore invisible to the user program: it can never "see" the formal pointer as anything other than how Hard Object intends it to be seen.

For formal pointers Hard Object can modify the ALU to prevent corruption of that metadata and to guarantee the correct propagation of that metadata.
  For example, during pointer subtraction, the metadata can be removed before the subtract, thereby resulting in the intended result.
  For example, when used in an operational context where the operation expects an integer, a formal pointer is intercepted on its way into the ALU, the meta-data removed, and the pointer converted into a an integer representing the raw pointer address, which is what a program running on a prior art, non-Hard-Object system would expect.
  Depending exactly on the ALU operation, when processing a formal pointer, the meta-data is removed by Hard Object on the way into the ALU, the ALU operation is done, and the meta-data is re-annotated back onto the formal pointer on the way back out. Hard Object then checks that if the pointer were intercepted again, as would be done the next time the formal pointer goes back into the ALU, that the formal pointer decodes to same integer value as was just output before Hard Object put the meta-data back on, and if not, raises a fault. (That is, if the ALU operation put information in any of the high bits of the integer, which Hard Object uses for the meta-data, the ALU operation will fault.) The result is that (at least in this aspect) if the user's program does not trigger a Hard Object fault, then it will operate the same as if it were running on a non-Hard Object machine.

Hard Object intercepts loads and stores, so when a load or store is made through a structured pointer, the meta-data can be used to influence Hard Object's checking of whether the load or store is allowed. An Abs-Ptr-Kind-Encoding enum indicates the encoding of a pointer, and comprises:
  a lo-unstructured-APKE,
  a durable-abs-APKE,
  a ephemeral-abs-APKE,
  a hi-unstructured-APKE.

An Immediate-Granularity enum indicates the granularity of a sub-object immediate encoding of a pointer and comprises:
  a byte-IG,
  a half-IG,
  a word-IG,
  a sword-IG.

A Subobj-Id-Namespace enum indicates the sub-object encoding of a pointer and comprises:
  a top_SIDN,
  a bottom_SIDN.

This detailed description may refer to any pointer to data as a data-pointer.

Abs-Ptr (absolute-pointer, either an absolute heap; global pointer or a stack-pointer) comprises:
- an abs-ptr-kind-encoding (Abs-Ptr-Kind-Encoding), note that this annotation implicitly contains an encoding of a durable-flag,
- a subobj-immediate-flag,
- a public-target-flag,
- a writable-target-flag,
- a time (heap/global pointer time or time address or time-address),
- an obj-id,
- in indirect mode (when subobj-immediate-flag is false) further comprises: (1) a subobj-id-namespace, and (2) a subobj-id (which can be called a subobj-topid when the subobj-id-namespace=top-SIDN),
- in immediate mode (when subobj-immediate-flag is true) comprises: (1) an immediate-granularity (Immediate-Granularity), (2) an immediate-dist-to-start (distance to the start of the sub-object from the start of the object in immediate-granularity units), (3) an immediate-length (length of the sub-object in immediate-granularity units),
- a page-overflow-flag,
- a target-address/target-data-address: (1) a data-page-index (the part of the target-address that selects the page), (2) a data-page-offset (the part of the target-address that points within the page; usually 12 bits in prior art embodiments).

An immediate-subobject-start can be computed as the sum of the object-start and the immediate-dist-to-start times the immediate-granularity. An immediate-subobject-end can be computed as the sum of the immediate-subobject-start and the immediate-length times the immediate-granularity. In one embodiment, where a machine word has 64 bits, of which 39 bits are used to encode the target address, the above fields use the following bits:
- abs-ptr-kind-encoding: 2 bits;
- subobj-immediate-flag: 1 bit;
- public-target-flag: 1 bit;
- writable-target-flag: 1 bit;
- time: 2 bits;
- obj-id: 9 bits;
- indirect mode and immediate mode are a union (in the sense of the C language: either one or the other is used) depending on the subobj-immediate-flag (the union tag); 8 bits; see below for details;
- page-overflow-flag: 1 bit;
- data-page-index: 27 bits: and
- data-page-offset: 12 bits.

Indirect mode and immediate mode are a union (either one or the other is used) depending on the subobj-immediate-flag (the union tag); 8 bits:
- indirect mode (8 bits): (1) subobj-id-namespace: 1 bit; (2) subobj-id: 7 bits;
- immediate mode (8 bits): (1) an immediate-granularity (Immediate-Granularity): 2 bits; (2) an immediate-dist-to-start (distance to the start of the sub-object from the start of the object in immediate-granularity units): 3 bits; (3) an immediate-length (length of the sub-object in immediate-granularity units): 3 bits.

Using the page-overflow-flag and page-class-id:
When doing pointer arithmetic on an Abs-Ptr, if the new value of the pointer ends up pointing to a new page having a different page-class-id than that of the original pointer value, and the new page is one page after the range of pages annotated with the original page-class-id, then Hard Object sets the page-overflow-flag on the new value;
- a doing this means that in a subsequent use of the pointer, before looking for the data page PTE (in which to find the page-class-id), Hard Object will first decrement one page from the data-page-index of the pointer, meaning Hard Object will use the data page PTE for the previous page;

optimization: When caching a PTE meta-datum, cache the PTE metadata for the previous page in the same cache entry, so that when the page-overflow-flag is set on a pointer, the same cache entry can be used to satisfy the request.

Pointer arithmetic that tries to make a pointer more than one page after the range of pages annotated with the same page-class-id as the original pointer, faults.

Pointer arithmetic that tries to make a pointer before the range of pages annotated with the same the page-class-id as the original pointer, faults.

A Stack-Obj-Ptr (stack object pointer, stack-object-pointer, stack-obj-ptr) comprises:
- a Ptr-Kind-Enum,
- a writable-target-flag,
- a framepointer-uprelto-stack-in-qwords, which is a framepointer-uprelto-stack in units of qwords (quad-words) note that this field amounts to a compressed encoding of the value of the Hard Object framepointer (shadow-frame-pointer) when this stack-object-pointer points into the bottom frame (the stack-object-pointer-frame-pointer),
- a start-dnrelto-pointer-in-bytes, which is a start-dnrelto-pointer (or target-start-dnrelto-pointer/target-start-down-relative-to-pointer) in units of bytes,
- a size-in-bytes, which is a size (or target-size) in units of bytes, and
- a pointer-uprelto-stack-in-bytes, which is a pointer-up-relto-stack (or a target-pointer-uprelto-stack/target-pointer-up-relative-to-stack) in units of bytes.

The pointer-uprel-to-stack-in-bytes added to the stack-limit-pointer gives the bottom of the stack object, the stack-object-bottom. Adding the size-in-bytes gives the stack-object-top.

Let the stack-pointer-target of a stack-pointer be defined as the stack-limit-ptr plus the pointer-uprelto-stack-in-bytes of the stack-pointer. Let the stack-pointer-start of a stack-pointer be defined as the stack-pointer-target of the stack-pointer minus the start-dnrelto-pointer-in-bytes of the stack-pointer. In one embodiment, where the stack is 8M bytes, the above fields use the following bits:
- Ptr-Kind-Enum: 3 bits,
- veritable-target-flag: 1 bits,
- framepointer-uprelto-stack-in-qwords: 19 bits,
- start-dnrelto-pointer-in-bytes: 9 bits,
- size-in-bytes: 9 bits, and
- pointer-uprelto-stack-in-bytes: 23 bits.

A Text-Ptr-Kind-Enum indicates the kind of a text pointer and comprises:
- a forward-text-TPKE, and
- a ret-and-frame-TPKE.

A Forward-Text-Ptr (forward text pointer/function pointer/function-pointer/function capability) comprises:
- a Ptr-Kind-Enum,
- a text-Ptr-Kind-Enum (a Text-Ptr-Kind-Enum),
- a target-address,
- a durable-flag,
- a function-body-target-flag,
- a cross-module-target-flag, and
- a function time (or time address or time-address).

In one embodiment, where the program text memory is constrained to 4G bytes, the above fields use the following bits:
   Ptr-Kind-Enum: 3 bits,
   text-Ptr-Kind-Enum (a Text-Ptr-Kind-Enum): 1 bit,
   target-address: 32 bits,
   durable-flag: 1 bit,
   function-body-target-flag: 1 bit,
   cross-module-target-flag: 1 bit, and
   function time (or time address): at least 1 bit.

A Ret-And-Frame-Ptr (ret-and-frame/return pointer) comprises:
   a Ptr-Kind-Enum,
   a text-Ptr-Kind-Enum Text-Ptr-Kind-Enum),
   a target-address,
   a function-top-offset-in-dwords, which is a function-top-offset in units of dwords (double-words),
   a framepointer-uprelto-stack-in-qwords (or framepointer-uprelto-stack/framepointer-up-relative-to-stack in units of qwords (quad-words)), and,
   a function time (or time address).

In one embodiment, where the program text memory is constrained to 4G bytes and where text target addresses are half word (16-bit) aligned, the above fields use the following bits:
   Ptr-Kind-Enum: 3 bits,
   text-Ptr-Kind-Enum (a Text-Ptr-Kind-Enum): 1 bit,
   target-address: 31 bits (semantically, a 32-bit value where the low bit is assumed to be 0),
   function-top-offset-in-dwords: 9 bits,
   framepointer-uprelto-stack-in-qwords: 19 bits, and
   function time (or time address): 1 bit.

Passing a Stack-Obj-Ptr or Ret-And-Frame-Ptr out of stack context:
   When a Stack-Obj-Ptr or Ret-And-Frame-Ptr has been passed out of its stack context, such as to a kernel routine or another thread, the pointer no longer makes sense as it has fields that are defined only relative to the stack-limit-ptr.
   Such contexts go through dangerous code, so techniques may be used for dealing with this situation that are not available to normal user code.
   In one embodiment, when such a pointer is passed out of context, clear its ref-flag; now the pointer is still structured, but not longer formal, so it cannot be accidentally used out of context.
   Further, embed the structured pointer into a larger struct containing an identifier for the context in which it made sense, such as the thread-id or the stack-limit-ptr.
   A special Hard Object operator can be provided to allow dangerous code that wishes to use such a pointer by passing the stack-limit-ptr as a second argument to the operator to be used during pointer decoding.
   A special Hard Object operator can be provided to allow dangerous code that wishes to make formal again, such dangerous code is trusted to check that it is passing the pointer into a context having the right the stack-limit-ptr before making it formal; for example, code which restores a trap frame might be a suitable place to do this.

Page Table Entries: Page granularity metadata is annotated onto text and data pages simply by adding fields to the Page Table Entry (PTE) or by making a parallel Page Table Entry map that works in a similar manner to the standard prior art virtual memory Page Table. This is a simple and time-tested mechanism for annotation. A text-page meta-datum (Text-Page-Metadata) comprises:
   a func_at_page_start: pointer to the top of the function that contains the first instruction on the page.

Of course every text-page meta-datum is associated with a text-page which has a start address for its page, its page-start-address; the Hard Object design uses this page-start-address to handle the restoration of current-function-start at a return. The map from a text address to the text page metadata for that page may of course be cached in the standard way, but further, since most references for this map want the metadata for the current text page, it is quite efficient to also cache the map entry for the current text page in special current_text_page_base and current_-text_metadata registers for that purpose. A data-page meta-datum (Data-Page-Metadata) comprises:
   a page-class-id: an identifier for a Page class meta-datum, such as an index into a Page class metadata table,
   a page-subobj-id-abs-base.

Caching Page Table Entries as a function of a page-index (the target address without the on-page bits, usually the low 12 bits) is a solved problem and prior art techniques will therefore work.

Tags: per machine word nags: Tag metadata is annotated onto (or associated with) each machine word (in one embodiment, a 64-bit "double word") using a simple memory map, such as an array that corresponds one-to-one with main memory. For example, when machine words are 64 bits and the tags per word are 4 bits, this results in a factor of 64/4=16 reduction in size.

Hard Object requires 4 tag bits of metadata per machine word:
   A Text-Dword-Metadata comprises a single flag annotated onto a machine word,
   A Data-Dword-Metadata comprises a collection of four flags annotated onto a machine word.

A Text-Dword-Metadata/text Dword-Meta-Datum/text dword-flags/Text-Dword-Flags comprises:
   a func-top-flag: when set, the machine word on which it is annotated is the top of a function.
   (extension in one embodiment) a intra-func-dyn-target-flag: when set, the machine word on which it is annotated may be the target of an intra-function dynamic control flow transfer (a dynamic control flow transfer that is not a call or return); regarding the granularity of annotation: note that that since Text-Dword-Metadata annotate meta-data at the dword (64-bit, double-word) granularity, whereas default instructions in RISCV are at the word (32-bit) granularity, we may either require dynamic control flow transfers target only text addresses on double-word boundaries, or have two intra-func-dyn-target-flag-s per Text-Dword-Metadata; for compressed instructions at the half-word 16-bit granlarity, we have a similar trade-off of requiring targeting only text addresses of a coarser granularity (64-bit or 32-bit, as above) or of having four intra-func-dyn-target-flag-s per Text-Dword-Metadata A Data-Dword-Metadata/dataDword-Meta-Datum/data dword-flags/Data-Dword-Flags comprises:
   a public-flag,
   a writable-flag: when set, the associated machine word may be written (otherwise, it may only be read),
   a written-flag: when set, the associated machine word has been written (since this flag was last cleared, such as, say, when the object containing this machine word was last allocated); if memory having a clear written-flag is read, the result depends on the read-unwritten-mem-policy, a ref-flag: when set, the associated machine word is a formal pointer/reference (ref).

Such a bit array is also a simple and time-tested mechanism for annotation; see the lowRISC project at Cambridge [low-risc] which does exactly this. Caching such tags as a function of an address which they annotate is a solved problem and prior art techniques will therefore work.

Function-Metadata headers: Every function has a Function-Metadata header containing annotations for that function. Hard Object provides a way to map from the start address of a function, the function-start, to the Function-Metadata of the function; call this map the function-start-to-function-metadata-map.

In one embodiment, the Function-Metadata of a function is annotated onto its function by putting the Function-Metadata directly above the function as a Function-Metadata header; in this embodiment, to find the Function-Metadata for a function knowing its function-start, subtract the size of a Function-Metadata from the function-start and do a load. This simply header embedding technique in the abstract performs the function of a function-start-to-function-metadata-map.

In another embodiment, there could be a function-start-to-function-metadata-map which maps the current-function-start to the Function-Metadata for a function; some embodiments of this map could be a prior art red-black tree, a prior art hashtable, or a prior art skip list.

Hard Object always knows the pointer to the current function, the function-start (first instruction of a function) of the current function (the current-function-start):

When a call to a function is made, the pointer to the top of the function is known (as the call/jal/jalr instruction is jumping to it); Hard Object therefore stores the target function pointer in the current-function-start.

When a return to target address within a target function is made, as detailed elsewhere, metadata in the return pointer together with Text-Page-Metadata annotated onto the target address is used to reconstruct the current-function-start No other forms of control transfer are allow to transfer control to another function, so none of them need change the current-function-start or current-function-metadata.

After a control transfer, or whenever the Function-Metadata for a function is needed, the function-start of the function in question (for the current function, the current-function-start) is then used to lookup the Function-Metadata for the current function using the function-start-to-function-metadata-map; further, the result of this lookup can be cached it in the current-function-metadata register.

A function has a version (or refable-version) and a function pointer or a return pointer has a time address and that these operate in a manner similar to similar metadata on heap/global data pointers: when a function is called through a function pointer or returned-to through a return pointer, if the version of the function does not match the time address of the pointer, then Hard Object raises a fault. One use of this functionality is to prevent call-after-free or return-after-free (to a function) in the face of dynamic loading/linking, that is, so that a dynamically loadable ELF may be loaded or unloaded and any outstanding stale function/return pointers to its functions can then be made to cease to allow function calls/returns through them. A Function-Metadata (function-Meta-Datum) comprises:

a mod-owner: the module-ower-id of the associated function, which comprises: (1) a mod-owner-id: the module-owner-id of the associated function, (2) a mod-owner-suff-len: the module-owner-suffix-length of the associated function, a danger-flag: when set, the code of the associated function has dangerous powers, a may-call-suff-len: constrain calling this function to a module-group, a may-make-ref-suff-len: constrain making references to this function to a module-group, a length (function-length): the length of the sequence of instructions of the associated function.

a function refable, (see below), wherein a function refable comprises:

a require-function-pointer-flag: when set, calling this function requires calling through a formal function pointer, otherwise calling through a formal function pointer is not required, a refable-version: the version of this function, a refable-version-ceiling: maintain the invariant that there are no outstanding formal pointers to the function that have a time greater than the version and less than the version-ceiling, a refable-version-next-ceiling: useful during concurrent version collection for recording the current function version at the start so that value can be used to put the next ceiling at the end (that is, during collection, as the program is still running, the function version may change, say if a dynamically loaded library were unloaded and another loaded, and only the initial version is ok to use as the ceiling at the end).

In one embodiment, the above fields use the following bits:

mod-owner: 19 bits,
danger-flag: 1 bit,
may-call-suff-len: 4 bits,
may-make-ref-suff-len: 4 bits,
length: 26 bits,
function refable, 10 bits, wherein said embodiment said function refable comprises:
require-function-pointer-flag: 1 bits,
refable-version: 3 bits,
refable-version-ceiling: 3 bits,
refable-version-next-ceiling: 3 bits.

A Function-Metadata public-flag can be implemented using a may-call-suff-len of 0 for private and 15 for public. Time constraint on function call/return:

at a call through a function pointer transferring control to a function or a return through a return pointer transferring control to a function, through a function pointer or a return pointer, the time address of the function pointer or return pointer must match the refable-version of the function to which control is being transferred, or Hard Object raises a fault.

Hard Object annotates each function pointer with the Function-Metadata header for that function, so, in one embed, this Function-Metadata header can be put just before the top of the function and found easily from the pointer to the top of the function using a subtract of the header size and a load. This map from function pointer to a Function-Metadata header may of course be cached in the standard way (using the low bits of the function pointer as the cache index). Caching such Function-Metadata as a function of an address which they annotate is a solved problem and prior art techniques will therefore work. Further, however, since most references to this map want the metadata for the current function, Hard Object may also cache the map entry for the current function in special current-function-metadata registers just for that purpose (current-danger-flag, current-function-start, current-function-end), providing effectively a second layer of caching, which in practice seems to be quite effective.

Tables mapping IDs to metadata: Hard Object annotates metadata onto objects and sub-objects. This is done by annotating obj-id and subobj-id fields onto structured Abs-Ptrs which are used as indices to look up the object and sub-object metadata in tables, as follows.

Hard Object maps each page-class-id to a Page-Class-Meta-Datum using a page-class-id-map; one embodiment of this map is a table mapping page-class-ids to a pointer to the Page-Class-Meta-Datum; another embodiment is that the page-class-id itself is a pointer to the Page-Class-Meta-Datum. A Page-Class-Metadata (Page-Class-Meta-Datum) comprises:
- a page-class-allot: the allocator managing this page class,
- a page-class-alloc-ref-flag: the ref-flag for the pointer to the allocator,
- a next-obj-id: next unused object ID for this page class,
- a map-obj-metadata-table: table of Object-Metadata for objects in this page class,
- a map-subobj-metadata-table: table of Sub-Object-Metadata for objects in this page class.

In one embodiment, the above fields use the following bits:
- page-class-alloc: 36 bits (dword aligned pointer having low 3 bits of 0),
- page-class-alloc-ref-flag: 1 bits,
- next-obj-id: 9 bits,
- map-obj-metadata-table: 36 bits (dword aligned pointer having low 3 bits of 0): pointer to table of Object-Metadata for objects in this page class (note that it is common in the prior art C programming language to use language in a way which identifies/conflates the table with the pointer to the table, and this detailed description does so when it is convenient),
- map-subobj-metadata-table: 36 bits (dword aligned pointer having low 3 bits of 0): pointer to table of Sub-Object-Metadata for objects in this page class (note that it is common in the prior art C programming language to use language in a way which identifies/conflates the table with the pointer to the table, and this detailed description does so when it is convenient).

Each object has an associated Object-Metadata. An Object-Metadata (Object-Meta-Datum, object-metadata, object-meta-datum, object-metadatum) comprises:
- a has-subobj-metadata-flag: whether this object has any sub-object metadata,
- a iterator-flag: whether the improper sub-object is an iterator,
- a may-make-ref-suff-len: constrain making references to this object to a module-group,
- a may-read-suff-len: constrain reading this object to a module-group,
- a may-write-suff-len: constrain writing this object to a module-group,
- a writable-flag: when clear, the data associated with the object may not be written,
- a mod-ownable: the mod-ownable-id of this object,
- an integrity-flag: the integrity flag of this object,
- a refable (see below),
- a start (object-start): pointer to the start of the object,
- a length (object-length): the length of the object, where a refable comprises:
- a refable-owner-managed-flag: when set, the owner may put the refable-informally-targetable-flag and the refable-version of the refable of the same object, otherwise, only dangerous code may do so,
- a refable-may-make-ref-flag: when set, a ref may be made to this object by non-dangerous code, otherwise, only dangerous code may make a ref to this object,
- a refable-informally-targetable-flag: when set, this object may be accessed by a non-formal pointer, otherwise, access to this object requires a formal pointer,
- a refable-version: the version of this object; at an access to data through the pointer (a "deref"), the time address of the reference must match the refable-version of the target object,
- a refable-version-ceiling: maintain the invariant that there are no outstanding formal pointers to the object that have a time greater than the version and less than the version-ceiling,
- a refable-version-next-ceiling: useful during concurrent version collection for recording the current object version at the start so that value can be used to put the next ceiling at the end (that is, during collection, as the program is still running, the object version may change, and only the initial version is ok to use as the ceiling at the end).

Let an object-end be computed as the sum of the object-start and the object-length. In one embodiment, the above fields use the following bits, fitting into two double words, 128 bits:
- has-subobj-metadata-flag: 1 bit,
- iterator-flag: 1 bit,
- may-make-ref-suff-len: 4 bits,
- may-read-suff-fen: 4 bits,
- may-write-suff-len: 4 bits,
- writable-flag: 1 bit,
- mod-ownable: 15 bits,
- integrity-flag: 1 bits,
- refable (see below): 18 bits,
- start: 39 bits,
- length: 39 bits, where in said embodiment said refable comprises:
- refable-owner-managed-flag 1 bit,
- refable-may-make-ref-flag: 1 bit,
- refable-informally-targetable-flag: 1 bit,
- refable-version: 5 bits,
- refable-version-ceiling: 5 bits, and
- refable-version-next-ceiling: 5 bits.

Each object (or its object-metadatum) has an associated Sub-Object-Metadata-Table. A Sub-Object-Metadata-Table (sub-object-metadata-table) comprises:
- a map-subobj-metadata: map from sub-object IDs to Sub-Object-Metadata-Mem-s.
- a map-subobj-topid-to-subobj-id (map-subobj-topid-to-absolute-subobj-id): map from top IDs to sub-object IDs,
- a num-abs-subobj-ids: number of sub-object IDs in this table,
- a num-subobj-topids: number of top IDs in this table,
- a contains-a-non-immediate-non-trivial-union-flag: whether the C type tree corresponding to this table contain a non-immediate non-trivial union sub-type, and a top-is-array-flag: whether the top sub-object of the sub-object tree is an array.

A Sub-Object-Metadata-Mem (sub-object-metadata-mem, sub-object-metadatum-mem), the representation in a table in metadata memory, comprises:
  an offset-from-object-start (subobject-offset-from-object-start): the start of this sub-object expressed as an offset from the start of the associated object,
  a length (subobject-length): length of the sub-object,
  an is-array-flag: whether the C type corresponding to this sub-object is an array,
  an iterator-flag: whether this sub-object is an iterator, and
  a parent-subobj-id: the sub-object ID of the parent sub-object.

A Sub-Object-Metadata sub-object-metadatum, sub-object-metadata), the representation in the cache, comprises:
  an improper-flag: whether this sub-object is the improper sub-object,
  an iterator-flag: whether this sub-object is an iterator,
  a start (subobject-start): pointer to the start of the sub-object, and
  a length (subobject-length): the length of the sub-object.

Let a subobject-end be computed as the sum of the subobject-start and the subobject-length, Absolute sub-object IDs (absolute-sub-object-id-s, absolute sub-object-id-s) are numbered depth-first from the top of the sub-object tree; however, these can use a lot of bits. Here are some compression algorithms for representing an absolute sub-object ID in a pointer while using fewer bits than may be required by the naive encoding.

Hard Object can represent an absolute sub-object ID for a sub-object that starts on one page and ends either on the same page or ends on the next page by representing the absolute sub-object ID as the sum of (a) the data-page metadata page-subobj-id-abs-base and (b) the pointer subobj-id; that is, given a pointer where the pointer has a subobj-id-namespace=bottom-SIDN, find the absolute sub-object ID of the intended sub-object, as follows:
  1. if the pointer has a set page-overflow-flag, use the previous page instead of the page pointed to by the pointer data-page-index (that is, subtract one from the data-page-index before looking up the page);
  2. for the page pointed to by the data-page-index, find the data-page metadata page-subobj-id-abs-base;
  3. add the sub-object ID of the pointer to the page-subobj-id-abs-base to get the absolute sub-object id.

Hard Object can represent the sub-object IDs for the sub-objects at the top of the sub-object tree (which typically would mirror the C type tree) by numbering the sub-object breadth-first while descending the sub-object tree until some point (such as if the available topids are exhausted) and then recording the mapping from topids to absolute sub-object IDs in a map-subobj-topid-to-subobj-id table; that is, given a pointer where the pointer has a subobj-id-namespace=top-SIDN, find the absolute sub-object ID of the intended sub-object, as follows:
  1. interpret the sub-object ID of the pointer as a tepid (subobj-topid); and
  2. look it up in the map-subobj-topid-to-subobj-id of the Sub-Object-Metadata-Table of the object to get the absolute sub-object id.

To find the object and sub-object metadata for a given an Abs-Ptr:
  (1) From the data-page-index (the part of the pointer pointing to the top of the page), look up the data-page meta-datum (in one embodiment, by finding it in the data Page Table Entry (data PTE), when extended with Hard Object metadata).
    If the pointer has the page-overflow-flag set, then look for the page-class-id of the previous page, that is, for data-page-index minus one. A way to do this without looking up more than one Page Table Entry (PTE) is in each PTE to also store the page-class-id of the previous page.
    This need only be done for the PTEs in the Translation Lookaside Buffer (TLB), not in the actual Page Table, as two adjacent PTEs can be looked up on a TLB cache fill and used to fill one cache entry.
  (2) From the page-class-id of the data-page meta-datum, look up the Page-Class-Metadata in a Page-Class-Metadata-Table.
  (3) In parallel:
    In the Page-Class-Metadata, find the map-obj-metadata-table and in that look up the Object-Metadata from the obj-id (of the pointer metadata).
    In the Page-Class-Metadata, find the map-subobj-metadata-table and in that look up the Sub-Object-Metadata-Mem from the subobj-id (of the pointer metadata).
  Construct the Sub-Object-Metadata from the Sub-Object-Metadata-Mem and the Object-Metadata by combining the information in both of them as follows:
    the improper-flag: true exactly when the absolute sub-object ID is 0;
    the iterator-flag: copy from the iterator-flag of the Sub-Object-Metadata-Mem;
    the start (sub-object-start): add the start of the Object-Metadata and the offset-from-object-start of the Sub-Object-Metadata-Mem; and
    the length (sub-object-length): copy from the length of the Sub-Object-Metadata-Mem.

Figure 7:
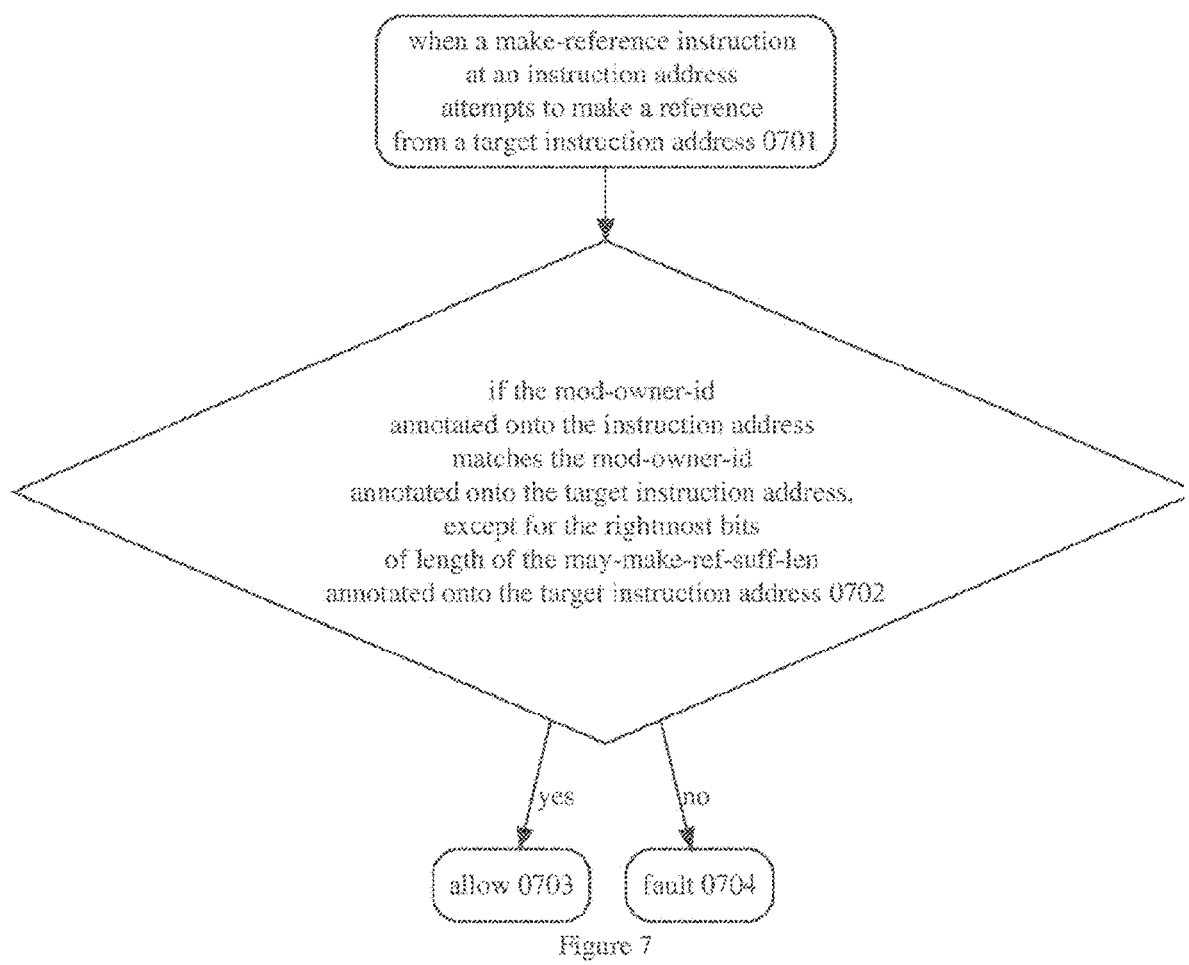
FIG. 7 shows when making a reference from an instruction address, checking the mod-owner-id of the make-reference instruction vs mod-owner-id of the target instruction address to the degree specified by the may-make-ref-suff-len.

Doing this the simple way requires accessing the object and sub-object metadata caches after the TLB has come back with the data PTE metadata. That is, in that embodiment, Hard Object must access two layers of caches in series, whereas it is generally more efficient to access caches in parallel. However, this technique is also what must be done when implementing a caching strategy that caches physical memory (rather than virtual memory). This technique appears in Patterson's undergraduate textbook [patterson-hennessy-2nd-ed-1998, p. 595], so it seems likely that this technique is not prohibitively expensive or the technique would not appear in a textbook:

"Figure 7.27 assumes that all memory addresses are translated to physical addresses before the cache is accessed . . . . In such a system, the amount of time to access memory, assuming a cache hit, must accommodate both a TLB access and a cache access; of course, these accesses can be pipelined."

Caching an Object-Metadata is an interesting puzzle: since the obj-id only has meaning relative to the page-class-id, doing this effectively uses both the obj-id and the page-class-id in the cache index. One embodiment is to simply compute the bitwise exclusive-or of (the low bits of) these two fields of the pointer; note that bitwise exclusive-or is quite fast in hardware, requiring only one layer of transistors.

Caching a Sub-Object-Metadata is even more interesting: note that the representation of the Sub-Object-Metadata in the cache differs from the Sub-Object-Metadata-Mem in memory: the cache version has absolute addresses, so it is also a function of the Object-Metadata, and therefore the cache must use both the obj-id and subobj-id in the computation of the index. Similarly, since both the obj-id and subobj-id only have meaning relative to the page-class-id, and further, since the subobj-id has meaning only relative to the subobj-id-namespace, caching the Sub-Object-Metadata effectively effectively uses the obj-id, the subobj-id, the subobj-id-namespace, and the page-class-id in the cache index. As above, one embodiment is to simply compute the bitwise exclusive-or of (the low bits of) all of these fields of the pointer, but given that the subobj-id-namespace is only a single bit, simply appending it to the low bits of subobj-id allows for using only three inputs, thereby requiring only a three-way bitwise exclusive-or.

Another embodiment of the cache scheme above could conceivably dispense with the caches in series (first looking up the page-class-id and then looking up the Object-Metadata/Sub-Object-Metadata (in parallel)), but at the expense of no longer guaranteeing unique representation of metadata in the cache, inducing more cache pressure and requiring cache flushes when metadata is altered. If this embodiment is used, then in the caching discussion above regarding what fields of the pointer to use in the index of the Object-Metadata cache and the index of the Sub-Object-Metadata, replace the page-class-id with the page-index. Again, this representation will be redundant: the result will be that one object will have its Object-Metadata cached more than once; similarly for sub-objects.

Version collector: This sub-section states the entire version collection system, which is partially redundant with the above. A live reference is one where the time address of the reference equals the refable-version of the target object to which it points; a reference that is not live is stale.

Hard Object prevents stale references from being de-referenced, but while a stale references is outstanding somewhere, the refable-version of the object may not be re-used.

Thus the Hard Object system wants to clear stale references by finding them and clearing their ref-flags. Doing this is the purpose of version collection.

During version collection, while considering a reference, note that every reference points from a source address to a target address.

Page participation pass: Annotate each page with page-version-collection-obj-scan-live-flag (one embodiment would be to use a bit array). When this flag is set, this detailed description says the objects on the page corresponding to the flag are "participating in the object pass" below.

For example, a useful configuration at the start of the scan might be as follows: all data pages mapped into memory have the page-version-collection-obj-scan-live-flag set and those not mapped into memory (or that their metadata page is not mapped into memory, see below) have that flag clear.

Another embodiment might be, for each heap page, decide if it is hot enough (frequently-used enough) or desperate enough (its objects are sufficiently short on available unused versions) to be worth scanning.

For the purposes of version collection what is really needed of a data page is the metadata of objects that are stored on that page. That metadata of objects stored on a data page could be (a) stored on the same data page as the objects or (b) on a different but corresponding metadata page. In case (b), if said metadata of the objects of a page is on another metadata page corresponding to said data page, then throughout this detailed description the phrase "if the data page is mapped into memory" means if its corresponding metadata page (containing the metadata of the objects on said data page) is mapped into memory. Any page-version-collection-obj-scan-live-flag corresponding to a data page will be taken to also be annotated on the metadata corresponding to the objects on the data page. If a data object spans more than one data page, for annotation purposes it is considered to be on one of those pages, such as the first one.

Reference pass: Scan through all the formal pointers (that is, scan through their source addresses):
registers, and
memory: globals, stack, heap.

For each reference in the above locations, check if the reference is stale as follows:

1. look up the page-version-collection-obj-scan-live-flag of the target page of the reference;
2. if the page-version-collection-obj-scan-live-flag is set on a page, check if the page is still mapped into memory; (a) if the page is not still mapped, clear the page-version-collection-obj-scan-live-flag on the page as it is no longer participating in the scan and the scan is done considering this reference and this reference check is done (another embodiment could load the page into memory and continue below); (b) if the page is still mapped, continue below;
3. find out if the formal pointer is still live by checking if the following two values are equal (a) the time address of the reference and (b) the refable-version of the target object; if they are equal, the reference is live, otherwise it is not (the reference is stale); and
4. if the reference is not live (stale), make it inoperative, such as by clearing its ref-flag.

An alternative to clearing the ref-flag in the last step is to instead put the next-ceil annotated onto the target object to the current reference version; doing this ensures that the current stale version will not be re-used. This embodiment might be useful in a situation where somehow it is expensive to immediately clear the ref-flag. The above checking can also be interrupt-driven, use of which is made below.

Object pass: Scan through the objects on pages that have a set page-version-collection-obj-scan-live-flag and, for each object, update the version clock of that object, as follows:

1. put version-ceiling version-next-ceiling; and
2. put version-next-ceiling current-version.

When the memory allocator handles a call to free( ) on a pointer to an object, the memory allocator increments the current-version of the object, where the increment is done in modular arithmetic, that is, when the increment results in a number too large to represent in the number of allotted bits, the number is put to 0. When the memory allocator handles a request to allocate memory, such as a call to malloc( ) it does not re-use a deallocated object if for that object the current-version=version-ceiling.

Version collecting concurrently with the user program running: To finish making this algorithm concurrent it is required to deal with the copying of formal pointers from the checked range to the un-checked range. Maintain a scan-color on each container of formal pointers:
annotate each data page with three values: no-none, some, yes-all; and
annotate each register with two values: no, yes.

Scan pages and color them indicating they have been scanned:

1. when staring the ref scan, all pages start colored no-none;
2. when starting scanning a page, color it some; and
3. when finishing scanning a page, color it yes-all.

When a formal pointer is copied, if copying from a no register to a some or yes-page, stop and check the pointer as above during a reference scan, clearing its ref-flag if it is stale; do this as follows:
- on a load of a reference from a page to a register, the register color is put to the color of the target page:
  - a load from page no-none or page some means put register color no, and
  - a load from page yes-all means put register color yes;
- on a store of a reference from a register to a page:
  - if the register color is no and the page color is some or yes-all, then see "handle a tainted reference transfer", below;
  - otherwise, if the register color is any other color combination, just allow the store.

Handle a tainted reference transfer: when the register color is no and the page color is some or yes-all either:
1. induce an interrupt-driven check of liveness/staleness (detailed above) to see if the reference is stale, and then see "in case (1)" below, or
2. (optimization) just clear the page-version-collection-obj-scan-live-flag on the page pointed to by the reference and allow the store; doing this is an optimization that reduces the cost of the interrupt by preventing the need to lookup the metadata of the object pointed to by the reference.

In case (1) (above), if an interrupt-driven check of liveness/staleness is done:
(a) if the reference is not stale, color the register yes and allow the store;
(b) if the reference is stale, clear the ref-flag on the reference on the register before doing the store.

Optimization: toggle whether 0 is no and 1 is yes (or the reverse) on every scan: Done naively, another scan would be needed to reset the yes annotations on page containers back to no at the start of each scan. Instead, toggle whether 0 means no and 1 means yes (or the reverse) on every scan.

Optimization: never swap in pages in arbitrary order during the ref scan: During the ref-scan-phase, to check if a reference is stale, the Object-Meta-Datum annotated onto the target object must be read in order to get its refable-version. Done naively, doing this would induce arbitrary paging-in of the Object-Meta-Datum. It is much faster to conduct the ref-scan-phase of the version collection without inducing this arbitrary paging. Only check the target of a reference if:
- the target page that the ref points to has the page-version-collection-obj-scan-live-flag (is participating in the object scan), and
- the target page is still resident in memory.

If the first condition holds but not the second, then clear the page-version-collection-obj-scan-live-flag for this page (rather than paging it in; this is the optimization); this page will not participate in the object scan that comes next.

Optimization: best-effort reference passes: It is faster and more predictable to reduce the number of pauses due to interrupt-driven checking of copied references from unchecked to checked containers. There is no requirement to do an object pass right after doing a reference pass:
- The version collector can be configured to do a best-effort reference pass where the version collection does not use the above techniques for preventing copying of a reference from an unchecked container to a checked container;
- Therefore, during a best-effort reference pass, there is a chance that a reference was copied from an un-scanned container to a scanned container, thus it is not safe to do the object pass after a best-effort reference pass;
- However, the number of outstanding stale references is likely greatly reduced by a best-effort reference scan; thus if a second guaranteed (non-best-effort) reference scan is done immediately afterward, the number of pauses due to interrupt-driven checking of copied references from unchecked to checked containers will likely be less (this is the optimization).

Optimization: scanning with the client program dataflow: Interrupt-driven checks occur when the program dataflow goes in the opposite direction of that of the version collection scan. Thus, if the version collection pass scans through memory generally the same direction as the program tends to write data, then the interrupts are reduced. To do this the scan needs to know the program dataflow.
- Perhaps it can be obtained using machine learning on logs of data access traces generated from running the program.
- Perhaps the client code can just tell it to the scan directly somehow, similar to the way client programs can currently provide hints to the mmap system call.
- Perhaps the compiler can inferring it using a static analysis.

Hard Object operators: Hard Object provides operators for the program and/or kernel and/or operating system libraries to influence the behavior of Hard Object; the Hard Object operators comprise those listed in this section. Some of these operations would clearly be dangerous for user code to be able to do, such as most of those that allow altering metadata. It is rather clear which are dangerous however, and therefore this section only comments on those where some insight may be required. These Hard Object operators can be implemented as additional instructions in the instruction set, or
- by hardware-intercepted system calls (called ecalls on RISC-V®), or
- by exposing special purpose registers (called control status registers on RISC-V®) which on some architectures (such as RISC-V®) can be read and written using special control status register access instructions, or
- by being implemented in software as a system call added to a Hard-Object-aware kernel which either has access to further operators with which to effect the required result, or which can alter metadata memory directly, or possibly by other methods.

This subsection enumerates some suggested Hard Object operators which have been found to be sufficient in one software simulation of Hard Object. Those of ordinary skill in the art know that any kind of metadata annotated onto a thing of any kind at the very least must have getter/putter operators and that Hard Object is no exception; therefore this detailed description does not necessarily exhaustively enumerate all such operators, possibly leaving some implied. Similarly, those of ordinary skill in the art know that any map/table/annotation/data-structure herein disclosed must have some method for being initialized, read, and written (collectively "managed"), the interesting details of which are relevant only to choices made by the details of a particular choice of embodiment/implementation; therefore this detailed description does not necessarily exhaustively enumerate these map/table/annotation/data-structure management instructions/operators, possibly leaving some implied. Operators that have the prefix "idem" are idempotent: if the input is already the way that the operator makes the output, then the operator does nothing. Throughout this detailed description, "get" means to read a value, "put"

means to write a value, "set" means to put a flag to true, "clear" means to put a flag to false; further, when speaking of the state of a flag, if it is described as "set" that means its value is true and if it is described as "clear" that means its value is false.

Hard Object data operators: These are additional operators necessary when manipulating user data.

non-integrity load/store: When data is annotated with a clear integrity flag, normal load/store instructions/operators may not access the object, instead only special non-integrity load/store instructions may do so (that would not be used accidentally); further, these non-integrity instructions/operators cannot access data annotated with a set integrity flag; for those, use normal load/store instructions.

load_noninteg_byte, load_noninteg_half, load_noninteg_word, load_noninteg_double;

store_noninteg_byte, store_noninteg_half, store_noninteg_word, store_poninteg_double.

Dewdrop implements these non-integrity load/store operators as a sequence of instructions, rather than as a single hardware instruction. Doing this prevents the need to create new load/store instructions. To do this, Dewdrop makes an enum MemAccessInteg {no_MemAccessinteg=0, yes_ MemAccessInteg=1,} and an instance of that enure next_instruction_mem_access_integ, a flag boot next_instruction_mem_access_integ_just_put, and a Dewdrop ecall implemented in hardware (discussed elsewhere) clear_next_instruction_mem_access_integ.

When the clear_next_instruction_mem_access_integ Dewdrop ecall is invoked, the next_instruction_mem_access_integ_just_put flag is set to true and the next_instruction_mem_access_integ is put to no_MemAccessInteg. During observe_instruction_end if next_instruction_mem_access_integ_just_put is true, the next_instruction_mem_access_integ_just_put is cleared to false, and otherwise next_instruction_mem_access_integ is put to yes_MemAccessinteg. The result is that for just one subsequent instruction, next_instruction_mem_access_integ has value no_MemAccessInteg; when this is the case, normal memory access instructions (load/store) may not access objects that have a set integrity flag and may access objects that have a clear integrity flag.

general-purpose CSR: These operators manage the general-purpose control status registers (CSRs) that Hard Object can make use of when passing additional arguments or modifying user code and need additional scratch registers, but wishing to avoid using the general-purpose (int) registers; this situation often arises when modifying assembly when register roles have already been assigned by the compiler.

get_hard_object_arg1_csr, put_hard_object_arg1_csr;

get_hard_object_arg2_csr, put_hard_object_arg2_csr;

get_hard_object_scratch1_csr, put_hard_object_scratch1_csr;

get_hard_object_scratch2_csr, put_hard_object_scratch2_csr.

Hard Object metadata operators: These are additional operators necessary when manipulating metadata, annotated onto user data and text. This section attempts to partition them into useful categories, but note that the categories are a bit of a judgment call.

Annotation: These operators manage metadata annotation.

get_kind_of_structured: get the Ptr-Kind-Enum (and, if relevant, the Abs-Ptr-Kind-Encoding) from a structured pointer;

put_flags_for_16_dwords: put the text/data Dword-Meta-Datum flags for 16 machine words (in this embodiment double-words of 64 bits each, in the terminology of RISC-V®) all at once; this is particularly efficient since Hard Object annotates 4 bits on each dword, in this embodiment 64 bits, which is a ratio of 64/4=16/1; as it is convenient to make the metadata memory the same width as the data memory, writing one dword of metadata is writing 64 bits, which corresponds to writing all at once the metadata for 16 data dwords; this instruction is particularly useful when setting the flags for a whole page very quickly;

narrow_structured operators: these take as input a target-pointer (an abs-ptr, stack-pointer, or stack-object-ptr) and other data, such as a new object size (new-object-size), and output an abs-ptr or stack-obj-ptr "narrowed" to point to a sub-object of that object having the requested object base pointer and size:

narrow_structured_immediate: takes a pointer and expects to be able to represent the requested sub-object as an immediate; faults if the requested object cannot be represented as an immediate sub-object;

narrow_structured_subobj_id_delta: takes a pointer and a sub-object-id delta, a difference between the sub-object-id of the input and the sub-object-id of the output; using a sub-object-id delta turns out to be very handy, as if the original program were written in the C programming language, one could easily be in a situation where the programmer wants to narrow from a pointer to a struct B to a pointer to one of its elements, a long int y, represented as follows: struct B {long int x; long int y;}; however, Hard Object does not know if the pointer to struct B points to a struct B that is stand-alone or embedded within a larger struct A, as follows: struct A {long int q; struct B b; long int r;}; by using a subobj-id delta, this operator can handle both of those situations in the same way, as the struct B sub-object subtree can be made isomorphic to the stand-alone struct B sub-object subtree.

narrow_structured_table_search: specify the object base pointer and the size and then do a search of the sub-object table to find the sub-object ID to use; this is necessary in some ambiguous situations;

widen_structured_to_improper_subobj: do the inverse of the narrow operators above: widen the sub-object to the improper sub-object (the root of the sub-object tree, allowing access to the whole object);

get_page_class_alloc, put_page_class_alloc: get/put the allocator associated with a data page;

get_start_of_range: get a pointer to the start of the accessible range from a pointer somewhere into the range;

get_is_iterator: get the iterator-flag on a pointer;

annotate_text_page: annotate a text page with the argument metadata;

addr_is_text: return whether an address points to text memory or something else;

annotate_object: annotate metadata onto a heap or global object; likely to be implemented in software as a system call which would make the related annotation changes by altering metadata directly, or by using putter/getter Hard Object metadata operators that would be made for any field that happens to not have one listed here, that those of ordinary skill in the art would see as implied by the need for all data or metadata fields to have getter/putter operators.

Boundaries: These operators manage boundary metadata annotation.
    set_ok_to_call_flag (set-ok-to-call-flag): given a register ID and its value as an argument, set the ok-to-call-flag on that register if the value is ok to call;
    set_ok_to_return_flag (set-ok-to-return-flag): given a register ID and its value as an argument, set the ok-to-return-flag on that register if the value is ok to return;
    put_num_int_args_in_registers (put-num-int-args-in-registers), put_num_float_args_in_registers (put-num-float-args-in-registers): put the num-int-args-in-registers or num-float-args-in-registers registers, respectively;
    clear_caller_save_reg_except_args: clear the written-flag and ref-flag on the caller-save registers except for those designated as arguments by ok-to-call-flag-s or num-int-args-in-registers and num-float-args-in-registers;
    get_object_size_of_obj, put_object_size_of_obj: get/put the object size of an object;
    get_stack_base_ptr: return the stack-base-ptr;
    get_ext_dword_kind_of_text_addr, put_text_dword_kind_of_text_addr: get/put the Text-Dword-Flags, which means func-top-flag, for a given text address;
    erase_data_dword_metadata_for_raw: erase the Data-Dword-Flags annotated onto a data dword;
    get_stack_floor_ptr, put_stack_floor_ptr: get/put the stack-floor register;
    assert_user_current_danger_flag: fault unless the user program counter points within a function that has is annotated with the danger-flag.

Modularity: These operators manage modularity metadata annotation.
    get_current_mod_owner: return the value of the current-mod-owner register;
    get_caller_mod_owner: return the value of the caller-mod-owner register;
    assert_caller_is_current_mod_owner: assert that the value of the current-mod-owner register and the value of the caller-mod-owner register are the same;
    transfer_obj_to_new_owner: note that this is one of the few Hard Object operators which alters metadata on an object and which may be used by code that does not have dangerous powers; any text annotated with a mod-owner where the mod-ownable-id annotated on to the object matches the mod-owner except for the right-most bits of length of the mod-owner-suff-len, that is any code that owns the object, may call this instruction to change the mod-ownable-id to that of another module; this operator:
        changes the mod-ownable annotated onto an object to the new one specified in the arguments, and
        also lowers the integrity-flag on the object in question, so the new owner cannot access it using normal load/store instructions until the new owner sets the integrity-flag.
    get_integrity_flag_of_obj, put_integrity_flag_of_obj: get/put the integrity-flag annotated onto an object;
    put_public_flag_for_data_dword, put_writable_flag_for_data_dword, put_public_writable_flags_for_data_dword, get_written_flag_for_data_dword, set_written_flag_for_datadword, clear_written_flag_for_data_dword, put_public_ flag_for_data_dword, get_writable_flag_for_data_dword, put_all_flags_for_data_dword: get/put the respective metadata annotated onto the data dword;
    get_mod_ownable_of_obj: get the mod-ownable annotated onto the object;
    get_mod_suffix_of_obj, put_mod_suffix_of_obj: get/put the suffix of the mod-ownable annotated onto the object, with respect to a given or implied mod-owner-suff-len;
    get_default_mod_ownable_for_mod_owner: given a mod-ownable, get the mod-owner having the zero suffix;
    get_mod_owner_of_function: get the mod-owner annotated onto the function;
    get_may_read_suff_len_of_obj, put_may_read_suff_len_of_obj: get/put the may-read-suff-len annotated onto the object;
    get_may_write_suff_len_of_obj, put_may_write_suff_len_of_obj: get/put the may-write-suff-len annotated onto the object;
    get_may_make_ref_suff_len_of_obj, put_may_make_ref_suff_len_obj: get/put the may-make-ref-suff-len annotated onto the object;
    get_writable_flag_of_obj, put_writable_flag_of_obj; get/put the writable-flag annotated onto the object.

Reference: These operators manage reference metadata annotation.
    get_refable_owner_managed_flag_of_obj, put_refable_owner_managed_flag_of_obj, put_refable_may_make_ref_flag_of_obj, get_refable_may_make_ref_flag_of_obj, get_refable_informally_targetable_flag_of_obj put_refable_informally_targetable_flag_of_obj: get/put the metadata in question annotated onto the object;
    get_refable_version_of_obj, put_refable_version_of_obj: get/put the metadata in question annotated onto the object;
    inc_refable_version_of_obj: increment the refable-version of the object; recall that the recommended strategy for a memory allocator is to increment the refable-version of an object when it is de-allocated (in the handler for free( ));
        if the refable-version on this object cannot be incremented because the new version would equal the refable-version-ceiling, fault; a correctly-written memory allocator would never get into this state; see below;
        if the next refable version after the new one cannot be incremented because the new version would equal the refable-version-ceiling, return false; in this case, the memory allocator should consider this object to be dead memory and should not put it on a free object list to be used again to handle a request for a new object (such as a call to malloc( ));
        otherwise, return true; in this case, it is ok for the memory allocator to put the de-allocated object onto a free object list;
    get_ref_flag_for_data_dword, clear_ref_flag_for_dword: get/put the metadata in question annotated onto the object;
    make_abs_structured_into_abs_ref (a make-reference instruction): make a structured Abs-Ptr into a formal Abs-Ptr;
    make_structured_have_obj_id: put the obj-id annotated onto a structured (formal or not) Abs-Ptr;
    idem_make_func_raw_or_structured_into_forward_text_ref: make a raw function pointer or a structured forward-text-pointer into a formal Forward-Text-Ptr;

idem_make_structured_into_raw, make_ref_into_structured, make_ref_into_raw: change between raw, structured, and formal pointers as indicated;

get_ref_flag_of_structured: get the rel flag annotated onto a structured pointer;

get_time_addr_of_structured: get the time address annotated onto a structured pointer, if there is one;

make_structured_have_time_addr_of_obj_version: return the given structured pointer after annotating it with the same time address as the refable-version of the object to which it points;

make_perm_ref_into_ephem_ref, idem_make_perm_ref_into_ephem_ref: attenuate a permanent pointer into an ephemeral one; and idem_put_public_target_flag, idem_put_writable_target_flag: return the given pointer with its public-target-flag/writable-flag (respectively) updated to the given value.

version collection: These operators manage version collection.

get_page_class_iter, get_data_page_iter, get_object_iter: get an iterator over the respective named container, which can be used to get an iterator over the next container in the sequence; note that this technique for iterating over memory keeps the iterator in the operating system and so there can be only one at a time unless something changed, such as the iterator was kept in thread-local memory or a table of iterators were maintained and the operators provided an index to select one, or some other design were used;

obj_version_ceiling_circ_minus_obj_version: return the object version-ceiling minus the object-version, but with subtraction done "circularly"; that is, return the number of times the object version may be incremented in arithmetic modulo 2 to the power of the number of bits in the object version field before it equals the object version-ceiling (note that this is not just modular subtraction);

obj_rotate_version_clock:
1. put the object.version-ceiling:=object.version-next-ceiling;
2. put the object.version-next-ceiling:=object.version;

in_place_make_reg_abs_ref_into_structured_unless_fresh, in_place_make_mem_abs_ref_into_structured_unless_fresh: in both cases, consider a reference (formal pointer) that is either within a register or within memory, respectively, and if it is stale (not fresh), that is if the time address annotated onto the reference does not equal the refable-version annotated onto the object to which it points, then clear the ref-flag annotated onto the reference, thereby making it no longer formal, that is, turning it into a structured pointer; these operators are used in ref-scan-phase of the version collector.

callee-save-reg-state: These operators manage callee-save-reg-state.

get_callee_save_active_flag, put_callee_save_active_flag: get/put the callee-save-active-flag; when the callee-save-active-flag is clear, the callee-save-reg-state checks are off; doing this is necessary during the synchronous version collection ref-scan-phase when the registers are being scanned;

save_restore_callee_save_reg_state; save or restore the callee-save-reg-state to/from the stack.

Hard Object manager operators: These operators manage the meta-state of Hard Object.

get_hard_object: get the version of Hard Object that the hardware is running;

get_hard_object_requested: this is an operator that allows the Hard Object libraries to read whether the user who started the process Hard. Object is running wants Hard Object to be on; this operator is naturally handled as something like a system call getting the configuration from the kernel/operating system;

init_hard_object: initialize Hard Object registers from the initial process state, such as the stack pointer, etc.;

get_hard_object_active, put_hard_object_active: get/put the hard-object-active-flag; when the hard-object-active-flag is clear, Hard Object may passively track metadata as it flows around, but it does not enforce many Hard Object properties;

having Hard Object in an inactive state can be useful during process startup as the metadata is not yet fully annotated onto objects;

it is also useful to be able to switch into this inactive state in a system that retains a prior art kernel mode so that Hard Object can be made inactive while a user process running with Hard Object constraints traps into the kernel if the kernel is not set up to run with Hard Object turned on.

Another embodiment: Pivot-Centric Stack Objects

Another embodiment of Stack-Obj-Ptr/stack-obj-pointer includes:

Ptr-Kind-Enum; 3 bits;
writable-target-flag; 1 bit;
start-dnrelto-ptr-in-bytes; 15 bits;
size-in-bytes, 15 bits;
pivot-pow2-round-up; 5 bits;
stack-obj-ptr; 24 bits;

construction: from stack-pointer, frame-pointer, and object-start:
1. assert object-start>=stack-pointer;
2. assert, object-start<frame-pointer;
3. put size:=frame-pointer-stack-pointer;
4. put pivot-pow2-round-up:=get-log 2-rounding-up (size);
5. put get-frame-pivot-high-bits-mask:=−(1UL<<(pivot-pow2-round-up−1));
6. put frame-pivot:=(frame-pointer−1) & get-frame-pivot-high-bits-mask;
7. assert frame-pivot<frame-pointer; this is true because it starts less than frame-pointer and masking off bits can only lower the value further;
8. assert frame-pivot>=stack-pointer; this is true because the power of 2 is smaller than the size, so masking off cannot subtract more than size;
9. put frame-offset:=truncate-to-num-bits(object-start—frame-pivot, pivot-pow2-round-up); this is the distance to the object-start from the frame-pivot, signed, but then truncated to a given width, which need not be larger than the power of 2 greater than the size;
10. put stack-obj-ptr:=(frame-pivot<<1)−frame-offset; set field stack-obj-ptr; functions:

(a) get-frame-pivot-pointer: this always points to a valid address within the frame:
1. remove-offset-bits-mask-(1UTL<<pivot-pow2-round-up);
2. return stack-limit+((stack-obj-ptr & remove-offset-bits-mask)>>1);

(b) get-frame-pivot-offset:
1. get-offset-bits-mask=((1UL<<pivot-pow2-round-up)−1),
2. return sign-extendstack-obj-ptr & get-offset-bits-mask;

(c) get-pointer:

1. return get-frame-pivot-pointer( )+get-frame-pivot-offset( );
(d) lives-at-least-as-long-as-another Stack-Obj-Ptr (other):
   1. return get-frame-pivot-pointer( )<=other.get-frame-pivot-pointer( );

From the savings on bits in other metadata above allows expanding the size of stack objects to get 32K bytes.

Another Embodiment: Object-Centric Virtual Address Space

This embodiment makes a fundamental shift in the conception of the virtual address space for Hard Object. Rather than the current page-centric model, which splits 39 bit space addresses into a 27-bit page index and a 12-bit page offset, this embodiment proposes that a virtual address space shall split a 40 bit space address into 5 bits of obj-offset-suffix, (35−(obj-offset-suffix+3)) bits of object ID, and obj-offset-suffix+3 bits of object offset.

An Object-Metadatum encodes its start address in the physical address space rather than the virtual address space, eliminating the need for a traditional PTE or TLB. In this embodiment, doing so also eliminates the mechanisms that has been used to deal with the page boundaries, such as the page overflow flag and the page class ID. In addition, it will free up more metadata bits (by eliminating the object ID) while providing more overall addressable space.

However, note that, as a practical matter, when programmers write software, they often assume a linear memory model and use this assumption in their programs.

For example, when writing a concurrent program, a standard technique for avoiding deadlock is to acquire all locks needed for a transaction in order isomorphic with a global order, such as the memory address of the objects being locked. Also, when programmers annotate one object with another, often they use a hashtable to do so, hashing the address of the object being annotated. Both of these usage examples (and likely others) require that objects have a well-defined and easily-accessible address in a linear address space. Thus, it may be necessary to insert an additional layer of addressing to provide this linear order.

Further, it may be possible to use Hard Object to build a single-address space operating system, it is quite likely that people will want to build a system that had the features of Hard Object while also retaining the address space separation of virtual memory. Therefore mapping semantic objects directly to physical memory may be problematic as address mappings between virtual address spaces may become dependent on one another without another layer of virtual addressing in-between them to keep them separated: if the virtual address system does not have a simple page table mechanism to coordinate the mapping of virtual addresses to physical addresses, then when moving data in physical memory around (relative to the virtual addresses) during swapping, the process of updating all of the metadata, herein annotated onto object metadata, could become complex to say the least; even when done correctly, just the fact that it would likely require unpredictable amounts of time could become a problem.

Both of the above concerns argue that, as a practical matter, it is likely necessary to insert a virtual address space layer into the design of this section, replacing what the rest of this section calls "physical memory" with a layer of "virtual memory" (including concomitant page tables, etc.).

However, doing so does not necessarily obviate the other potential benefits of the new memory organization disclosed in this section.

Mechanism

Create a new Virtual-Obj-Ptr (a pointer that goes through the virtual address space described by an object). A Virtual-Obj-Ptr (virtual-object-pointer), comprising:
   Ptr-Kind-Enum (3 bits),
   public target flag (1 bit),
   writable target flag (1 bit),
   sub-object (19 bits, see below),
   space pointer (40 bits, see below),
where 19 bits sub-object, comprises:
   sub-object immediate flag (1 bit),
   sub-object immediate structure, comprising: granularity (2 bits), immediate-dist-to-start (8 bits), immediate-length (8 bits),
   sub-object non-immediate structure, comprising: sub-object ID (18 bits),
and where 40 bits space pointer, comprises:
   obj-offset-suffix (5 bits),
   object ID (35−(obj-offset-suffix+3)) bits),
   object offset ((obj-offset-suffix+3) bits).

Remove the function-top-offset-in-dwords from the Ret-And-Frame-Ptr/return pointer. Add a 5 bit obj-offset-suffix to the space bits of both the Ret-And-Frame-Ptr/return pointer and the Forward-Text-Ptr/function pointer, dividing the space bits into a function-id and a function-offset.

Add to the Forward-Text-Ptr an obj-offset-suffix.

Make the start address on an Object-Metadata item a physical address instead of a virtual address; make this address large enough to enumerate all physical addresses in memory.

Make the key for the Object-Metadata-Cache the obj-offset-suffix and the object ID.

Make 32 obj-metadata-for-size-start CSRs (control status registers). These are only readable or retable by code having dangerous powers. Each one contains a pointer to an indexable collection of object metadata (possibly a flat array, possibly a hierarchical structure similar to a 3-level PTE, etc) for each of the sizes, or possibly NULL if no memory has been reserved for Object-Metadata for that size.

Create a Physical-Page-Table in software, which system code will use to coordinate which pages of physical memory are reserved by which thread.

Remove the TLB.

Create 32 system globals, called object-id-frontier-for-size, containing the next object ID that is unused for each size.

Create 32 system globals, called object-id-global-free-list-head, containing the object ID that is the bead of the global free list for object metadata headers not reserved by any live object nor by any allocator.

Rename make-pointer-into-ref to make-physical-pointer-into-virtual-ref. This will take as arguments a physical pointer, an obj-offset-suffix, an object ID, and a class-num.

Rename make-ret-into-pointer to make-ref-into-physical-pointer.

Convert the stack-limit-ptr register to contain a physical address rather a virtual address.

No time address is needed; two virtual objects with very different object IDs can be backed by the same physical address space without issue.

The Object-Metadata Tables (In this detailed description, the notation "x**y" means x raised to the y power.). Rather than a page table, have an Object-Metadata table. Upon de-referencing a Virtual-Obj-Ptr, look up the pointer's obj-offset-suffix and object ID in the table.

Each obj-offset-suffix has associated with it an Object-ID-Frontier, describing the first unused object ID number for that size.

Provide the Object-Metadata table using a hierarchical table, akin to what is commonly done for page tables. This could be implemented as a two-level table, with the first level having an index of the entire obj-offset-suffix and some quantity of the bits of the object ID, with the remainder of the object ID used as an index. For 37 bits that may possibly be used for the suffix and object ID, this embodiment could split this into 21 bits of index (5 bits of obj-offset-suffix and 16 bits of object ID) for the first level and 16 bits for the second level. This implies a second-level array of size 64K Object-Metadata items, or (assuming a 2-dword Object-Metadata) a 1 MB array for each second-level of the table. While this seems like it would imply $221$ entries at the top level, or an array that is 16 MB in size, note that the index starts underflowing the bits when the obj-offset-suffix hits 16. Because each obj-suffix-size halves the number of required Object-Metadata items, and because the number of required Object-Metadata items is 1 when the suffix is 31, the underflow portion has $2(32-16+1)$ entries, or $2**17$ entries, or 1 MB. Because this underflow portion is the same size as one of the regular second-level entries, it can be treated as another entry, and the top-level array will actually have $(16*(1<<16))$ or $2**20$ entries, making it 8 MB in size. The above, of course, is just an example of one possible structure (chosen to make the underflow entry similar in size to the regular entries): depending upon system requirements, it may be desirable to dedicate more or less bits to each level of the table, or to provide more or less layers of hierarchy.

For the above two-level hierarchical table, note that while the upper-level of table needs to be initialized, the lower level does not. Because object IDs are assigned in a sequential fashion and this embodiment keeps track of the frontier for each size, the cache fill mechanism can check any requested object ID against the frontier and fail if the ID is greater than or equal to the frontier. This means that the 1 MB arrays that this embodiment prescribes for the second-level arrays can be reserved very quickly, requiring only an update to the physical page table.

Once an object ID is used, it will only rarely be returned to the system; usually Object-Metadata items can be held on to and reused by an allocator allocating an object of that size. However, in the case when an object ID is returned to the system, it is possible to keep a free list per obi-offset-suffix for fast reuse. Of course, a version collection pass must be run before an Object-Metadata item may be reused for a different purpose.

While the above two-level object metadata table treats all possible object IDs equally, the object annotation mechanism reserves objects sequentially starting from 0. To prevent front having to immediately resort to a hierarchical PTE, it would be possible to allocate a flat array for the smallest (and thus most likely to be used) object IDs; deciding which table to perform the lookup in is as simple as a shift and a compare. If this embodiment did this for the low 11 bits of object ID, this would create an initial flat array of size $2**20$ bytes (actually fewer, because this embodiment can remove unneeded entries for larger sizes needing fewer object IDs). 2048 objects per size is probably enough for most object sizes in most programs, and thus this could be a good way to reduce the Object-Metadata cache miss penalty. Similar to the above, this initial flat Object-Metadata array could be provided more or fewer bits depending upon system requirements.

Annotating an Object

Annotating an object placed at a particular address involves the following steps:

1. Round up the object-size to the next power of 2, call this pow2-object-size.
2. Check to see if there is a non-null object ID for the free list for this object size; if there is, reserve the current value and update the free list head, going to step 4. Otherwise continue,
3. Read the current value of the Object-ID-Frontier into a variable named new-object-id and increment the Object-ID-Frontier (this may need to be atomic for a multi-threaded system).
4. Assert that the Object-Metadata indicated by the new-object-id is in a state consistent with it being unused by any live object or allocator.
5. Write the fields of the Object-Metadata, and mark it as active.
6. Call mate-physical-pointer-into-virtual-ref to create a reference to the new object.
7. Return the new reference.

Reserving Physical Space

Before an object can be annotated, a range of memory in physical address space must be reserved for it. For globals, the space will be pre-reserved by the loader based upon the data sections in the ELF file. Allocator code, on the other hand, must reserve physical space for itself. The system can keep a physical page table, indicating for each page of physical memory whether it is allocated and (for a multi-threaded system) which thread owns it. The size of the pages in this page table entry are a system implementation detail, and can be chosen by the system code based upon the features of the backing memory device.

Translating to Physical Addresses for the Stack

Accesses to the stack through a Stack-Obj-Ptr can translate to physical addresses by offsetting from the value in stack-limit-ptr. While this takes care of many stack accesses, it does not handle accesses to the stack through the stack pointer (which is not a Stack-Obj-Ptr).

To handle the stack pointer, annotate the entire 8 MB range of the stack as a single object with a special stack Object-Metadata. Make a reference to this object and offset it to the end of the object range. Now one Object-Metadatum can provide the virtual-to-physical translation for offset stack pointers for the entire stack range.

Translating to Physical Addresses for Text

Require all dynamic jumps to go through a Forward-Text-Ptr.

Remove the function-top-offset-in-dwords from Ret-And-Frame-Ptr. Represent the space bits of a text pointer the same as with an object pointer: with 40 space bits, divided between an object ID and an offset based upon the value of the suffix length. Functions are considered to just be a special kind of executable object. A bit on the payload of the object table indicates whether the object is a data object (and thus is not executable) or a text object (and is thus executable). This embodiment thus moves the function headers from the dword immediately preceding the start of a function to the object metadata table. When there is a miss on the function cache, the ID can be used to offset into this table to find the correct metadata header. Add to the function header a start-physical-address for the function; describe the length of the function in bytes.

Because return and forward-jump references contain a complete virtual text address, it is straightforward to use these references to find the function metadata for their target address. This is less straightforward for static jumps, but can be accomplished by altering the behavior of the jal instruction based upon its link register:

When it is ra, consider the immediate to be in function ID space.

When it is x0, consider the immediate to be in short-offset space, unless a special performing-tail-call CSR is set, in which case consider it to be in function ID space.

When offsetting in function/object ID space, consider the offset-suffix-length bits to be the least significant bits of the object ID. Although this is a departure from how they are represented in the pointer, it provides some nice properties. Using this, a loader can group multiple functions and objects of different sizes that appear in the same translation unit together; this allows them to offset to each other in ID space with a relatively small ID offset. This is useful for jal calls (which have limited range on their immediate offset) and for expressing text and data relative to each other for position-independent code.

If the system is inserting unavoidable dynamic checks, call-graph checking code ensures that a jal performing a tail call cannot be executed separately from the CSR setting performing-tail-call, otherwise the previously-static jal becomes a dynamic decision between two different static targets, one in short-offset space and the other in function ID other space. In the case where the system is not inserting these dynamic checks, it need not worry about this ambiguity: because static jumps can only jump to the same function or the top of another public function, this choice in the interpretation of the jump instruction cannot be used to attack another function.

The performing-tail-call CSR could also be used to allow branch targets to perform tail calls; however, this is not critical, as the GCC compiler does not seem to em code performing tail calls via branch instructions.

Because this embodiment allows a static call a function only at the function top, the function offset is implicitly 0 upon the completion of the call.

Handling Sub-Objects

The page-centric embodiment of virtual memory annotated the sub-object information onto the page table entry. The object-centric embodiment has no pages upon which to annotate the pointer to the sub-object information for the classes of the objects on the page. However, the reason that the page-centric embodiment annotated sub-object information in a per-page rather than a per-object fashion was because it is inefficient to go through both the PTE and the object metadata in series in order to fill a sub-object cache miss; since in the object-centric embodiment access object metadata is made before any other cached metadata, it is more palatable to place the pointer to the sub-object metadata on the object metadata.

In the new scheme, an access to a Virtual-Obj-Ptr hits the object cache and the sub-object cache in parallel, just as it did before. However, in the case that there is a miss in the sub-object metadata, the sub-object cache loads the sub-object metadata pointer from the object metadata and retrieves the appropriate sub-object meta-datum from it. While this may make some sub-object cache fills slow relative to object cache fills, it requires the same number of dependent metadata accesses as the old embodiment (Old Scheme: PTE→sub-object metadata, new scheme: object metadata→sub-object-metadata). Also, the additional bits freed up for use in the sub-object aspect will greatly increase the number of objects that can be expressed with an immediate sub-object, reducing the frequency with which the sub-object cache will be required.

Placing the sub-object metadata pointer per-object reduces the complexity of co-locating globals of different classes close to each other: because they do not need to share sub-object metadata, there is no question of how that metadata should be shared.

Placing the sub-object metadata per-object reduces a dimension of fragmentation in allocators as well. While in the old embodiment, objects co-located in the same allocator had to share sub-object structure with each other, this new scheme allows objects of very different structure to share the same allocator; they need not even have the same size.

In addition, having sub-object metadata per-object increases the flexibility in when sub-object metadata is set up on objects. In the previous embodiment, it was necessary to know at the internal class structure of the object at allocation time, so an allocator was chosen having metadata matching the object's internal structure. Now, after allocating an object, setting up the type structure can be deferred until the first cast casting the object from type void*to some other pointer type. Once an object has a structure, it is dangerous to alter it, as existing pointers may have their structure changed out from under them, but allowing the owner to apply structure to objects in a late-breaking way could greatly increase the flexibility of Hard Object in handling allocation-wrapping functions.

To allow for fast updating of sub-object metadata pointers, the linker or sysruntime should create the sub-object metadata for each type that may be annotated onto an object in memory before the program starts. Using this scheme, vanilla implementations of malloc can be augmented to be Hard-Object-protected rather than mandating a slab, or any other, kind of allocator.

Additional Benefits

Refactoring the metadata in this fashion produces several incidental benefits not mentioned above:

Because function metadata no longer need be co-located with the start of the function, functions no longer need be aligned at a dword boundary, nor be a multiple of dwords in size. This would likely reduce memory fragmentation.

Because metadata is no longer annotated at the page granularity, Hard Object no longer imposes a requirement that sections be aligned at the page granularity.

Because object IDs for globals can be chosen before the program starts, and because the exact size of the object ID (35−(pow2-object-size+3)) is known, it is much easier to create code to turn pointers into objects for globals. This can ease the process of eliminating the refs-in-text table.

Because static calls now set a CSR before executing jal to declare their intention to make a call, and because dynamic calls are identifiable from dynamic jumps due to having a function-offset of 0, at the time of executing the call/jal/jalr instruction, it is always known whether a jump or a call is being performed.

Increasing the number of metadata bits available both greatly increases the number of sub-objects that can be expressed as immediates and increases the number of bits that can be used for sub-object IDs, while reducing the complex distinction between top bottom sub-object IDs.

Tool Changes

To support the above changes, a few things would have to change in the tools:

The tools' sense of available sub-object mantissa bits should be expanded, in this embodiment from 3 to 8.

Remove the distinction between top and bottom sub-object IDs.

Alter the Hard Object assembly transforms to set the performing-tail-call CSR before any instruction performing a tail call.

Alter, in the post linker, any jal or branch performing a tail call to express their offset in function ID space.

If any of the features that may dynamically redistribute bits to or from the sub-object aspect are implemented, change the tools to make the sub-object ID deltas be set at link time. This requires a mid-linker between the merge and reloc stages of the linker.

In addition, these changes make the following adjustments easier:

Now that object Ms for globals are predictable from initial ELF contents, the refs-in-text table may be eliminated without the use of a mid-linker xform, and requiring only a post-linker xform.

Because in this embodiment the story for how virtual and physical addresses will be managed is clearer, the spike proxy kernel is therefore no longer relied-upon to manage memory mapping.

Because the function/object size suffix is very adjustable, Hard Object can be extended to work with different numbers of space bits and different register widths.

Optimization: Combining Globals

Many globals barely have an independent identity as objects. They are loaded at the start of the program (or loading of a dynamic library) and are not independently deallocated (it is possible that a dynamic library containing globals gets unloaded, but this will de-allocate all globals in the library at once). If a global is not transferred, does not have its identity changed, is not made available to other threads, etc., then it can likely be combined with other globals in the same section as a large, composite object. Access to the individual globals can then be mediated through sub-object references. This would reduce pressure on the object metadata cache, and in the case where all such globals fit in immediate sub-objects, would cause no additional burden on the sub-object metadata cache. A hard-object-aware compiler could automatically identify and group such globals into large composite objects.

Flow Charts and Other Diagrams

The present invention can be described through a series of methods that are deployed in hardware, but can be understood through a series of flow charts. The figures teach examples of various elements of the present invention that can be used alone or in combination.

Figure 1B:
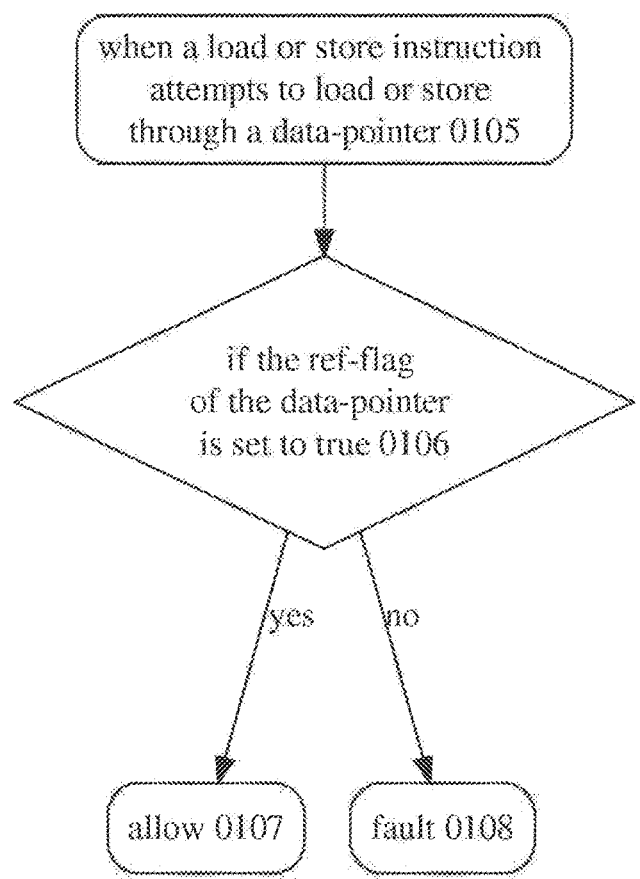
FIG. 1b shows enforcing the ref flag.

FIG. 1: A method for regulating an execution of a program on a computer, the computer having data addresses, some of the data addresses being heap-global memory, the computer having data-pointers, the data-pointers having a target-address and a durable-flag, some of the data-pointers being annotated with a ref-flag, the computer having a load instruction which can load data through a data address, the computer having a store instruction which can store data through a data address, the method comprising:

when a store instruction attempts to store a data-pointer to a data address 0101, performing the following steps:

checking if the data address is heap-global memory 0102, if not, allowing because not relevant 0109, if so, then further checking if the durable-flag of the data-pointer is set to true 0103, if so, allowing 0110, if not, then clearing to false the ref-flag annotated onto the data-pointer when storing it, or raising a fault 0104, when a load or store instruction attempts to load or store through a data-pointer 0105, performing the following steps:

checking if the ref-flag of the data-pointer is set to true 0106, if so, allowing 0107, if not, raising a fault 0108.

Figure 2:
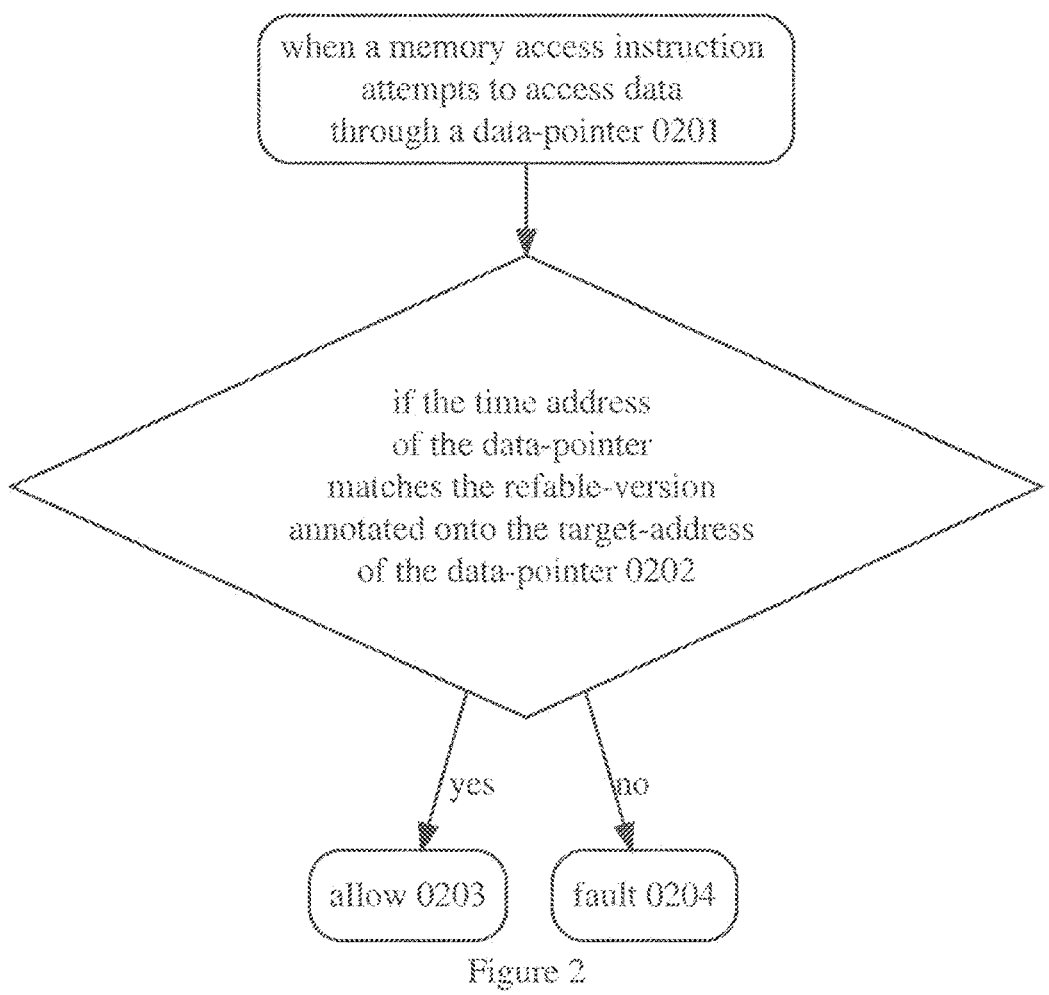
FIG. 2 shows enforcing the heap-global data pointer time address vs the refable-version.

FIG. 2: A method for regulating an execution of a program on a computer, the computer having data addresses, some of the data addresses having data, some of the data addresses being annotated with a rabble-version, the computer having data-pointers, the data-pointers having a target-address and a time address, the computer having a memory access instruction which accesses data through a data-pointer, the method comprising:

when a memory access instruction attempts to access data through a data-pointer 0201, performing the following steps:

checking if the time address of the data-pointer matches the refable-version annotated onto the target-address of the data-pointer 0202, if so, allowing 0203, if not, raising a fault 0204.

Figure 3:
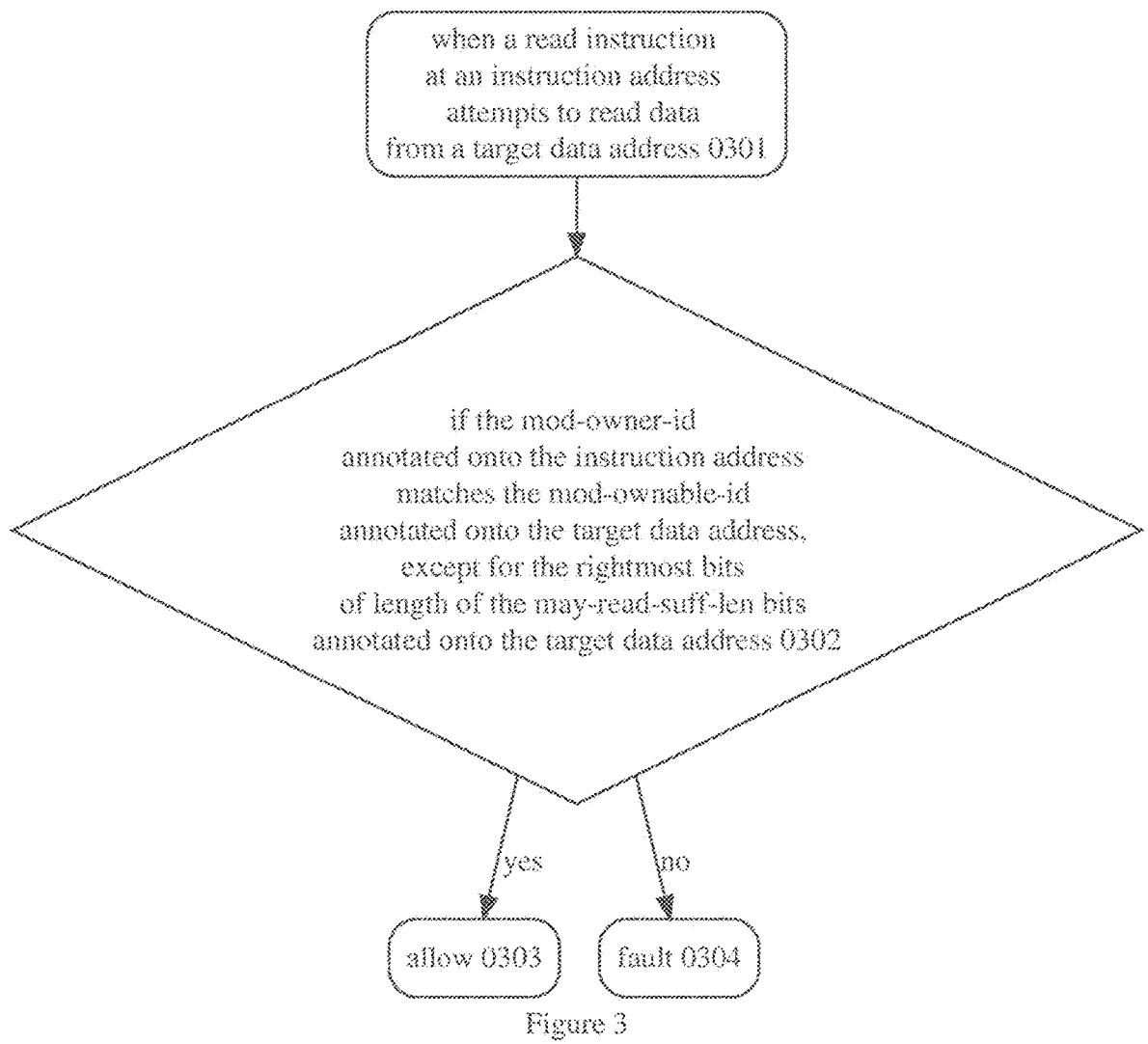
FIG. 3 shows when loading data, checking the mod-owner-id vs mod-ownable-id to the degree specified by the may-read-suff-len.

FIG. 3: A method for regulating an execution of a program on a computer, the computer having instruction addresses and data addresses, some of the instruction addresses having instructions, some of the data addresses having data, the computer having a read instruction which reads data from a target data address, some of the instruction addresses being annotated with a mod-owner-id, some of the data addresses being annotated with a mod-ownable-id and a may-read-suff-len, the method comprising:

when a read instruction at an instruction address attempts to read data from a target data address 0301, performing the following steps:

checking if the mod-owner-id annotated onto the instruction address matches the mod-ownable-id annotated onto the target data address, except for the rightmost hits of length of the may-read-suff-len bits annotated onto the target data address 0302, if so, allowing 0303, if not, raising a fault 0304.

Figure 4:
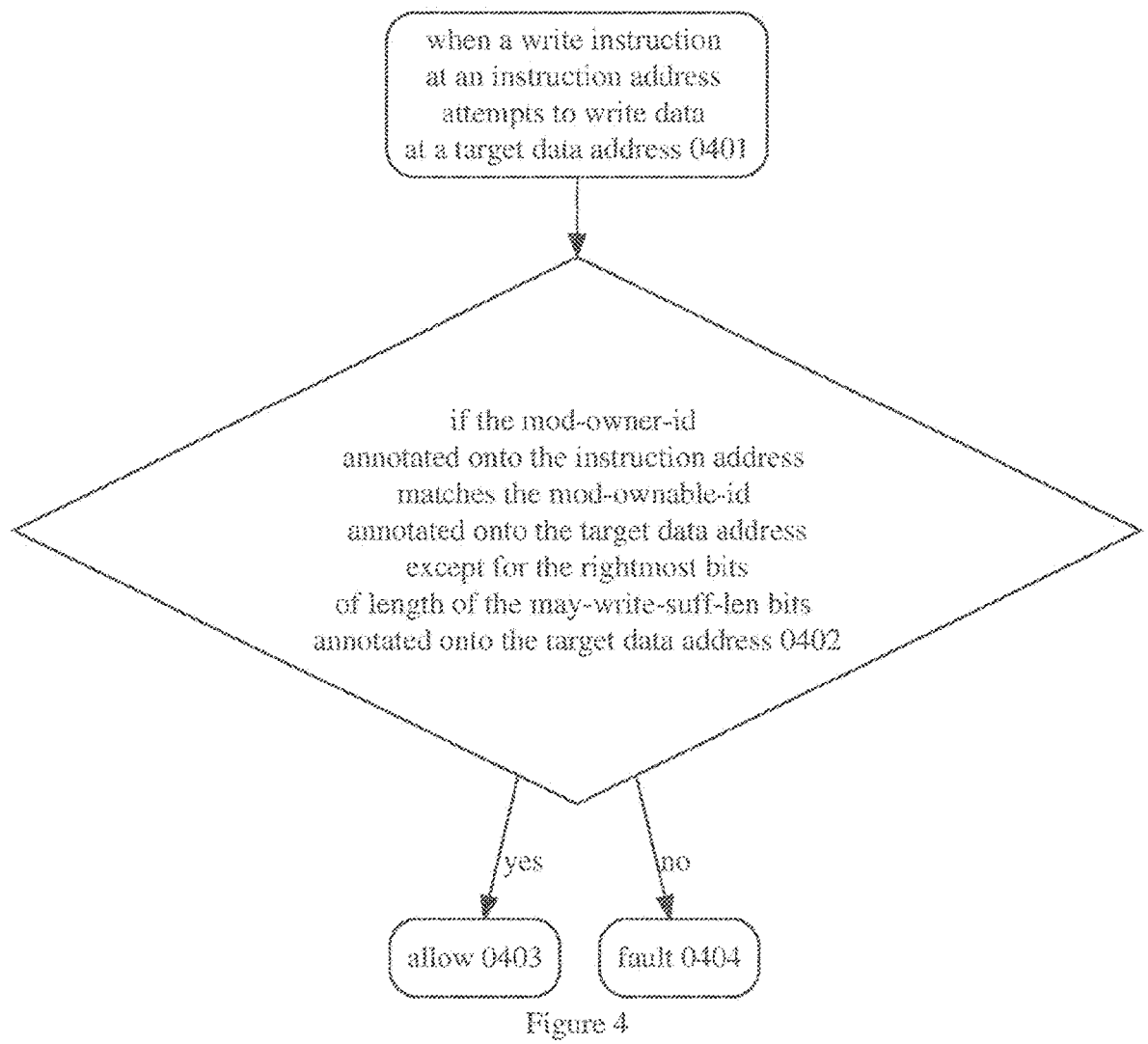
FIG. 4 shows when storing data, checking the mod-owner-id vs mod-ownable-id to the degree specified by the may-write-suff-len.

FIG. 4: A method for regulating an execution of a program on a computer, the computer having instruction addresses and data addresses, some of the instruction addresses having instructions, some of the data addresses having data, the computer having a write instruction which writes data to a target data address, some of the instruction addresses being annotated with a mod-owner-id, some of the data addresses being annotated with a mod-ownable-id and a may-write-suff-len, the method comprising:
  when a write instruction at an instruction address attempts to write data at a target data address 0401, performing the following steps:
  checking if the mod-owner-id annotated onto the instruction address matches the mod-ownable-id annotated onto the target data address, except for the rightmost bits of length of the may-write-staff-len hits annotated onto the target data address 0402,
  if so, allowing 0403,
  if not, raising a fault 0404.

Figure 5:
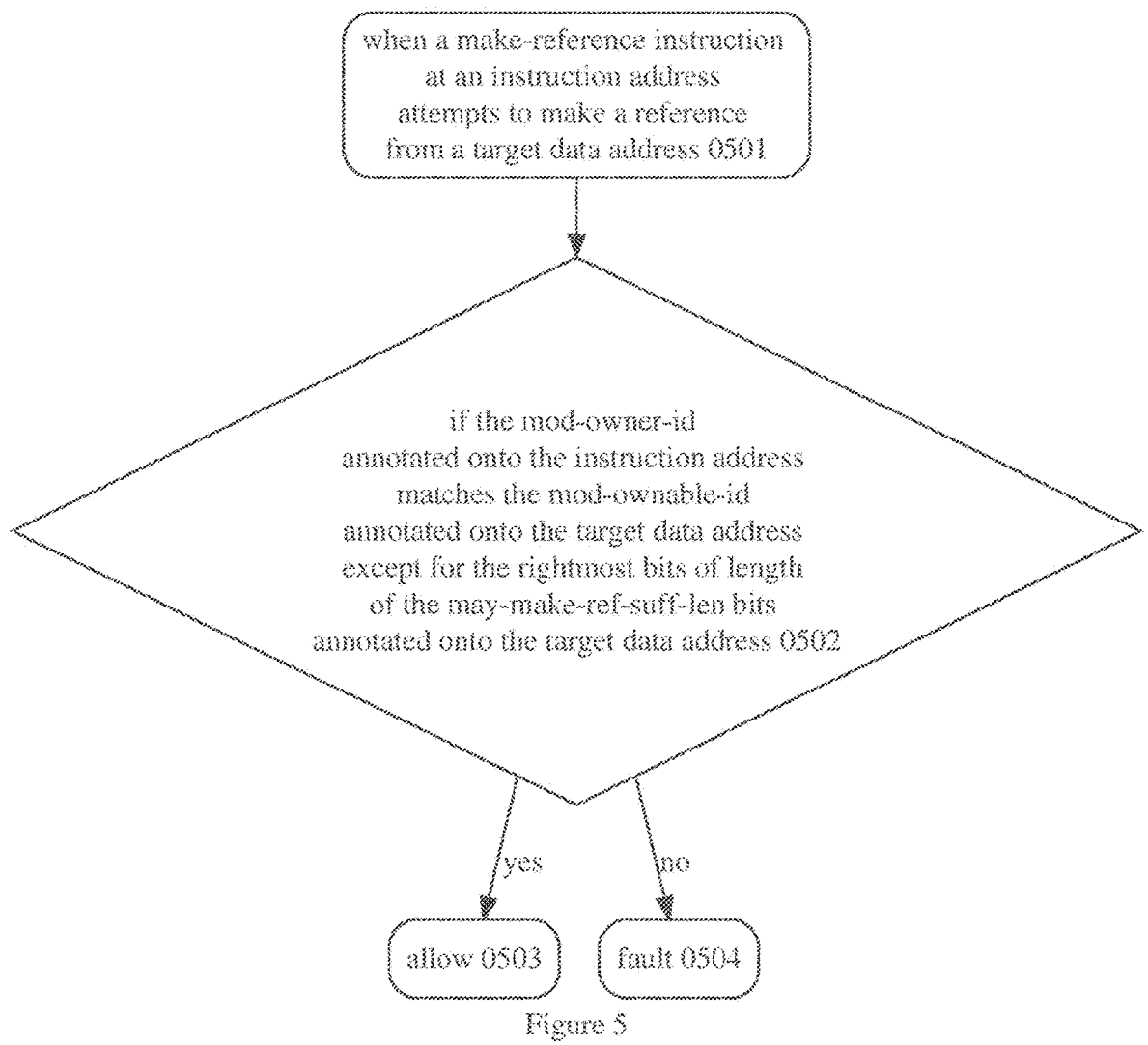
FIG. 5 shows when making a reference from a target data address, checking the mod-owner-id vs mod-ownable-id to the degree specified by the may-make-ref-suff-len.

FIG. 5: A method for regulating an execution of a program on a computer,
  the computer having instruction addresses and data addresses, some of the instruction addresses having instructions,
  the computer having a make-reference instruction which makes a reference from a target data address,
  some of the instruction addresses being annotated with a mod-owner-id,
  some of the data addresses being annotated with a mod-ownable-id and a may-make-ref-suff-len,
the method comprising:
  when a make-reference instruction at an instruction address attempts to make a reference from a target data address 0501, performing the following steps:
  checking if the mod-owner-id annotated onto the instruction address matches the mod-ownable-id annotated onto the target data address, except for the rightmost bits of length of the may-make-ref-suff-len bits annotated onto the target data address 0502,
  if so, allowing 0503,
  if not, raising a fault 0504.

Figure 6:
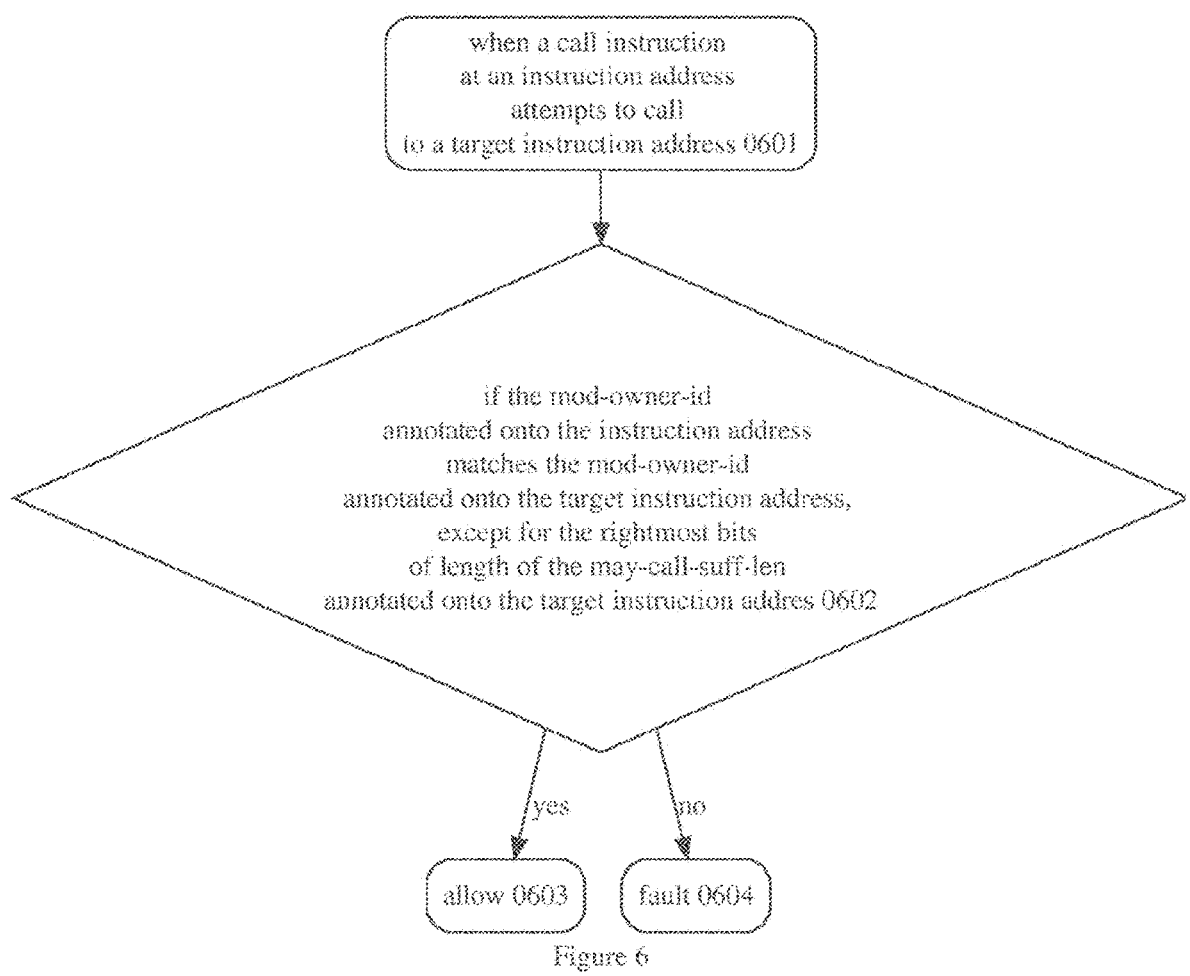
FIG. 6 shows when calling, checking the caller mod-owner-id vs the callee mod-owner-id to the degree specified by the may-call-suff-len.

FIG. 6: A method for regulating an execution of a program on a computer,
  the computer having instruction addresses, some of the instruction addresses having instructions,
  the computer having a call instruction which calls to a target instruction address,
  some of the instruction addresses being annotated with a mod-owner-id, some of the instruction addresses being annotated with a may-call-suff-len,
the method comprising:
  when a call instruction at an instruction address attempts to call to a target instruction address 0601, performing the following steps:
  checking if the mod-owner-id annotated onto the instruction address matches the mod-owner-id annotated onto the target instruction address, except for the rightmost bits of length of the may-call-suff-len annotated onto the target instruction address 0602,
  if so, allowing 0603,
  if not, raising a fault 0604, FIG. 7: A method for regulating an execution of a program on a computer,
  the computer having instruction addresses, some of the instruction addresses having instructions,
  the computer having a make-reference instruction which makes a reference from a target instruction address,
  some of the instruction addresses being annotated with a mod-owner-id,
  some of the instruction addresses being annotated with a may-make-ref-suff-len,
the method comprising:
  when a make-reference instruction at an instruction address attempts to make a reference from a target instruction address 0701, performing the following steps:
  checking if the mod-owner-id annotated onto the instruction address matches the mod-owner-id annotated onto the target instruction address, except for the rightmost bits of length of the may-make-ref-suff-len annotated onto the target instruction address 0702,
  if so, allowing 0703,
  if not, raising a fault 0704.

Figure 8A:
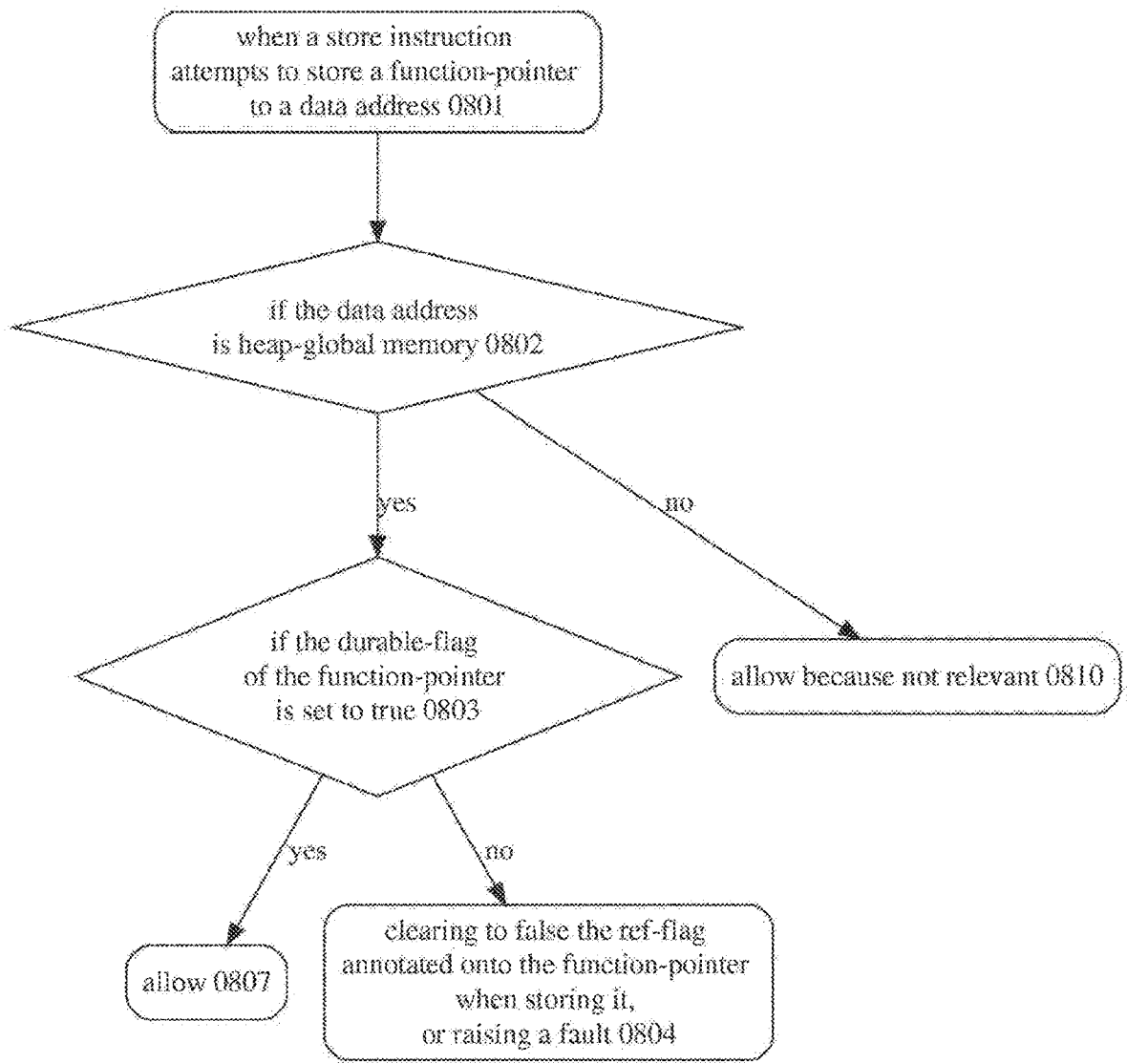
FIG. 8a shows enforcing the function pointer durable-flag.
Figure 8B:
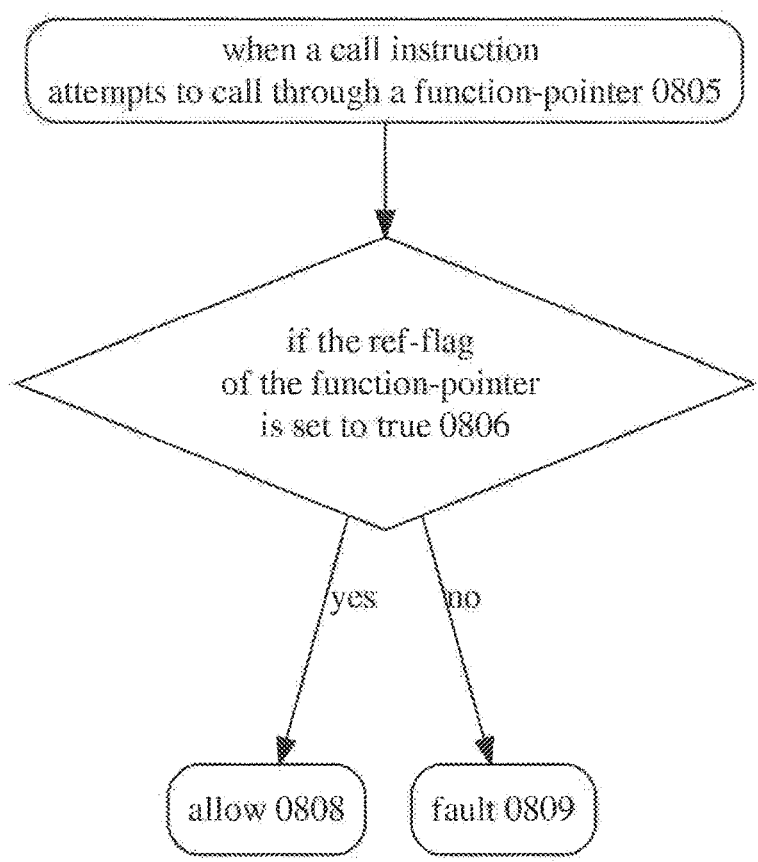
FIG. 8b shows enforcing the function pointer ref-flag.

FIGS. 8a-8b: A method for regulating an execution of a program on a computer,
  the computer having instruction addresses, some of the instruction addresses having instructions,
  the computer having data addresses, some of the data addresses being heap-global memory,
  the computer having a function-pointer, the function-pointer having a target-address and a durable-flag,
  the function-pointer being annotated with a ref-flag,
  the computer having a store instruction which can store a function-pointer to a data address,
  the computer having a call instruction which calls through a function-pointer,
the method comprising:
  when a store instruction attempts to store a function-pointer to a data address 0801, performing the following steps:
  checking if the data address is heap-global memory 0802,
  if not, allowing because not relevant 0810,
  if so, then further checking if the durable-flag of the function-pointer is set to true 0803,
  if so, allowing 0807,
  if not, then clearing to false the ref-flag annotated onto the function-pointer when storing it, or raising a fault 0804,
  when a call instruction attempts to call through a function-pointer 0805, performing the following steps:
  checking if the ref-flag of the function-pointer is set to true 0806,
  if so, allowing 0808,
  if not, raising a fault 0809.

Figure 9:
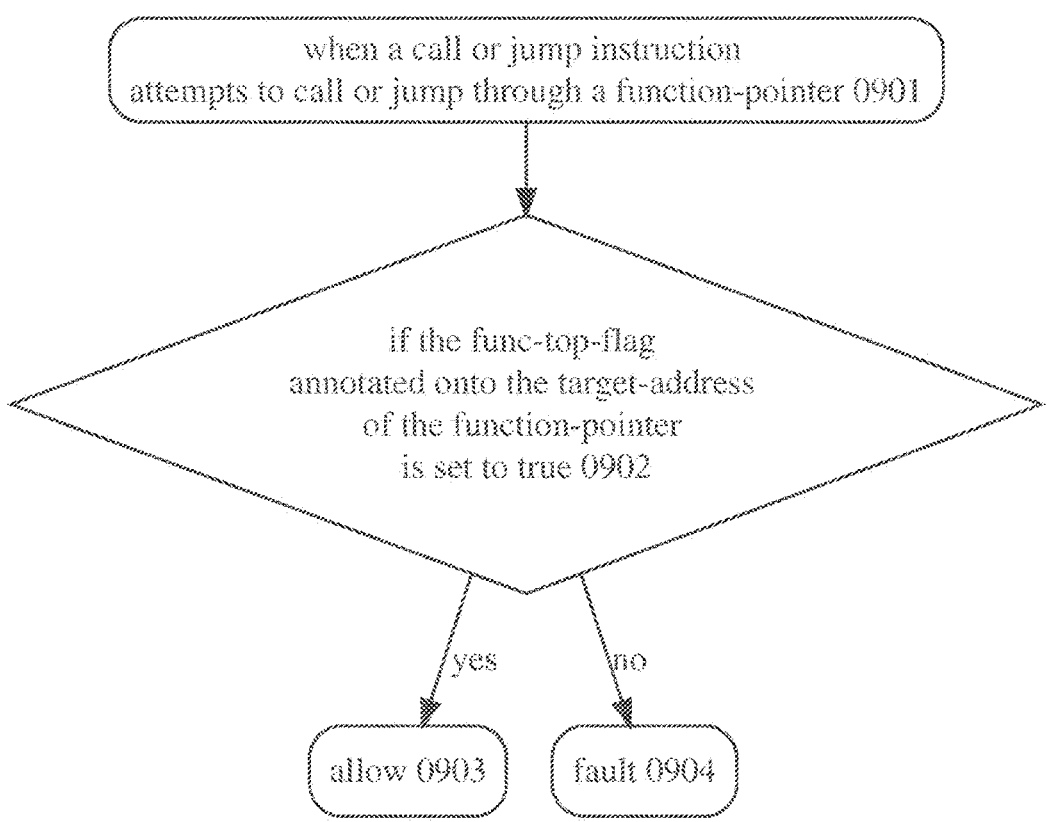
FIG. 9 shows enforcing the function func-top-flag.

FIG. 9: A method for regulating an execution of a program on a computer,
  the computer having instruction addresses, some of the instruction addresses having instructions,
  some of the instruction addresses being annotated with a func-top-flag,
  the computer having a text-pointer, the text-pointer having a target-address,
  the computer having a jump instruction which jumps through a text-pointer, the method comprising:
  when a call or a jump instruction attempts to jump through a function-pointer 0901, performing the following steps:
  checking if the func-top-flag annotated onto the target-address of the text-pointer is set to true 0902,
  if so, allowing 0903,
  if not, raising a fault 0904.

Figure 10:
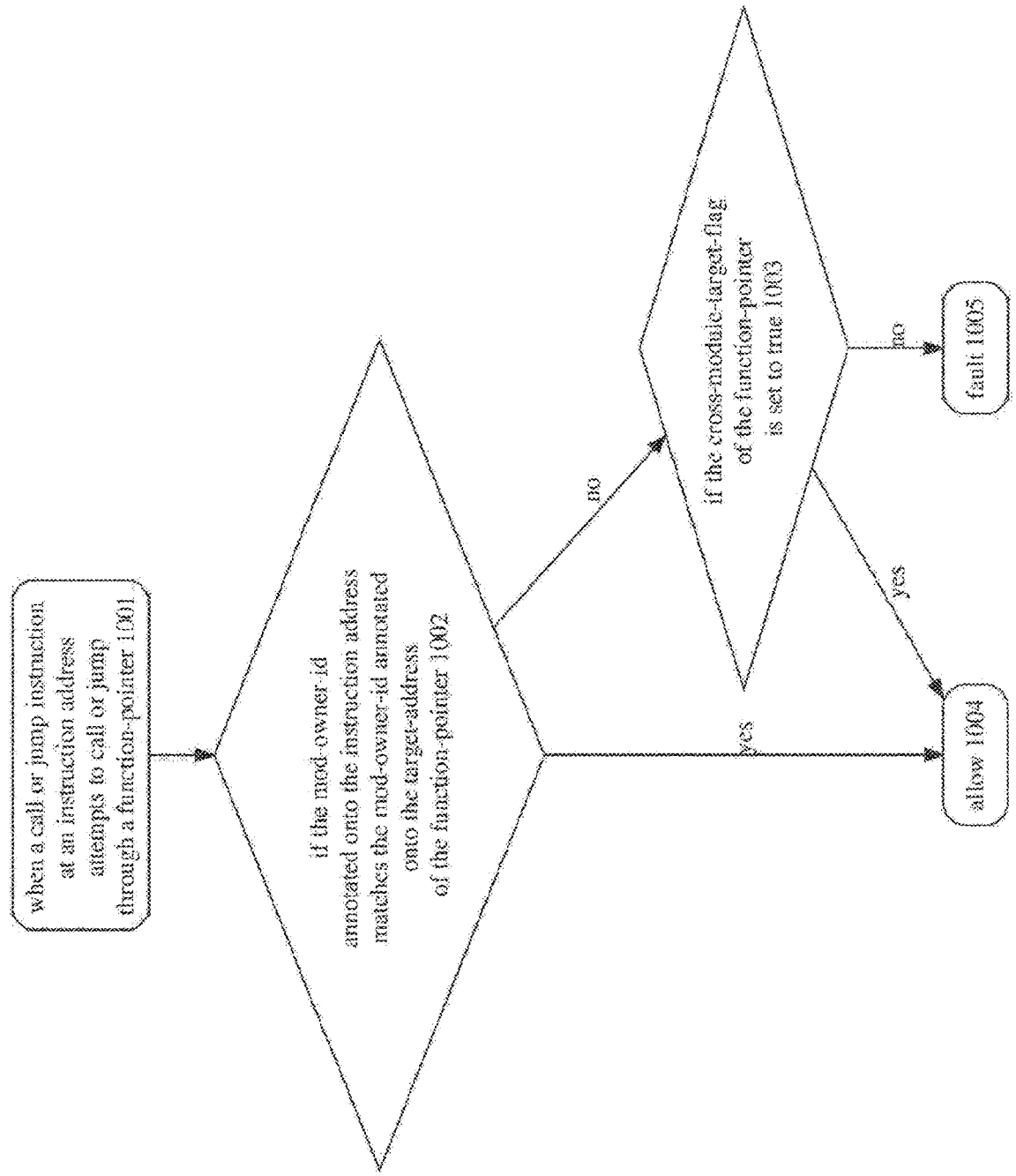
FIG. 10 shows enforcing the function pointer cross-module-target-flag.

FIG. 10: A method for regulating an execution of a program on a computer,
  the computer having instruction addresses, some of the instruction addresses having instructions,
  some of the instruction addresses being annotated with a mod-owner-id,
  the computer having a function-pointer, the function-pointer having a target-address and a cross-module-target-flag, the computer having a call instruction which calls through a function-pointer,
the method comprising:
when a call instruction at an instruction address attempts to call through a function-pointer 1001, performing the following steps:
checking if the mod-owner-id annotated onto the instruction address matches the mod-owner-id annotated onto the target-address of the function-pointer 1002,
if so, allowing 1004,
if not, then further checking if the cross-module-target-flag of the function-pointer is set to true 1003,
if so, allowing 1004,
if not, raising a fault 1005.

Figure 11:
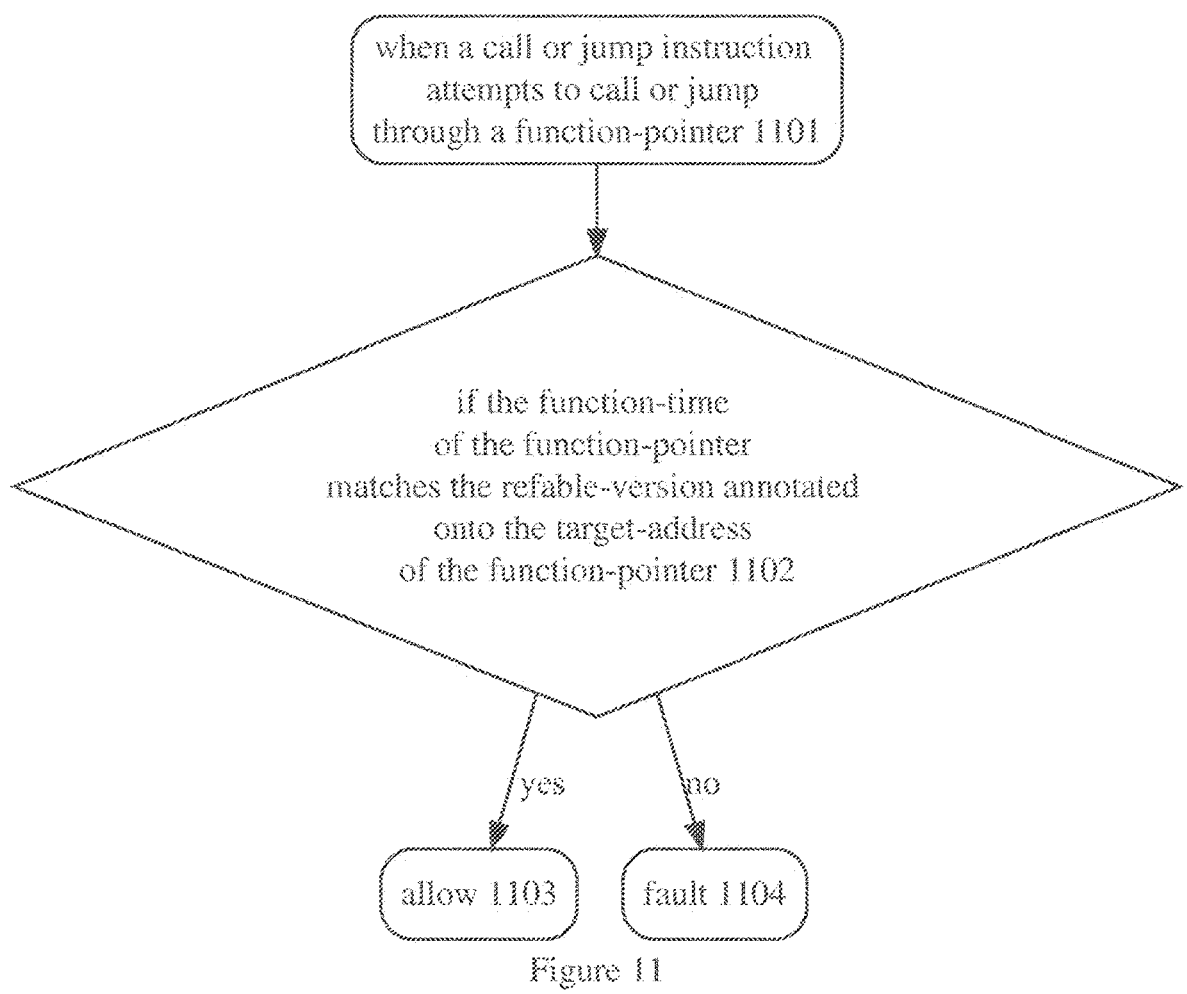
FIG. 11 shows enforcing the function pointer function-time vs the function refable-version.

FIG. 11: A method for regulating an execution of a program on a computer,
the computer having instruction addresses, some of the instruction addresses having instructions,
some of the instruction addresses being annotated with a refable-version,
the computer having a function-pointer, the function-pointer having a target-address and a function-time,
the computer having a call instruction which calls through a function-pointer,
the method comprising:
when a call or jump instruction attempts to call or jump through a function-pointer 1101, performing the following steps:
checking if the function-time of the function-pointer matches the refable-version annotated onto the target-address of the function-pointer 1102,
if so, allowing 1103,
if not, raising a fault 1104.

Figure 12:
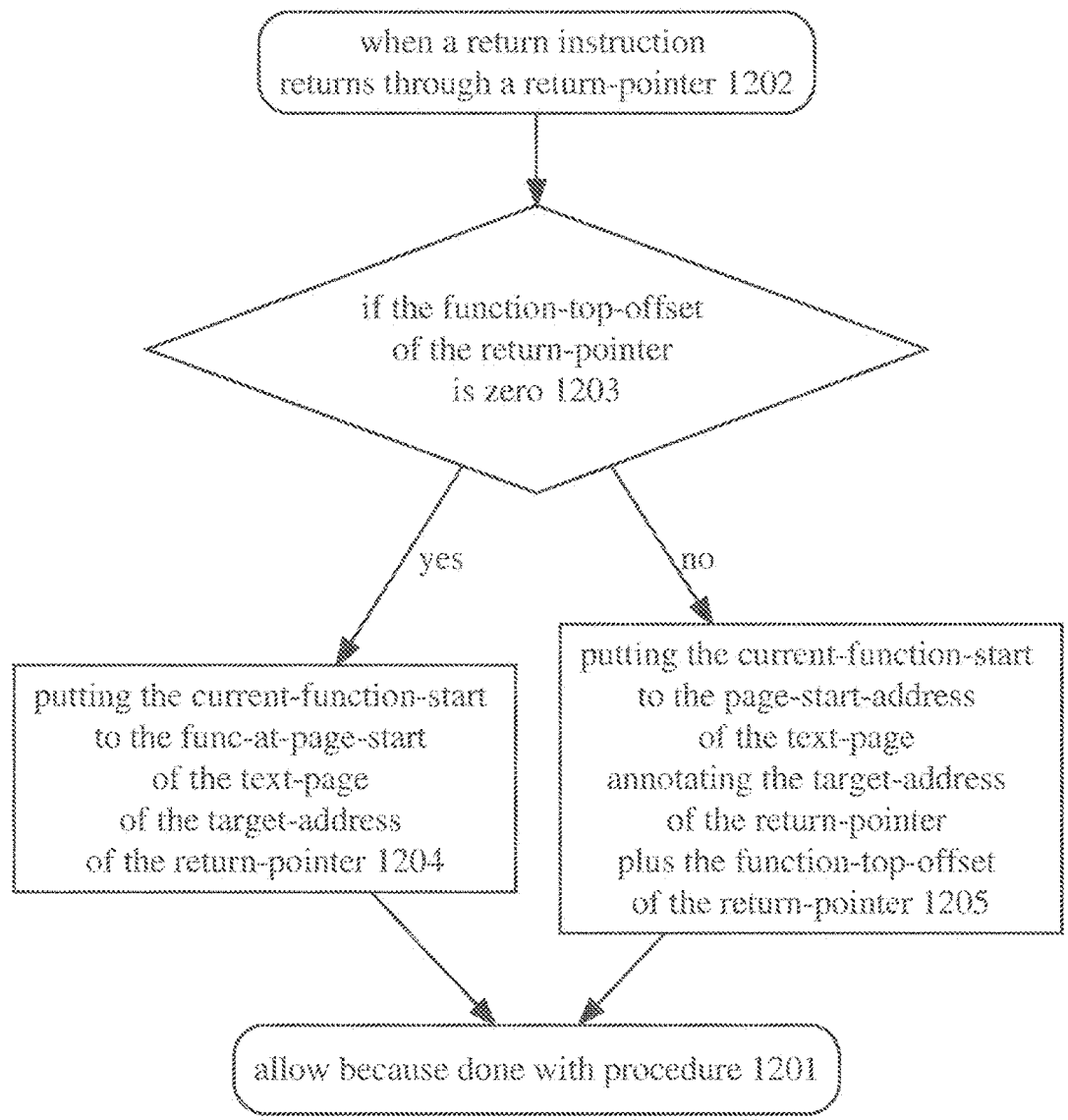
FIG. 12 shows when returning, putting the current-function-start.

FIG. 12: A method for regulating an execution of a program on a computer,
the computer having instruction addresses,
the computer having a current-function-start,
some of the instruction addresses being annotated with a text-page, some text-pages having a page-start-address and a func-at-page-start.
the computer having a return-pointer, the return-pointer having a target-address and a function-top-offset,
the computer having a return instruction which returns through a return-pointer,
the method comprising:
when a return instruction returns through a return-pointer 1202, performing the following steps:
checking if the function-top-offset of the return-pointer is zero 1203,
if so, putting the current-function-start to the franc-at-page-start of the text-page of the target-address of the return-pointer 1204 (and proceeding to 1201 below),
if not, putting the current-function-start to the page-start-address of the text-page annotating the target-address of the return-pointer plus the function-top-offset of the return-pointer 1205 (and proceeding to 1201 below),
proceeding from either branch above (1204 or 1205), allowing because done with procedure 1201.

Figure 13:
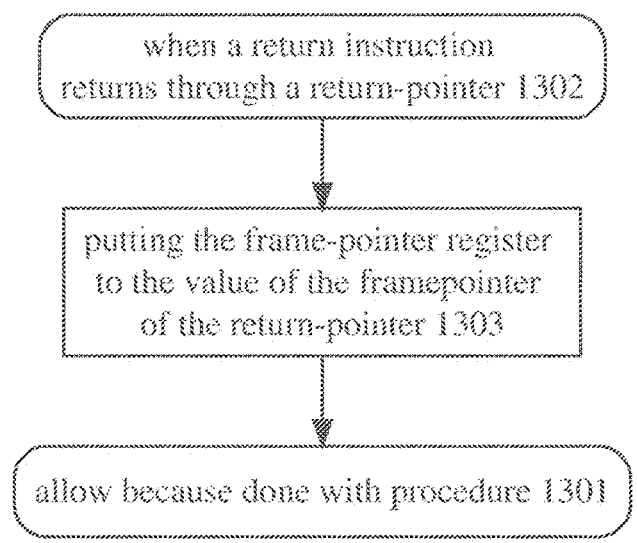
FIG. 13 shows when returning, putting the frame-pointer register.

FIG. 13: A method for regulating an execution of a program on a computer,
the computer having instruction addresses, some of the instruction addresses having instructions,
the computer having a frame-pointer register,
the computer having a return-pointer, the return-pointer having a framepointer,
the computer having a return instruction which returns through a return-pointer,
the method comprising:
when a return instruction returns through a return-pointer 1302, performing the following steps:
putting the frame-pointer register to the value of the framepointer of the return-pointer 1303,
allowing because done with procedure 1301.

Figure 14:
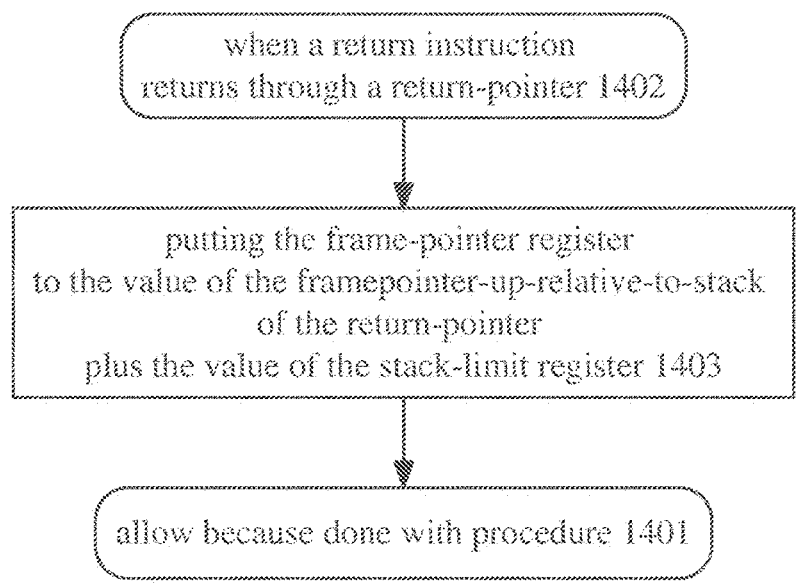
FIG. 14 shows when returning, putting the frame-pointer register using the framepointer-up-relative-to-stack and stack-limit register.

FIG. 14: The method of FIG. 13,
the computer further having a stack-limit register,
the computer further encoding the framepointer of a return-pointer in coordinates relative to the value of the stack-limit register, as a framepointer-up-relative-to-stack,
the method further comprising:
when a return instruction returns through a return-pointer, substituting the following steps 1402:
putting the frame-pointer register to the value of the framepointer-up-relative-to-stack of the return-pointer plus the value of the stack-limit register 1403,
allowing because done with procedure 1401.

Figure 15:
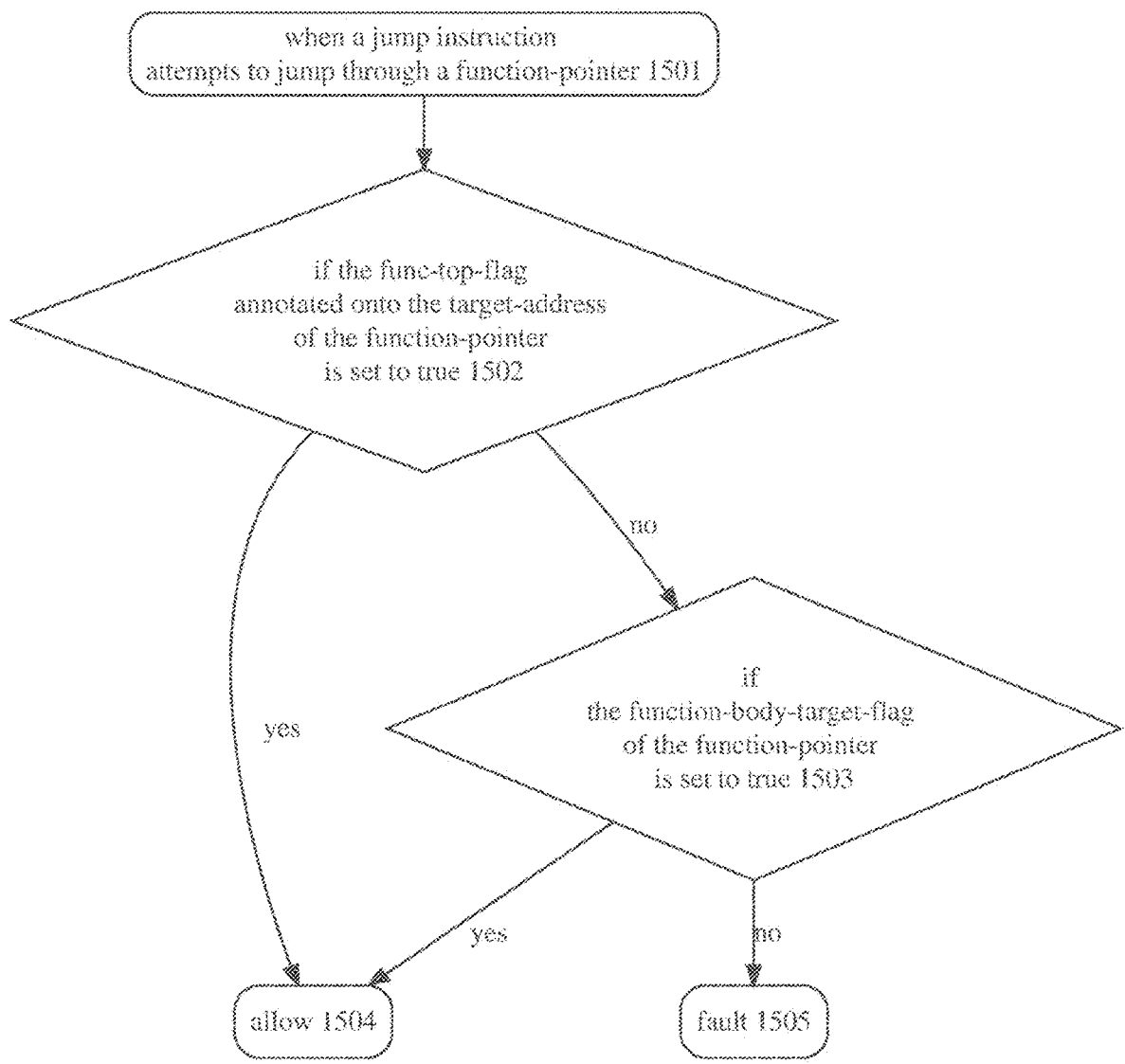
FIG. 15 shows enforcing the function func-top-flag and function-pointer function-body-target-flag together.

FIG. 15: The method of FIG. 9,
the text-pointer further having a function-body-target-flag, the method further comprising:
when a jump instruction attempts to jump through a function-pointer 1501,
in the case when the func-top-flag annotated onto the target-address of the text-pointer is set to true 1502,
if so, allowing 1504,
if not, instead of raising a fault, further performing the following steps:
checking if the function-body-target-flag of the function-pointer is set to true 1503,
if so, allowing 1504,
if not, raising a fault 1505.

Figure 16:
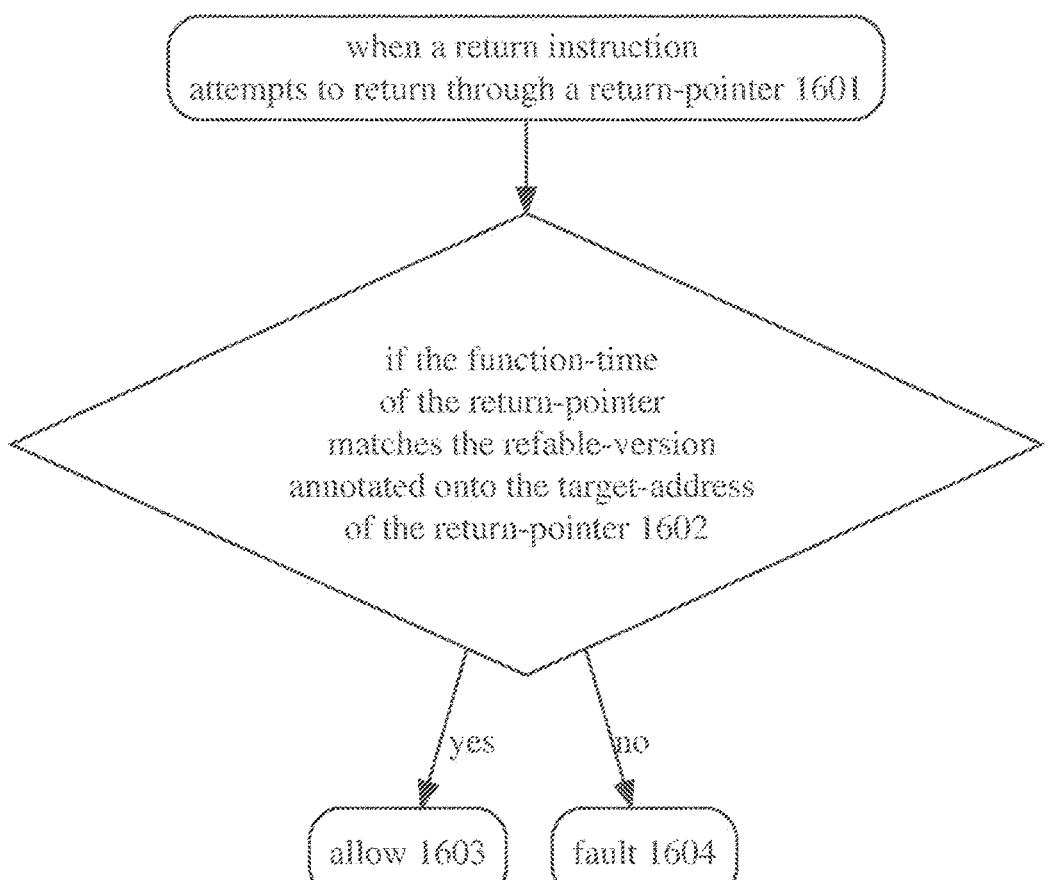
FIG. 16 shows when returning, checking the function-time vs the refable-version.

FIG. 16: A method for regulating an execution of a program on a computer,
the computer having instruction addresses, some of the instruction addresses having instructions,
some of the instruction addresses being annotated with a refable-version,
the computer having a return-pointer, the return-pointer having a target-address and a function-time,
the computer having a return instruction which returns through a return-pointer,
the method comprising:
when a return instruction attempts to return through a return-pointer 1601, performing the following steps:
checking if the function-time of the return-pointer matches the refable version annotated onto the target-address of the return-pointer 1602,
if so, allowing 1603,
if not, raising a fault 1604.

Figure 17:
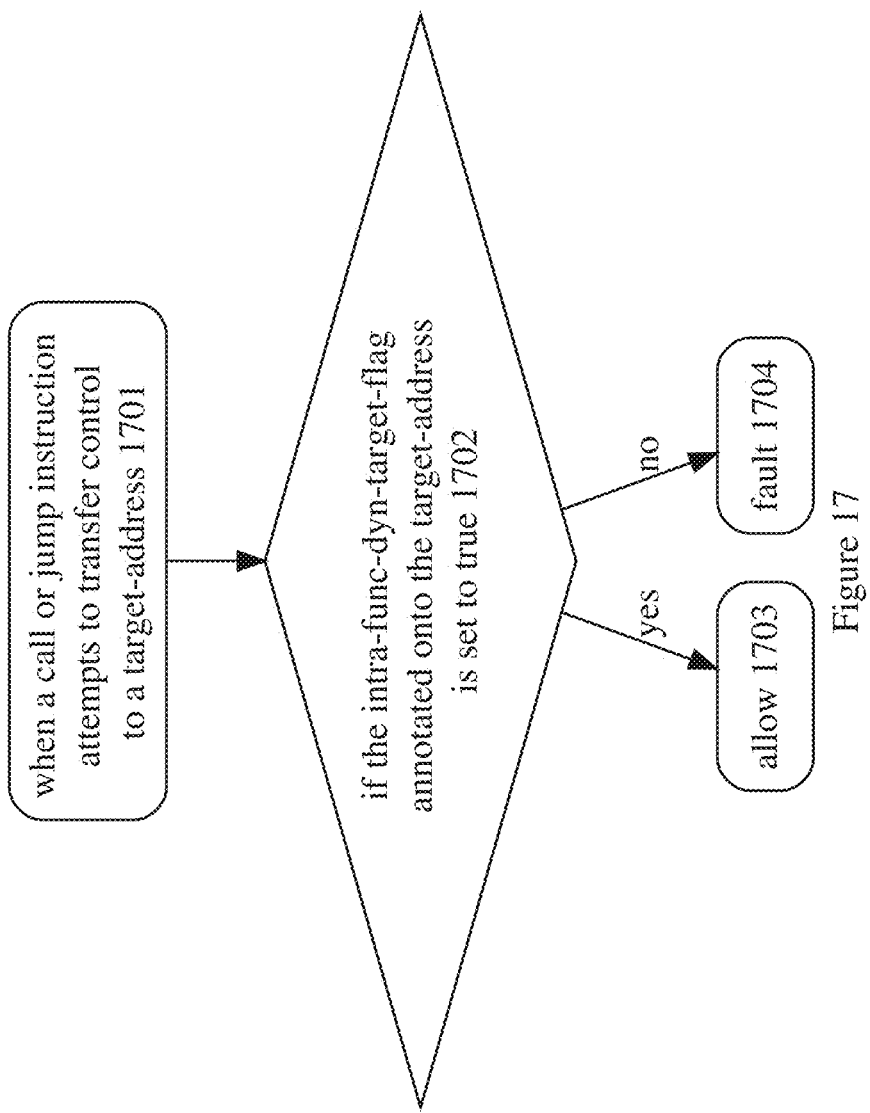
FIG. 17 shows when performing a dynamic jump, checking the intra-func-dyn-target-flag.

FIG. 17: A method for regulating an execution of a program on a computer,
the computer having instruction addresses, some of the instruction addresses having instructions,
some of the instruction addresses being annotated with a intra-func-dyn-target-flag,
the computer having a jump instruction which transfers control to a target-address,
the method comprising:
when a jump instruction attempts to transfer control to a target-address 1701, performing the following steps:
checking if the intra-func-dyn-target-flag annotated onto the target-address is set to true 1702,
if so, allowing 1703,
if not, raising a fault 1704.

Figure 18:
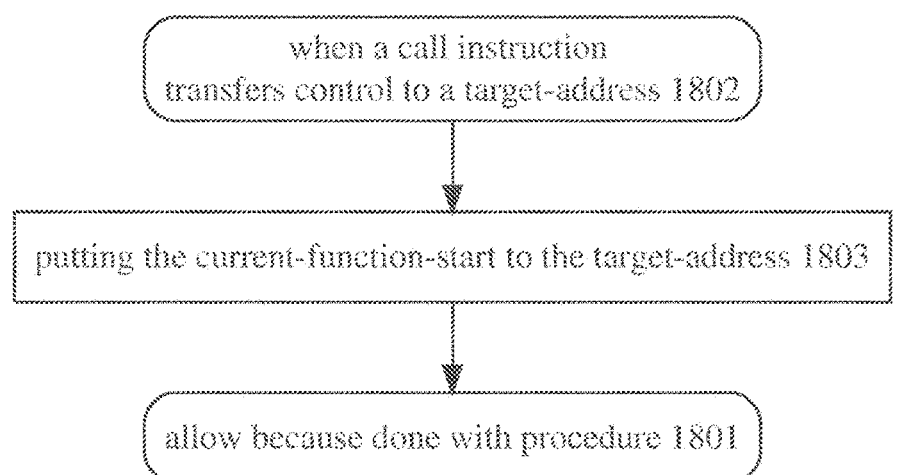
FIG. 18 shows when calling, maintaining the current-function-start.
Figure 19:
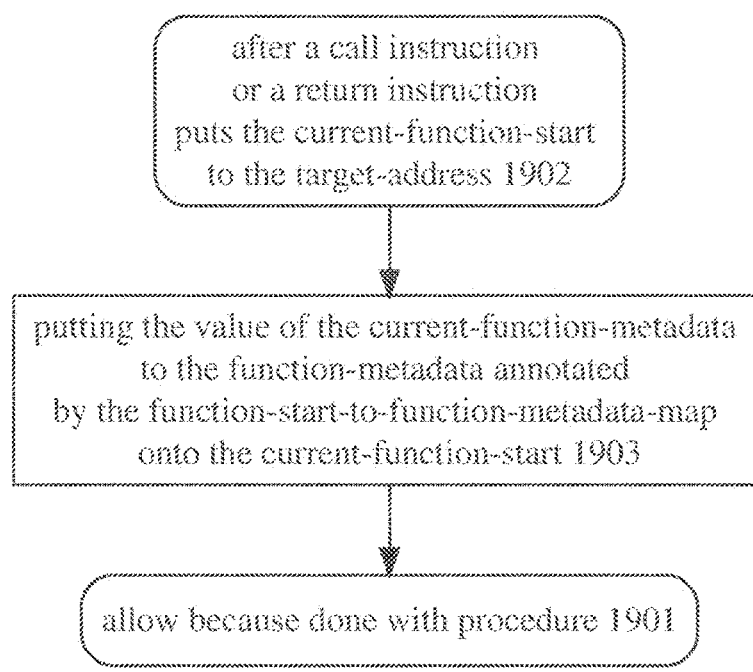
FIG. 19 shows after a call or return puts the current-function-start to the target-address, putting the value of the current-function-metadata into the function-start-to-function-metadata-map.
Figure 20:
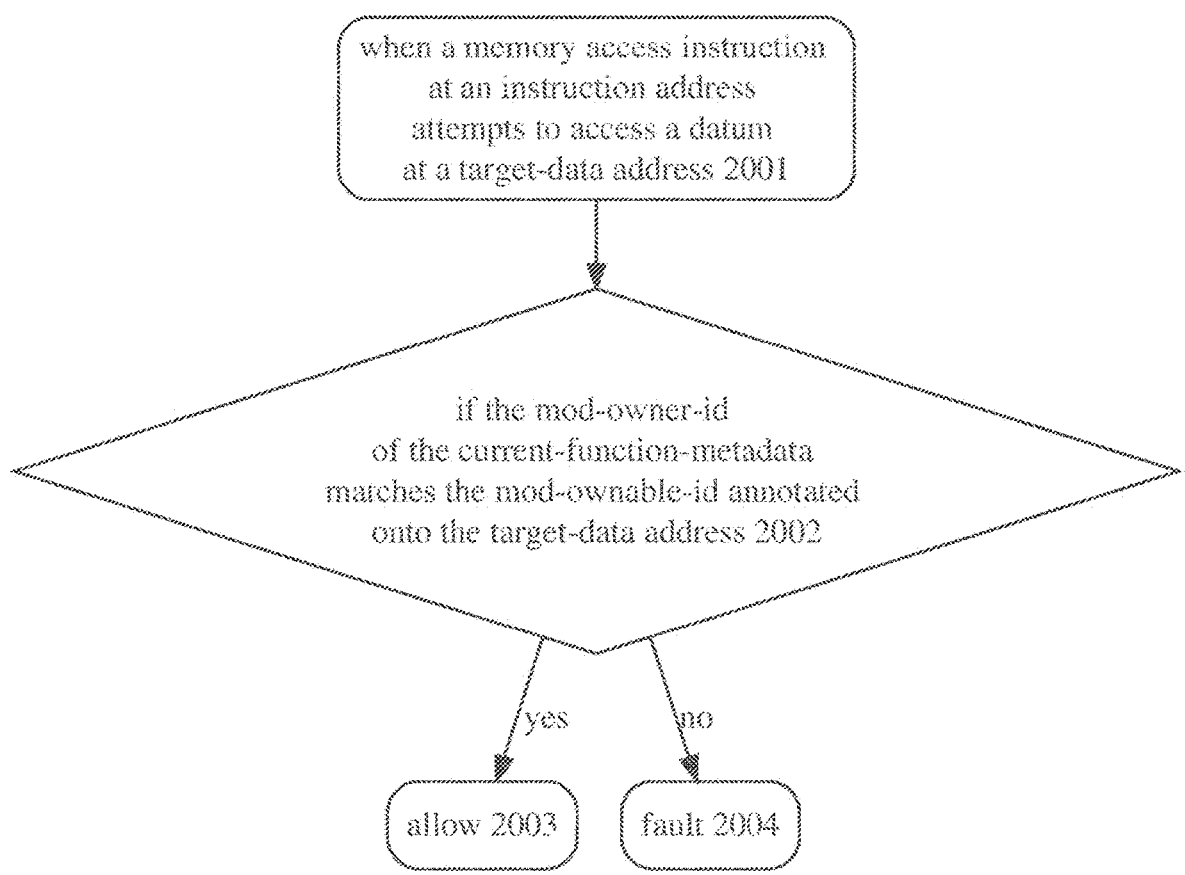
FIG. 20 shows when accessing heap-global memory, checking the mod-owner-id vs the mod-ownable-id.
Figure 21:
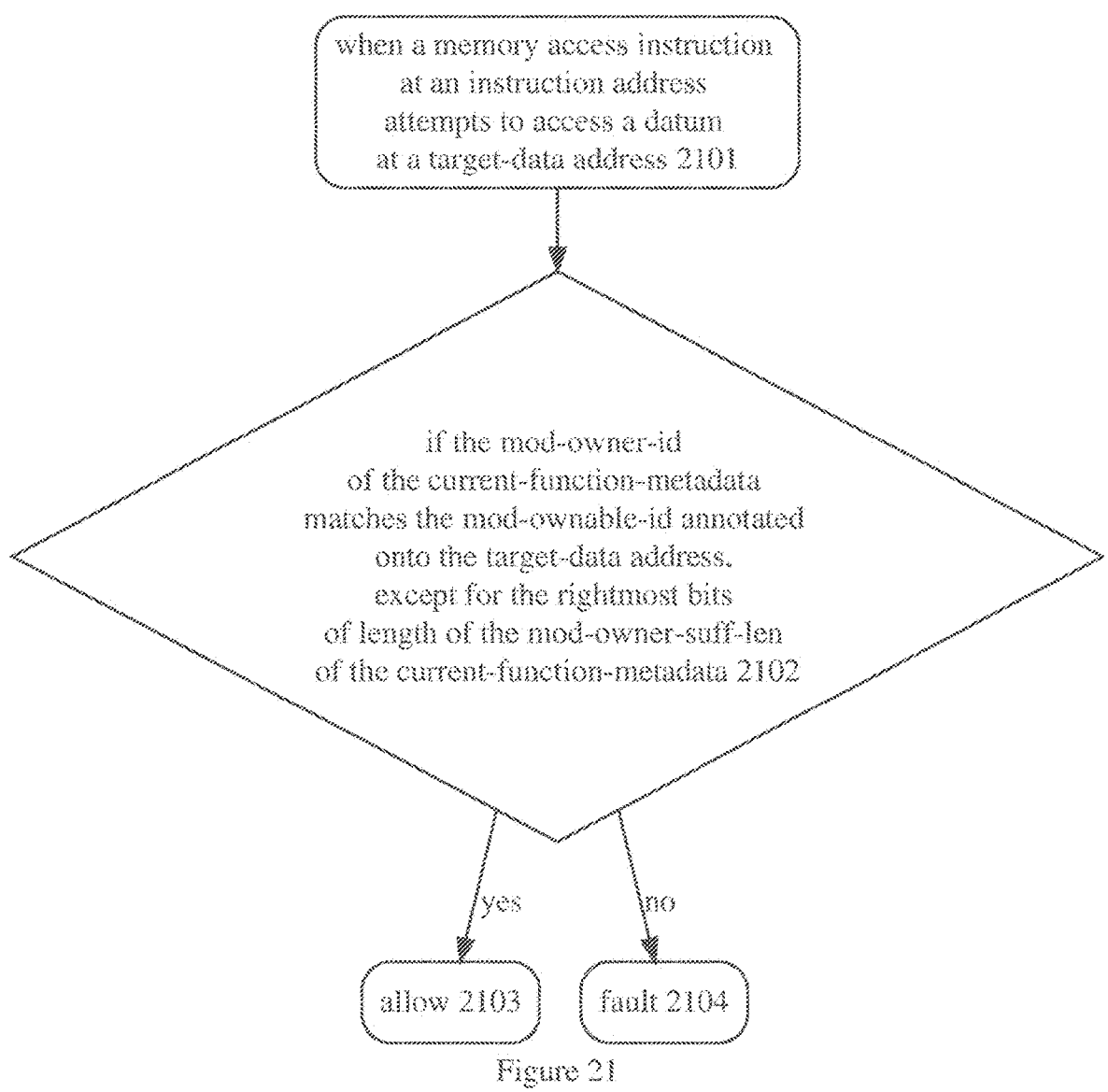
FIG. 21 shows when accessing heap-global memory, checking the mod-owner-id vs the mod-ownable-id to the extent specified by the mod-owner-suff-len.
Figure 22:
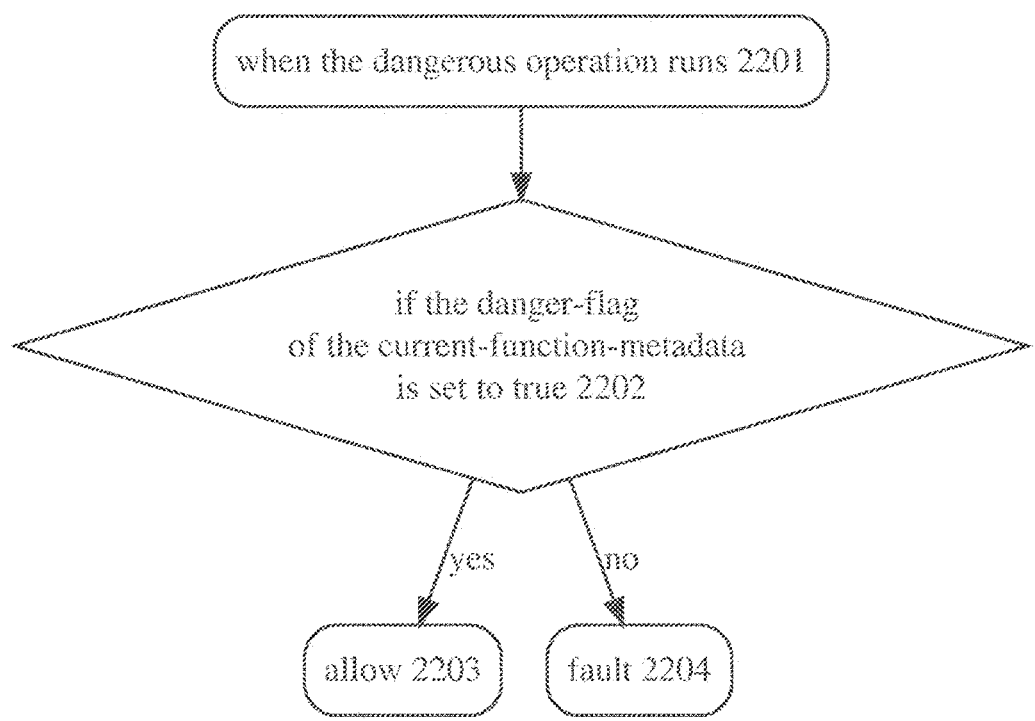
FIG. 22 shows when a dangerous operation urns, checking the danger-flag.
Figure 23:
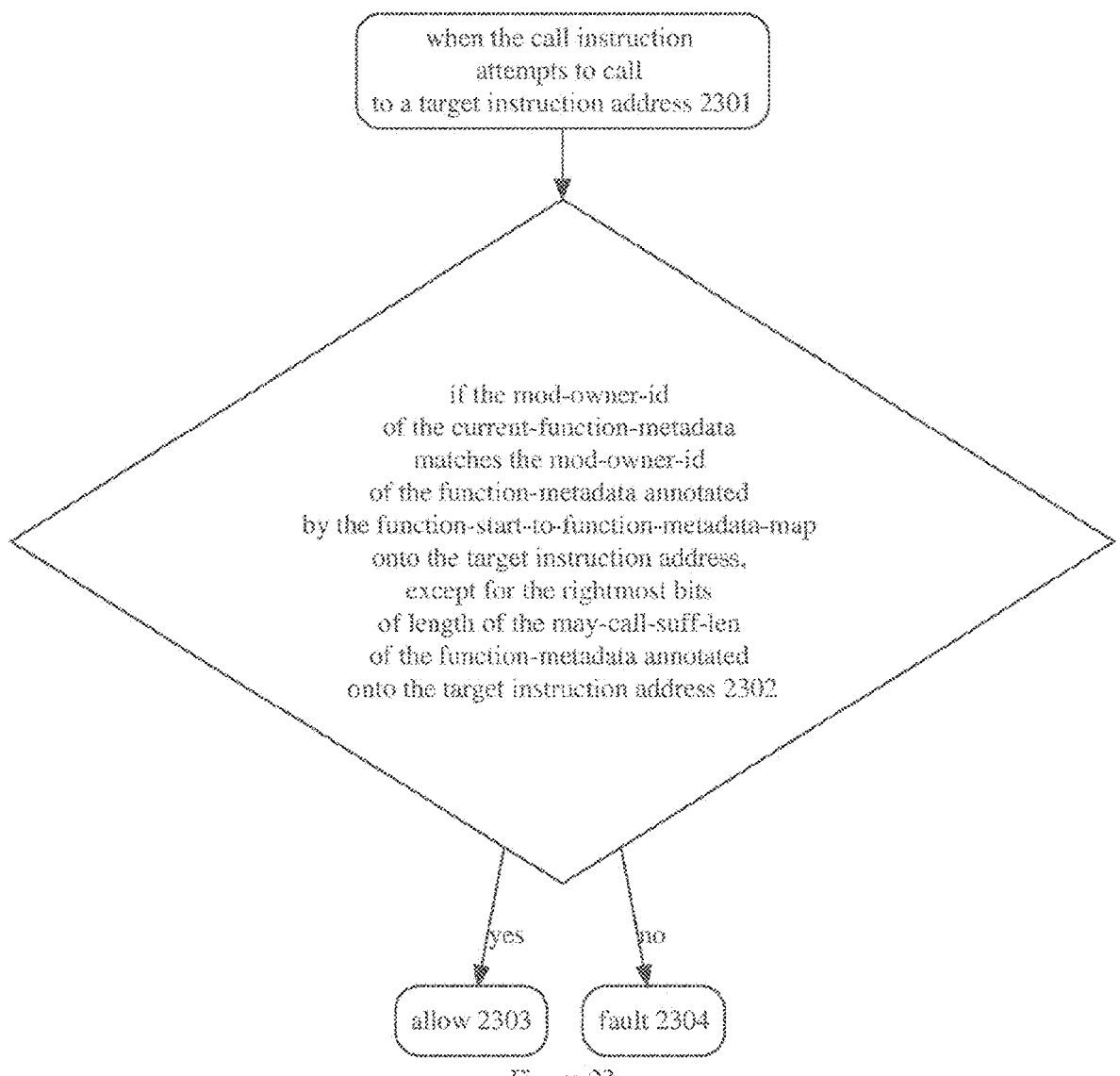
FIG. 23 shows when calling, checking mod-owner-id vs mod-owner-id.
Figure 24:
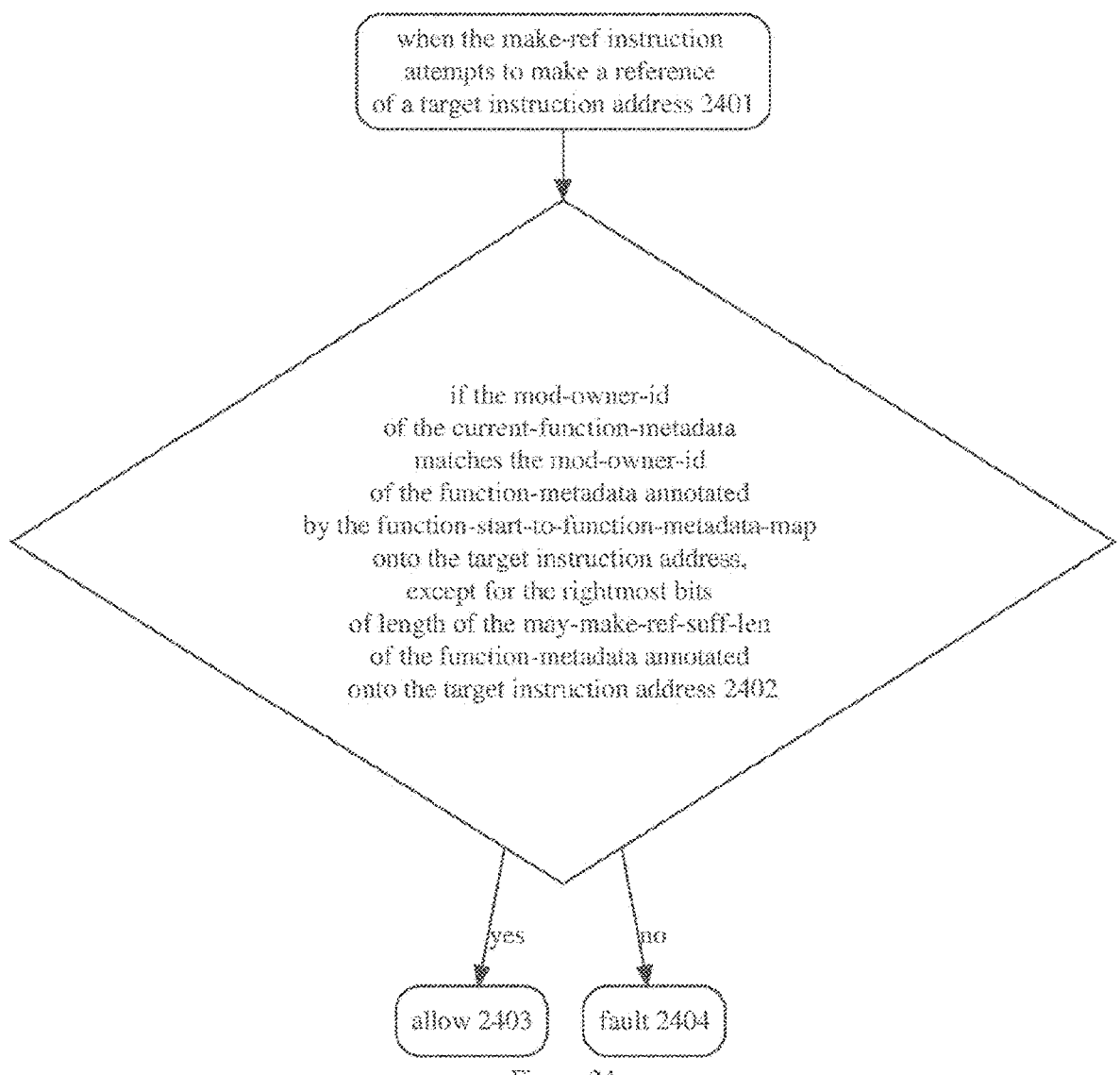
FIG. 24 shows when making a ref of an instruction address, checking mod-owner-id vs mod-owner-id.
Figure 25A:
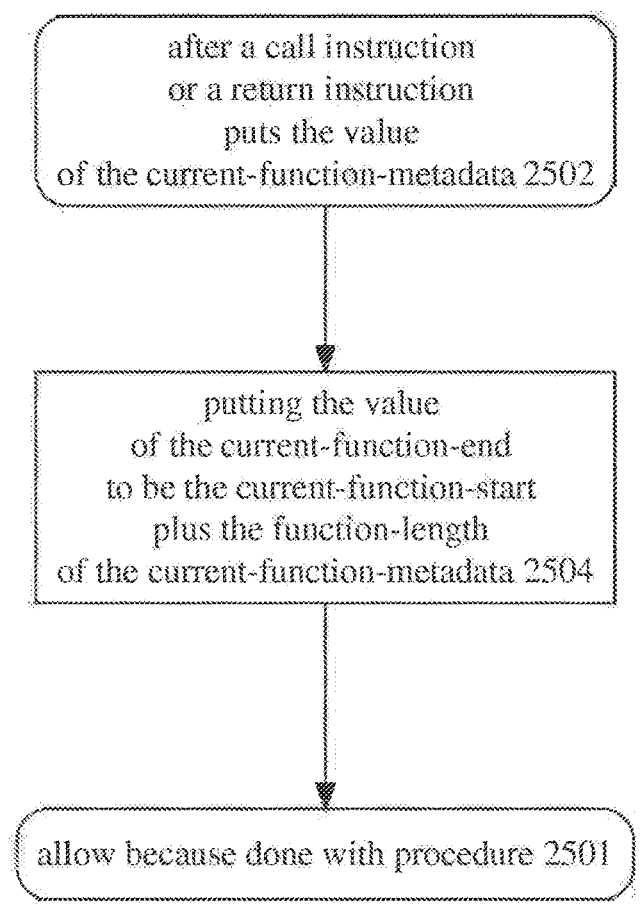
FIG. 25a shows after a call instruction or a return instruction, putting the value of the current-function-end to be the current-function-start plus the function-length of the current-function-metadata.
Figure 25B:
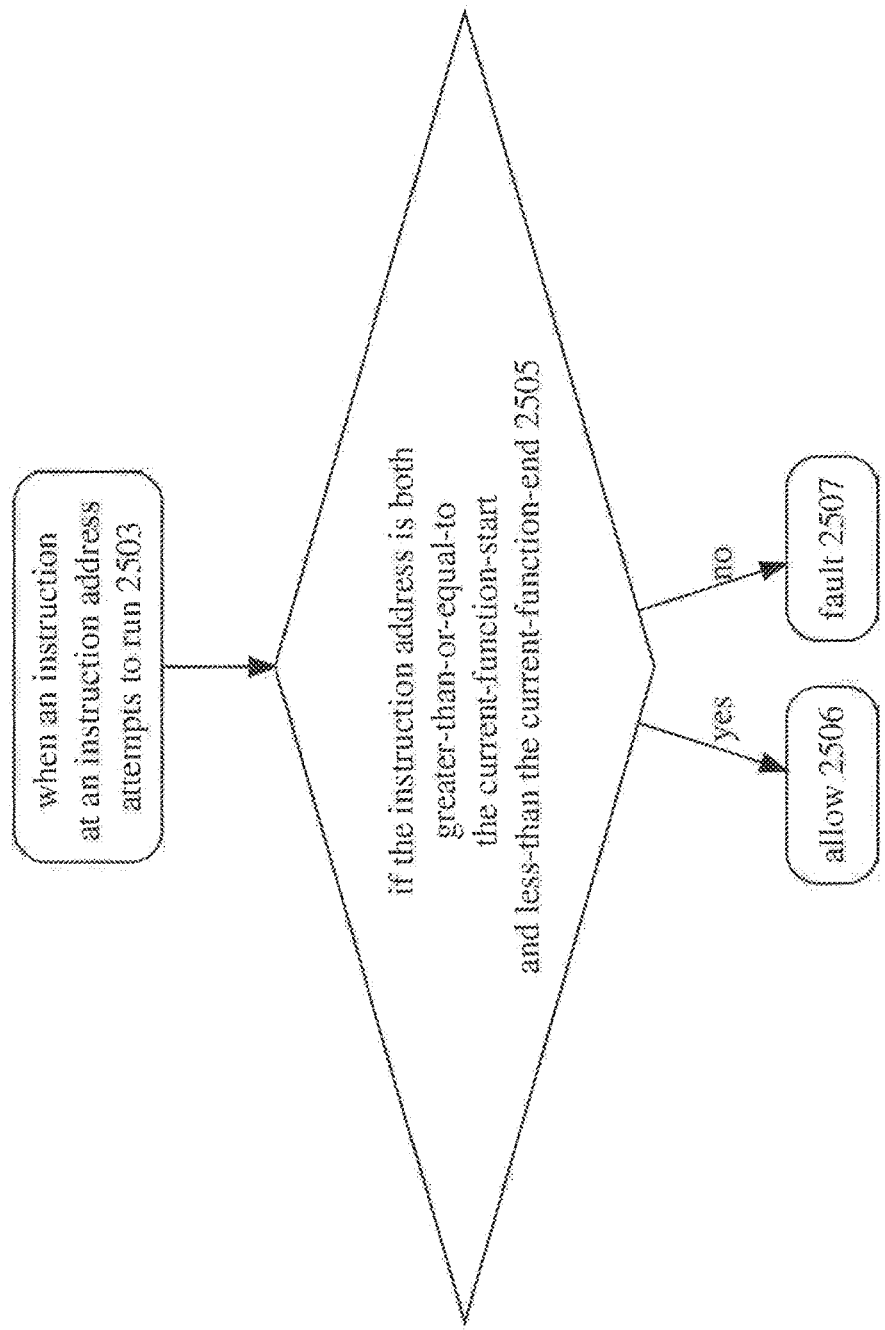
FIG. 25b shows when an instruction attempts to run, checking if the instruction address is both greater-than-or-equal-to the current-function-start and less-than the current-function-end.
Figure 26:
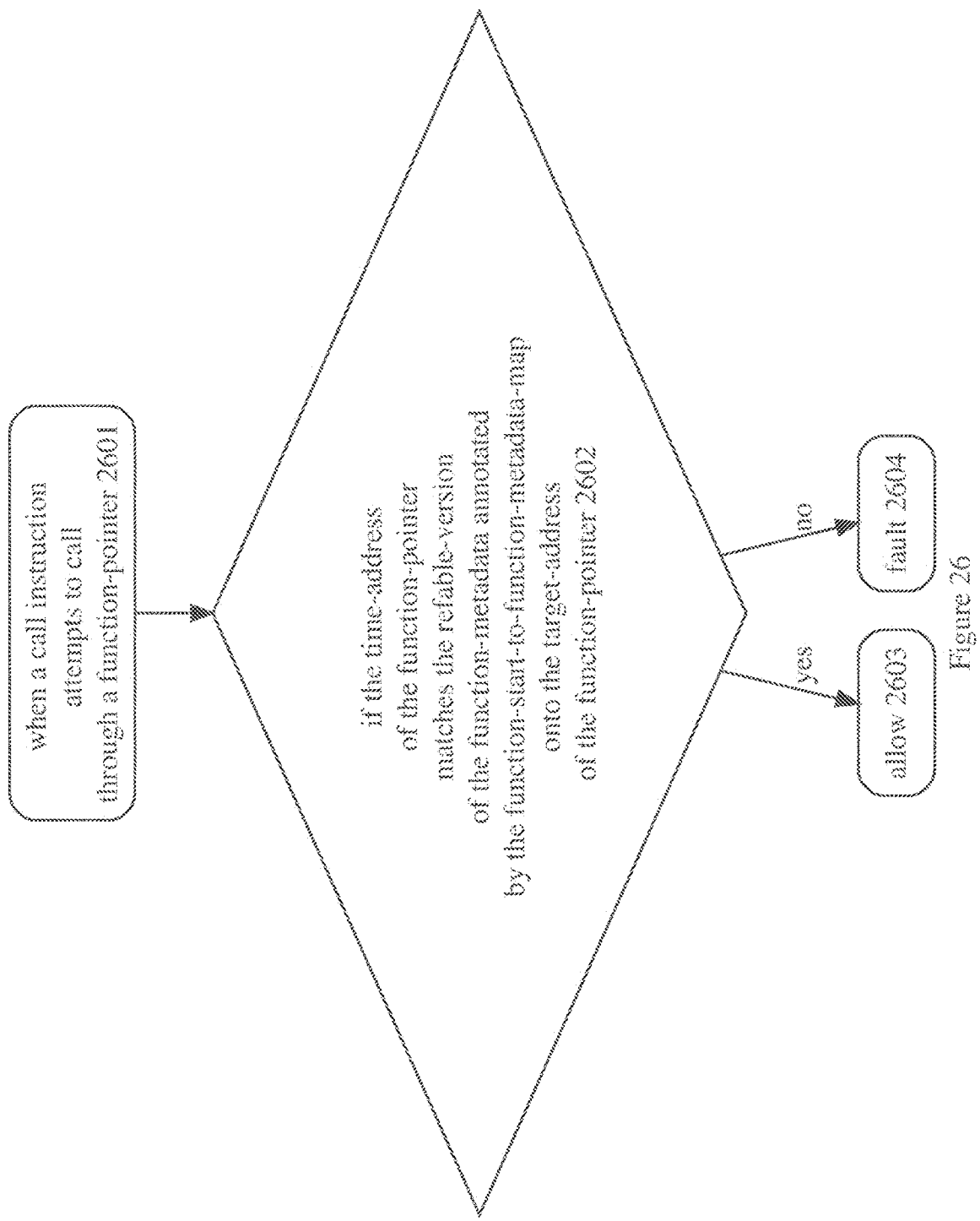
FIG. 26 shows when calling, checking the time-address vs the refable-version.

FIG. 18: The method of FIG. 12,
the computer further having a call instruction which transfers control to a function top at a target-address,
the method further comprising:
  when a call instruction transfers control to a target-address 1802,
  putting the current-function-start to the target-address 1803,
  allowing because done with procedure 1801.
FIG. 19: The method of FIG. 18,
the program further having a function-start-to-function-metadata-map, which annotates a function-start with a function-metadata,
the program further having a current-function-metadata,
the method further comprising:
  after a call instruction or a return instruction puts the current-function-start to the target-address 1902,
  putting the value of the current-function-metadata to the function-metadata annotated by the function-start-to-function-metadata-map onto the current-function-start 1903,
  allowing because done with procedure 1901.
FIG. 20: The method of FIG. 19,
the function-metadata further having a mod-owner-id,
the computer further having data addresses, some of the data addresses further being annotated with a mod-ownable-id,
the computer further having a memory access instruction which accesses data through a target-pointer,
the method further comprising:
  when a memory access instruction at an instruction address attempts to access a datum at a target-data address 2001, performing the following steps:
  checking if the mod-owner-id of the current-function-metadata matches the mod-ownable-id annotated onto the target-data address 2002,
  if so, allowing 2003,
  if not, raising a fault 2004.
FIG. 21: The method of FIG. 20,
the function-metadata further having a mod-owner-suff-len,
the method further comprising:
  when a memory access instruction at an instruction address attempts to access a datum at a target-data address 2101,
  replacing the checking step with the following step:
  checking if the mod-owner-id of the current-function-metadata matches the mod-ownable-id annotated onto the target-data address, except for the rightmost hits of length of the mod-owner-suff-len of the current-function-metadata 2102.
  if so, allowing 2103,
  if not, raising a fault 2104.
FIG. 22: The method of FIG. 19,
the function-metadata further having a danger-flag,
the computer further having a dangerous operation,
the method further comprising:
  when the dangerous operation runs 2201,
  checking if the danger-flag of the current-function-metadata is set to true 2202,
  if so, allowing 2203,
  if not, raising a fault 2204.
FIG. 23: The method of FIG. 19,
the function-metadata further having a may-call-sift-fen and a mod-owner-id,
the computer further having a call instruction to a target instruction address,
the method further comprising:
  when the call instruction attempts to call to a target instruction address 2301,
  checking if the mod-owner-id of the current-function-metadata matches the mod-owner-id of the function-metadata annotated by the function-start-to-function-metadata-map onto the target instruction address, except for the rightmost bits of length of the may-call-suff-len of the function-metadata annotated onto the target instruction address 2302,
  if so, allowing 2303,
  if not, raising a fault 2304.
FIG. 24: The method of FIG. 19,
the function-metadata further having a may-make-ref-suff-len and a mod-owner-id,
the computer further having a make-ref instruction which can make a reference of a target instruction address,
the method further comprising:
  when the make-ref instruction attempts to make a reference of a target instruction address 2401,
  checking if the mod-owner-id of the current-function-metadata matches the mod-owner-id of the function-metadata annotated by the function-start-to-function-metadata-map onto the target instruction address, except for the rightmost bits of length of the may-make-ref-suff-len of the function-metadata by the function-start-to-function-metadata-map annotated onto the target instruction address 2402,
  if so, allowing 2403,
  if not, raising a fault 2404.
FIGS. 25a-25b: The method of FIG. 19,
the function-metadata further having a function-length,
the computer further having a current-function-end,
the method further comprising:
  after a call instruction or a return instruction puts the value of the current-function-metadata 2502,
  further putting the value of the current-function-end to be the current-function-start plus the function-length of the current-function-metadata 2504,
  allowing because done with procedure 2501,
  when an instruction at an instruction address attempts to run 2503,
  checking if both (a) the instruction address is greater-than-or-equal-to the current-function-start and (b) the instruction address plus the access-width is less-than-or-equal-to the current-function-end 2505,
  if so, allowing 2506,
  if not, raising a fault 2507.
FIG. 26: The method of FIG. 19,
the function-metadata further having a retable-version,
the computer further having a function-pointer, the function-pointer having a target-address and a time-address,
the computer further having a call instruction which calls through a function-pointer,
the method further comprising:
  when a call instruction attempts to call through a function-pointer 2601, performing the following steps:
  checking if the time-address of the function-pointer matches the refable-version of the function-metadata annotated by the function-start-to-function-metadata-map onto the target-address of the function-pointer 2602,
  if so, allowing 2603,
  if not, raising a fault 2604.

Figure 27A:
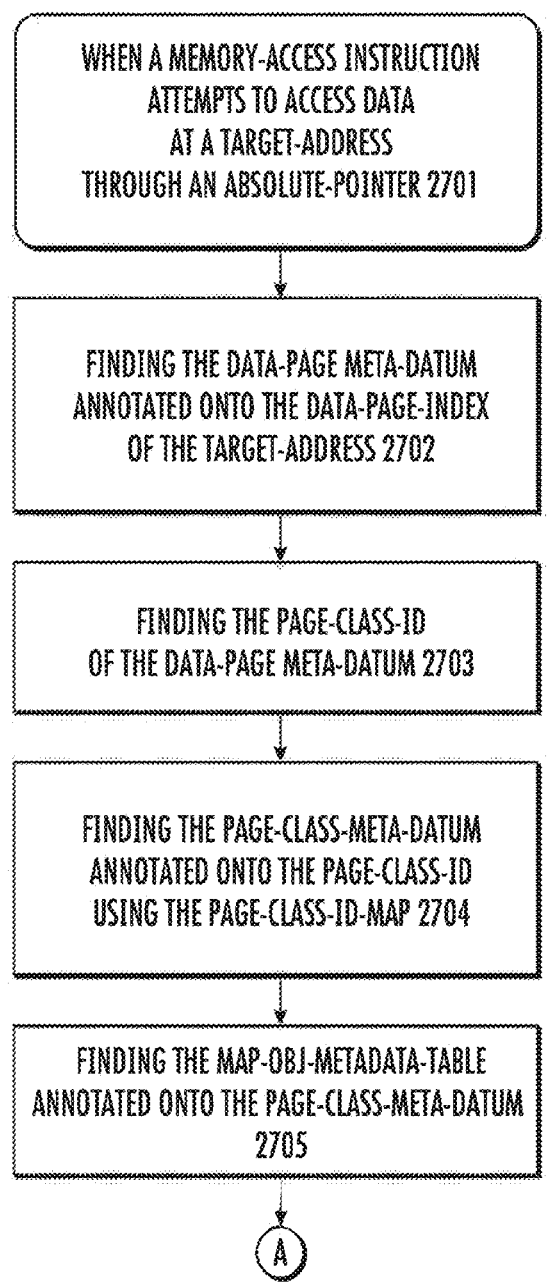
FIGS. 27a-27c shows when accessing heap-global memory, finding the object metadata and checking the target address vs the object range.
Figure 27B:
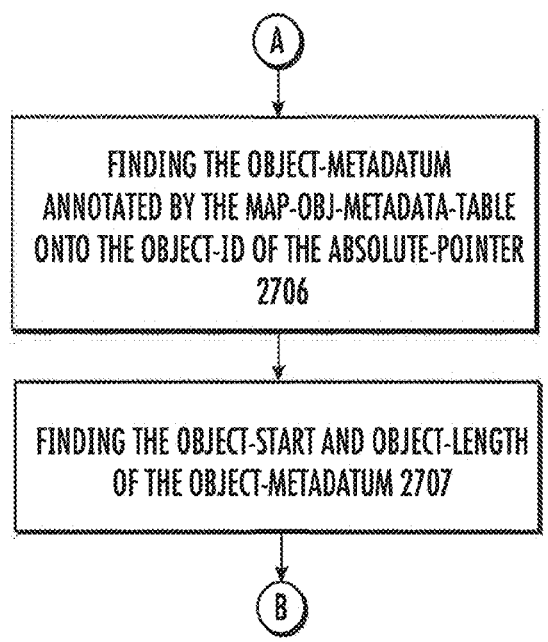
Figure 27C:
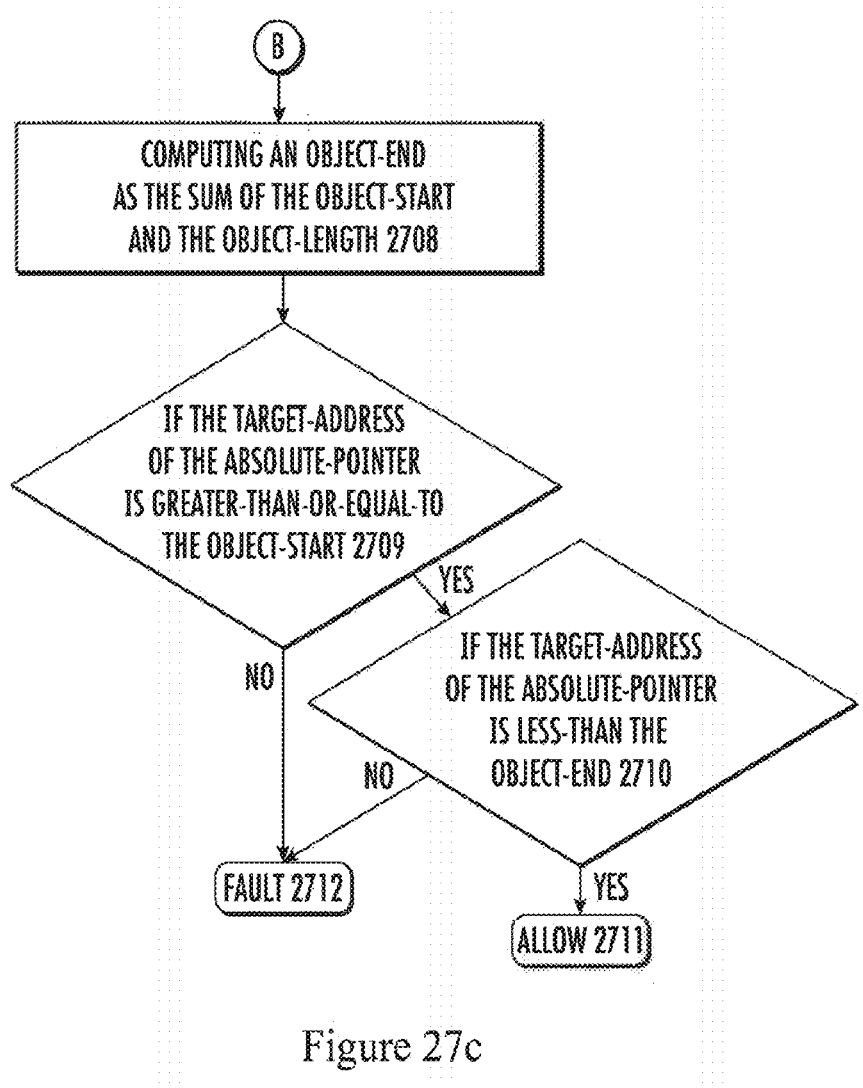
Figure 28A:
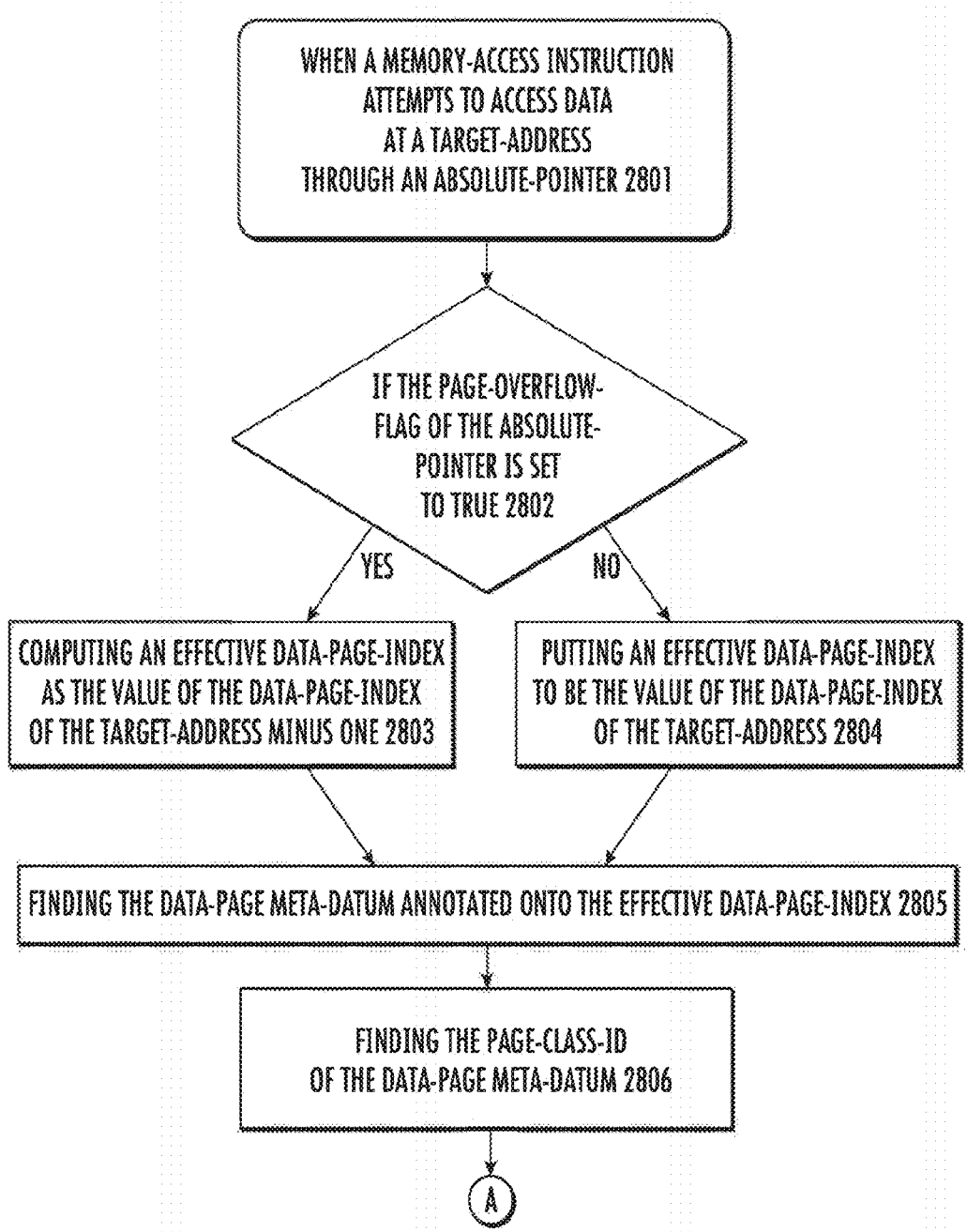
FIGS. 28a-28c shows when accessing heap-global memory, finding the object metadata using the page-over-flow-flag and then checking the target address vs the object range.
Figure 28B:
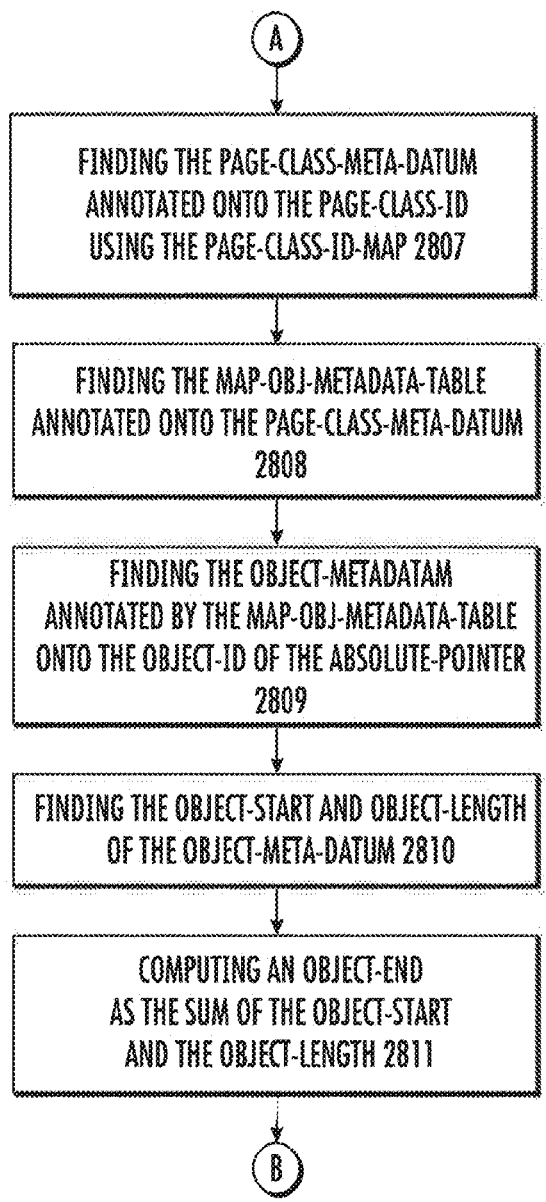
Figure 28C:
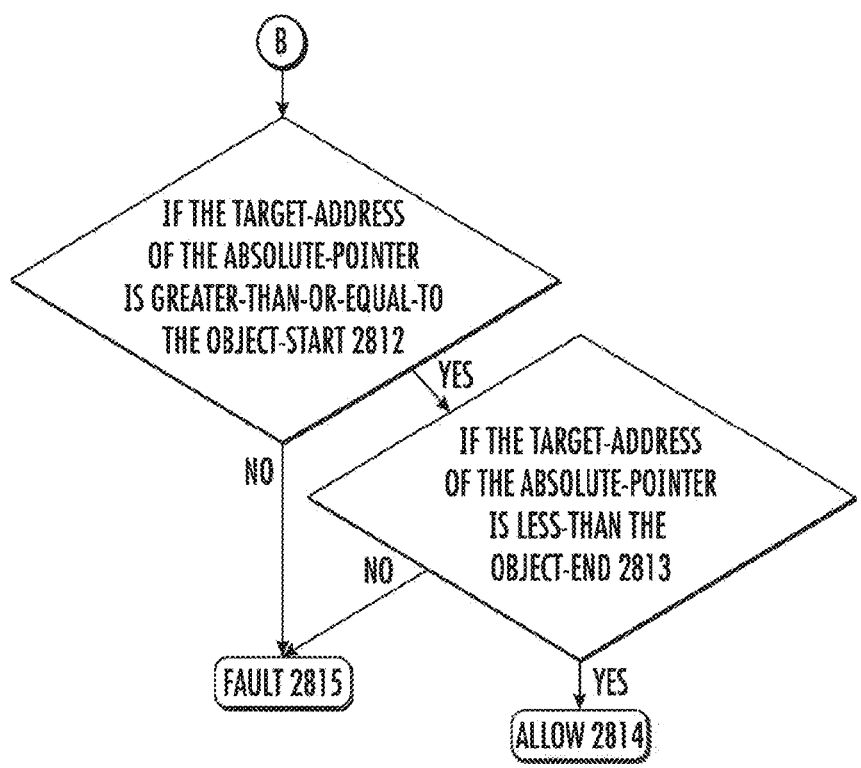
Figure 29A:
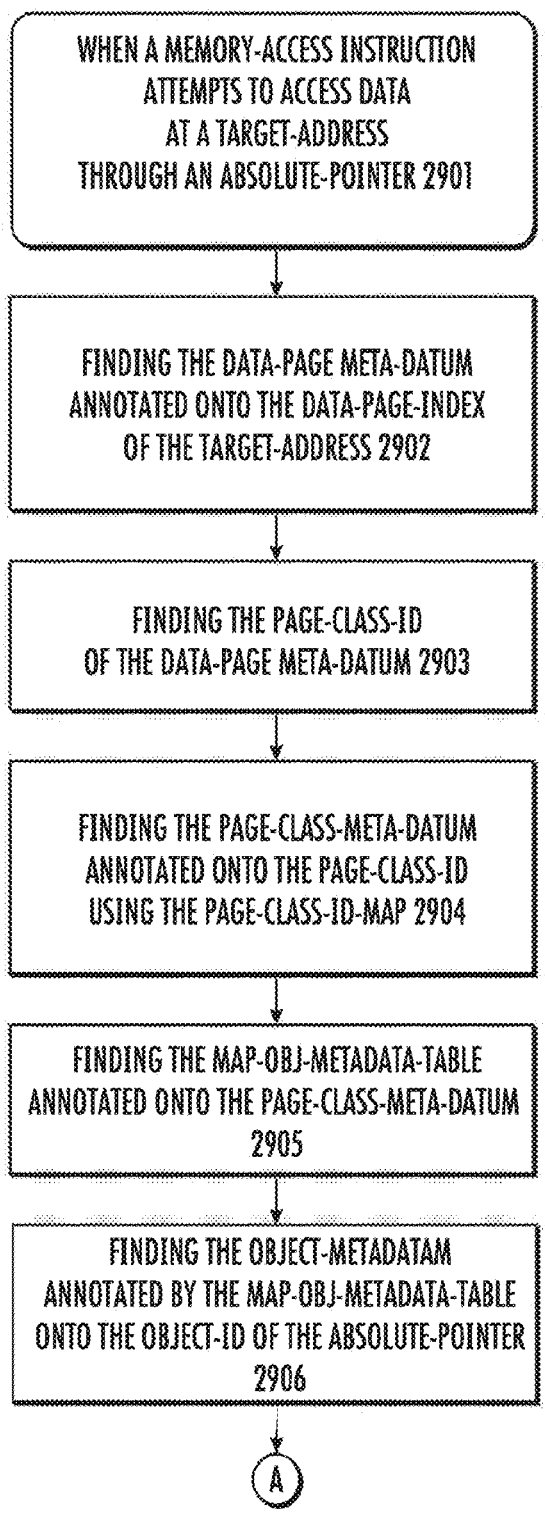
FIGS. 29a-29c shows when accessing heap-global memory, finding the object metadata and checking the object range also using immediate-dist-to-start and immediate-length.
Figure 29B:
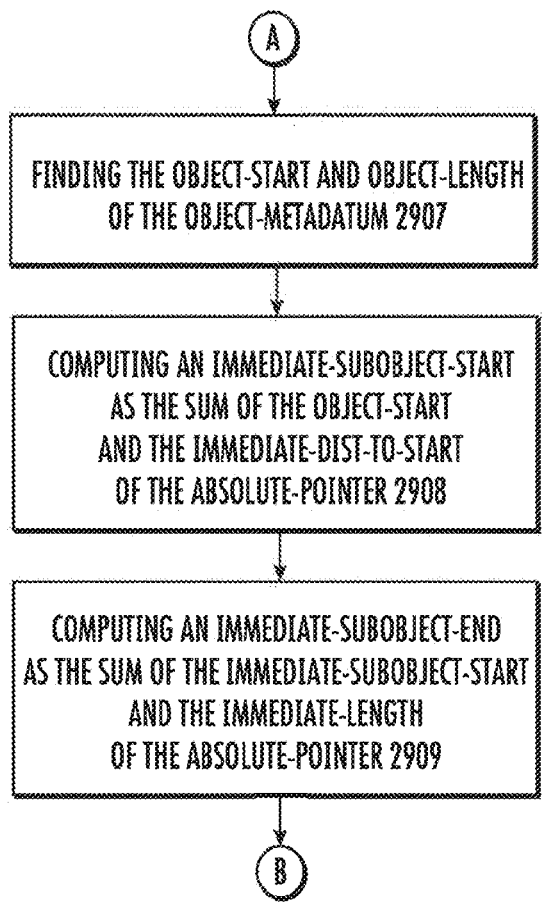
Figure 29C:
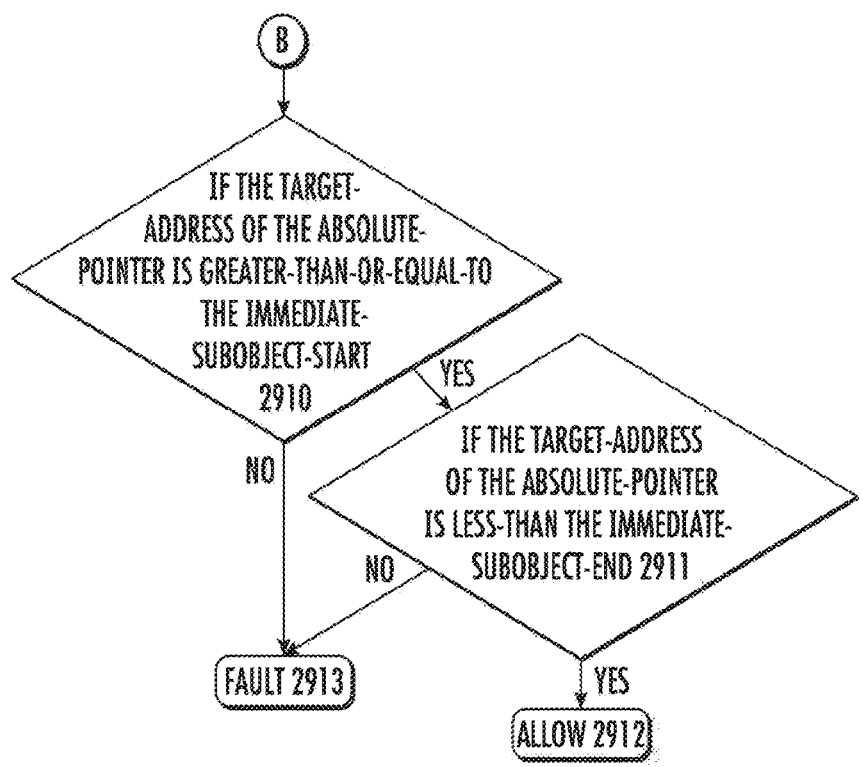
Figure 30:
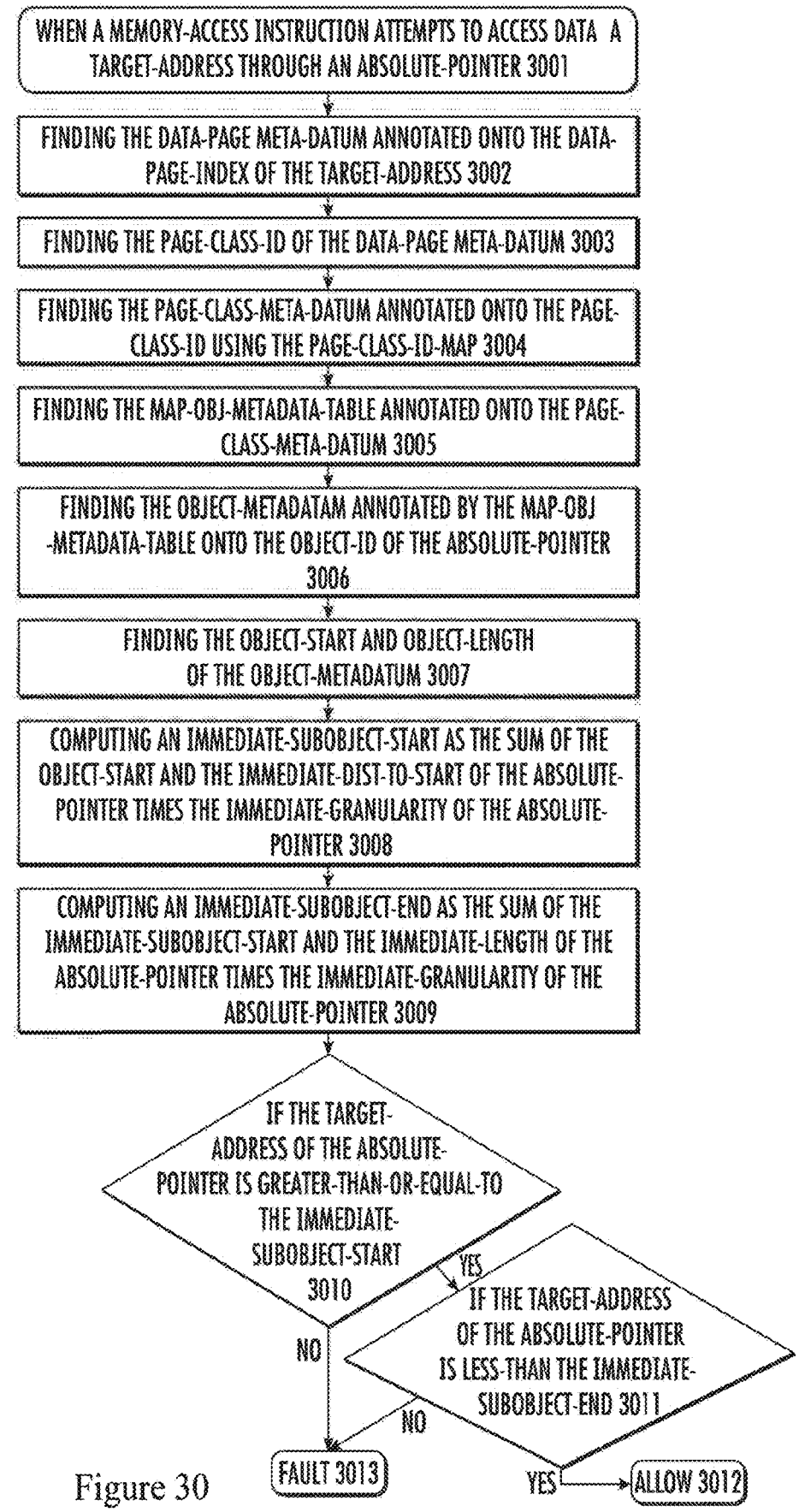
FIG. 30 shows when accessing heap-global memory, finding the object metadata and checking the object range also using immediate-dist-to-start and immediate-length using the immediate-granularity.
Figure 31A:
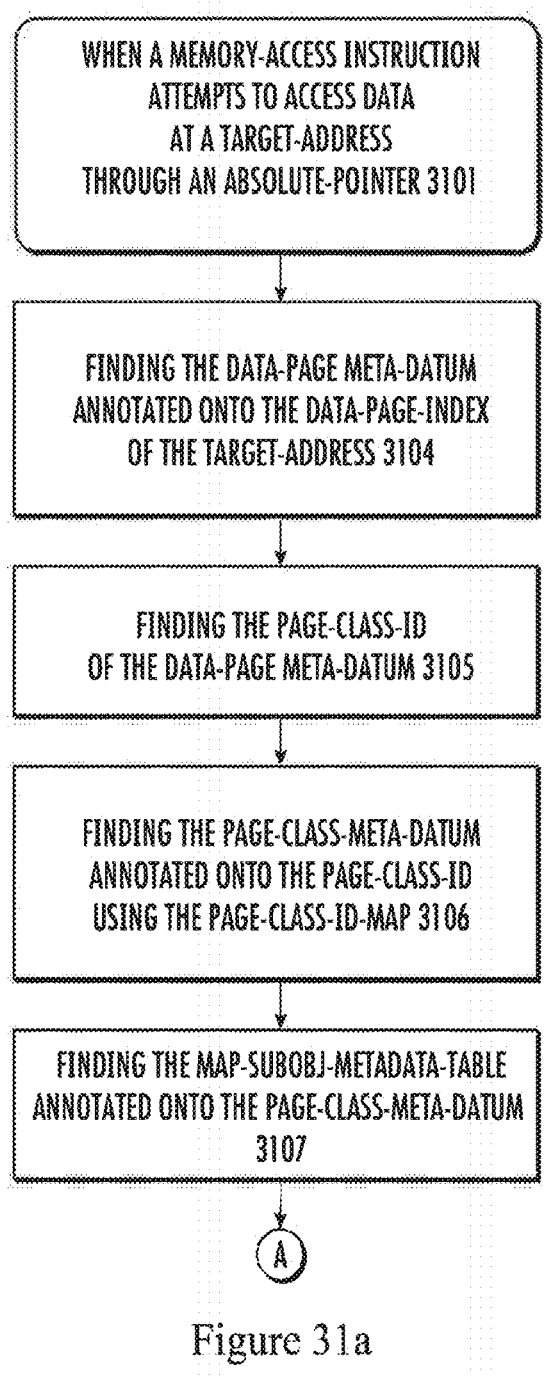
FIGS. 31a-31c shows when accessing heap-global memory, checking the sub-object-start and the sub-object-length.
Figure 31B:
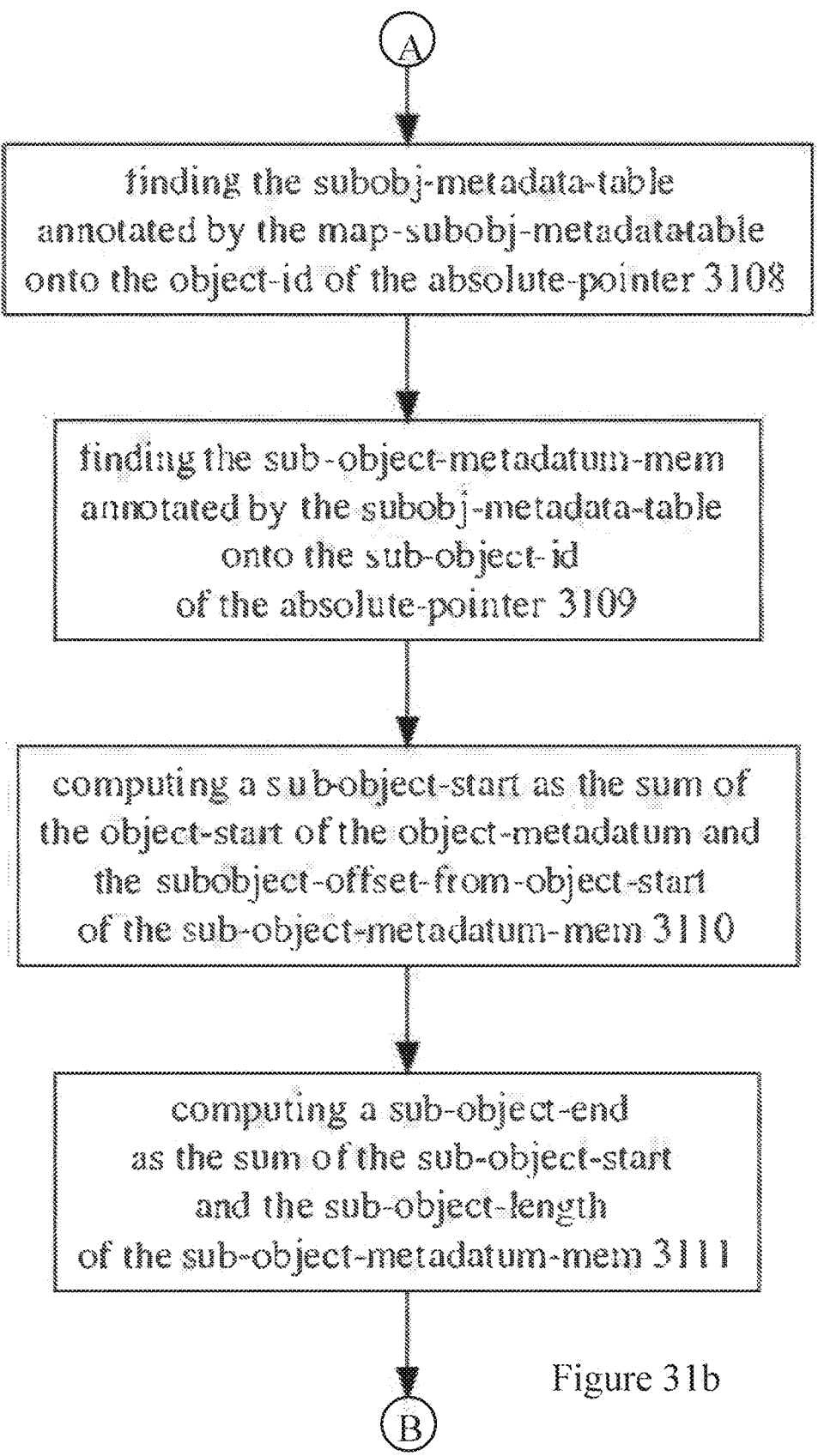
Figure 31C:
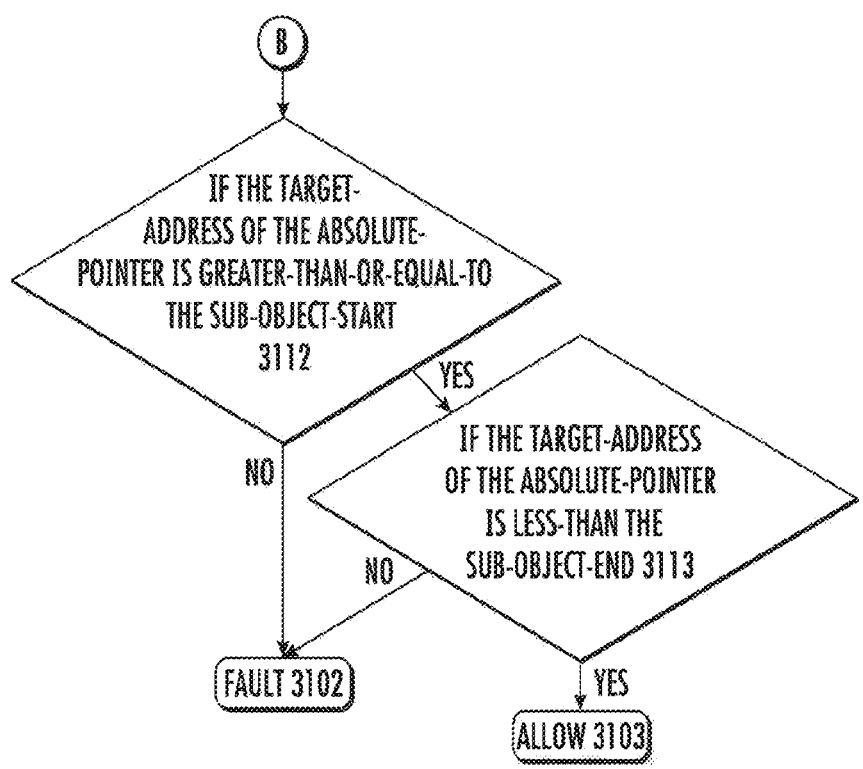
Figure 32C:
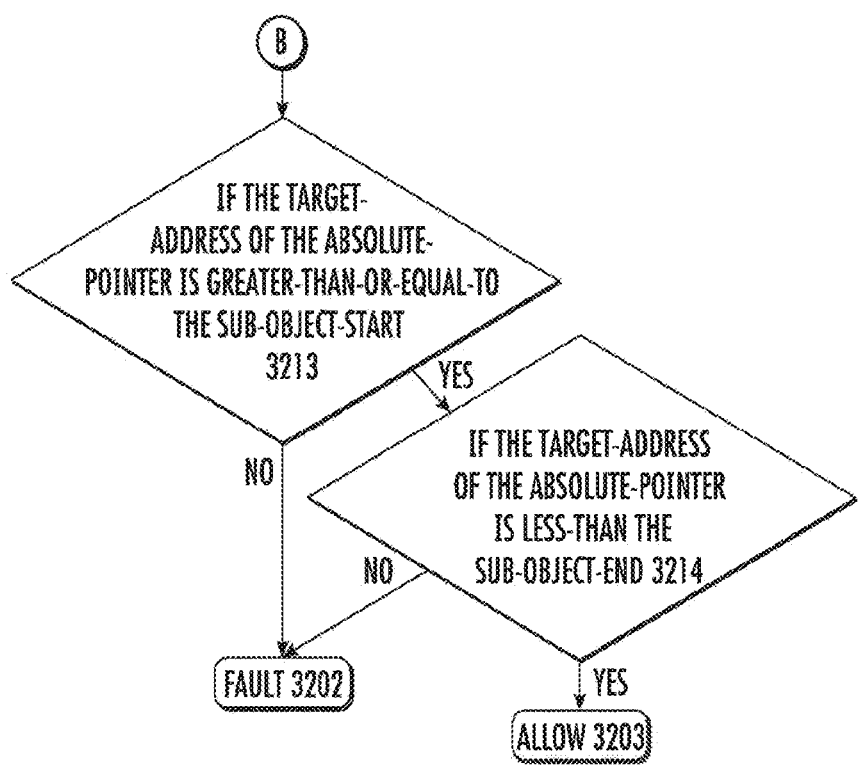
Figure 33B:
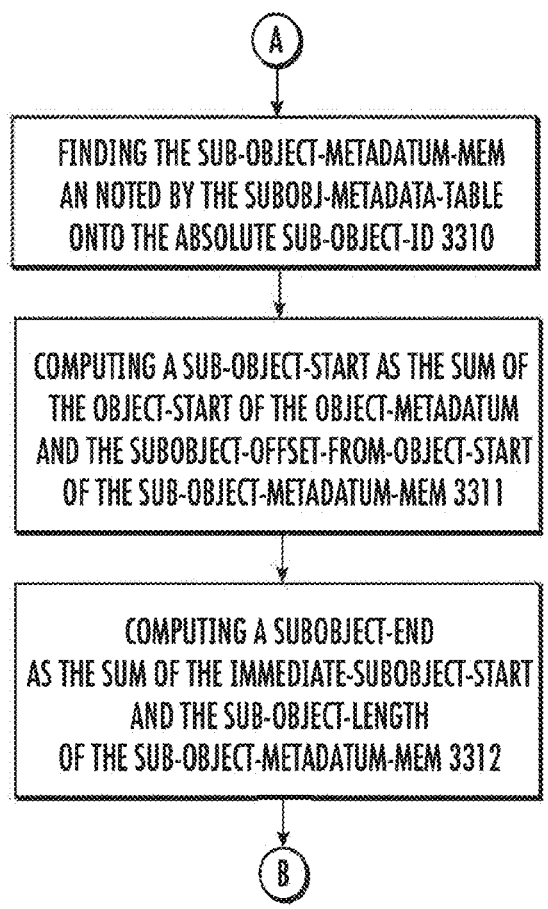
Figure 33C:
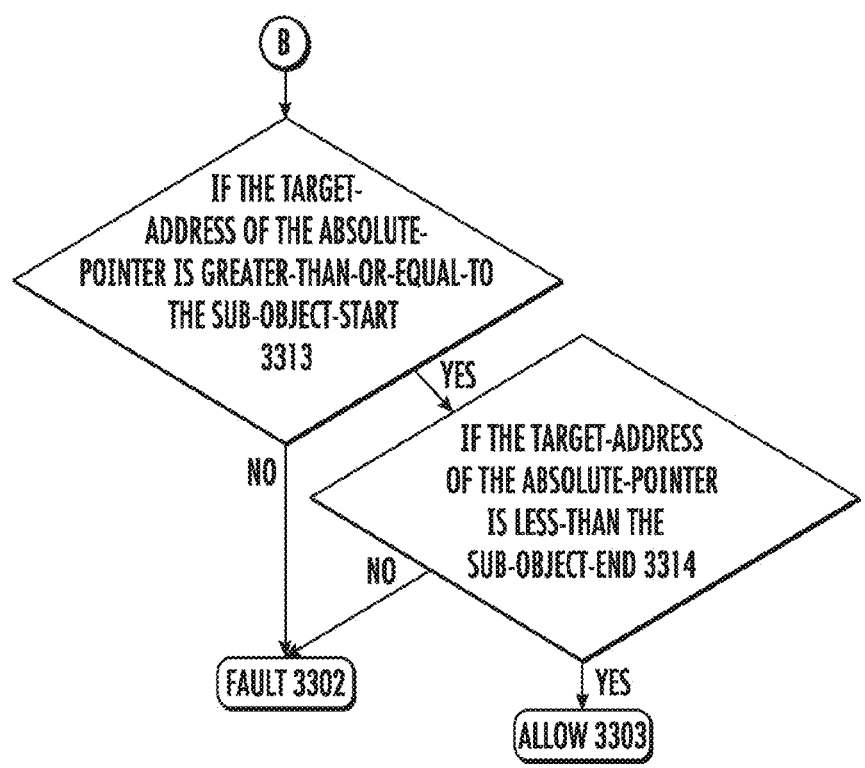

FIGS. 27a-27c: A method for regulating an execution of a program on a computer,
  the computer having an absolute-pointer, the absolute-pointer having a target-address, the target-address comprising a data-page-index and a data-page-offset,
  the absolute-pointer having an object-id,
  the computer having data addresses, the data addresses comprising a data-page-index and a data-page-offset,
  some of the data addresses having data,
  some of the data-page-index-es being annotated with a data-page meta-datum,
  some data-page meta-datum-s having a page-class-id,
  some page-class-id-s being annotated with a page-class-meta-datum using a page-class-id-map,
  some page-class-meta-datum-s being annotated with a map-obj-metadata-table, which annotates an object-id with an object-metadatum,
  some object-metadatum-s having an object-start and an object-length,
  the computer having a memory-access instruction which accesses data at a target-address through an absolute-pointer,
the method comprising:
  when a memory-access instruction attempts to access data at a target-address through an absolute-pointer 2701, performing the following steps:
  finding the data-page meta-datum annotated onto the data-page-index of the target-address 2702,
  finding the page-class-id of the data-page meta-datum 2703,
  finding the page-class-meta-datum annotated onto the page-class-id using the page-class-id-map 2704,
  finding the map-obj-metadata-table annotated onto the page-class-meta-datum 2705,
  finding the object-metadatum annotated by the map-obj-metadata-table onto the object-id of the absolute-pointer 2706,
  finding the object-start and object-length of the object-metadatum 2707,
  computing an object-end as the sum of the object-start and the object-length 2708,
  checking if the target-address of the absolute-pointer is greater-than-or-equal-to the object-start 2709,
  if not, raising a fault 2712,
  if so, checking if the target-address of the absolute-pointer plus the access-width is less-than-or-equal-to the object-end 2710,
  if not, raising a fault 2712,
  if so, allowing 2711.
FIGS. 28a-28c: The method of FIGS. 27a-27c,
  the absolute-pointer further having a page-overflow-flag,
the method further comprising:
  when a memory-access instruction attempts to access data at a target-address through an absolute-pointer 2801,
  checking if the page-overflow-flag of the absolute-pointer is set to true 2802,
  if so, computing an effective data-page-index as the value of the data-page-index of the target-address minus one 2803 (and proceeding to 2805 below),
  if not, patting an effective data-page-index to be the value of the data-page-index of the target-address 2804 (and proceeding to 2805 below),
  proceeding from either branch above (2803 or 2804), when finding the data-page meta-datum, instead finding the data-page meta-datum annotated onto the effective data-page-index 2805,
  finding the page-class-id of the data-page meta-datum 2806,
  finding the page-class-meta-datum annotated onto the page-class-id using the page-class-id-map 2807,
  finding the map-obj-metadata-table annotated onto the page-class-meta-datum 2808,
  finding the object-metadatum annotated by the map-obj-metadata-table onto the object-id of the absolute-pointer 2809,
  finding the object-start and object-length of the object-metadatum 2810,
  computing an object-end as the sum of the object-start and the object-length 2811,
  checking if the target-address of the absolute-pointer is greater-than-or-equal-to the object-start 2812,
  if not, raising a fault 2815,
  if so, checking if the target-address of the absolute-pointer plus the access-width is less-than-or-equal-to the object-end 2813,
  if not, raising a fault 2815,
  if so, allowing 2814.
FIGS. 29a-29c: The method of FIGS. 27a-27c,
  the absolute-pointer further having an immediate-dist-to-start and an immediate-length,
the method further comprising:
  when a memory-access instruction attempts to access data at a target-address through an absolute-pointer 2901, further performing the following steps:
  finding the data-page meta-datum annotated onto the data-page-index of the target-address 2902,
  finding the page-class-id of the data-page meta-datum 2903,
  finding the page-class-meta-datum annotated onto the page-class-id using the page-class-id-map 2904,
  finding the map-obj-metadata-table annotated onto the page-class-meta-datum 2905,
  finding the object-metadatum annotated by the map-obj-metadata-table onto the object-id of the absolute-pointer 2906,
  finding the object-start and object-length of the object-metadatum 2907,
  computing an immediate-subobject-start as the sum of the object-start and the immediate-dist-to-start of the absolute-pointer 2908,
  computing an immediate-subobject-end as the sum of the immediate-subobject-start and the immediate-length of the absolute-pointer 2909,
  checking if the target-address of the absolute-pointer is greater-than-or-equal-to the immediate-subobject-start 2910
  if not, raising a fault 2913,
  if so, checking if the target-address of the absolute-pointer plus the access-width is less-than-or-equal-to the immediate-subobject-end 2911,
  if not, raising a fault 2913,
  if so, allowing 2912.
FIG. 30: The method of FIGS. 27a-27c,
  the absolute-pointer further having an immediate-dist-to-start, an immediate-length, and an immediate-granularity,
the method further comprising:
  when a memory-access instruction attempts to access data at a target-address through an absolute-pointer 3001, further performing the following steps:
  finding the data-page meta-datum annotated onto the data-page-index of the target-address 3002, finding the page-class-id of the data-page meta-datum 3003,
finding the page-class-meta-datum annotated onto the page-class-id using the page-class-id-map 3004,
finding the map-obj-metadata-table annotated onto the page-class-meta-datum 3005,
finding the object-metadatum annotated by the map-obj-metadata-table onto the object-id of the absolute-pointer 3006,
finding the object-start and object-length of the object-metadatum 3007,
computing an immediate-subobject-start as the sum of the object-start and the immediate-dist-to-start of the absolute-pointer times the immediate-granularity of the absolute-pointer 3008,
computing an immediate-subobject-end as the sum of the immediate-subobject-start and the immediate-length of the absolute-pointer times the immediate-granularity of the absolute-pointer 3009,
checking if the target-address of the absolute-pointer is greater-than-or-equal-to the immediate-subobject-start 3010,
if not, raising a fault 3013,
checking if the target-address of the absolute-pointer plus the access-width is less-than-or-equal-to the immediate-subobject-end 3011,
if not, raising a fault 3013,
if so, allowing 3012.
FIGS. 31*a*-31*c*: The method of FIGS. 27*a*-27*c*,
the absolute-pointer further having a sub-object-id,
some page-class-meta-datum-s further being annotated with a map-subobj-metadata-table,
some map-subobj-metadata-table-s further annotating an object-id with a subobj-metadata-table,
some subobj-metadata-table-s further annotating a sub-object-id with a sub-object-metadatum-mem,
some sub-object-metadatum-mem-s further having a sub-object-offset-from-object-start and a subobject-length,
the method further comprising:
when a memory-access instruction attempts to access data at a target-address through an absolute-pointer 3101, further performing the following steps:
finding the data-page meta-datum annotated onto the data-page-index of the target-address 3104,
finding the page-class-id of the data-page meta-datum 3105,
finding the page-class-meta-datum annotated onto the page-class-id using the page-class-id-map 3106,
finding the map-subobj-metadata-table annotated onto the page-class-meta-datum 3107,
finding the subobj-metadata-table annotated by the map-subobj-metadata-table onto the object-id of the absolute-pointer 3108,
finding the sub-object-metadatum-mem annotated by the subobj-metadata-table onto the sub-object-id of the absolute-pointer 3109,
computing a sub-object-start as the sum of the object-start of the object-metadatum and the subobject-offset-from-object-start of the sub-object-metadatum-mem 3110,
computing a sub-object-end as the sum of the sub-object-start and the sub-object-length of the sub-object-metadatum-mem 3111,
checking if the target-address of the absolute-pointer is greater-than-or-equal-to the sub-object-start 3112,
if not, raising a fault 3102,
if so, checking if the target-address of the absolute-pointer plus the access-width is less-than-or-equal-to the sub-object-end 3113,
if not, raising a fault 3102,
if so, allowing 3103.
FIGS. 32*a*-32*c*: The method of FIGS. 27*a*-27*c*,
the absolute-pointer further having a sub-object-id,
some page-class-meta-datum-s further being annotated with a map-subobj-metadata-table,
some map-subobj-metadata-table-s further annotating an object-id with a subobj-metadata-table,
some subobj-metadata-table-s further annotating a sub-object-id with a sub-object-metadatum-mem,
some data-page meta-datum-s further having a page-subobj-id-abs-base,
some sub-object-metadatum-mem-s further having a sub-object-offset-from-object-start and a subobject-length,
the method further comprising:
when a memory-access instruction attempts to access data at a target-address through an absolute-pointer 3201, further performing the following steps:
finding the data-page meta-datum annotated onto the data-page-index of the target-address 3204,
finding the page-class-id of the data-page meta-datum 3205,
finding the page-class-meta-datum annotated onto the page-class-id using the page-class-id-map 3206,
finding the map-subobj-metadata-table annotated onto the page-class-meta-datum 3207,
finding the subobj-metadata-table annotated by the map-subobj-metadata-table onto the object-id of the absolute-pointer 3208,
computing an absolute sub-object-id as the sum of the sub-object-id of the absolute-pointer, and the page-subobj-id-abs-base annotated onto the data-page meta-datum annotated onto the data-page-index of the target-address 3209,
finding the sub-object-metadatum-mem annotated by the subobj-metadata-table onto the absolute sub-object-id 3210.
computing a sub-object-start as the sum of the object-start of the object-metadatum and the subobject-offset-from-object-start of the sub-object-metadatum-mem 3211,
computing a sub-object-end as the sum of the sub-object-start and the sub-object-length of the sub-object-metadatum-mem 3212,
checking if the target-address of the absolute-pointer is greater-than-or-equal-to the sub-object-start 3213,
if not, raising a fault 3202,
checking if the target-address of the absolute-pointer plus the access-width is less-than-or-equal-to the sub-object-end 3214,
if not, raising a fault 3202,
if so, allowing 3203.
FIGS. 33*a*-33*c*: The method of FIGS. 27*a*-27*c*,
the absolute-pointer further having a subobj-tepid,
some page-class-meta-datum-s further being annotated with a map-subobj-metadata-table,
some map-subobj-metadata-table-s further annotating an object-id with a subobj-metadata-table,
some sub-object-metadata-table-s further having a map-subobj-topid-to-absolute-subobj-id,
some map-subobj-topid-to-absolute-subobj-id further annotating an absolute sub-object-id onto a subobj-topid,
some subobj-metadata-table-s further annotating an absolute sub-object-id with a sub-object-metadatum-mem, some sub-object-metadatum-mem-s further having a sub-object-offset-from-object-start and a subobject-length,
the method further comprising
when a memory-access instruction attempts to access data at a target-address through an absolute-pointer 3301, further performing the following steps:
finding the data-page meta-datum annotated onto the data-page-index of the target-address 3304,
finding the page-class-id of the data-page meta-datum 3305,
finding the page-class-meta-datum annotated onto the page-class-id using the page-class-id-map 3306,
finding the map-subobj-metadata-table annotated onto the page-class-meta-datum 3307,
finding the subobj-metadata-table annotated by the map-subobj-metadata-table onto the object-id of the absolute-pointer 3308,
finding the absolute sub-object-id annotated by the map-subobj-topid-to-absolute-subobj-id of the sub-object-metadata-table from the subobj-topid of the absolute-pointer 3309,
finding the sub-object-metadatum-mem annotated by the subobj-metadata-table onto the absolute sub-object-id 3310,
computing a sub-object-start as the sum of the object-start of the object-metadatum and the subobject-offset-from-object-start of the sub-object-metadatum-mem 3311,
computing a sub-object-end as the sum of the sub-object-start and the sub-object-length of the sub-object-metadatum-mem 3312,
checking if the target-address of the absolute-pointer is greater-than-or-equal-to the sub-object-start 3313,
if not, raising a fault 3302,
checking if the target-address of the absolute-pointer plus the access-width is less-than-or-equal-to the sub-object-end 3314,
if not, raising a fault 3302,
if so, allowing 3303.

Figure 34:
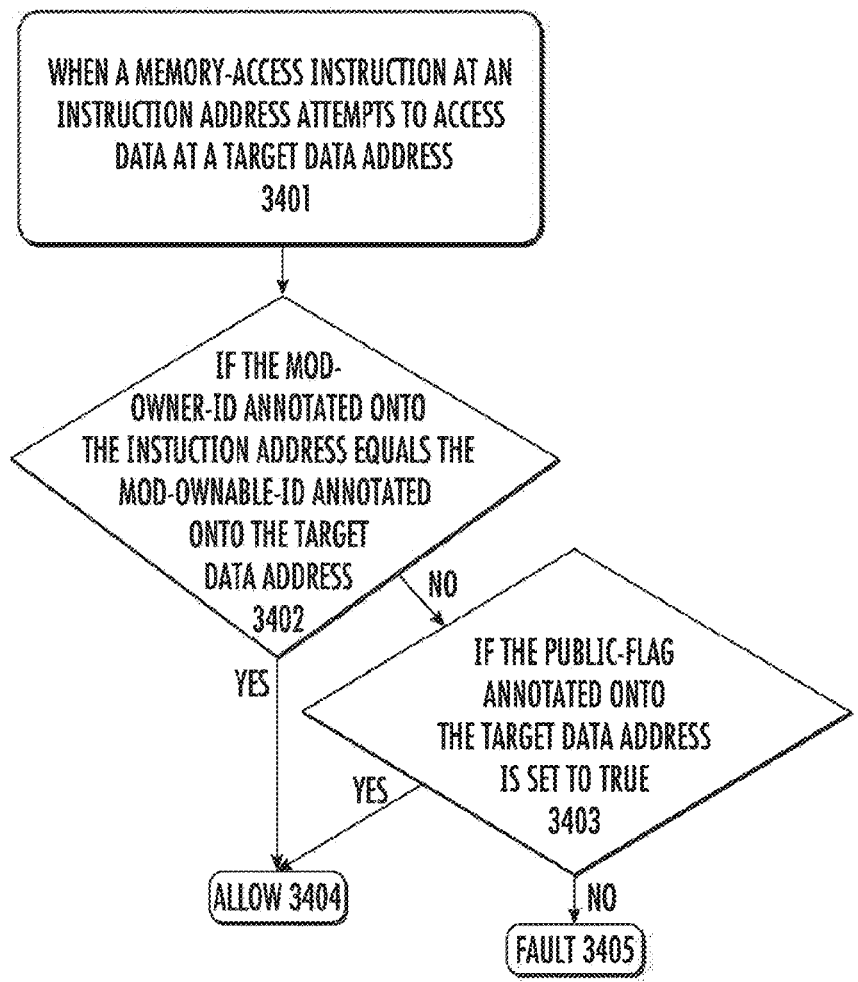
FIG. 34 shows when accessing heap-global memory, using the public-flag.

FIG. 34: A method for regulating an execution of a program on a computer,
the computer having instructions addresses, some of the instructions addresses having instructions,
the computer having data addresses, some of the data addresses having data,
the computer having a memory-access instruction which accesses data at a target data address,
some of the instructions addresses being annotated with a mod-owner-id, some of the data addresses being annotated with a mod-ownable-id and a public-flag,
the method comprising:
when a memory-access instruction at an instruction address attempts to access data at a target data address 3401, performing the following steps:
checking if the mod-owner-id annotated onto the instruction address equals the mod-ownable-id annotated onto the target data address 3402,
if so, allowing 3404,
if not, checking if the public-flag annotated onto the target data address is set to true 3403,
if so, allowing 3404,
if not, raising a fault 3405.

Figure 35:
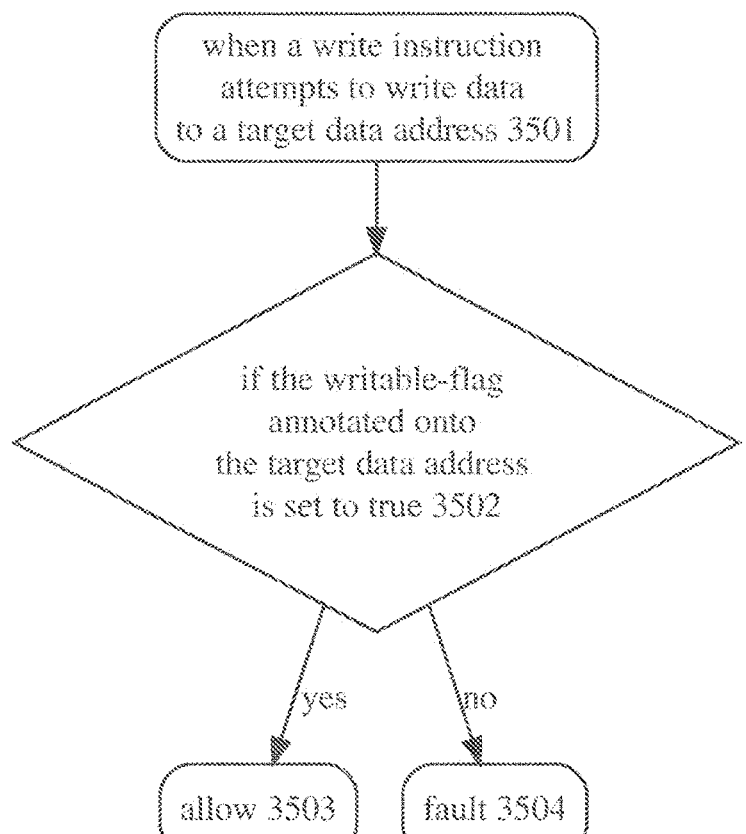
FIG. 35 shows when writing heap-global memory, using the writable-flag.

FIG. 35: A method for regulating an execution of a program on a computer,
the computer having data addresses, some of the data addresses having data,
the computer having a write instruction which writes data to a target data address,
some of the data addresses being annotated with a writable-flag,
the method comprising:
when a write instruction attempts to write data to a target data address 3501,
checking if the writable-flag annotated onto the target data address is set to true 3502,
if so, allowing 3503,
if not, raising a fault 3504.

FIGS. 36a-36b: A method for regulating an execution of a program on a computer,
the computer having data addresses, some of the data addresses having data,
the computer having a read instruction which reads data from a target data address and a write instruction which writes data to a target data address,
some of the data addresses being annotated with a written-flag,
the method comprising:
when a write instruction attempts to write data to a target data address 3602,
setting the written-flag annotated onto the target data address to true 3603,
allowing because done with procedure 3601,
when a read instruction attempts to read data from a target data address 3604, performing the following steps:
checking if the written-flag annotated onto the target data address is set to true 3605,
if so, allowing 3606,
if not, raising a fault 3607.

Figures 37A, 37B:
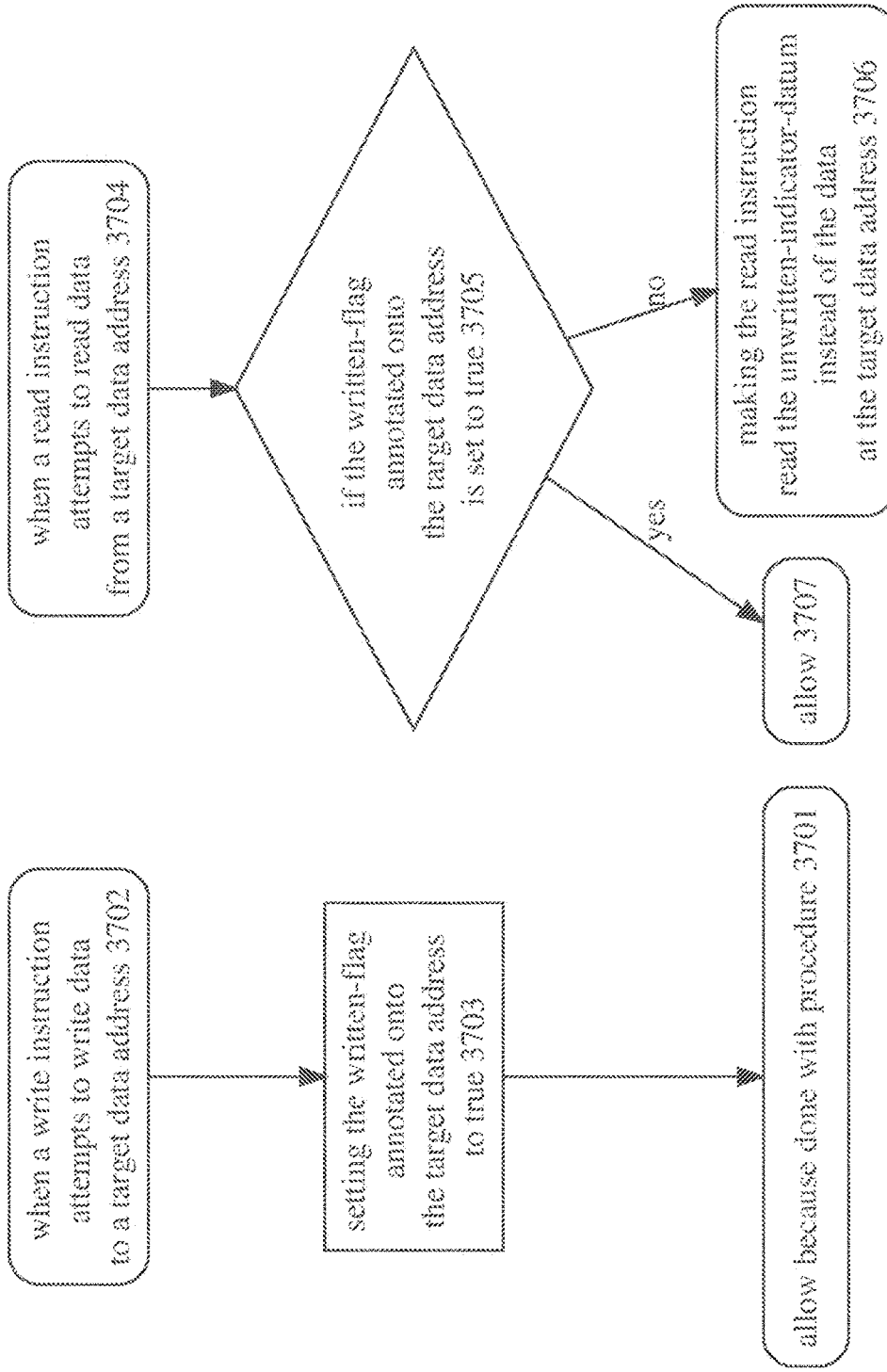
FIG. 37a shows when writing heap-global and setting the written-flag.
FIG. 37b shows when reading heap-global, returning the unwritten-indicator-datum unless the written-flag is set.

FIGS. 37a-37b: A method for regulating an execution of a program on a computer,
the computer having data addresses, some of the data addresses having data,
the computer having a read instruction which reads data from a target data address and a write instruction which writes data to a target data address,
some of the data addresses being annotated with a written-flag,
the computer having an unwritten-indicator-datum,
the method comprising:
when a write instruction attempts to write data to a target data address 3702,
setting the written-flag annotated onto the target data address to true 3703,
allowing because done with procedure 3701,
when a read instruction attempts to read data from a target data address 3704, performing the following steps:
checking if the written-flag annotated onto the target data address is set to true 3705,
if so, allowing 3707,
if not, making the read instruction read the unwritten-indicator-datum instead of the data at the target data address 3706.

Figure 38:
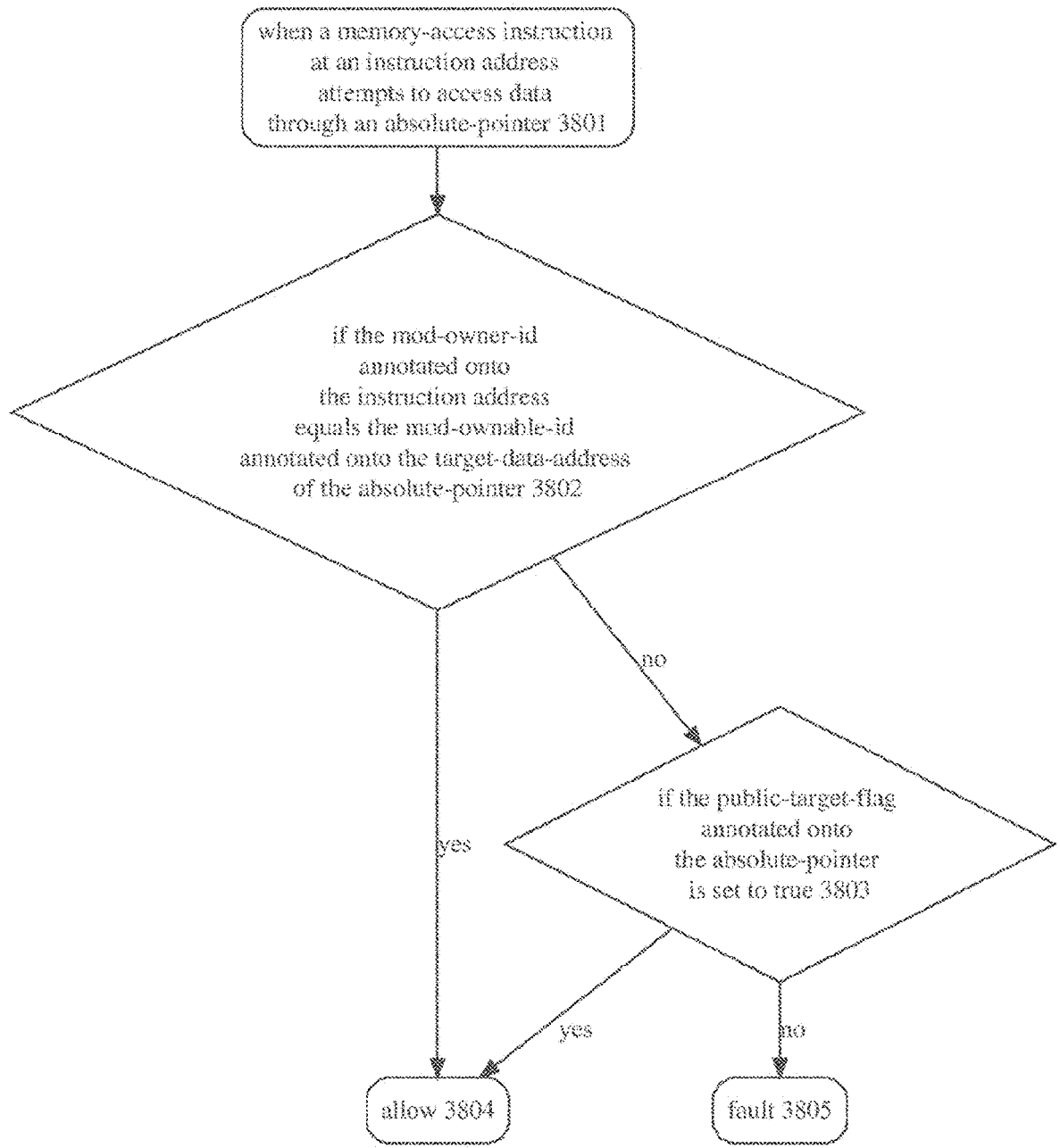
FIG. 38 shows when accessing heap-global memory, using the public-target-flag.

FIG. 38: A method for regulating an execution of a program on a computer,
the computer having an absolute-pointer, the absolute-pointer having a target-data-address and a public-target-flag,
the computer having instruction addresses, some of the instruction addresses having instructions,
the computer having data addresses, some of the data addresses having data,
the computer having a memory-access instruction which accesses data through an absolute-pointer,
some of the instructions addresses being annotated with a mod-owner-id, some of the data addresses being annotated with a mod-ownable-id, the method comprising:
when a memory-access instruction at an instruction address attempts to access data through an absolute-pointer 3801, performing the following steps:
checking if the mod-owner-id annotated onto the instruction address equals the mod-ownable-id annotated onto the target-data-address of the absolute-pointer 3802,
if so, allowing 3804,
if not, checking if the public-target-flag annotated onto the absolute-pointer is set to true 3803,
if so, allowing 3804,
if not, raising a fault 3805.

Figure 39:
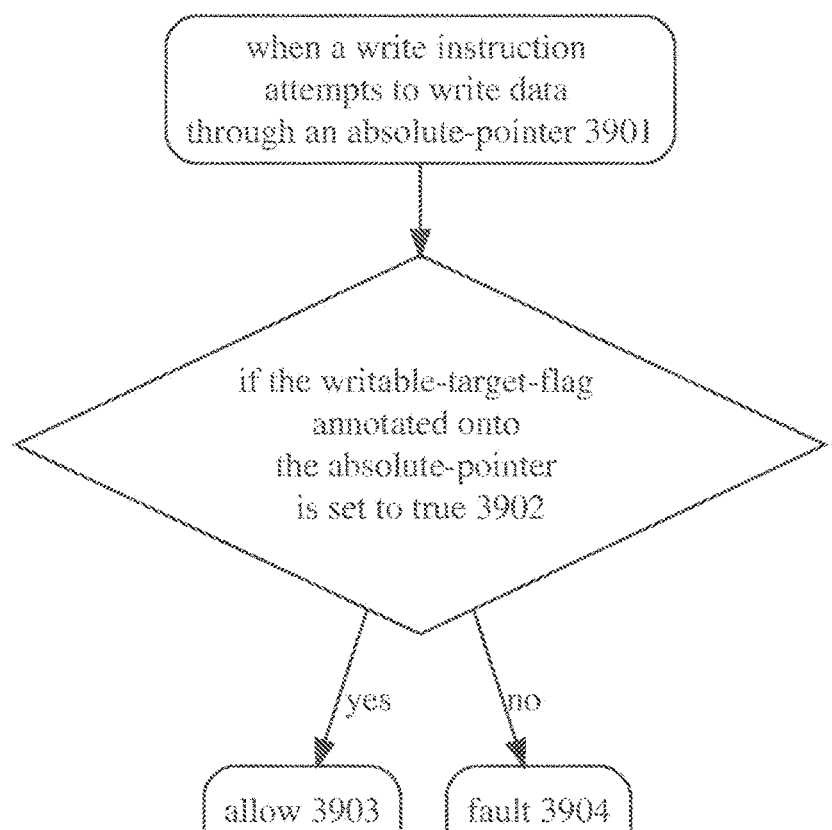
FIG. 39 shows when writing heap-global memory, using the writable-target-flag.

FIG. 39: A method for regulating an execution of a program on a computer,
the computer having an absolute-pointer, the absolute-pointer having a target-data-address and a writable-target-flag,
the computer having data addresses, some of the data addresses having data,
the computer having a write instruction which writes data through an absolute-pointer, the method comprising:
when a write instruction attempts to write data through an absolute-pointer 3901,
checking if the writable-target-flag annotated onto the absolute-pointer is set to true 3902,
if so, allowing 3903,
if not, raising a fault 3904.

Figure 40:
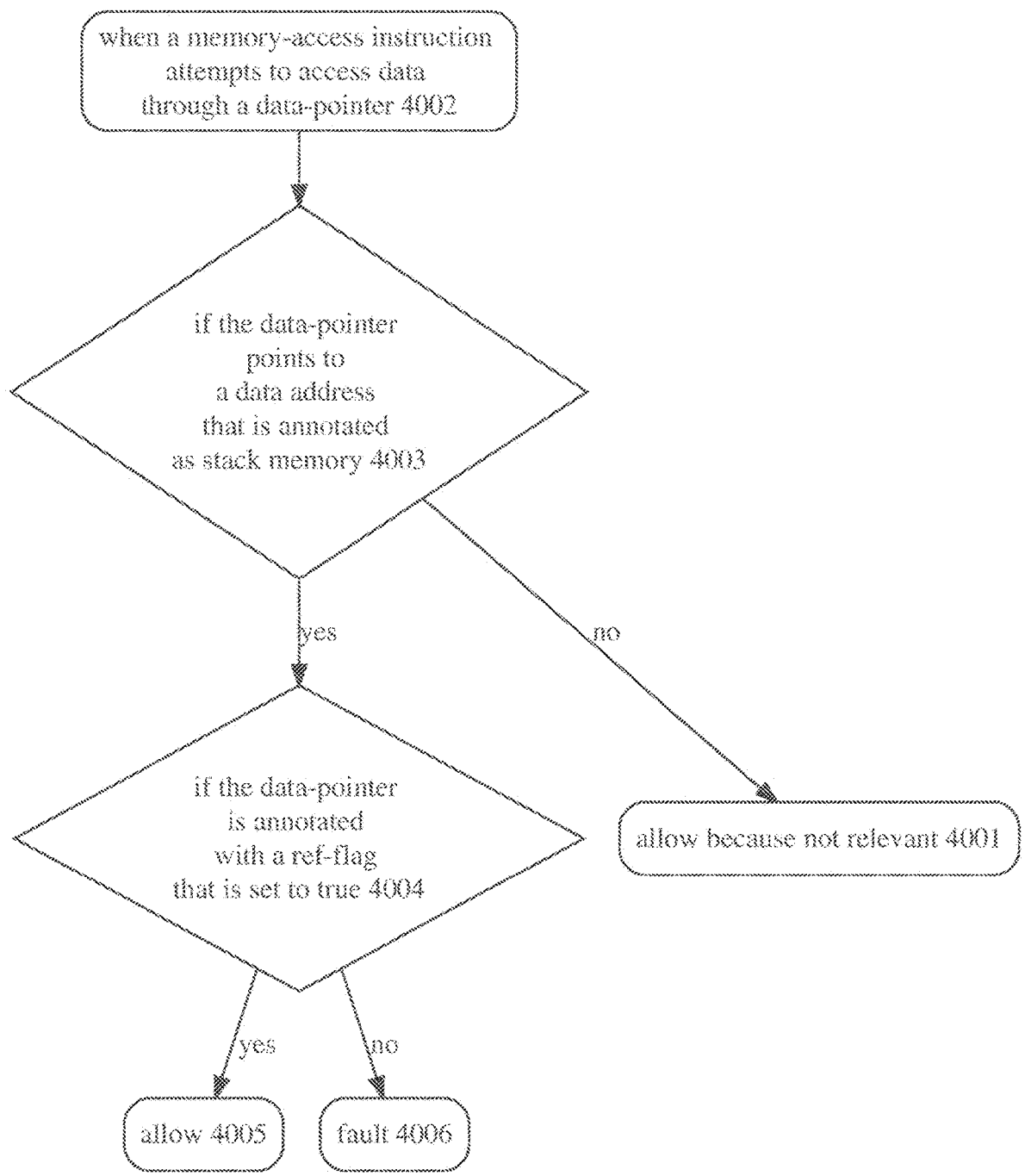
FIG. 40 shows when accessing the stack, requiring a ref-flag on the pointer.

FIG. 40: A method for regulating an execution of a program on a computer,
the computer having data addresses, some of the data addresses being stack memory,
the computer having data-pointers,
some of the data-pointers being annotated with a ref-flag,
the computer having a memory-access instruction which can access data through a data-pointer, the method comprising:
when a memory-access instruction attempts to access data through a data-pointer 4002, performing the following steps:
checking if the data-pointer points to a data address that is annotated as stack memory 4003,
if not, allowing because not relevant 4001,
if so, checking if the data-pointer is annotated with a ref-flag that is set to true 4004,
if so, allowing 4005,
if not, raising a fault 4006.

Figure 41:
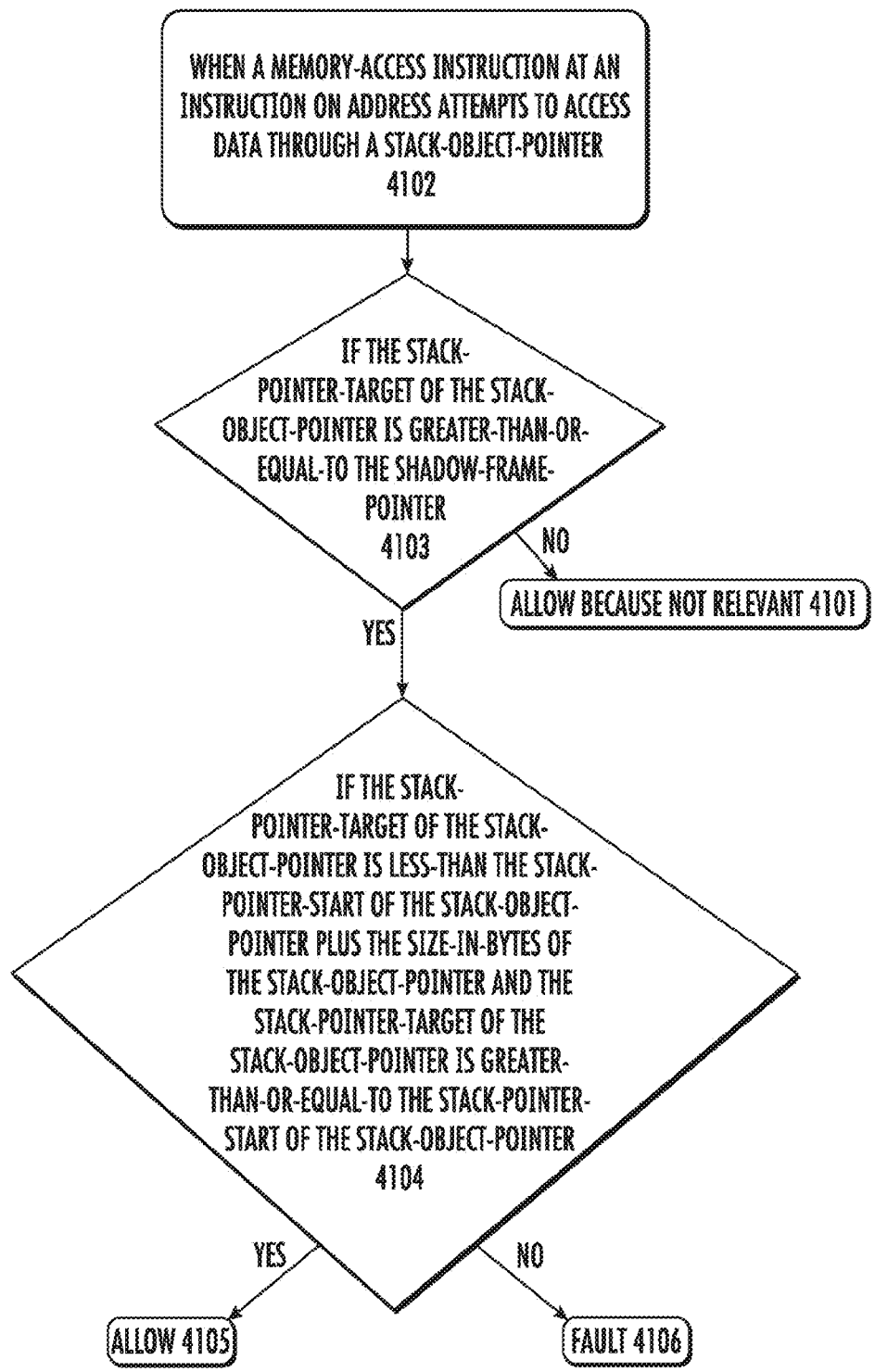
FIG. 41 shows when accessing the stack through a stack-object-pointer outside of the current frame, requiring the user of a stack-object-pointer and checking the access is within its range.

FIG. 41: A method for regulating an execution of a program on a computer,
the computer having instruction addresses and data addresses, some of the instruction addresses having instructions, some of the data addresses having data,
the computer having a stack, some data addresses being annotated as part of the stack,
the computer having a shadow-frame-pointer,
the computer having a stack-object-pointer, the stack-object-pointer having a stack-pointer-target, a stack-pointer-start, and a size-in-bytes,
the computer having a memory access instruction which accesses data through a stack-object-pointer,
the method comprising:
when a memory access instruction at an instruction address attempts to access data through a stack-object-pointer 4101, performing the following steps:
checking if the stack-limit-pointer is less-than-or-equal-to the stack-pointer-target of the stack-object-pointer; 4102 if not raising a fault 4107,
checking if the stack-pointer-target of the stack-object-pointer plus the access-width is less-than-or-equal-to the stack-base-pointer 4103; if not, raising a fault 4107,
checking if the stack-pointer-start of the stack-object-pointer is less-than-or-equal-to the stack-pointer-target of the stack-object-pointer 4104; if not, raising a fault 4107,
checking if the stack-pointer-target of the stack-object-pointer plus the access-width is less-than-or-equal-to the stack-pointer-start of the stack-object-pointer plus the size-in-bytes of the stack-object-pointer 4105; if not, raising a fault 4107,
otherwise, allowing the access 4106.

Figure 42:
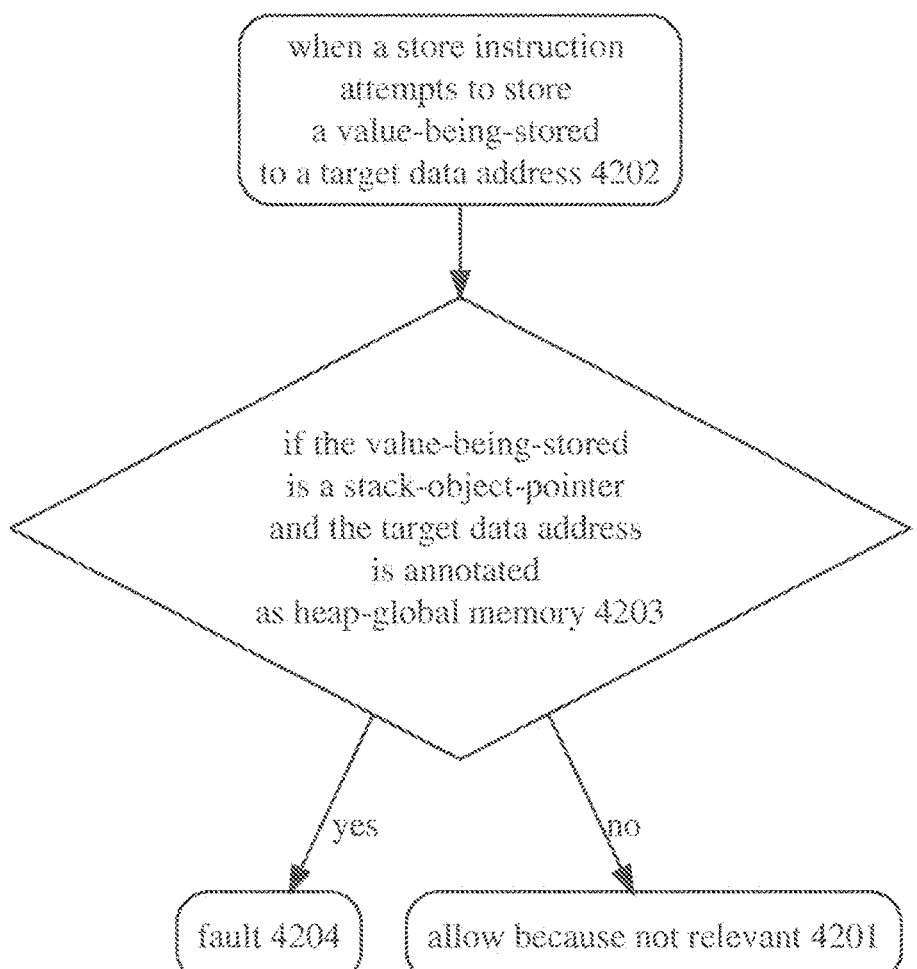
FIG. 42 shows do not allow storing a stack-object-pointer into a heap-global.

FIG. 42: The method of FIG. 41,
some of the data addresses further being annotated as heap-global memory,
the computer further having a store instruction which stores a value-being-stored to a target data address,
the method further comprising:
when a store instruction attempts to store a value-being-stored to a target data address 4202,
checking if the value-being-stored is a stack-object-pointer and the target data address is annotated as heap-global memory 4203,
if so, raising a fault 4204,
if not, allowing because not relevant 4201.

FIGS. 43*a*-43*b*: The method of FIG. 41,
the computer further having a call instruction,
the computer further having a stack-pointer,
the computer further having a s tack-object-floor,
the computer further having a protected-range-bottom,
the computer further having a narrow-pointer operation which makes a new stack-object-pointer, the narrow-pointer operation having a target-pointer parameter and a new-object-size parameter,
the method further comprising:
when the narrow-pointer operation is called with a target-pointer parameter value and a new-object-size parameter value 4302,
putting the new stack-object-floor to the minimum of the current stack-object-floor value, the target-pointer parameter value of the narrow-pointer operation, and the protected-range-bottom value 4303,
allowing because done with procedure 4301,
When the call instruction runs 4304,
checking if the stack-pointer is less-than-or-equal-to the stack-object-floor 4305,
if so, allowing 4306,
if not, raising a fault 4307.

Figure 43:
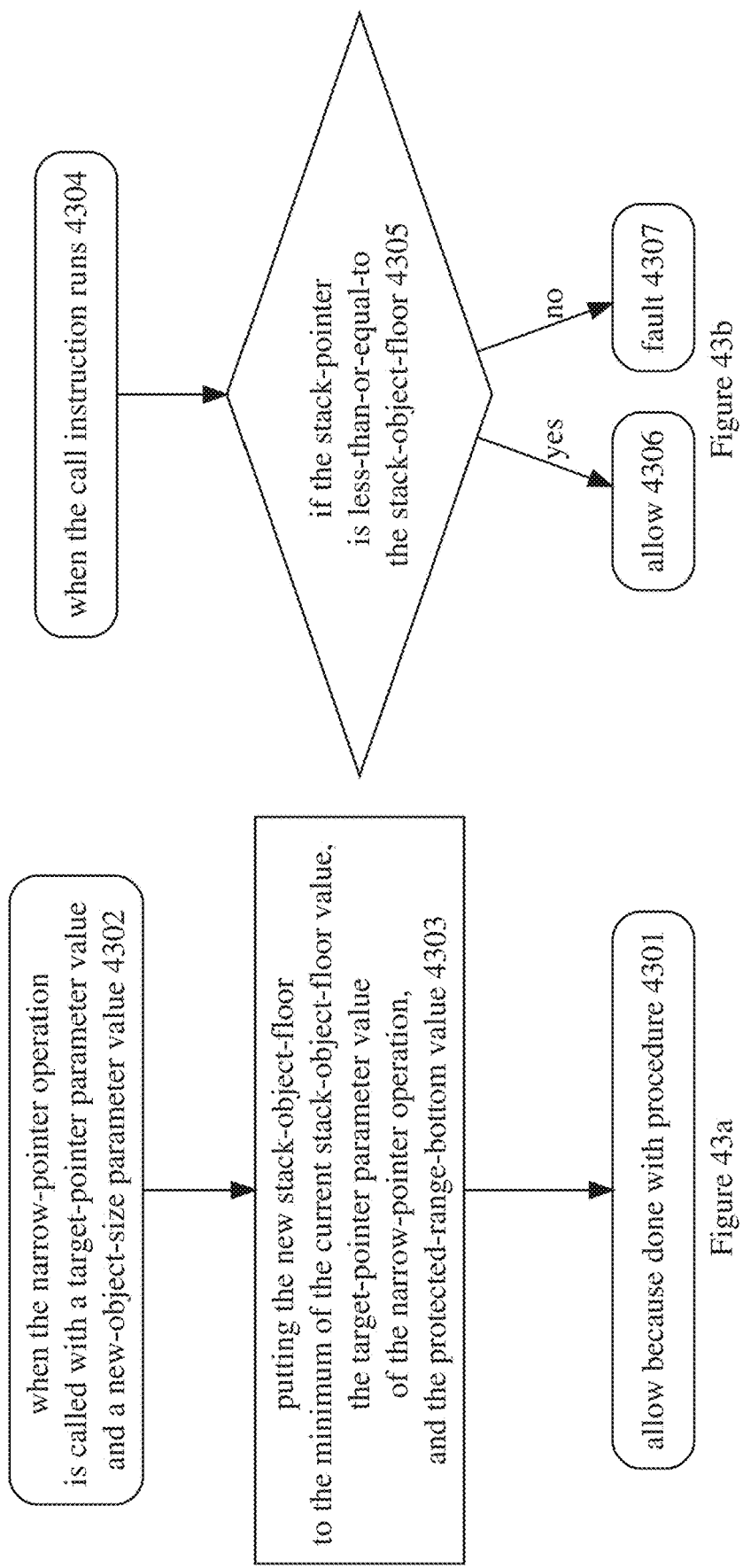
FIG. 43a shows using the narrow-pointer operation to make a stack-object-pointer.
FIG. 43b shows when the call instruction runs, allowing or faulting depending on whether the stack-pointer is less-than-or-equal-to the stack-object-floor.
Figure 44:
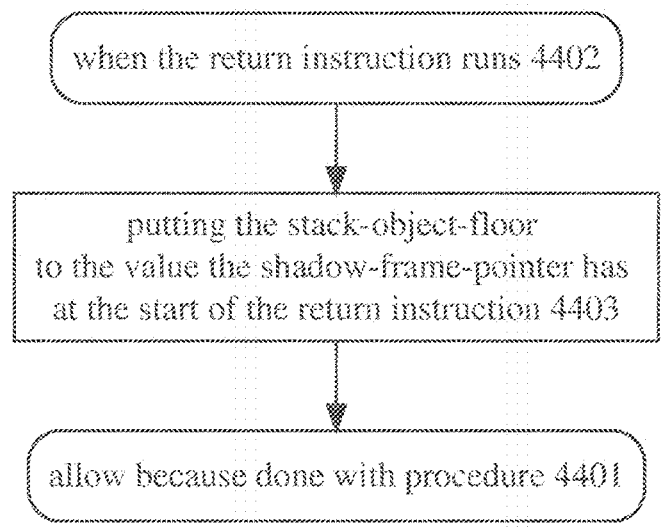
FIG. 44 shows when returning, putting the stack-object-floor to the shadow-frame-pointer.

FIG. 44: The method of FIG. 43*a*-43*b*,
the computer further having a shadow-frame-pointer,
the computer further having a return instruction,
the method further comprising:
when the return instruction runs 4402,
putting the stack-object-floor to the value the shadow-frame-pointer has at the start of the return instruction 4403.
allowing because done with procedure 4401.

Figure 45:
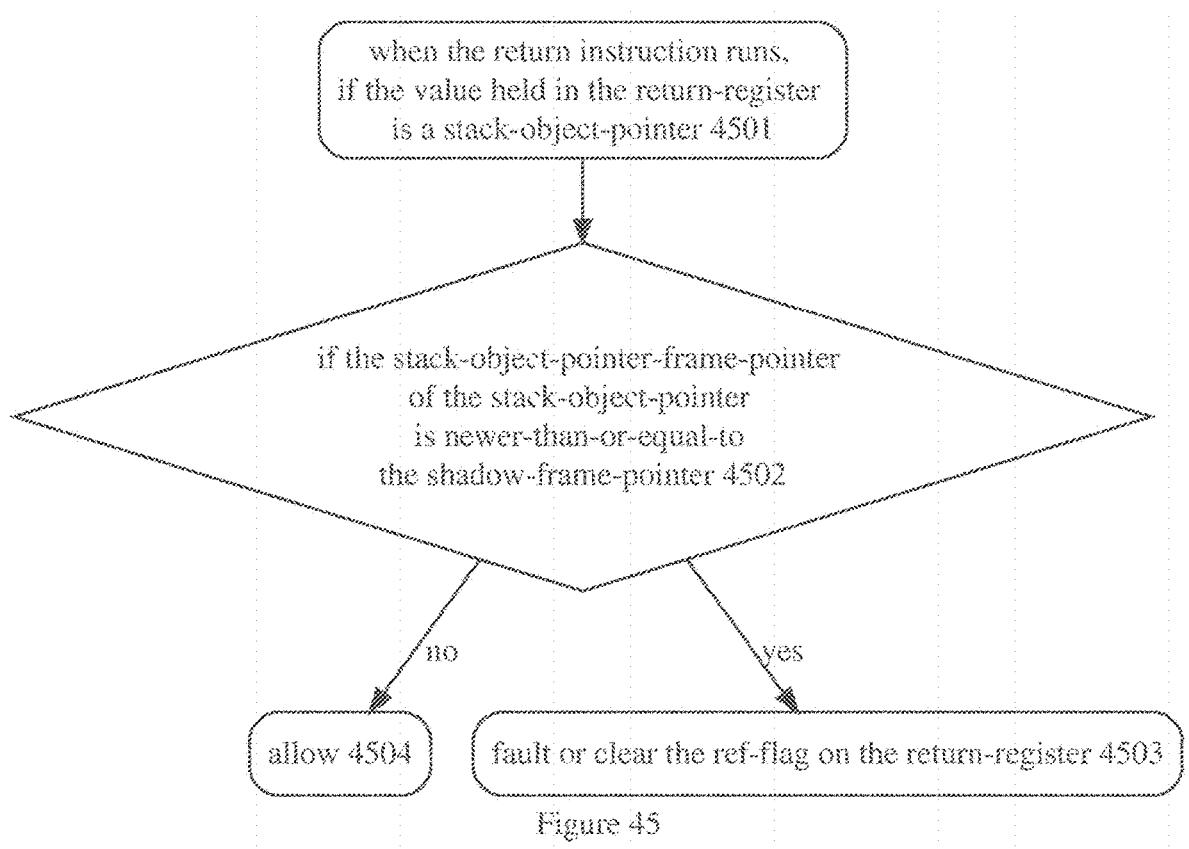
FIG. 45 shows when returning, and the value held in said return-register is a stack-object-pointer, checking the stack-object-pointer-frame-pointer vs the shadow-frame-pointer.

FIG. 45: A method for regulating an execution of a program on a computer,
the computer having a stack, some data addresses being annotated as part of the stack, the data addresses annotated as part of the stack having an newer-than-or-equal-to total order, the computer having a shadow-frame-pointer,
the computer having a stack-object-pointer, the stack-object-pointer having a stack-object-pointer-frame-pointer,
the computer having a return-register, said return-register having a ref-flag,
the computer having a return instruction,
the method comprising:
  when the return instruction runs, if the value held in the return-register is a stack-object-pointer 4501, performing the following steps:
  checking if the stack-object-pointer-frame-pointer of the stack-object-pointer is newer-than-or-equal-to the shadow-frame-pointer 4502,
  if not, allowing 4504,
  if so, raising a fault or clearing the ref-flag on the return-register 4503.

Figure 46:
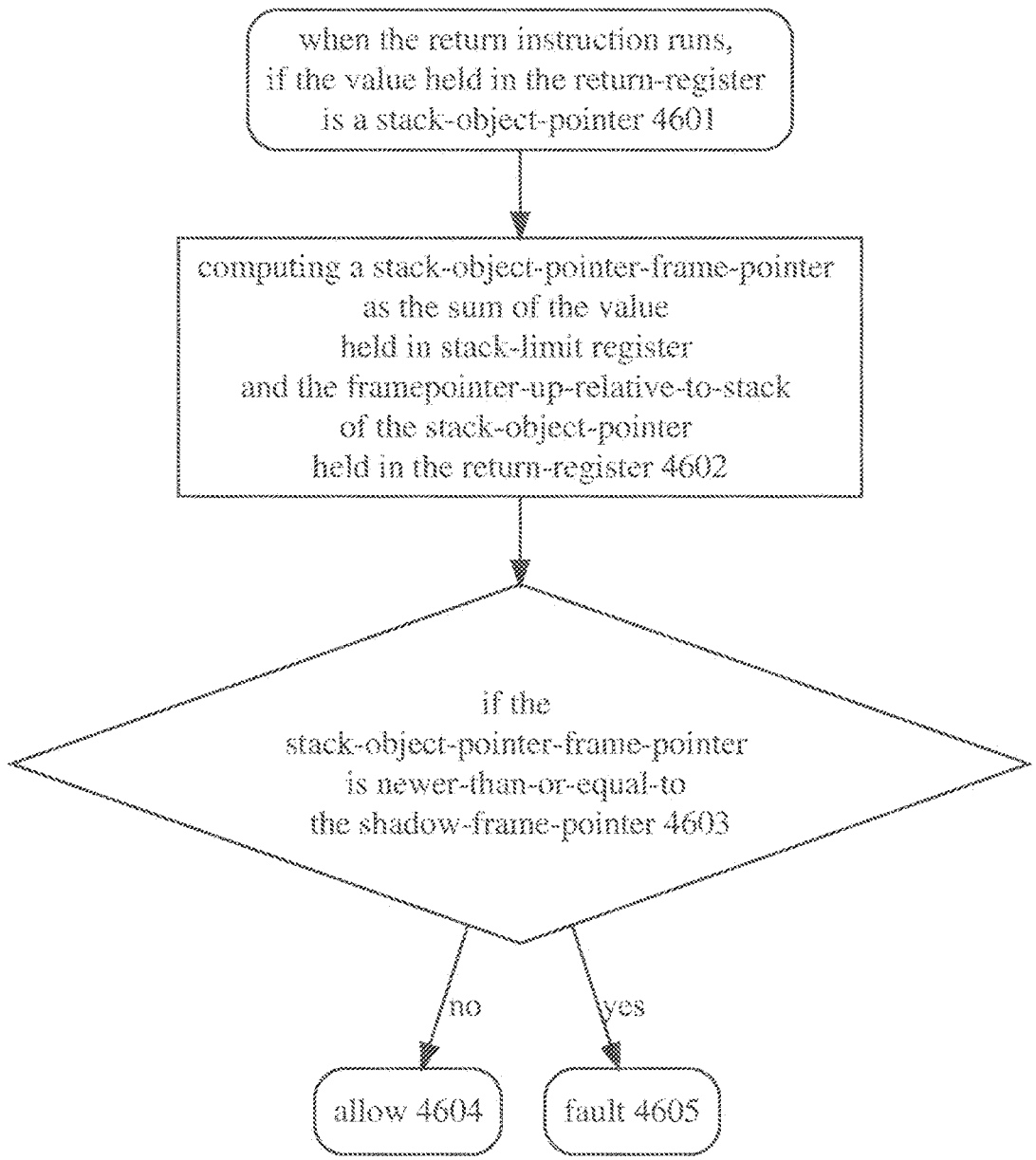
FIG. 46 shows when returning, and the value held in said return-register is a stack-object-pointer, computing the stack-object-pointer-frame-pointer from the framepointer-up-relative-to-stack, then comparing the stack-object-pointer-frame-pointer to the shadow-frame-pointer.

FIG. 46: A method for regulating an execution of a program on a computer,
  the computer having a stack, some data addresses being annotated as part of the stack, the data addresses annotated as part of the stack having an newer-than-or-equal-to total order,
  the computer having a shadow-frame-pointer,
  the computer having a stack-limit register,
  the computer having a stack-object-pointer, the stack-object-pointer having a framepointer-up-relative-to-stack,
  the computer having a return-register,
  the computer having a return instruction,
the method comprising:
  when the return instruction runs, if the value held in the return-register is a stack-object-pointer 4601, performing the following steps:
  computing a stack-object-pointer-frame-pointer as the sum of the value held in stack-limit register and the framepointer-up-relative-to-stack of the stack-object-pointer held in the return-register 4602,
  checking if the stack-object-pointer-frame-pointer is newer-than-or-equal-to the shadow-frame-pointer 4603,
  if not, allowing 4604,
  so, raising a fault 4605.

Figure 47:
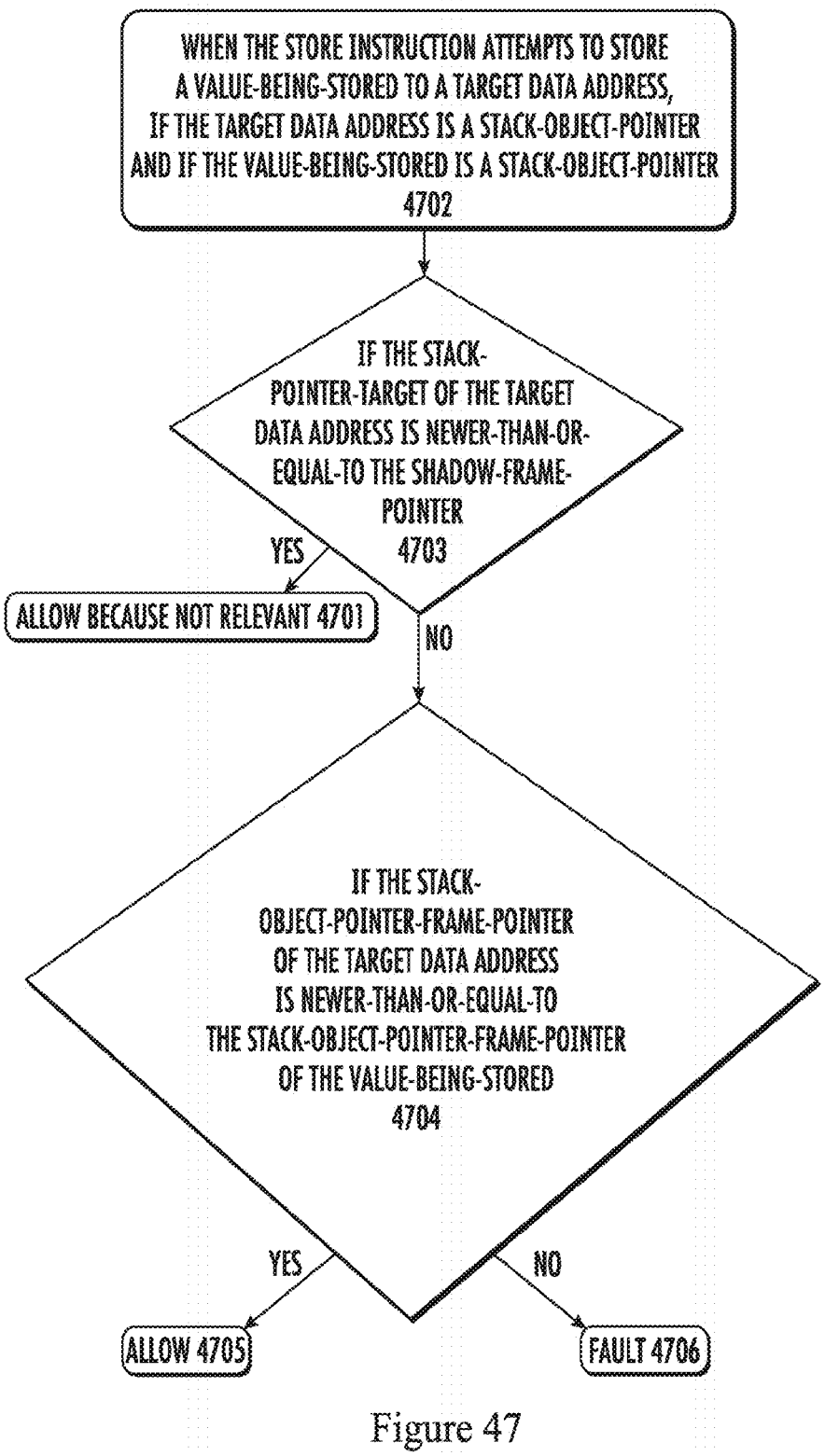
FIG. 47 shows when storing one stack object pointer value-being-stored through another to a target data address, checking if the stack-object-pointer-frame-pointer of the target data address is newer-than-or-equal-to the stack-object-pointer-frame-pointer of the value-being-stored.

FIG. 47: A method for regulating an execution of a program on a computer,
  the computer having data addresses, some of the data addresses having an newer-than-or-equal-to total order,
  the computer having a shadow-frame-pointer,
  the computer having a stack-object-pointer, the stack-object-pointer having a stack-pointer-target and a stack-object-pointer-frame-pointer,
  the computer having a store instruction which stores a value-being-stored to a target data address,
the method comprising:
  when the store instruction attempts to store a value-being-stored to a target data address, if the target data address is a stack-object-pointer and if the value-being-stored is a stack-object-pointer 4702, performing the following steps:
  checking if the stack-pointer-target of the target data address is newer-than-or-equal-to the shadow-frame-pointer 4703.
  allowing because not relevant 4701,
  if not, checking if the stack-object-pointer-frame-pointer of the target data address is newer-than-or-equal-to the stack-object-pointer-frame-pointer of the value-being-stored 4704,
  if so, allowing 4705,
  if not, raising a fault 4706, FIG. 48: A method for regulating an execution of a program on a computer,
  the computer having data addresses, some of the data addresses having an newer-than-or-equal-to total order,
  the computer having a shadow-frame-pointer,
  the computer having a stack-limit register,
  the computer having a stack-object-pointer, the stack-object-pointer having a stack-pointer-target and a framepointer-up-relative-to-stack,
  the computer having a store instruction which stores a value-being-stored to a target data address,
the method comprising:
  when the store instruction attempts to store a value-being-stored to a target data address, if the target data address is a stack-object-pointer and if the value-being-stored is a stack-object-pointer 4802, performing the following steps:
  checking if the stack-pointer-target of the target data address is newer-than-or-equal-to the shadow-frame-pointer 4803,
  if so, allowing because not relevant 4801.
  if not, then proceeding as follows:
  computing a stack-object-pointer-frame-pointer of the target data address as the sum of the stack-limit register and the framepointer-up-relative-to-stack of the target data address stack-object-pointer, and 4804
  computing a stack-object-pointer-frame-pointer of the value-being-stored as the sum of the stack-limit register and the framepointer-up-relative-to-stack of the value-being-stored stack-object-pointer 4805,
  checking if the stack-object-pointer-frame-pointer of the target data address is newer-than-or-equal-to the stack-object-pointer-frame-pointer of the value-being-stored 4806,
  allowing 4807,
  if not, raising a fault 4808.

Figure 49B:
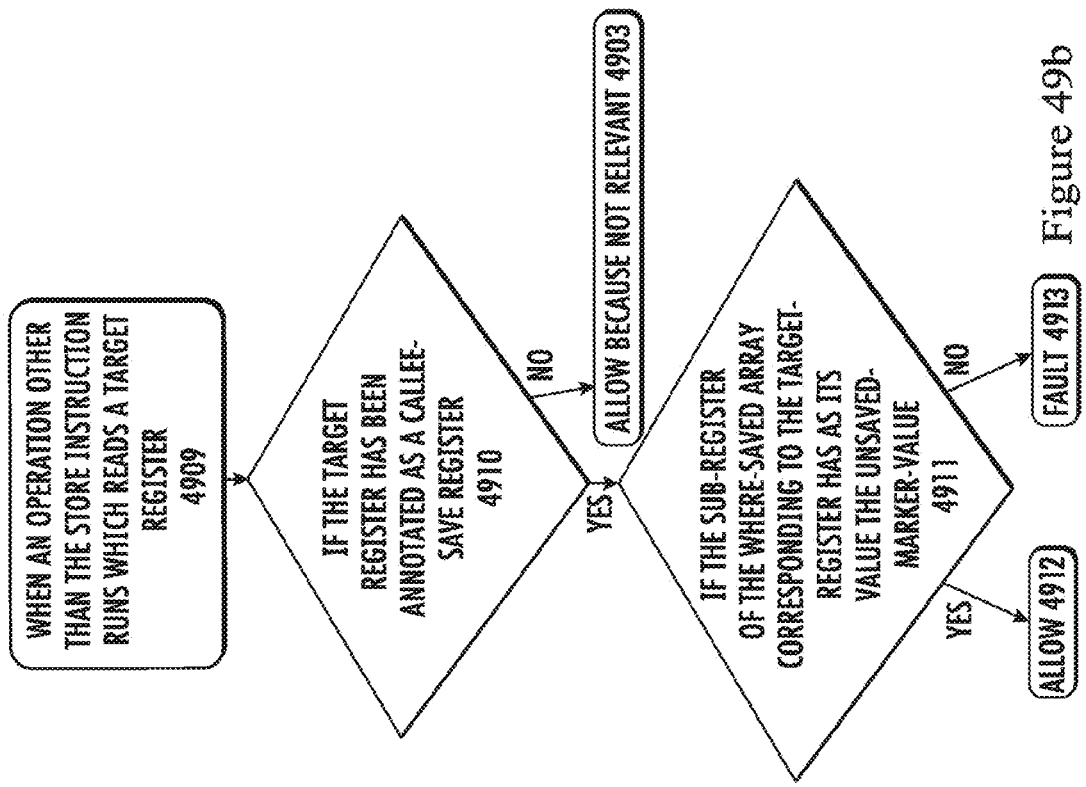
FIG. 49b shows when a operation other than the store instruction runs which reads a target register.
Figure 49A:
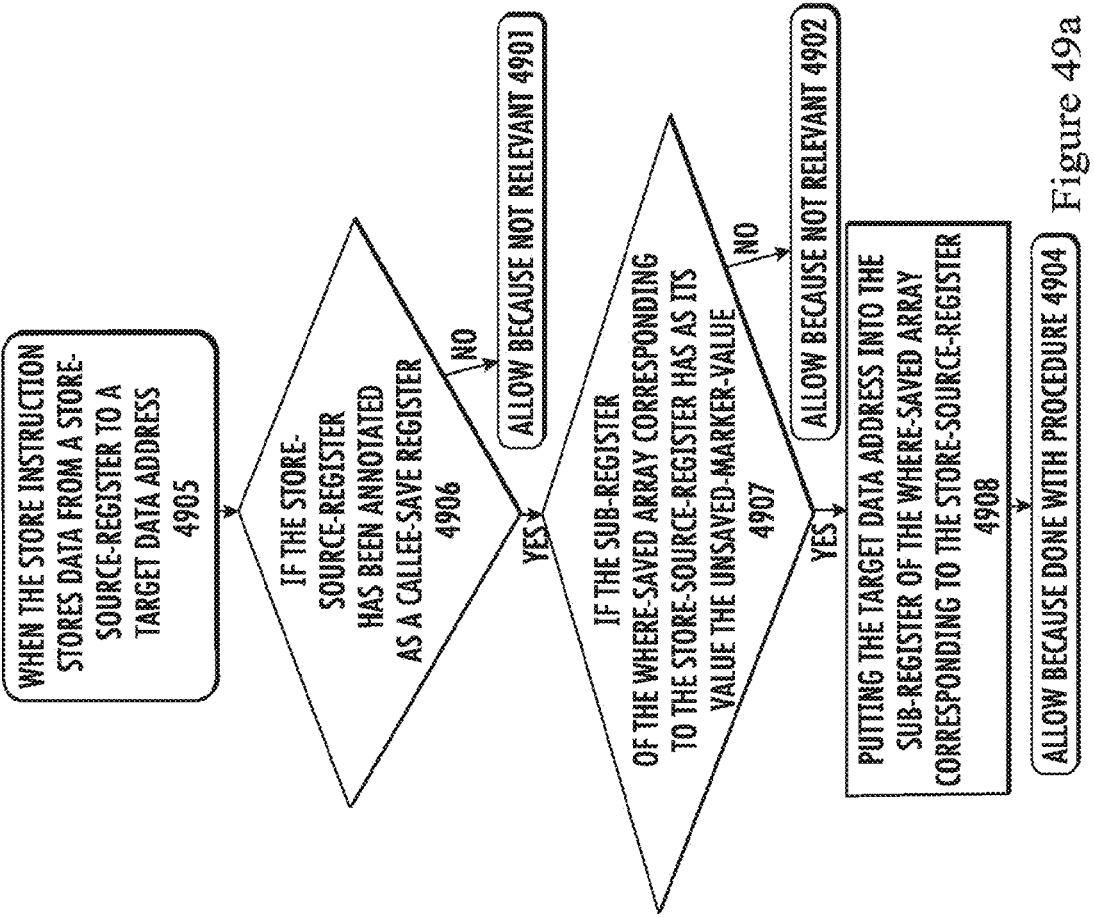
FIG. 49a shows when a callee-save register is saved, using the where-saved array to record where.
Figure 50:
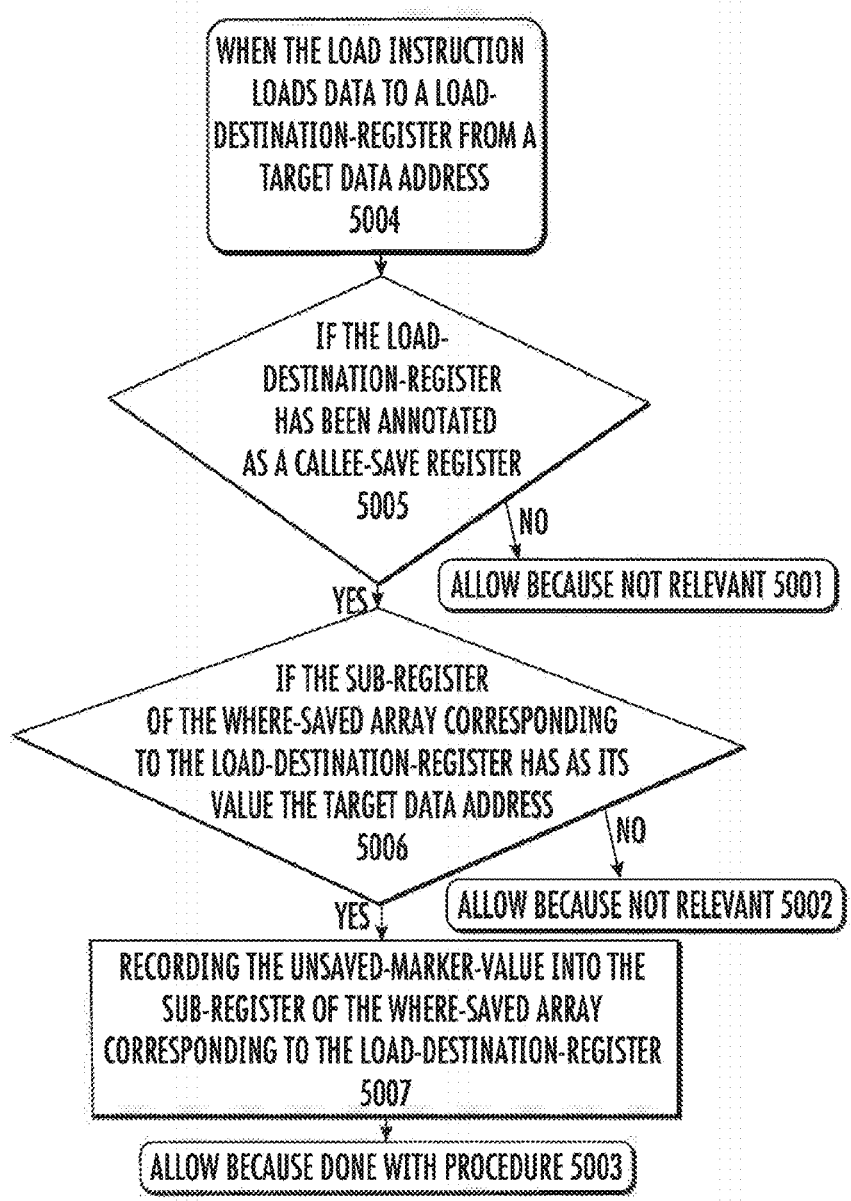
FIG. 50 shows when a callee-save register is restored, recording that fact in the where-saved array.
Figure 51:
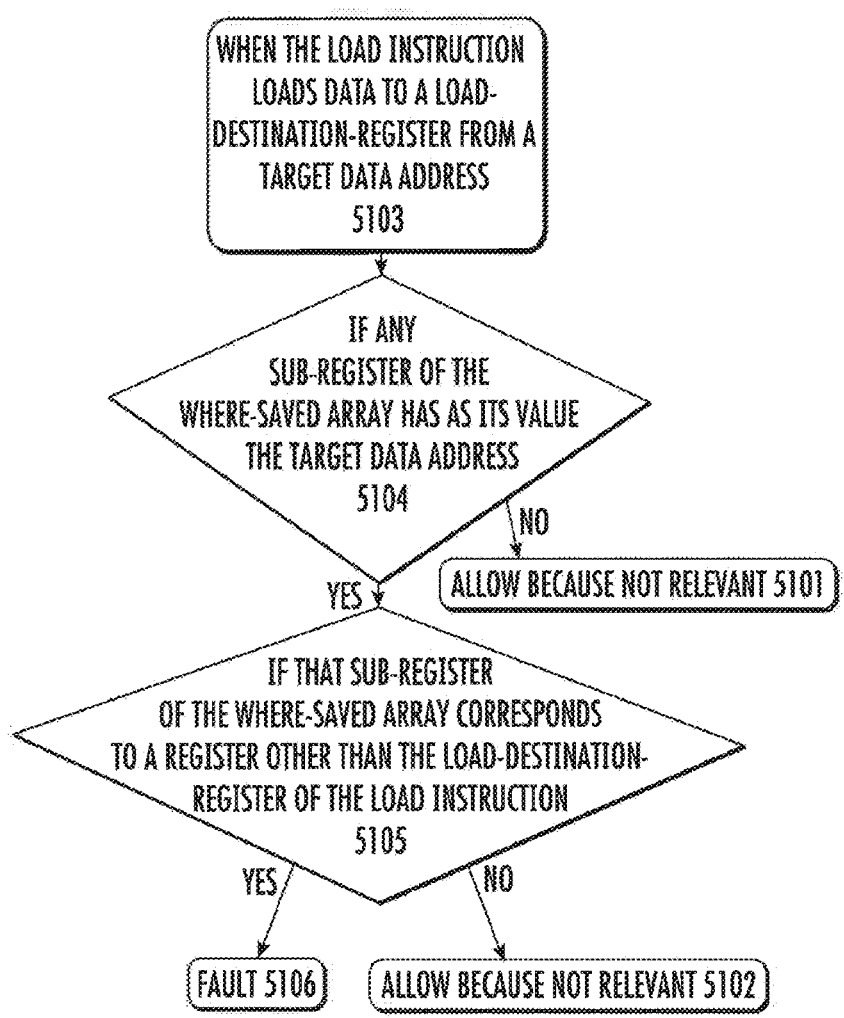
FIG. 51 shows when a callee-save register is restored, checking that it is restored from the correct stack location.
Figure 52:
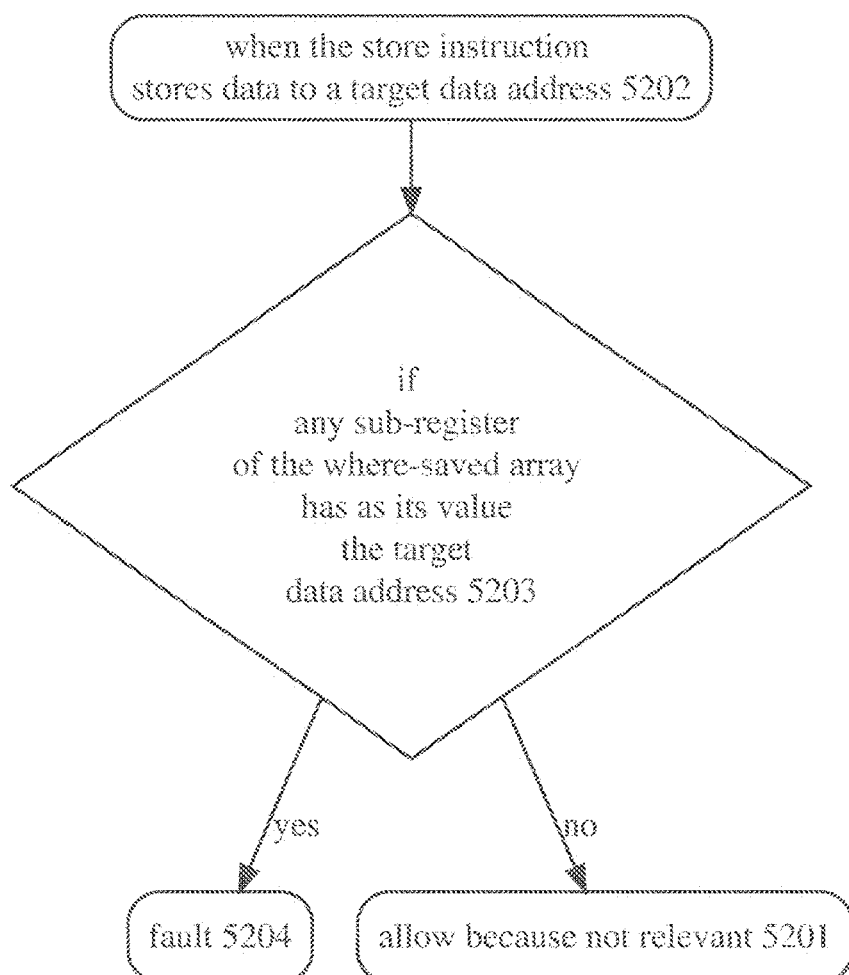
FIG. 52 shows when a callee-save register is saved, checking that another callee-save register has not been saved at the same location.
Figure 57A:
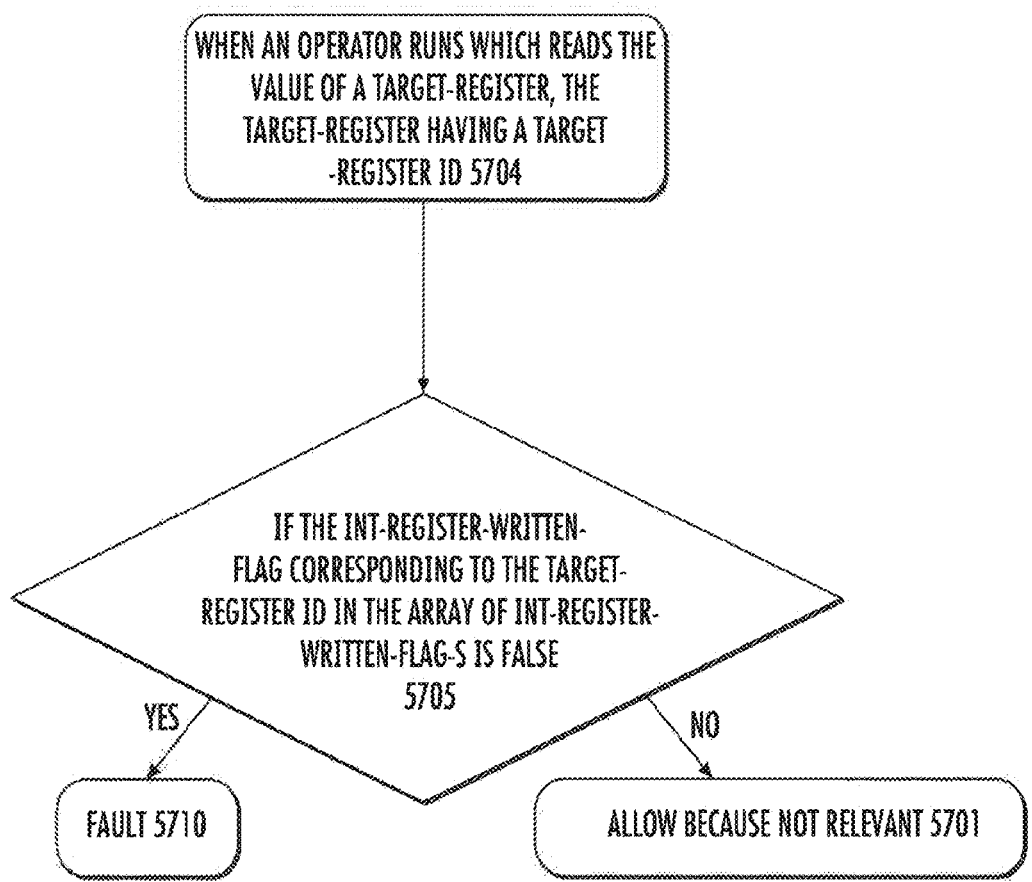
FIG. 57a shows when reading a register, checking its int-register-written-flag and faulting if the flag is not set.
Figure 58A:
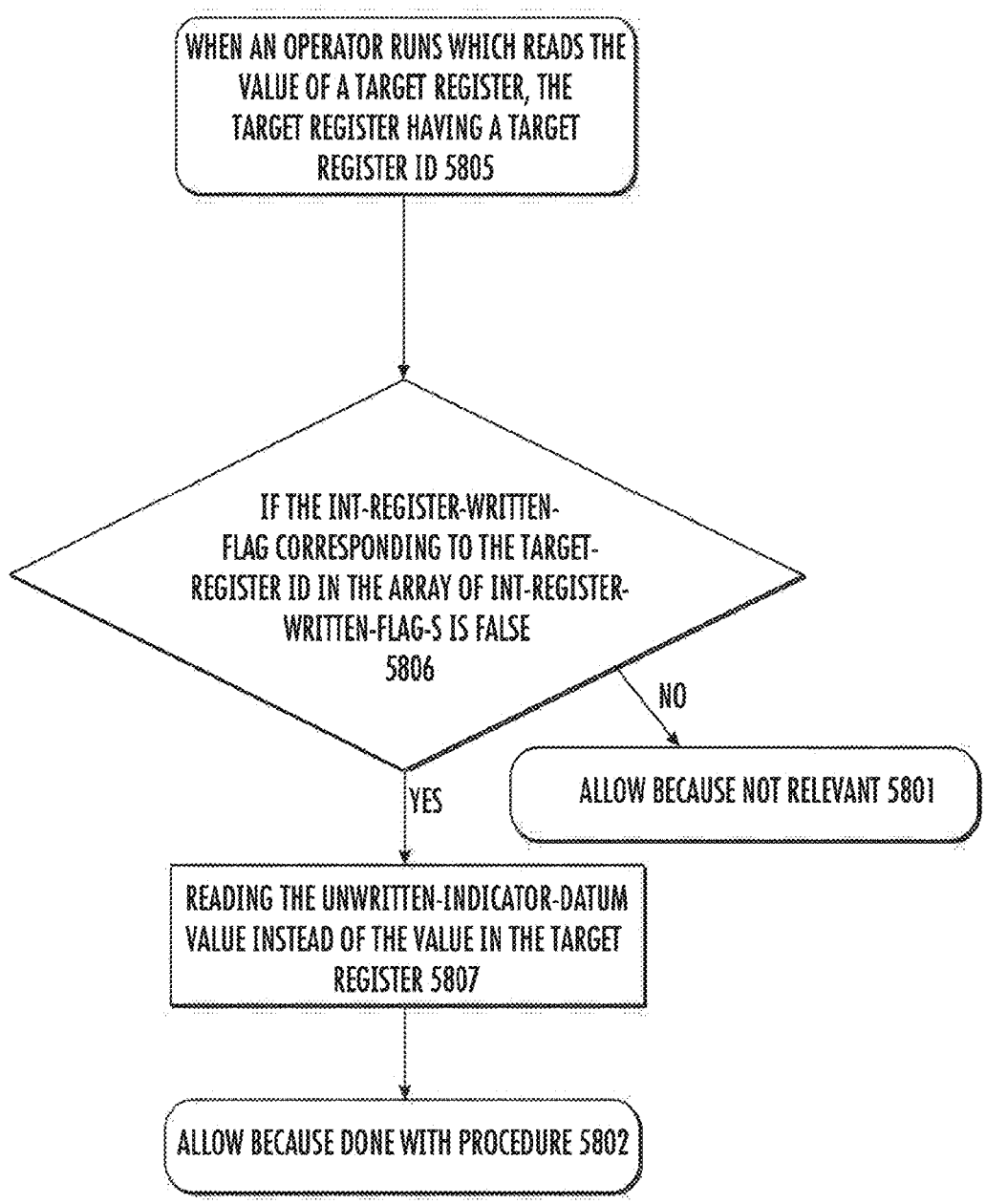
FIG. 58a shows when reading a register, checking its int-register-written-flag, and reading the unwritten-indicator-datum value if the flag is not set.
Figure 59A:
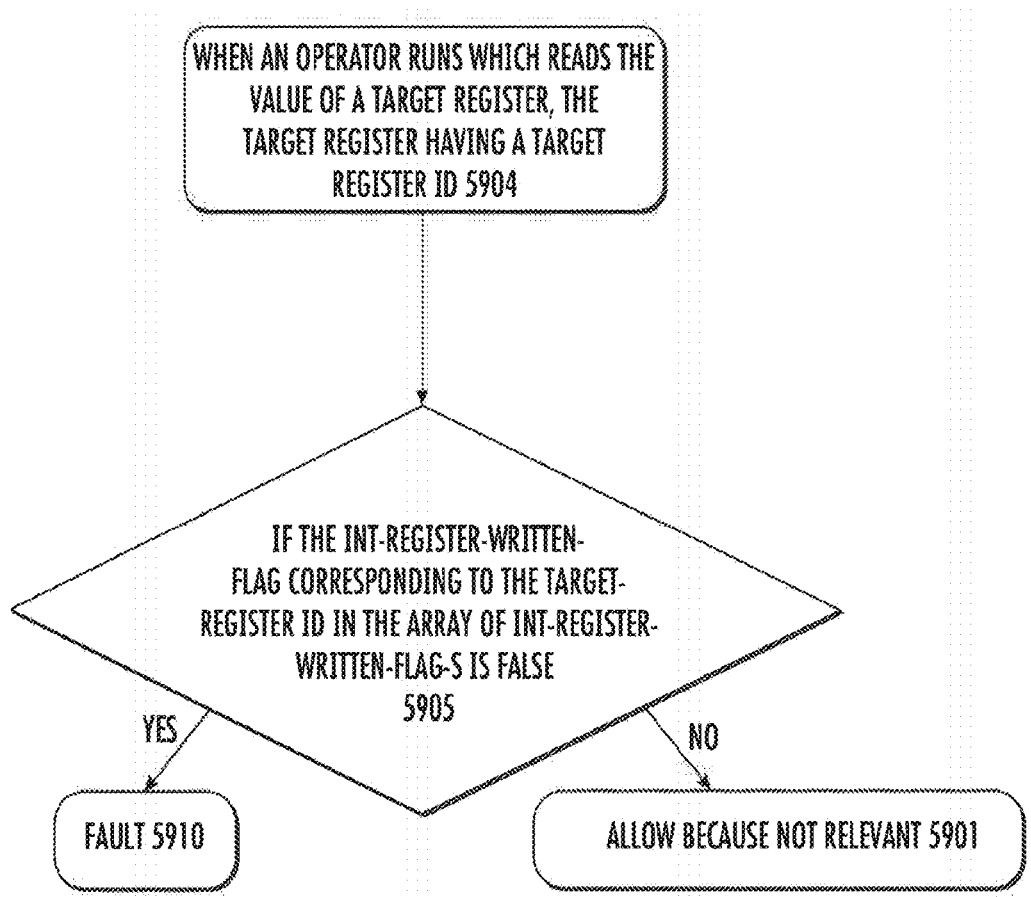
FIG. 59a shows when reading a register, checking it has a set int-register-written-flag and if not raising a fault.
Figure 60A:
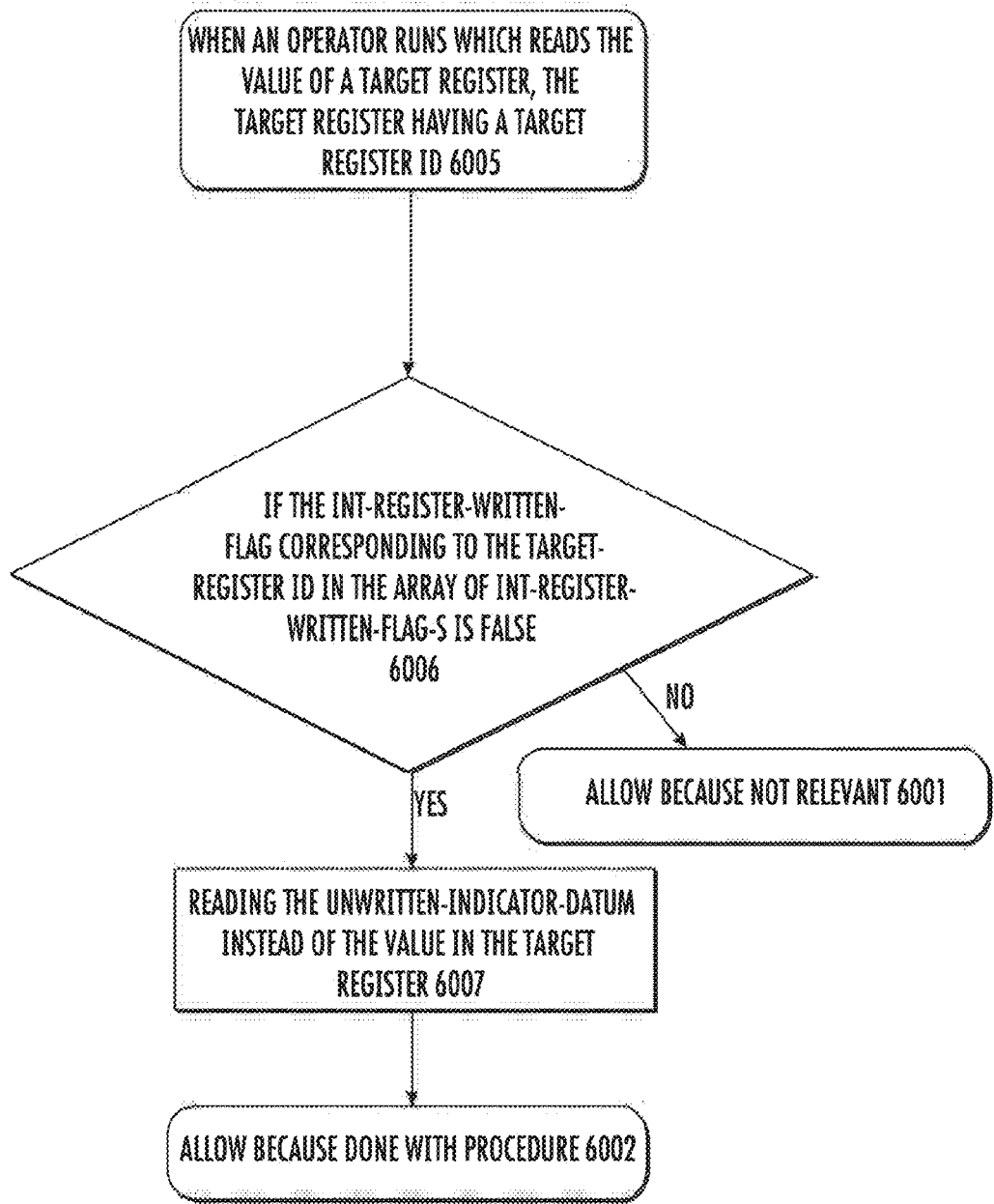
FIG. 60a shows when reading a register, checking it has a set int-register-written-flag and if not returning the unwritten-indicator-datum.

FIGS. 49a-49b: A method for regulating an execution of a program on a computer,
  the computer having data addresses, some of the data addresses having data,
  the computer having at least one register annotated as a callee-save register,
  the computer having a where-saved array, the where-saved array having a sub-register corresponding to each of the at least one register annotated as a callee-save register, the computer having an unsaved-marker-value which may be stored in a where-saved array sub-register and which does not correspond to any target data address,
  the computer having a store instruction which stores data from a store-source-register to a target data address,
the method comprising:
  when the store instruction stores data from a store-source-register to a target data address 4905,
  checking if the store-source-register has been annotated as a callee-save register 4906,
  if not, allowing because not relevant 4901,
  if so, checking if the sub-register of the where-saved array corresponding to the store-source-register has as its value the unsaved-marker-value 4907,
  if not, allowing because not relevant 4902,
  if so, putting the target data address into the sub-register of the where-saved array corresponding to the store-source-register 4903, allowing because done with procedure 4904,
when an operation other than the store instruction runs which reads a target register 4909,
checking if the target register has been annotated as a callee-save register 4910,
if not, allowing because not relevant 4903,
if so, checking if the sub-register of the where-saved array corresponding to the target register has as its value the unsaved-marker-value 4911,
if not, allowing 4912,
if so, raising a faith 4913.
FIG. 50: The method of FIGS. 49a-49b.
the computer further having a load instruction which loads data to a load-destination-register from a target data address,
the method further comprising:
when the load instruction loads data to a load-destination-register from a target data address 5004,
checking if the load-destination-register has been annotated as a callee-save register 5005,
if not, allowing because not relevant 5001,
if so, checking if the sub-register of the where-saved array corresponding to the load-destination-register has as its value the target data address 5006,
if not, allowing because not relevant 5002,
if so, recording the unsaved-marker-value into the sub-register of the where-saved array corresponding to the load-destination-register 5007,
allowing because done with procedure 5003.
FIG. 51: The method of FIG. 50, the method further comprising:
when the load instruction loads data to a load-destination-register from a target data address 5103,
checking if any sub-register of the where-saved array has as its value the target data address 5104,
if not, allowing because not relevant 5101,
if so, checking if that sub-register of the where-saved array corresponds to a register other than the load-destination-register of the load instruction 5105,
if so, raising a fault 5106,
if not, allowing because not relevant 5102.
FIG. 52: The method of FIG. 50, the method further comprising.
when the store instruction stores data to a target data address 5202,
checking if any sub-register of the where-saved array has as its value the target data address 5203,
if so, raisin? a fault 5204,
if not, allowing because not relevant 5201,
FIG. 53: The method of FIG. 50,
the computer further having a return instruction,
the method further comprising:
when the return instruction runs 5302,
checking if all sub-registers of the where-saved array have as their value the unsaved-marker-value 5303,
if so, allowing because not relevant 5301,
if not, raising a fault 5304.
FIG. 54: The method of FIG. 41,
the stack-object-pointer further having a writable-target-flag,
the computer further having a store instruction which stores data through a stack-object-pointer,
the method further comprising:
when a store instruction attempts to store data through a stack-object-pointer 5402,
checking if the stack-object-pointer has a clear writable-target-flag 5403,
if so, raising a fault 5404,
if not, allowing because not relevant 5401.
FIGS. 55a-55b: The method of FIGS. 49a-49b,
the computer further having a may-restore-flag,
the computer further having a restore-callee-save-reg-state operator,
the computer further having an operation which writes a target register,
the method further comprising:
when an operation runs which writes a call ee-save target register, and the sub-register of the where-saved array corresponding to the callee-save target register has the unsaved-marker-value 5502,
clearing the may-restore-flag to false 5503,
allowing because done with procedure 5501,
when the restore-callee-save-reg-state operator runs 5504,
checking if the may-restore-flag is true 5505,
if so, allowing 5506,
if not, raising a fault 5507.
FIGS. 56a-56e: The method of FIGS. 49a-49b,
a the computer further having an operation which writes a target register,
the computer further having a for-this-func-flag,
the computer further having a call instruction and a return instruction,
the computer further having a save-callee-save-reg-state operator and a restore-callee-save-reg-state operator,
the method further comprising:
a when the call instruction runs 5605,
a checking if the for-this-func-flag is true 5606,
if not, raising a fault 5623,
if so, clearing the for-this-func-flag to false 5607,
allowing because done with procedure 5602,
when the save-callee-save-reg-stag; operator runs 5608,
checking if the for-this-func-flag is true 5624,
if so, raising a fault 5625,
if not, setting the for-this-func-flag to true 5609,
allowing because done with procedure 5603,
when an operation runs which accesses a target register 5610,
if the target register is annotated as a callee-save register 5611,
if not, allowing because not relevant 5601,
if so, checking if the for-this-func-flag is true 5612,
if so, allowing 5613,
if not, raising a fault 5614,
when the restore callee-save-reg-state operator runs 5615,
checking the for-this-func-flag is true 5616,
if so, allowing 5618 (note that there is no need to clear the for-this-func flag here as the callee-save-reg-state being restored holds that flag and, at the time it was saved Hard Object checked that it was false 5624, and if it was not, faulted instead 5625),
if not, raising a fault 5617,
when the return instruction runs 5619,
checking if the for-this-funk-flag is false 5620,
if not, raising a fault 5622,
if so, setting the for-this-func-flag to true 5621,
allowing because done with procedure 5604.
FIGS. 57a-57c: A method for regulating an execution of a program on a computer,
the computer having at least one integer-register, each of the at least one integer-register-s having a unique register-id,
the computer having an array of int-register-written-flag-s, one corresponding to each at least one integer-register, the computer having an array of ok-to-return-flag-s, one
corresponding to each at least one integer-register,
the computer having a set-ok-to-return-flag operator, the
set-ok-to-return-flag operator having a target register-id
parameter,
the computer having at least one operator which reads the
value of a target register, the target register having a
target register id,
the computer having a return instruction,
the method comprising:
when an operator runs which reads the value of a target
register, the target register having a target register id
5704,
checking if the int-register-written-flag corresponding to
the target register id in the array of int-register-written-
hags is false 5705,
if so, raising a fault 5710,
if not, allowing because not relevant 5701,
when the set-ok-to-return-flag operator is called with a
target register-id parameter value 5706,
setting the ok-to-return-flag in the array of ok-to-return-
flag-s corresponding to the integer register having the
target register-id parameter value 5707,
allowing because done with procedure 5702,
when the return instruction rims 5708,
clearing to false any int-register-written-flag-s which cor-
respond to any register-ids which correspond to a false
ok-to-return-flag 5709,
allowing because done with procedure 5703.
FIGS. 58*a*-58*c*: A method for regulating an execution of
a program on a computer,
the computer having at least one integer-register, each at
least one integer-register having a unique register-id,
the computer having an array of int-register-written-flag-
s, one corresponding to each at least one integer-
register,
the computer having an array of ok-to-return-flag-s, one
corresponding to each at least one integer-register,
the computer having a set-irk-to-return-flag operator, the
set-ok-to-return-flag operator having a target register-id
parameter,
the computer having at least one operator which reads the
value of a target register,
the target register having a target register id,
the computer having an unwritten-indicator-datum,
the computer having a return instruction,
the method comprising:
when an operator runs which reads the value of a target
register, the target register having a target register id
5805,
checking if the int-register-written-flag corresponding to
the target register id in the array of int-register-written-
flag-s is false 5806,
if not, allowing because not relevant 5801,
if so, reading the unwritten-indicator-datum value instead
of the value in the target register 5807,
allowing because done with procedure 5802,
when the set-ok-to-return-flag operator is called with a
target register-id parameter value 5808,
setting the irk-to-return-hag in the array of ok-to-return-
flag-s corresponding to the integer register having the
target register-id parameter value 5809,
allowing because done with procedure 5803,
when the return instruction runs 5810,
clearing to false any int-register-written-flag-s which cor-
respond to any register-ids which correspond to a false
ok-to-return-flag 5811,
allowing because done with procedure 5804.
FIGS. 59*a*-59*c*: A method for regulating an execution of
a program on a computer,
the computer having at least one integer-register, each at
least one integer-register having a unique register-id,
the computer having an array of int-register-written-flag-
s, one corresponding to each at least one integer-
register,
the computer having an array of ok-to-call-flag-s, one
corresponding to each at least one integer-register,
the computer having a set-ok-to-call-flag operator, the
set-ole-to-call-flag operator having a target register-id
parameter,
the computer having at least one operator which reads the
value of a target register, the target register having a
target register id,
the computer having a call instruction,
the method comprising:
when an operator runs which reads the value of a target
register, the target register having a target register id
5904,
checking if the int-register-written-flag corresponding to
the target register id in the array of int-register-written-
flag-s is false 5905,
if so, raising a fault 5910,
if not, allowing because not relevant 5901,
when the set-ok-to-call-flag operator is called with a
target register-id parameter value 5906,
setting the ok-to-call-flag in the array of ok-to-call-flag-s
corresponding to the integer register having the target
register-id parameter value 5907,
allowing because done with procedure 5902,
when the call instruction runs 5908,
clearing to false any int-register-written-flag-s which cor-
respond to any register-ids which correspond to a false
ok-to-call-flag 5909,
allowing because done with procedure 5903.
FIGS. 60*a*-60*c*: A method for regulating an execution of
a program on a computer,
the computer having at least one integer-register, each at
least one integer-register having a unique register-id,
the computer having an array of int-register-written-flag-
s, one corresponding to each at least one integer-
register,
the computer having an array of ok-to-call-flag-s, one
corresponding to each at least one integer-register,
the computer having a set-ok-to-call-flag operator, the
set-ole-to-call-flag operator having a target register-id
parameter,
the computer having at least one operator which reads the
value of a target register, the target register having a
target register id,
the computer having an unwritten-indicator-datum,
the computer having a call instruction,
the method comprising:
when an operator runs which reads the value of a target
register, the target register having a target register id
6005,
checking if the int-register-written-flag corresponding to
the target register id in the array of int-register-written-
flag-s is false 6006,
if not, allowing because not relevant 6001,
if so, reading the unwritten-indicator-datum instead of the
value in the target register 6007,
allowing because done with procedure 6002,
when the set-ok-to-call-flag operator is called with a
target register-id parameter value 6008,

99 setting the ok-to-call-flag in the array of ok-to-call-flag-s corresponding to the integer register having the target register-id parameter value 6009,
allowing because done with procedure 6003,
when the call instruction runs 6010,
clearing to false any int-register-written-flag-s which correspond to any register-ids which correspond to a false ok-to-call-flag 6011,
allowing because done with procedure 6004.

Figure 61A:
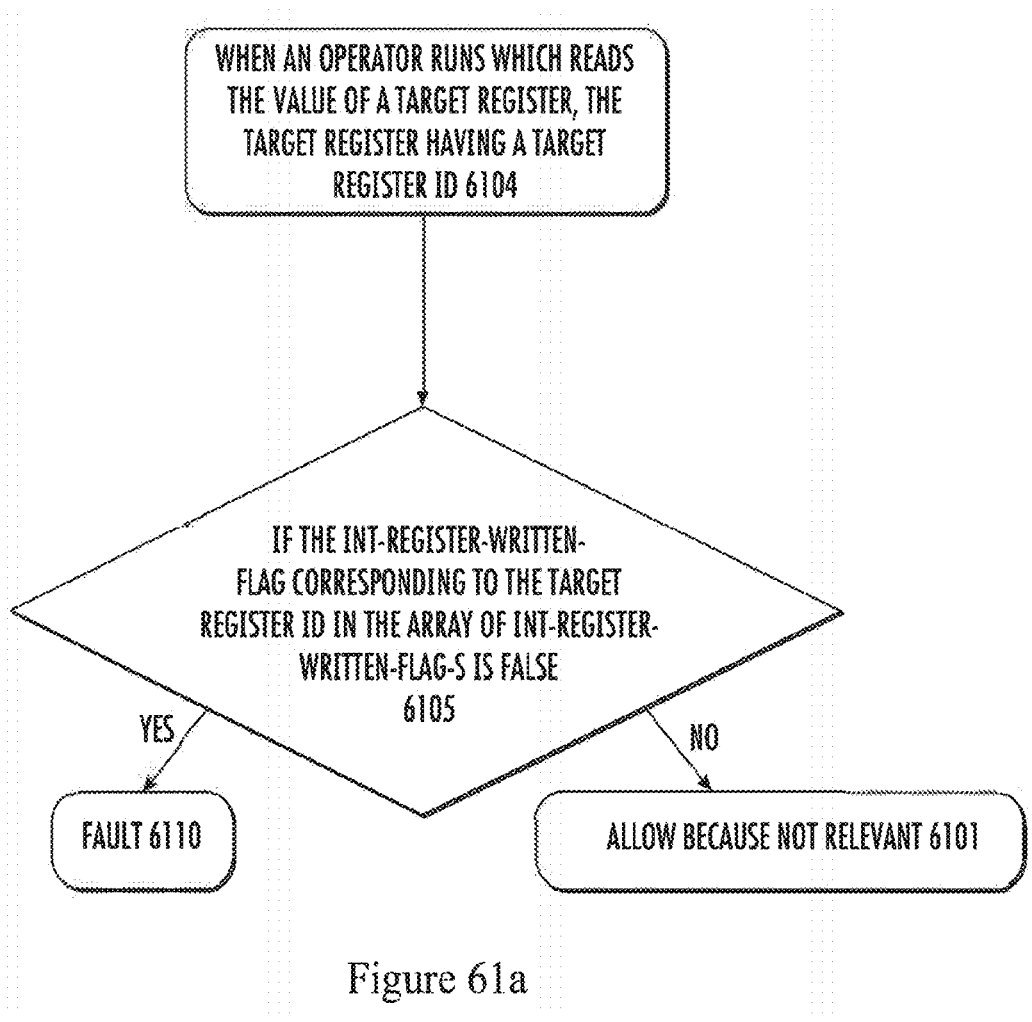
FIG. 61a shows when reading a register, checking it has a set int-register-written-flag and if not raising a fault.
Figure 61C:
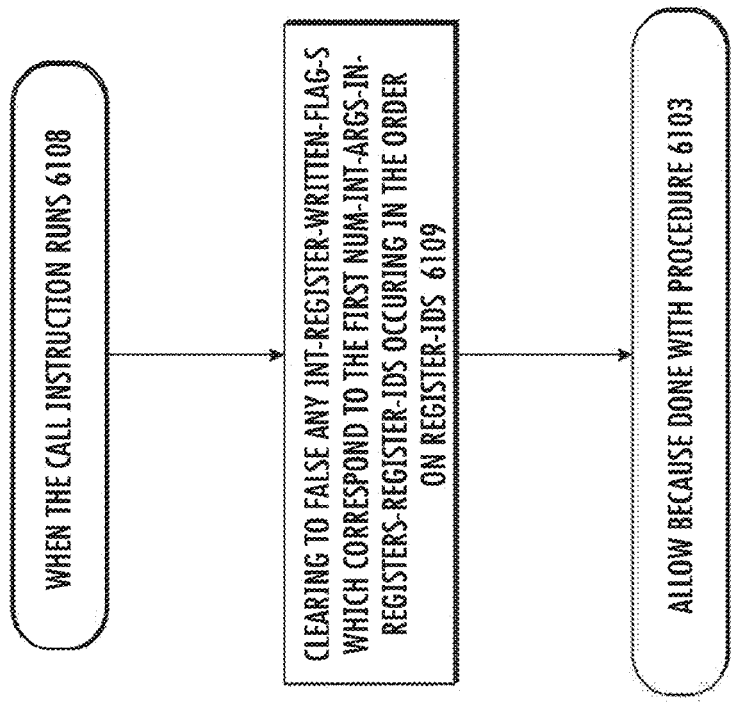
FIG. 61c shows when calling a function, clear the int-register-written-flag on the first num-int-args-in-registers argument registers.
Figure 61B:
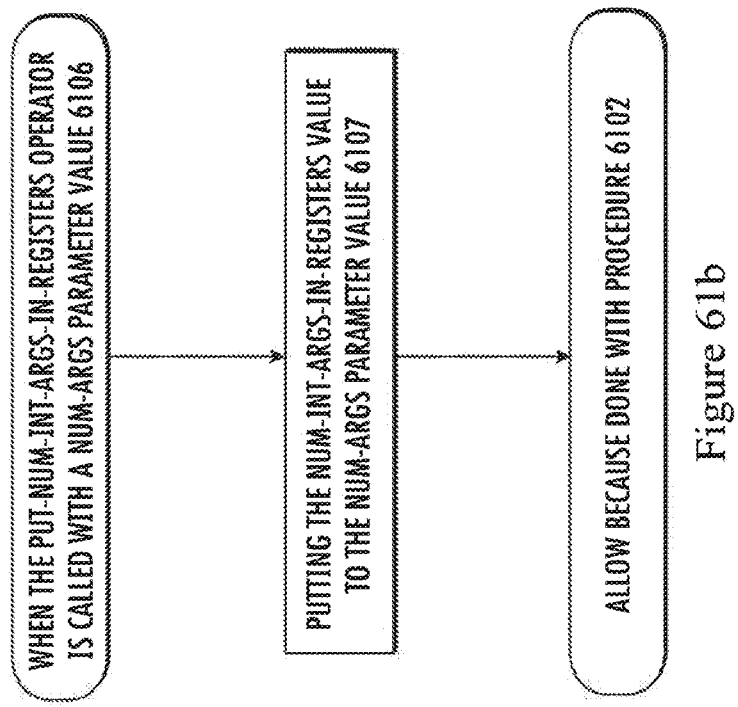
FIG. 61b shows when the put-num-int-args-in-registers operator is called with a num-args parameter value, putting the num-int-args-in-registers value to the num-args parameter value.

FIGS. 61*a*-61*c*: A method for regulating an execution of a program on a computer,
the computer having at least one integer-register, each at least one integer-register having a unique register-id, the register-ids being ordered,
the computer having an array of int-register-written-flag-s, one corresponding to each at least one integer-register,
the computer having a num-int-args-in-registers,
the computer having a put-num-int-args-in-registers operator, the put-num-int-args-in-registers operator having a num-args parameter,
the computer having at least one operator which reads the value of a target register, the target register having a target register id,
the computer having a call instruction,
the method comprising:
when an operator runs which reads the value of a target register, the target register having a target register id 6104,
checking if the int-register-written-flag corresponding to the target register id in the array of int-register-written-flag-s is false 6105,
if so, raising a fault 6110,
if not, allowing because not relevant 6101,
when the put-num-int-args-in-registers operator is called with a num-args parameter value 6106,
putting the num-int-args-in-registers value to the num-args parameter value 6107, allowing because done with procedure 6102,
when the call instruction runs 6108,
clearing to false any int-register-written-flag-s which correspond to the first num-int-args-in-registers register-ids occurring in the order on register-ids 6109,
allowing because done with procedure 6103.

Figure 62A:
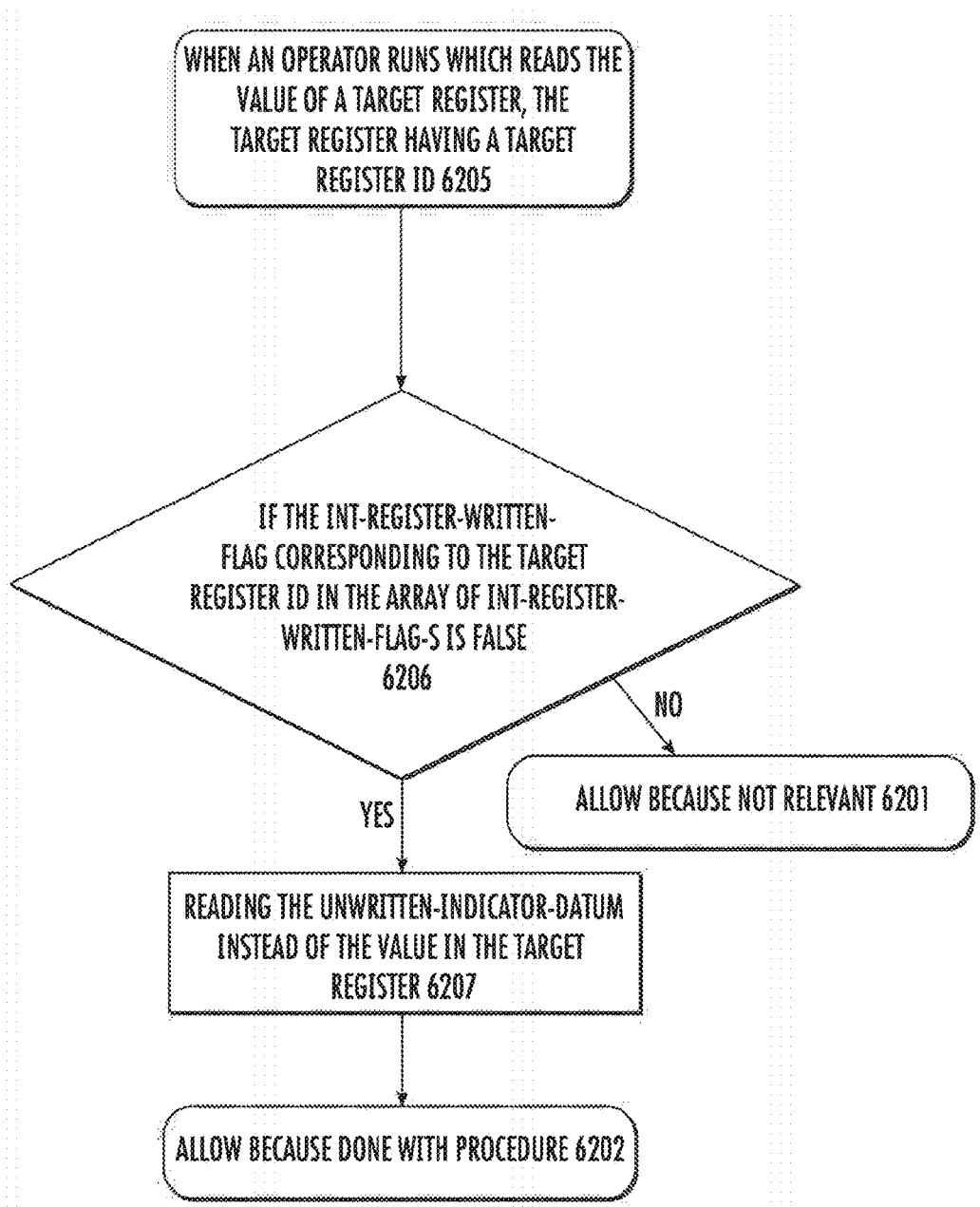
FIG. 62a shows when reading a register, checking it has a set int-register-written-flag and if not return the unwritten-indicator-datum.

FIGS. 62*a*-62*c*: A method for regulating an execution of program a computer,
the computer having at least one integer-register, each at least one integer-register having a unique register-id, the register-ids being ordered,
the computer having an array of int-register-written-flag-s, one corresponding to each at least one integer-register,
the computer having a num-int-args-in-registers,
the computer having a put-num-int-args-in-registers operator, the put-num-int-args-in-registers operator having a num-args parameter,
the computer having at least one operator which reads the value of a target register, the target register having a target register id,
the computer having an unwritten-indicator-datum,
the computer having a call instruction,
the method comprising:
when an operator runs which reads the value of a target register, the target register having a target register id 6205,

100 checking if the int-register-written-flag corresponding to the target register id in the array of int-register-written-flag-s is false 6206,
if not, allowing because not relevant 6201,
if so, reading the unwritten-indicator-datum instead of the value in the target register 6207,
allowing because done with procedure 6202,
when the put-arum-int-args-in-registers operator is called with a num-args parameter value 6208,
putting the num-int-args-in-registers value to the num-args parameter value 6209,
allowing, because done with procedure 6203,
when the call instruction runs 6210,
clearing to false any int-register-written-flag-s which correspond to the first num-int-args-in-registers register-ids occurring in the order on register-ids 6211,
allowing because done with procedure 6204.

Figure 63A:
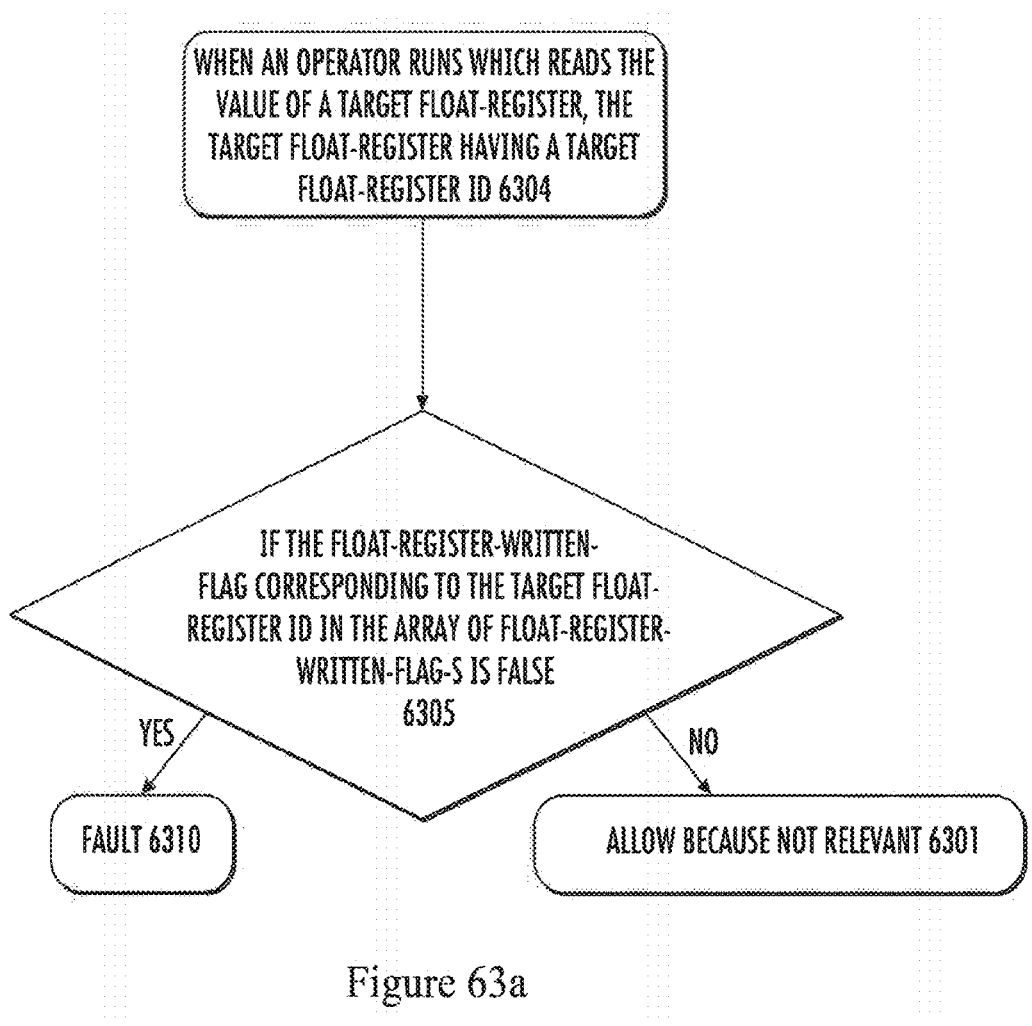
FIG. 63a shows when reading a float register, check it has a set float-register-written-flag and if not raising a fault

FIGS. 63*a*-63*c*: A method for regulating an execution of a program on a computer,
the computer having at least one float-register, each at least one float-register having a unique float-register-id, the float-register-ids being ordered,
the computer having an array of float-register-written-flag-s, one corresponding to each at least one float-register,
the computer having a num-float-args-in-registers,
the computer having a put-num-float-args-in-registers operator, the put-num-float-args-in-registers operator having a num-args parameter,
the computer having at least one operator which reads the value of a target float-register, the target float-register having a target float-register id,
the computer having a call instruction,
the method comprising:
when an operator runs which reads the value of a target float-register, the target float-register having a target float-register id 6304,
checking if the float-register-written-flag corresponding to the target float-register id in the array of float-register-written-flag-s is false 6305,
if so, raising a fault 6310,
if not, allowing because not relevant 6301,
when the put-num-float-args-in-registers operator is called with a num-args parameter value 6306,
putting the num-float-args-in-registers value to the num-args parameter value 6307,
allowing because done with procedure 6302,
when the call instruction runs 6308,
clearing to false any float-register-written-flag-s which correspond to the first num-float-arts-in-registers float-register-ids occurring in the order on float-register-ids 6309,
allowing because done with procedure 6303.

Figure 64A:
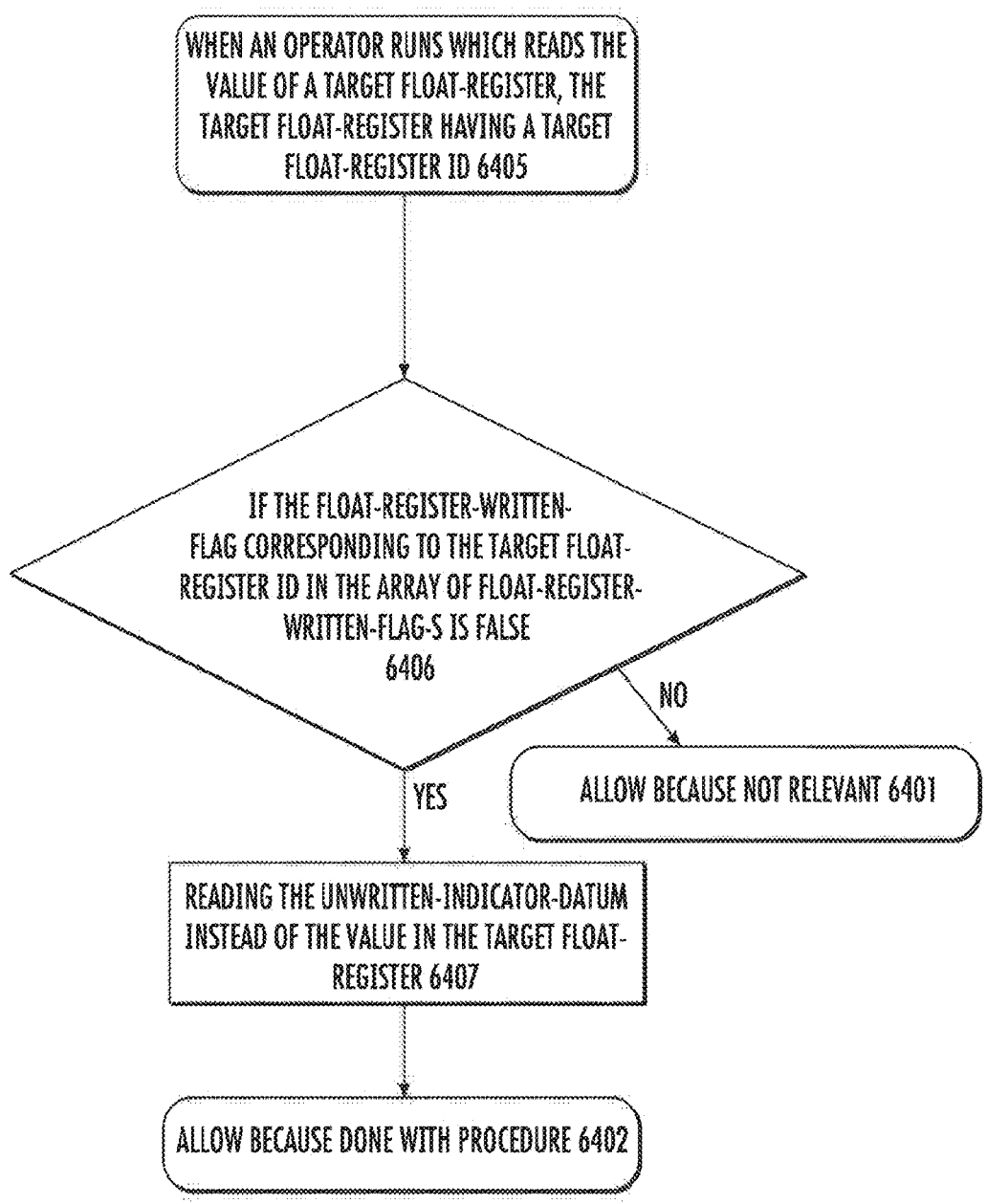
FIG. 64a shows when reading a float register, checking it has a set float-register-written-flag and if not reading the unwritten-indicator-datum.

FIGS. 64*a*-64*c*: A method for regulating an execution of a program on a computer,
the computer having at least one float-register, each at least one float-register having a unique float-register-id, the float-register-ids being ordered,
the computer having an array of float-register-written-flag-s, one corresponding to each at least one float-register,
the computer having a num-float-args-in-registers,
the computer having a put-num-float-args-in-registers operator, the put-num-float-args-in-registers operator having a num-args parameter, the computer having at least one operator which reads the value of a target float-register, the target float-register having a target float-register id,
the computer having an unwritten-indicator-datum,
the computer having a call instruction,
the method comprising:
when an operator runs which reads the value of a target float-register, the target float-register having a target float-register id 6405,
the if the float-register-written-flag corresponding to the target float-register id in the array of float-register-written-flag-s is false 6406,
if not, allowing because not relevant 6401,
if so, reading the unwritten-indicator-datum instead of the value in the target float-register 6407,
allowing because done with procedure 6402,
when the put-num-float-args-in-registers operator is called with a num-args parameter value 6408,
putting the num-float-args-in-registers value to the num-args parameter value 6409,
allowing because done with procedure 6403,
when the call instruction runs 6410,
clearing to false any float-register-written-flag-s which correspond to the first num-float-args-in-registers float-register-ids occurring in the order on float-register-ids 6411,
allowing because done with procedure 6404.

Figure 65A:
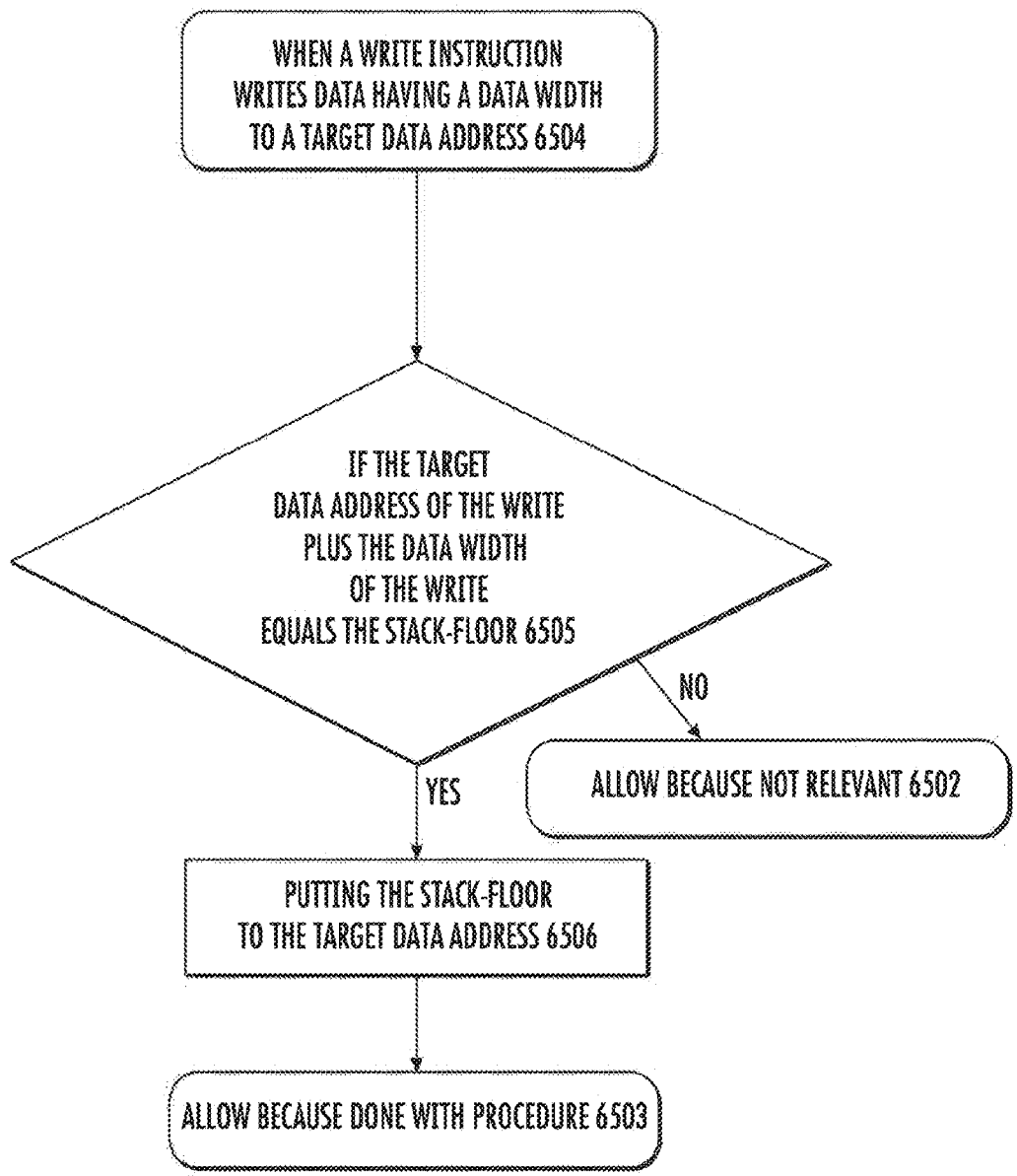
FIG. 65a shows maintaining a stack-floor of data that has been written.
Figure 65B:
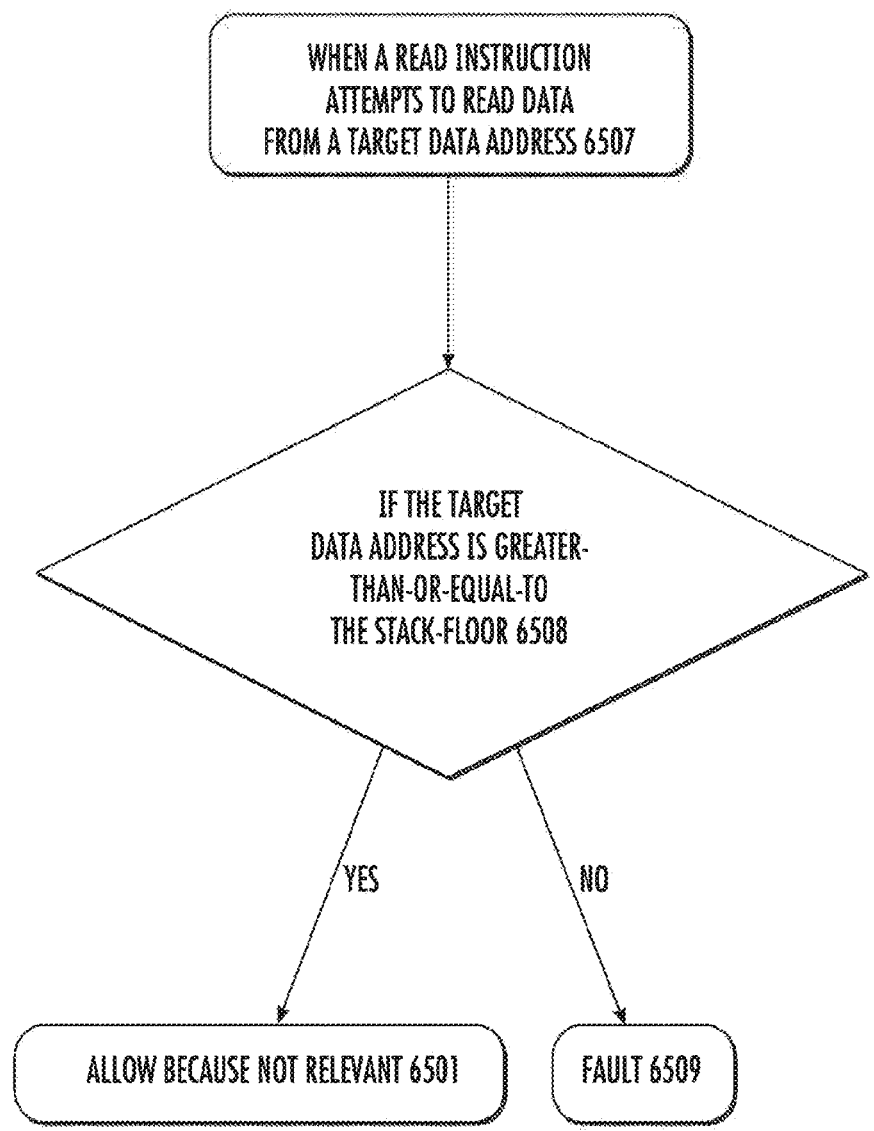
FIG. 65b shows on a read enforcing the stack-floor by faulting if the read is below the stack-floor.

FIGS. 65a-65b: A method for regulating an execution of a program on a computer,
the computer having data addresses, some of the data addresses having data,
the computer having a read instruction which reads data from a target data address,
the computer having a write instruction which writes data having a data width to a target data address,
the computer having a stack-floor,
the method comprising:
when a write instruction writes data having a data width to a target data address 6504,
checking if the target data address of the write plus the data width of the write equals the stack-floor 6505,
if not, allowing because not relevant 6502,
if so, putting the stack-floor to the target data address 6506,
allowing because done with procedure 6503,
when a read instruction attempts to read data from a target data address 6507, performing the following steps:
checking if the target data address is greater-than-or-equal-to the stack floor 6508,
if so, allowing because not relevant 6501,
if not, raising a fault 6509.

Figure 66:
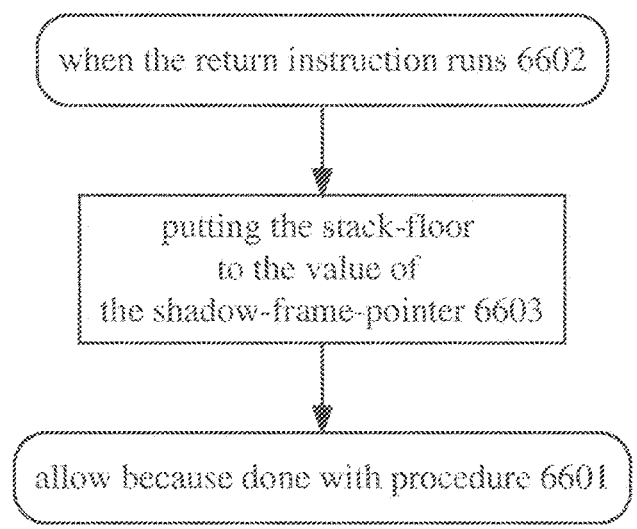
FIG. 66 shows maintaining a stack-floor of data that has been written; on a read enforcing the stack-floor; maintaining a shadow-frame-pointer and when returning, put the stack-floor to the value of the shadow-frame-pointer.

FIG. 66: The method of FIGS. 65a-65b,
the computer further having a return instruction,
the computer further having a shadow-frame-pointer,
the method further comprising:
when the return instruction runs 6602,
putting the stack-floor to the value of the shadow-frame-pointer 6603,
allowing because done with procedure 6601.

Figure 67:
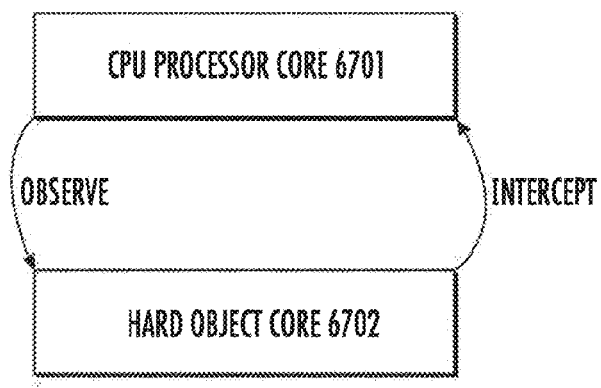
FIG. 67 shows the relationship between the central processing unit (CPU) processor core and the Hard Object core.

FIG. 67:
6701: CPU processor core
6702: Hard. Object core

Figure 68:
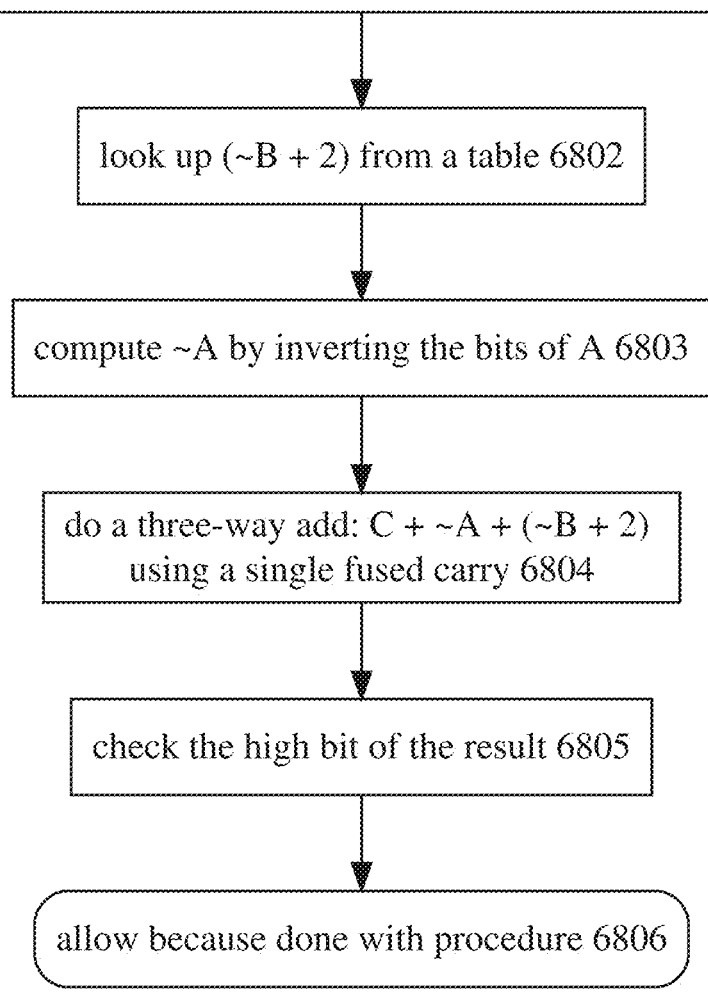
FIG. 68 shows a way to perform checking if A+B<=C using add-subtract-compare which is optimized to use only one fused carry, instead of two carries in series as would be required if done the naive way.

FIG. 68: A method of checking fixed-pointer numbers A, B, and C:
to determine if A+B<=C
using an add-subtract-compare 6801,
the method comprising:
looking up (~B+2) from a table 6802,
computing ~A by inverting the bits of A 6803,
doing a three-way add: C+~A−B+2) using a single fused carry 6804,
check the high bit of the result 6805,
allowing because done with procedure 6806.

Figure 69:
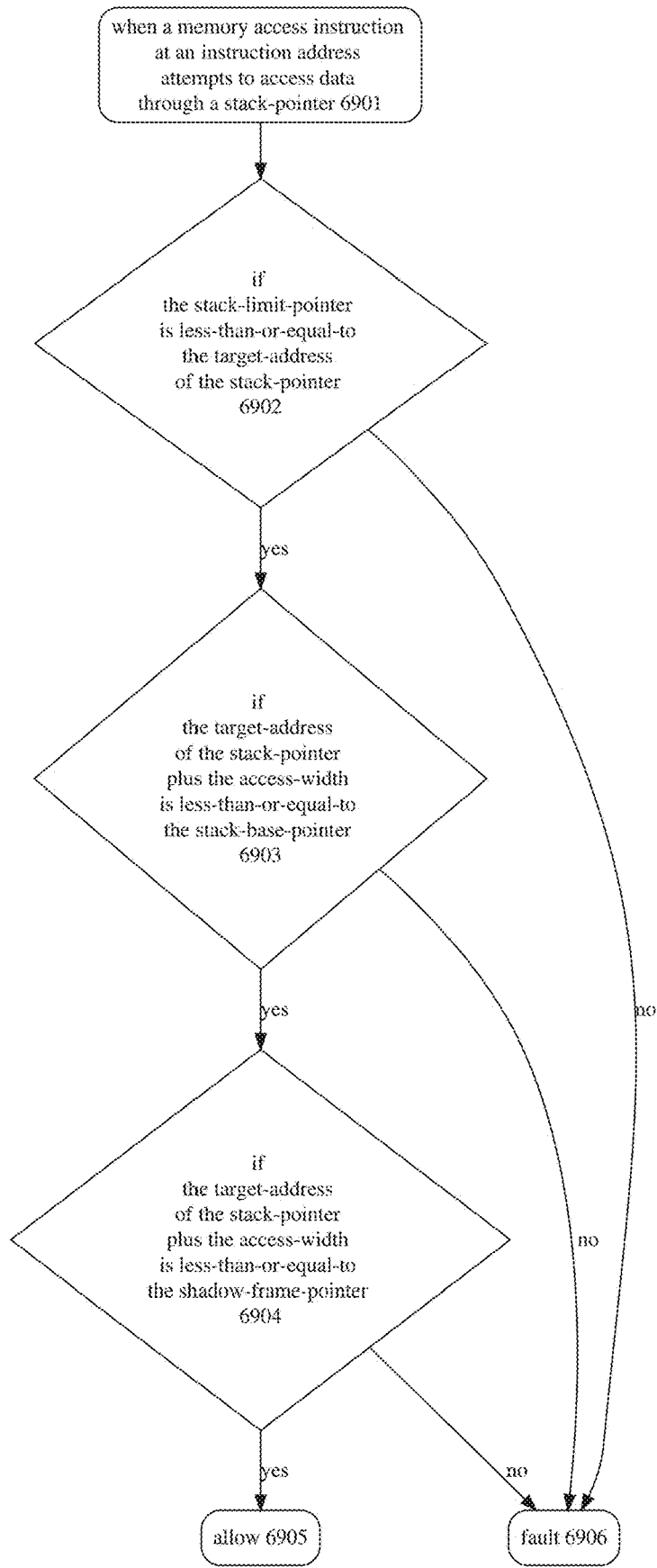
FIG. 69 shows when a memory access instruction at an instruction address attempts to access data through a stack-pointer, checking that this access is allowed.

FIG. 69: A method for regulating an execution of a program on a computer,
the computer having a stack-base-pointer, a stack-limit-pointer, and a shadow-frame-pointer,
the computer having a stack-pointer and the stack-pointer having a target address,
the computer having a memory access instruction which has an access width and which accesses data through the stack-pointer,
the method comprising:
when a memory access instruction attempts to access data through a stack-pointer 6901,
checking if the stack-limit-pointer is less-than-or-equal-to the target-address of the stack-pointer 6902, otherwise faulting 6906,
checking if the target-address of the stack-pointer plus the access-width is less-than-or-equal-to the stack-base-pointer 6903, otherwise faulting 6906,
checking if the target-address of the stack-pointer plus the access-width is less-than-or-equal-to the shadow-frame-pointer 6904, otherwise faulting 6906,
otherwise allowing the access 6905.

Figure 70:
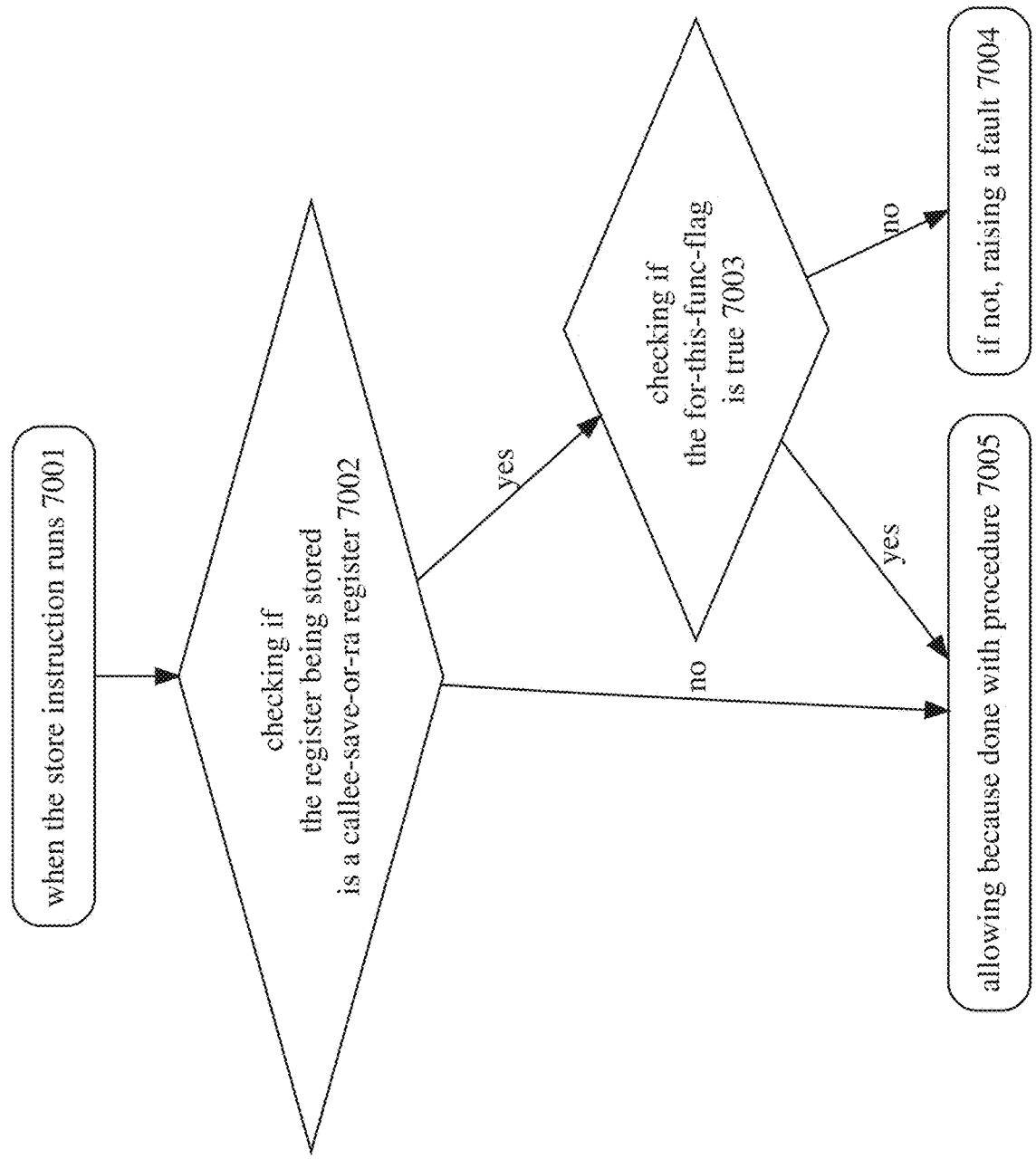
FIG. 70 shows when the for-this-func-flag is clear, check may not save a callee-save-or-ra register.

FIG. 70: The method of FIG. 56,
the computer having a callee-save-or-ra register,
the method further comprising:
When the store instruction runs 7001,
checking if the register being stored is a callee-save-or-ra register 7002,
if so, checking if the for-this-func-flag is true 7003,
if not, raising a fault 7004,
if so, allowing because done with procedure 7005.

Figure 71:
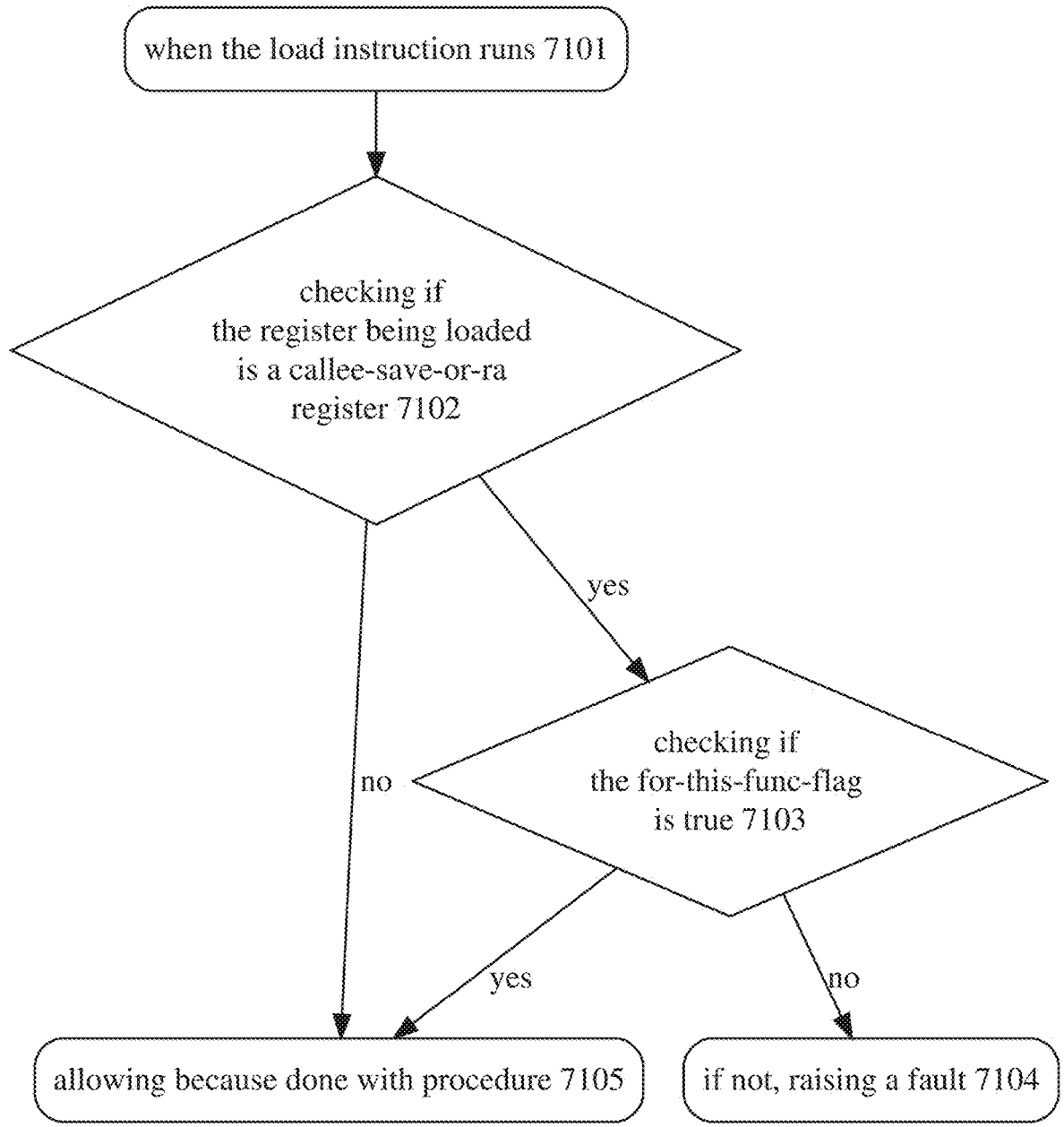
FIG. 71 shows when the for-this-func-flag is clear, check may not restore a callee-save-or-ra register.

FIG. 71: The method of FIG. 56,
the computer having a callee-save-or-ra register,
the computer having a load instruction,
the method further comprising:
when the load instruction runs 7101,
checking if the register being loaded is a callee-save-or-ra register 7102,
if so, checking if the for-this-func-flag is true, 7103, if not, raising a fault, 7104,
if so, allowing because done with procedure 7105.

Figure 72:
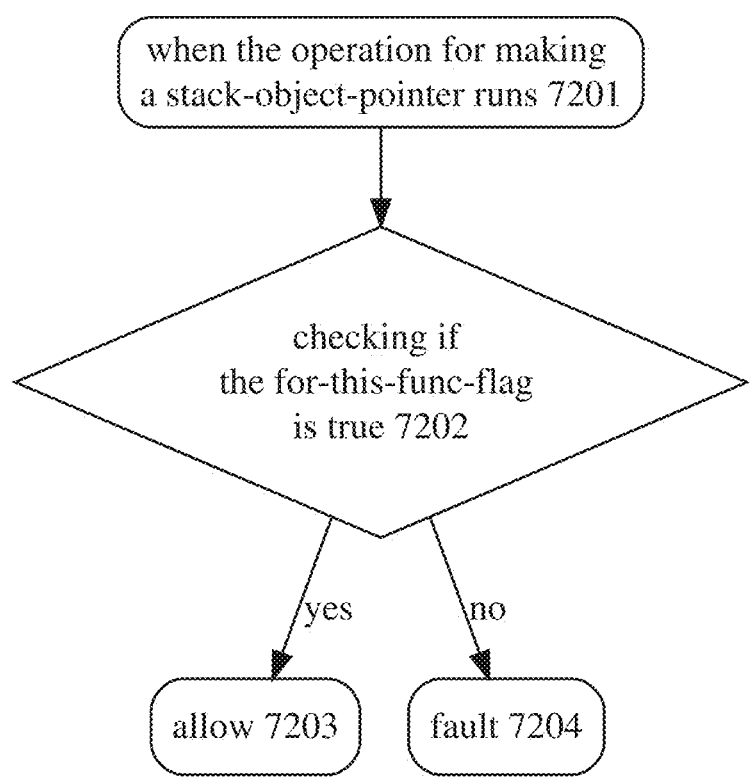
FIG. 72 shows when the for-this-flag is clear, check may not make a stack object pointer.

FIG. 72: The method of FIG. 56,
the computer having a stack-object-pointer and an operation for making a stack-object-pointer,
the method comprising:
when the operation for making a stack-object-pointer runs 7201,
checking if the for-this-func-flag is true 7202,
if not, raising a fault 7203,
if so, allowing because done with procedure 7204.

Figure 73:
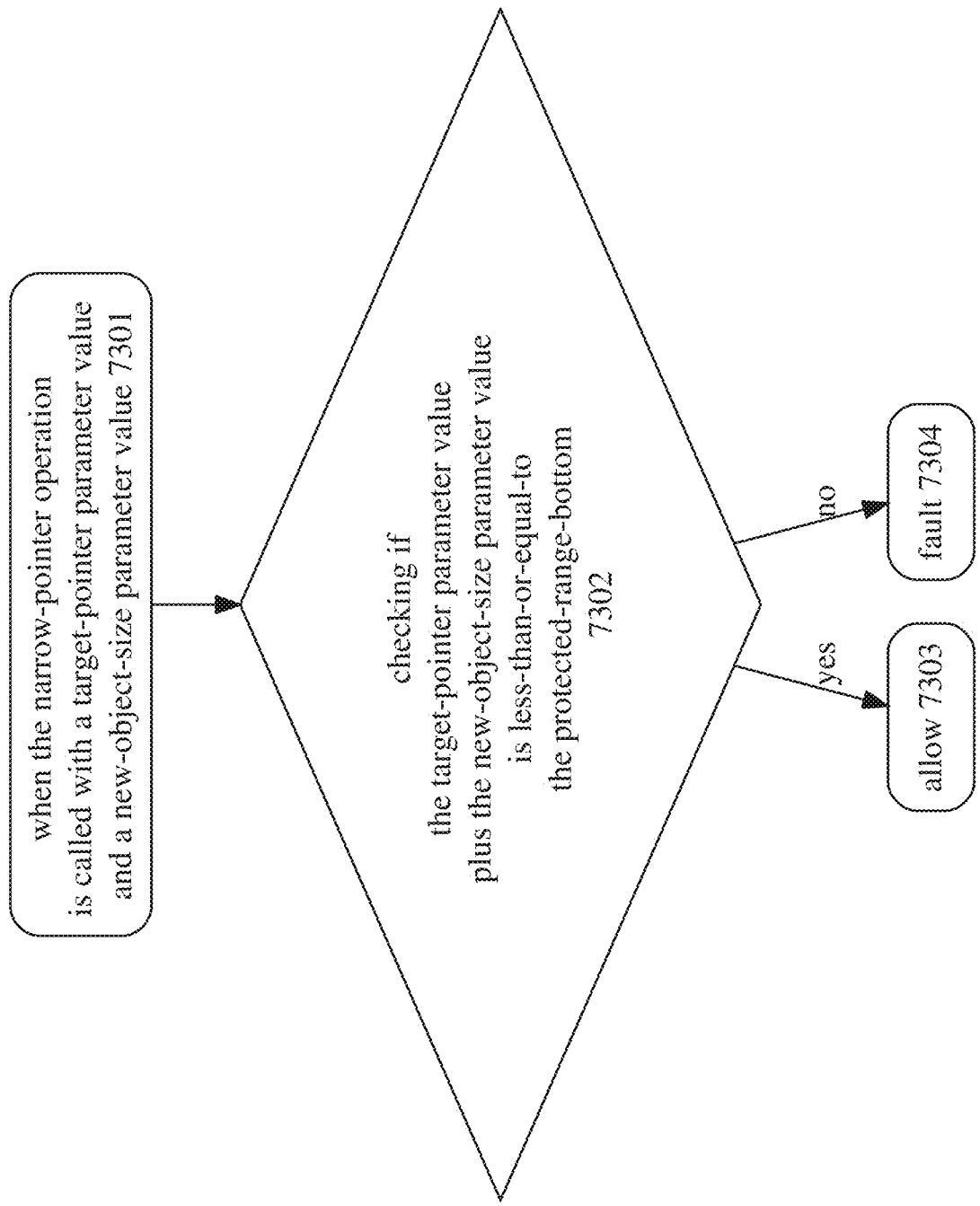
FIG. 73 shows when narrowing a stack-pointer to make a stack-object-pointer, not allowing the new stack-object-pointer range to exceed the protected-range bottom.
Figure 74:
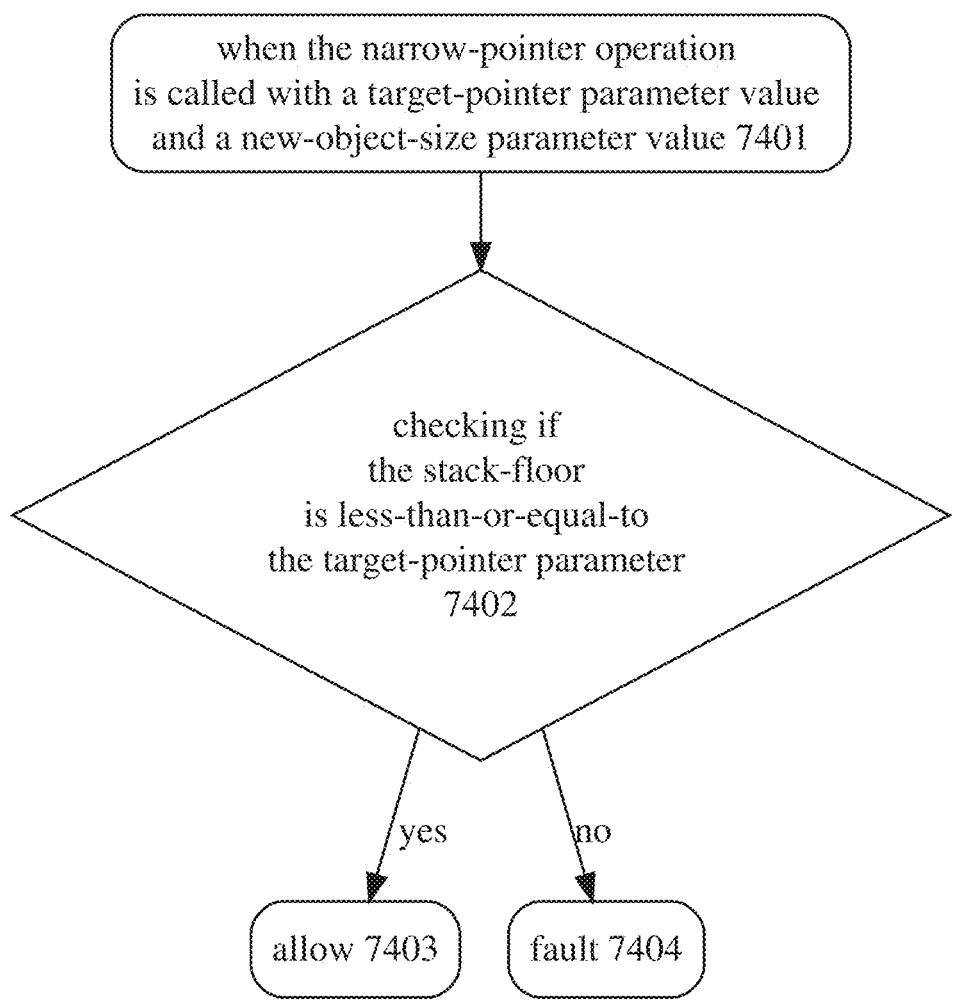
FIG. 74 shows when narrowing a stack-pointer to make a stack-object-pointer, not allowing the new stack-object-pointer range to go below the stack-floor.
Figures 76A, 76B:
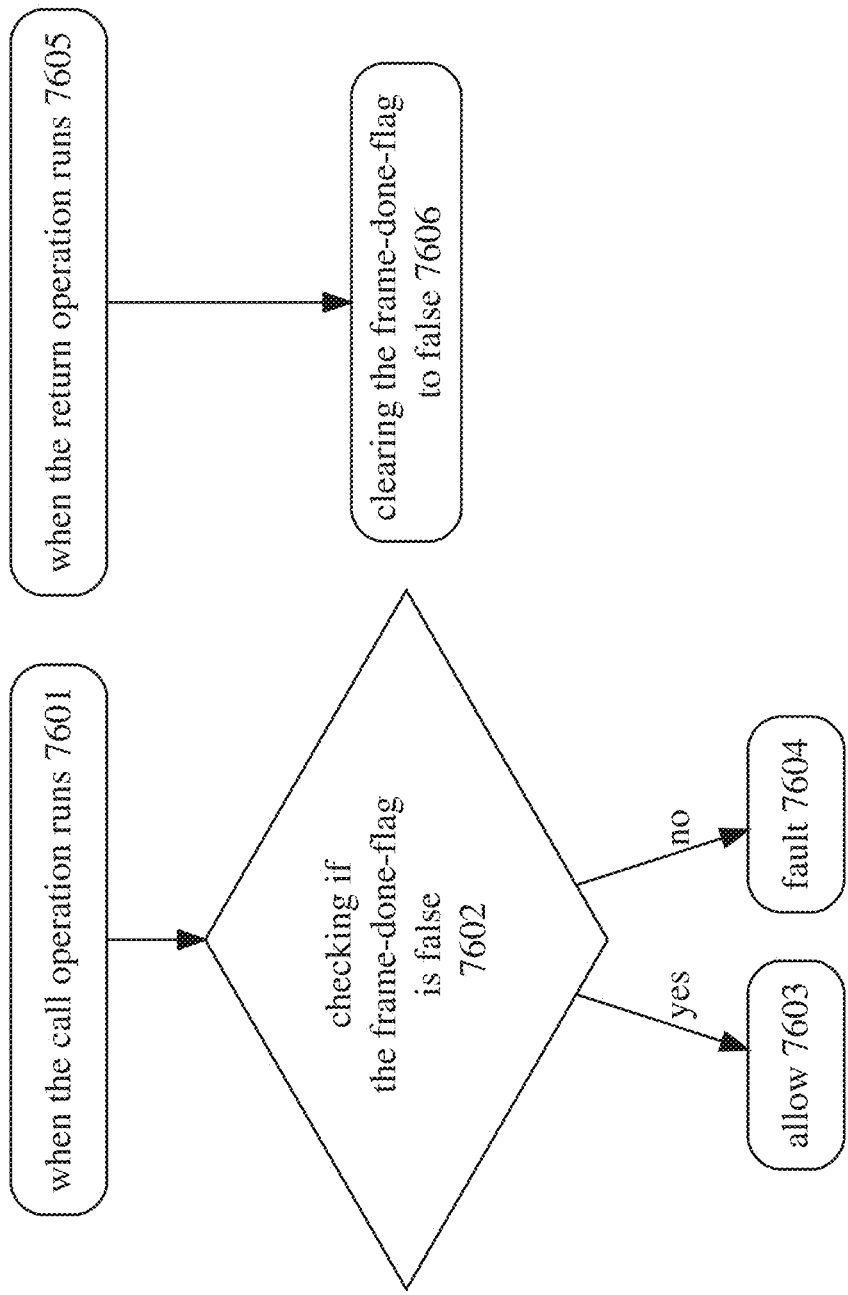
FIG. 76a shows the relationship between call operation and the frame-done-flag.
FIG. 76b shows the relationship between return operation and the frame-done-flag.
Figure 77:
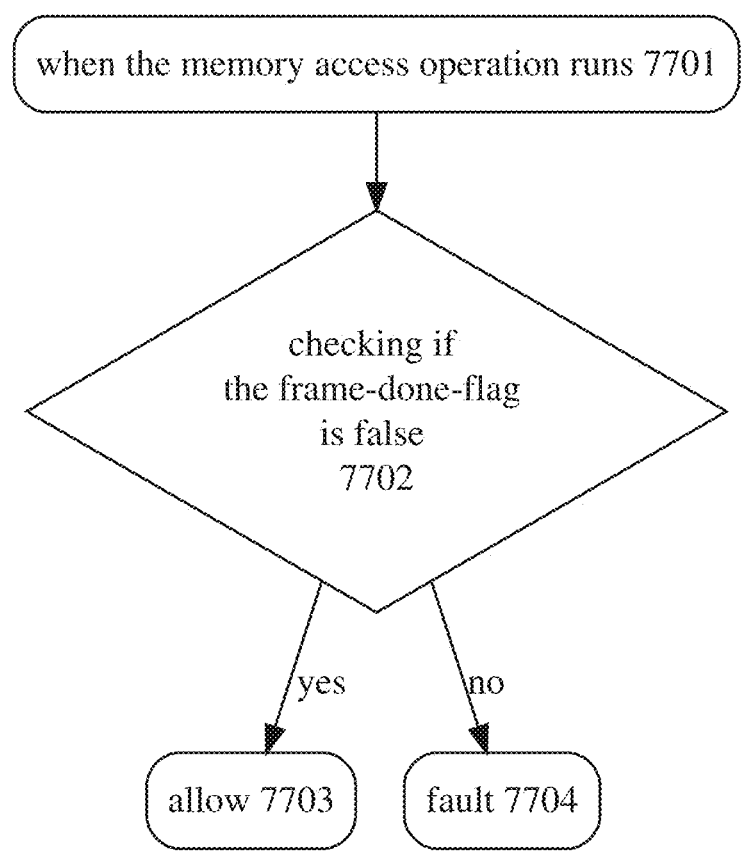
FIG. 77 shows the relationship between memory access operations and the frame-done-flag.

FIG. 73: The method of FIG. 41,
the computer further having a protected-range-bottom,
the computer further having a narrow-pointer operation which makes a new stack-object-pointer, the narrow-pointer operation having a target-pointer parameter and a new-object-size parameter,
the method further comprising:
when the narrow-pointer operation is called with a target-pointer parameter value and a new-object-size parameter value 7301, checking if the target-pointer parameter value plus the new-object-size parameter value is less-than-or-equal-to the protected-range-bottom, 7302,
if so, allowing 7303,
if not, raising a fault 7304.
FIG. 74: The method of FIG. 41,
the computer having a stack-floor,
the computer further having a narrow-pointer operation which makes a new stack-object-pointer, the narrow-pointer operation having a target-pointer parameter and a new-object-size parameter,
the method further comprising:
when the narrow-pointer operation is called with a target-pointer parameter value and a new-object-size parameter value 7401,
checking if the stack-floor is less-than-or-equal-to the target-pointer parameter 7402,
if so, allowing 7403,
if not, raising a fault 7404.
FIG. 75*a*: A method for regulating an execution of a program on a computer,
the computer having a save-callee-save-reg-state operator,
the computer having a frame-done-flag,
the method comprising:
when the save-callee-save-reg-state operation runs 7501,
checking if the frame-done-flag is false 7502,
if not, raising a fault 7503,
if so, allowing 7504.
FIG. 75*b*: A method for regulating an execution of a program on a computer,
the computer having a restore-callee-save-reg-state operator,
the computer having a frame-done-flag,
the method comprising:
when the restore-callee-save-reg-state operator runs 7505,
checking if the frame-done-flag is false 7506,
if not, raising a fault 7507,
if so, setting the frame-done-flag to true and allowing 7508.
FIG. 76*a*: The method of FIG. 75*a* and FIG. 75*b*,
the computer further having a call operation,
the method further comprising:
when the call operation runs 7601,
checking if the frame-done-flag is false 7602,
if so, allowing 7603,
if not, then raising a fault 7604.
FIG. 76*b*: The method of FIG. 75*a* and FIG. 75*b*,
the computer further having a return operation,
the method further comprising:
when the return operation runs 7605,
clearing the frame-done-flag to false 7606.
FIG. 77: The method of FIG. 75*a* and FIG. 75*b*,
the computer further having a memory access operation,
the method further comprising:
when the memory access operation runs 7701,
checking if the frame-done-flag is false 7702,
if so, allowing 7703,
if not, then raising a fault 7704.
FIG. 78*a*: A method for regulating an execution of a program on a computer,
the computer having a made-stack-obj-flag,
the computer further having a narrow-pointer operation which makes a new stack-object-pointer,
the method comprising:
when the narrow-pointer operation is called 7801,
setting the made-stack-obj-flag to true 7802.

FIG. 78*b*: A method for regulating an execution of a program on a computer,
the computer having a made-stack-obj-flag,
the computer having data addresses, some of the data addresses having data,
the computer having at least one register annotated as a callee-save-or-ra register,
the computer having a store instruction which stores data from a store-source-register to a target data address,
the method comprising:
when the store instruction stores data from a store-source-register to a target data address 7803,
checking if the store-source-register has been annotated as a callee-save-or-ra register 7804,
if not, allowing because not relevant 7805,
if so, checking if the made-stack-obj-flag is set to true 7806,
if not, allowing 7807,
if so, then raising a fault 7808.
FIG. 79: A method for regulating an execution of a program on a computer,
the computer having a memory access operation,
the computer having a save-callee-save-reg-state operator,
the computer further having a for-this-func-flag,
the method further comprising:
when the memory access operation runs, but not as part of a save-callee-save-reg-state operation 7901,
checking if the for-this-func-flag is true 7902,
if so, allowing 7903,
if not, then raising a fault 7904.

The Dewdrop Embodiment of Hard Object

Hard Object is modifications to the processor of a computer. However, making use of these modifications requires that they be wrapped with further changes which one could think of as hardware and software plumbing necessary get the data and meta-data to where the Hard Object system needs it in order to perform the core operations.

These changes are largely what one would come up with as the straightforward though possibly tedious process of getting a program set up to run on a Hard Object system. That said, some of those details of that processes are illustrated here.

In order to illustrate Hard Object, an embodiment is discussed in a system called Dewdrop. Dewdrop is a straightforward six-stage in-order pipeline implementation, currently manifested in a software simulator and is currently configured to interface to a 64-bit RISC-V® core (specifically configured as rv64imafd); a hybrid Dewdrop and 64-bit RISC-V® system is called Dewdrop-RV64.

Internal pipeline and caching: Manifesting the Hard Object checks efficiently in hardware requires that they be integrated into a pipeline and that any meta-data maps annotating meta-data onto text and data be cached efficiently. See Section "Dewdrop pipeline" below.

Interface with the core: The Hard Object core both observes and intercepts the activities of the standard processor core. See Section "Dewdrop interface" below. Someone building a processor core that wants to use that interface to Hard Object could use some suggestions as to at what points in the core to link into what parts of the Hard Object interface. See Section "Using the Dewdrop interface" below.

Additional instructions/operations: A processor which offers Hard Object features to the software also must add further instructions/operations to allow Hard Object meta-data to be initialized, modified, queried, and otherwise operated on. In the Dewdrop embodiment, rather that adding instructions to the processor instruction set proper, instead (1) hardware definition is given to some of the 64-BIT RISC-V® ecall (system call) identifiers, thereby allowing access to these hardware operations by use of the prior art 64-BIT RISC-V® ecall instruction, and (2) using the 64-BIT RISC-V® ability to define new control status registers (CSRs), given hardware definition to some CSR identifiers, thereby allowing access to these hardware operations by use of the prior art 64-BTT RISC-® instructions for accessing CSRs. See Section "Additional Dewdrop instructions" below.

Software build system: A new hardware architecture requires changes to the way that programs are compiled to run on it. The prior art 64-BIT RISC-V® system primarily uses a 64-BIT RISC-V® version of the industry standard prior art gcc compiler. While the gcc compiler is not modified, the process of using the compiler ("building") is modified, specifically by interleaving some additional stages in-between the stages of the build process. The build process (both the prior art gcc stages and Dewdrop stages) are shown. When building the user code to run on a Dewdrop-RV64 (where here 64-BIT RISC-VCR) means rv64imafd) system, the system works as follows:

- The prior art gcc pre-processing stage from user-typed C to pre-processed C.
- The Dewdrop source-to-source transform of (pre-processed) C. See Section "Dewdrop source-to-source transform of (pre-processed) C" below.
- The prior art gcc compilation (proper) stage from (pre-processed) C to 64-BIT RISC-VR® assembly. When running the compiler, many configuration flags are passed. See Section "Configuration of compilation proper" below.
- The Dewdrop source-to-source transform of 64-BIT RISC-V® assembly. See Section "Dewdrop source-to-source transform of 64-BIT RISC-V® assembly".
- The prior art gcc assembly stage from 64-BIT RISC-V® assembly to relocatable ELF.
- The prior art gcc (merging and) linking stage from multiple relocatable ELF files to a executable ELF. When running the linker, these are the modifications to the linker script (which configures/controls the linker) that are made. See Section "Configuration of linking" below.
- The Dewdrop post-linking. See Section "Dewdrop post-linking".

Dewdrop metadata: See Section "Format for Dewdrop embedded metadata" for the format for the metadata with which the Dewdrop stages augment the intermediate representations of the program.

Loading: For additional Dewdrop loading done after standard loading, see Section "The Dewdrop post-load system". These modifications run other loading but before the C standard library CRT0.

C standard library: For modifications to the C standard library, see Section "Modifications to the C standard library" below.

Dewdrop runtime library: For additional runtime support Dewdrop, see Section "Dewdrop runtime library" below.

Dewdrop Pipeline

The Dewdrop machine is a part of a CPU core that observes a 64-BIT RISC V® machine while it is running. As such, the Dewdrop machine is an extension to the 64-BIT RISC-V® machine and therefore the most straightforward way to implement it is to reflect the pipeline structure of the 64-BIT RISC-V® machine.

The current implementation of Dewdrop requires six pipeline stages. The control flow aspect of Dewdrop is handled in stages one through three. The data flow aspect is handled in stages three through five. Stage six, the last stage, is for committing results.

The sections of the document are as follows:
- An overview of the six-stage pipeline,
- The Dewdrop meta-data maps,
- The dataflow dependencies between map and arithmetic operations,
- An abstraction of the policy code for each of the six stages.

Note that this document is abstracted by hand from a working Dewdrop-RV64 interpreter implemented in C++ which has been factored to reflect the six stages. Since the interpreter works and passes many tests, likely the only mistakes are in the manual abstraction of it.

The last section is quite long and only partially abstracted. I found it to be quite a challenge to make this section as abstraction is the art of throwing away unwanted information and removing anything from the literal implementation of the Dewdrop policies could discard information that the reader might want.

An Overview of the Six-Stage Pipeline

The standard five-stage pipeline is as follows:
1. IF: instruction fetch;
2. ID/REG: instruction decode/access registers;
3. EX: execute;
4. MEM: load from memory; buffer any store to memory;
5. WRITE_BACK: write back to registers and commit any buffered store to memory;

The current implementation of Dewdrop requires six pipeline stages, modifying the above as follows:
1. IF: instruction fetch;
2. ID/REG: instruction decode/access registers;
3. EX1: execute one;
4. EX2: execute two;
5. MEM: load from memory; buffer any store to memory;
6. WRITE_BACK: write back to registers and commit any buffered store to memory, Note that in this modification to the standard five-stage pipeline the EX stage is split into two stages.

The Dewdrop Metadata Maps

Meta-Data Annotating Text: These are all Cached
- TP ("text page"): map_pagebase_to_TextPageMetadata read in stage 1: "IF: instruction fetch"
- TT ("text tag"): map_textaddr_to_Text DwordMetadata read in stage 1: "IF: instruction fetch"
  (possibly) read again in stage 2: "ID/REG: instruction decode/access registers", (after just_returned_function ( ) looks up the return);
    NOTE: there is no instruction that requires both reads, so it may be possible to combine the two reads, however, the dataflow path has different dependencies for different instructions: but in the case of a just_called_function( ), the input to the map the program_counter, and in the case of a just_returned_function( ), the input to the map must wait to come from an add. For now it is conservative to say a read in both stages is required.
- TF ("text function"): map_functop_to_FunctionMetadata read in stage 2: "ID/REG: instruction decode/access registers"

Meta-Data Annotating Data: These are All Cached
- DP ("data page"): map_pagebase_to_DataPageMetadata read in stage 3: "EX1: execute one", (before the add of the immediate)

read again in stage 4: "EX2: execute two", (after the add of the immediate); further, this read requires the value of the meta-data (a) for the target page and (b) for the previous page, and therefore requires each cache entry to hold both values, thereby requiring doubling the size of the cache DT ("data tag"): map_dataaddr_to_Data_DwordMetadata read in stage 4: "EX2: execute two"

DO ("data object"): map_objname_to_ObjectMetadata read in stage 4: "EX2: execute two"

DS ("data sub-object"): map_subobjname_to_SubObjectMetadata
read in stage 4: "EX2: execute two"

Special CalleeSaveRegState Per-Stack-Frame Maps

These two maps are part of the state of a single stack frame; they record where callee-save registered are saved on the stack for that frame; note that they are inverse of each other:

where_saved: maps reg-ids to where they are saved on the stack which_register: maps stack addresses to which register ID is saved there.

The first, where_saved, is saved/restored as part of the callee-save reg state double-word; note that, using a compression scheme, the whole map fits into a single double-word).

The plan is that, upon restoration from the stack, instead of inverting where_saved to get which_register, to instead use a content-addressable memory to allow where_saved to be looked up in reverse, thereby computing which_register without manifesting it directly as an array in the traditional sense.

How the Meta-Data Maps are Cached

Each meta-data map is cached (except for the immediate subobj-id case for the DS map). These caches work in a completely standard manner except for one concern, namely how to extract bits from the address to uses as the tag and index for a line in the cache.

Terminology: a cache groups data in lines larger than a single entry. The hits of the address are therefore partitioned into the line-address: those hits which determine the line and the entry-relative-to-line-address: those bits that find the entry within a given line.

So to uniquely address memory at the line granularity one only needs the line address and for the rest of this discussion the entry-relative-to-line address is not relevant (note that for some kinds of meta-data the number of bits in the entry-relative-to-line is put to zero, so a line becomes synonymous with an entry).

In a standard cache design, usually a line-address is partitioned into a tag and an index (and therefore information from both the tag and the index would be needed to reconstruct the line-address). A line is filed in a cache under its index and when there is an ambiguous resolution with another line (a collision), the tag is used to disambiguate.

However, instead of partitioning the line-address into tag and index, the tag is made to be the whole line-address and then extract some bits of the tag for use as the index. Doing this allows the computation of the index to not concern itself with preserving line-address information lost in the computing of the tag because the tag has not lost any of the information of the line-address. This whole-tag and index pair is called the signature of the line.

Normally in a cache, the lowest bits of the memory address are often used as the line index. However, for some of the Dewdrop meta-data maps, such as the DO map_objname_to_ObjectMetadata and the DS map_subobjname_to_SubObjectMetadata, such a value is simply not available at the point where the map is to be accessed (that is, at dereference time the hardware may be presented with a pointer into the middle of an object). However, instead other meta-data fields in the pointer are available, such as the object-id. Therefore, those fields are used to compute a line index.

Further, depending on the behavior of software, such as how objects are laid out in memory by the memory allocator, some fields of the meta-data fields may be interesting (have high entropy) and others may be boring (have low entropy). It is important that the resulting line index be interesting otherwise the cache utilization will be poor. To achieve this, instead a strategy of computing the XOR (bitwise-exclusive-or) of multiple fields to make an index can be used in order to make it more likely that the resulting index is sufficiently interesting to be useful.

The three strategies used for computing the index are as follows:

Classic_LineSigs this is the classic way to compute a line signature: shift off LOG_LINE_SIZE_IN_ENTRIES number of LOG_ENTRY_ADDR_ALIGN bits from the address and keep the rightmost remaining LOG NUM SETS bits for the index;

XorDoubleindex_LineSig: XOR two of fields of the meta-data in the high bits of the pointer together and then keep the rightmost remaining LOG_NUM_SETS hits for the index:

XorTripleIndex_LineSig: XOR three of fields of the meta-data in the high bits of the pointer together and keep the rightmost remaining LOG_NUM_SETS bits for the index.

How that is done differs per cache, so below the strategy for computing the index for each cache is provided.

TP ("text page"): map_pagebase_to_TextPageMetadata; Classic_LineSig: indexed by a page-aligned address;

TT ("text tag"): map_textaddr_to_Text_DwordMetadata: Classic_LineSig: indexed by a double-word aligned address;

TF ("text function"): map_functop_to_FunctionMetadata: Classic_LineSig: indexed by a dword-aligned address;

DP ("data page"): map_pagebase_to_DataPageMetadata: Classic_LineSig: indexed by a page-aligned address;

DT ("data tag"): map_dataaddr to Data_DwordMetadata: Classic_LineSig: indexed by a double-word aligned address;

DO ("data object"): map_objname_to_ObjectMetadata: XorDoubleindex_LineSig: indexed by an XOR of the page-class-id (looked up from the page-index) and the object-id (from the abs-ptr).

DS ("data sub-object"): map_subobjname_to_SubObjectMetadata: subobjects are represented in one of several ways which effect how this map is cached:

immediate: the meta-data is not cached as it is immediately available in the Abs-Ptr;

bottom subobj-id, which is unique across the page (modulo the effects of the page-overflow-flag): compute a page_tag as the effective data-page-index (the data-page-index after subtracting by one if there is a page-overflow-flag on the Abs-Ptr which is set to true);

top subobj-id, which is unique across the whole object: compute a page_tag as the page_class_id.

For DS compute a XorTripleindex_LineSig, indexed by an XOR of
  the page-tag (computed above),
  a concatenation of the subobj-id-namespace bit and the subobj-id (both from the abs-ptr),
  the obj-id (from the abs-ptr).
Cache Configurations
  Dewdrop caches are configured as follows.
  Note below "dword" means double-word, which on 64-BIT RISC-V® means a 64-bit word. The memory width is also assumed to be a double-word and all cache lines are an integral multiple of that.
  Below "normal" means text and data, which are present in a non-Dewdrop system, whereas "meta-data" means Dewdrop meta-data.
  The L1 cache replacement policies of random replacement are used in this embodiment.
Summary of Total Cache Sizes
  If the sizes of the caches below are added, the following results: normal caches:
    data: 32Ki
    text: 32Ki
  meta-data caches:
    a tags-data: 8Ki
    tags-text: 2Ki
    page-data: 1Ki
    page-text: 1Ki
    function: 2Ki
    object: 16Ki
    subobject: 2Ki.
  This gives a total meta-data cache size of 32Ki,
  However, due to the structure of the Dewdrop pipeline, some of these caches must be read during more than one cycle and one of them has the odd property that an entry and its preceding entry must be read together. One way to implement this seems to just making more than one cache and then filling all of them during a cache fill, which can just as easily be thought of as doubling or tripling the size of the cache. Doing this results in:
    making two copies of the text tags cache, thereby multiplying the size by 2, and
    making (a) two copies of the data page cache, and (b) making the second copy double in size, thereby multiplying the size by 3.
  Counting using these multiples. This gives a total meta-data cache size of: 36Ki.
  Note another configuration that gets us lower meta-data traffic uses a 4Ki data page cache instead of the 1Ki data page cache given here; however, doing so increases the total meta-data cache size to 45Ki.
  The sizes of these caches can be tuned, however, this embodiment err on the side of making them larger when there was any question. Therefore, it remains an open question as to whether the meta-data caches really all need to be this large to get similar performance. It also remains an open question as to if the cache sizes could be made smaller by using a different cache replacement policy.
For User Text and Data Caches at the Dword Granularity
  There are two normal caches: data and text. Both are configured as below.
    CACHE_USER_DATA_NUM_WAYS=8
    CACHE_USER_DATA_LOG_NUM_SETS=5
    CACHE_USER_DATA_LOG_LINE_SIZE_IN_ENTRIES=4
    CACHE_USER_DATA_ENTRY_SIZE_IN_BITS=64
  that is:
    line size in bytes=1.28
    associativity: number of sets=8
    a total size in bytes=32Ki
For text and data meta-data caches at the dword granularity, "tags" caches data:
    CACHE_DATA_DWORD_NUM_WAYS=8
    CACHE_DATA_DWORD_LOG_NUM_SETS=7
    CACHE_DATA_DWORD_LOG_LINE_SIZE_IN_ENTRIES=4
    CACHE_ENTRY_SIZE_IN_BITS_DwordMetadata=4
  that is:
    line size in bytes=8
    associativity: number of sets=8
    total size in bytes=8Ki
  text:
    CACHE_TEXT_DWORD_NUM_WAYS=8
    CACHE_TEXT_DWORD_LOG_NUM_SETS=5
    CACHE_TEXT_DWORD_LOG_LINE_SIZE_IN_ENTRIES=4
    CACHE_ENTRY_SIZE_IN_BITS_DwordMetadata=4
  that is:
    line size in bytes=8
    associativity: number of sets=8
    total size in bytes=2Ki
Notes
For Text and Data Tags Per Dword Tags Caches
  There are two tags caches: text and data.
  The data tags cache annotates 4 bits onto each double word.
  The text tags cache also annotates 4 bits onto each double word, but only 1 is used.
  Suppose in one embodiment is it desired for one double-word of tags memory to have the meta-data for one cache-line of normal memory.
    the smallest unit of memory traffic=min size of any cache line, in particular the tags cache line=64 bits=8 bytes=$2^3$ bytes;
    at 4-bits per tag, a 64-bit double-word of (meta-data) tags corresponds to 64/4=16 normal double words;
    a normal text (instruction) cache line having must therefore have at least 16 double words=16*8=128 bytes.
  In one embodiment if one were to make the text tags cache only store 1 bit per double word, then a 64-bit text tags cache line would correspond to a normal instruction cache of 64 double words=512 bytes. In one embodiment, for now, it is assumed this is too large.
For Text and Data Meta-Data Caches at the Page Granularity
  There are two meta-data page caches: text and data.
  data:
    CACHE_PAGE_NUM_WAYS=8
    CACHE_PAGE_LOG_IN_NUM_SETS=4
    CACHE_DATA_PAGE_LOG_LINE_SIZE_IN_ENTRIES=0
    CACHE_ENTRY_SIZE_IN_BITS_DataPageMetadata=64
  that is:
    line size in bytes=8
    associativity: number of sets=8
    total size in bytes=1Ki
  text:
    CACHE_PAGE_NUM_WAYS=8
    CACHE_PAGE_LOG_NUM_SETS=4
    CACHE_TEXT_PAGE_LOG_LINE_SIZE_IN_ENTRIES=1
    CACHE_ENTRY_SIZE_IN_BITS_TextPageMetadata=32 that is:
　　line size in bytes=8
　　associativity: number of sets=8
　　total size in bytes=1Ki
For Func Meta-Data Cache
　　There is a cache for per-function meta-data.
　　CACHE_FUNC_NUM_WAYS=8
　　CACHE_FUNC_LOG_NUM_SETS=5
　　CACHE_FUNC_LOG_LINES_IN_ENTRIES=0
　　CACHE_ENTRY_SIZE_IN_BITS_FunctionMetadata=64
that is:
　　line size in bytes=8
　　associativity: number of sets=8
　　total size in bytes=2Ki
For obj/subobj Meta-Data Caches
　　There is a cache for per-object meta-data and another cache for per sub-object meta-data.
　　Note that for these caches, no spatial locality of reference is assumed for these caches, and therefore there is only one entry per line.
　　Object:
　　CACHE_OBJ_NUM_WAYS=8
　　CACHE_OBJ_LOG_NUM_SETS=7
　　CACHE_ENTRY_SIZE_IN_BITS_ObjectMetadata=128
that is:
　　line size in bytes=16
　　associativity: number of sets=8
　　total size in bytes=16Ki
subobject:
　　CACHE_SUBOBJ_NUM_WAYS=8
　　CACHE_SUBOBJ_LOG_NUM_SETS=4
　　CACHE_ENTRY_SIZE_IN_BITS_SubObjectMetadata=(4*32)=128 (in reality only (3*32) is needed, but that is not an integer multiple of DDO_MEMORY_WIDTH_IN_BITS)
that is:
　　line size in bytes=16
　　associativity: number of sets=8
　　total size in bytes=2Ki
　　For information purposes the entry size is only needed to be 12 bytes, but to make the line size an integer multiple of the memory width, a double-word, can expand the entry size to 16 bytes.
The Dataflow Dependencies Between Map and Arithmetic Operations
　　Below is a list of the expensive operations of the policy code, factored into six stages.
　　In one pipeline stage in series at most one of the following is allowed
　　　　read from a general-purpose register file (not a specific hardware register
　　　　access to a map cache,
　　　　(carrying) OP: carrying arithmetic-logical operations: sign-extend, max, add, subtract, subtract-compare, or (parallel) double-subtract-compare;
　　However, in series more than one of the following are allowed:
　　　　read from a specific hardware register,
　　　　bitwise-OP: non-carrying arithmetic-logical operations: single-bit Boolean test, equality, xor.
　　All dataflow dependencies are across stages, except for a very few that do not violate the above rules.
　　Stage IF: instruction fetch:
　　　　TP.get(program_counter)
　　　　TT.get(program_counter)
　　Stage ID/REG: instruction decode/access registers
　　　　OP: subtract-compare (2.1): just_called_function( ): sp<=stack_obj_floor
　　　　OP: add (2.2) just_returned_function( ): caller_page_base+function_top_offset
　　　　bitwise-OP: xor and compare to zero (2.3):
　　　　　　TT.get(current_function_start)
　　　　　　Tf.get(current_function_start)
　　Stage EX1(C) (the control part of Stage EX1): execute one, control flow
　　　　OP: double subtract-compare (3C.1): current_function_start<=program_counter<current_function_end
　　Stage EX1(D) (the data part of Stage EX1): execute one, data flow (note: same stage as EX1(C) above)
　　　　DP.get(rawptr)
　　　　OP: add (3D.1): add the immediate: rs1_val_space_bits+imm;
　　Stage EX2: execute two
　　　　OP: subtract (4.1): for bottom_SubobjIdNamespace use the page_overflow_flag if necessary to keep the effective_data_page_index the same
　　　　OP: sign-extend (4.2): fault if the original op_output has information in the bits to be used for Dewdrop meta-data, as those bits will be lost
　　　　OP: subtract-compare or maybe just xor (4.3): unless the op_output is to small to be a pointer, in which case it can just be interpreted as an int
　　　　DP.get(rs1_target) and DP.get(rs1_:target—one_page) to put the page_overflow_flag if the arithmetic has gone out of the page class
　　　　OP: subtract (4.4): framepointer_minus_rs1_target=framepointer—rs1_target_RawPtr;
　　　　OP: subtract (4.5): rs1_val_dnrelto_sf=stack_floor—rs1_target_RawPtr;
　　Stage MEM: Load from Memory Buffer any Store to Memory
　　　　OP: subtract-compare (5.1): rs1_val_dnrelto_sf<=mem_access_width_in_bytes
　　　　OP: subtract-compare (5.2): rs1_val_framepointer<=rd_val_framepointer
　　　　　　NOTE: this is subtracting two results of StackObjPtr.get_framepointer( ), which looks like two parallel adds and then a subtract, but since both adds just add the same constant, namely stack_limit_ptr, which does not miler for the subtraction, both adds are phantoms and go away;
　　　　　　NOTE: that trick only works if (1) the framepointer is kept expressed relative to stack_limit_ptr, which may not work, or (2) if the stack is 8M aligned so that the subtract turns into a mask, which should work, and I think is not too onerous a restriction on the layout of memory;
　　　　OP: subtract-compare (5.3) (just a single subtract-compare):
　　　　rs1_target_StackObjPtr.pointer_within_bounds( )
　　　　OP: subtract-compare (5.4): rst_target_RawPtr<framepointer
　　　　OP: double-subtract-compare (5.5):
　　　　obj_metadata.range_contains(rs1_target_RawPtr)
　　　　DO.get(absptr)
　　　　OP: double subtract-compare (5.6):
　　　　subobj_metadata.range_contains(rs1_target_RawPtr)
　　　　DS.get(absptr)
　　　　bitwise-OP: xor (5.7): all_differences_in_suffix (source_mod_owner.mod_owner_id, target_mod_ownable.mod_ownable_id, target_may_read_suff_len);

bitwise-OP: xor (5.8): source_mod_owner.matches(target_mod_ownable)
bitwise-OP: xor (5.10): all_differences_in_suffix (source_mod_owner.mod_owner_id, target_mod_ownabl mod_ownable_id, target_may_write_suff_len)
  OP: max (5.9): target_may_write_suff_len=MAX(current_mod_owner.get_mod_owner_suff_len( ), obj_metadata.get_may_write_suff_len( ))
bitwise-OP: equality (5.11): obj_metadata.refable_version=rs1_val_AbsPtr.get_time( )
OP: subtract-compare (5.12): framepointer_minus_rs1_target callee_save_protected_range_size
bitwise-OP: equality (5.13): stack_loc_relto_fp_in_dwords==callee_save_reg_state_stack_loc_relto_fp_in_dwords
bitwise-OP: equality (5.14): rd==callee_save_reg_stale_reg_id
bitwise-OP: equality (5.15): rd==callee_save_reg_state_reg_id
bitwise-OP: equality (5.16): stack_loc_relto_fp.get_value( )==callee_save_reg_state.get_where_saved_val_of_reg(rd)*num_bytes_per_word64us where_saved.get(r); NOTE: this value is gotten earlier in this function as well
which_register.get(stack_loc_relto_fp_in_dwords)
Stage WRITE_BACK: Write Back to Registers and Commit any Buffered Store to Memory
None.
An Abstraction of the Policy Code for Each of the Six Stages
Stage IF: Instruction Fetch
  Control flow.
  observe_instruction_start0( ):
    get the text page meta-data for the page of the current program counter:
    TextPageMetadata current_text_page_metadata=TP.get(program_counter);
    a get the program_counter text tag:
    TextDwordKind text_dword_kind=TT.get(program_counter);
Stage ID/REG: Instruction Decode/Access Registers
Control Flow.
  clear_flags_of_registers0 (num_int_args_in_registers, num_float_args_in_registers):
    clear ref flags on the temporarily registers
    clear written flags on the temporary registers
    clear the ref_flags and written_flags on the aN registers past num_int_args_in_registers
    clear the unused floating point argument registers past num_float_args_in_registers
    maintain_stack_floor_at_call(new_stack_floor):
    insist that new_stack_floor is at or above stack_floor
    put the stack_floor to the new_stack_floor
    update_from_FunctionMetadata_for_text_addr(current_function_start0):
    check that the function address has a func_top_TextDwordKind: TextDwordKind text_dwork_kind=TT.get(current_function_start0);
    get the function meta-data: FunctionMetadata function_header=TF.get(text_ptr);
    update Dewdrop current function registers from function_header: current_function_start, current_function_end, current_danger_flag, current_mod_owner
    return whether Dewdrop remained within the same module
  bool just_called_function(callee_program_counter, sp, fool tail_call):
    enforce stack_obj_floor: if (tall_call, (which also means a sibling call)): {fault( ); in another embodiment stack_obj_floor=sp;} else {OP: subtract-compare (2,1): unless (sp<=stack_obj_floor): fault ("on a call stack pointer must be at most stack_obj_floor");};
    clear_flags_of_registers: default num_int_args_in_registers and num_float_args_in_registers to zero when undefined; clear_flags_of registers0 (num_int_args_in_registers, num_float_args_in_registers); make num_int_args_in_registers and num_float_args_in_registers undefined;
    clear the flags of the Dewdrop general-purpose argument and scratch CSRs
    stack_floor: maintain_stack_floor_at_call(sp);
    put caller_mod_owner: caller_mod_owner=current_mod_owner;
    update from the function header of the current_function_start: return update_from_FunctionMetadata_for_text_addr(callee_program_counter)
  maintain_stack_obj_floor_at_return( ):
    put stack_obj_floor to stack_floor, and check it is not NULL
  bool just_returned_function(caller_program_counter):
    put caller_mod_owner to nobody (as it is no longer valid)
    clear the flags of the Dewdrop general-purpose argument and scratch CSRs
    check that the callee returned to where the caller left off by checking the callee_ret_and_frame_ptr vs the caller_program_counter
    OP: add (2.2): See "get the current_function_start" below
    maintain stack_obj_floor: maintain_stack_obj_floor_at_return( );
    update from the function header of the current_function_start0: return update_from_FunctionMetadata_for_text_addr(callee_program_counter),
    get the current_function_start:

---

```
function_top_offset = callee_ret_and_frame_ptr.function_top_offset;
if (function_top_offset) {
  caller_page_base = caller_program_counter & page_remover_mask;
  current_function_start0 = caller_page_base + function_top_offset;
} else {
  // use the text page func_at_page_start
  unless (dd_current_text_page.current_text_page_metadata_found) {
    fault("no text meta-data for current page");
  }
  current_function_start0 = current_text_page_metadata.func_at_page_start;
}
```

--- check_constraints_on_a_function_call(bool tail_call):
  if (tail_call (which also means a sibling call)) fault;
  staying_within_module=just_called_function(program_counter, sp, tail_call);
  check the constraints on the function call: a call be to a function top and a modsame call stay within a module;
  bitwise-OP: xor and compare to zero (2.3): unless (staying_within_module), check function is within the callable module group of the caller according to the callee may_call_suff_len (NOTE: doing this re-uses the value of TF.get( ) gotten by just_called_function( ) above)
observe_instruction_start1(program_counter, sp):
  check for a func_top_TextDwordKind (used below) (note: this re-uses the result of TT.get(text_ptr) from observe_instruction_start0( ))
  if (control_flow_kind==fallthrough_CFK): nothing to do else if (control_flow_kind==branch, static jump, or dynamic jump): see "branch, static jump, or dynamic jump" below;
else if (is_call_ControlFlowKind(control_flow_kind)): check_constraints_on_a_function_call(false/*tail_call/*)
else if (control_flow_kind return_CFK): just_returned_function(program_counter);
branch, static jump, or dynamic jump:
  (1) if (text_dword_kind==func_top_TextDwordKind): this is a sibling/tail call, so raise a fault; (in another embodiment it has the semantics of a function call: check_constraints_on_a_function_call(true)).
  (2) else: jump/branch not to the top of a function unless
    (control_flow_kind==jump_or_branch_static_CFK): fault("jump/branch not to the top of a function must be static");
    NOTE: it is not necessary to check that Dewdrop stayed within the same module because, unless the current function bounds change, the hardware asserts that Dewdrop is in the same function which must be within the same module Stage EX1: Execute One
Control Flow.
observe_instruction_start2(program_counter, sp):
  OP: double-subtract-compare (3C.1): check current_function_start<=program_counter<current_function_end
  check Dewdrop is running a text page
  check Dewdrop is running a legal module
  NOTE: no memory access check is required: a module may always read its own text page
Data flow.
observe_memory_access0_ex1(imm, rs1_val, rs1_ref_flag):
  find the page_class_id for the target (found_data_page_meta_data, page_class_id, data_page_metadata)= DP.get(rawptr);
  OP: add (3D.1): add the immediate rs1_val_space_bits_plus_imm=rs1_val_space_bits+imm;
Stage EX2: Execute Two
Data flow.
  put_pointer_space_bits_and_page_overflow_flag (AbsPtr coast &absptr, DataPageMetadata const &pointer_data_page_metadata, word64us const new_pointer_space_bits):
    given the old absptr and its DataPageMetadata (found during stage EX1),
    put its space bits to new_pointer_space_bits;
    OP: subtract (4.1): if the original pointer is in the bottom_SubobjIdNamespace, then use the page_overflow_ flag if necessary to keep the effective_data_page_ index the same;
  otherwise, use the page_overflow_flag if necessary to keep the effective_page_class_id the same; doing this requires calling DP.get( ) twice, for the new page and the page before it (note: no subtract here, it is done during the cache fill): with the new pointer having page_overflow_flag=0 and with the new pointer having page_overflow_flag=1;
  note that this can be implemented as a single read of DP if on a fill of its cache it loads the value for the previous page as well; doing this doubles the size of the cache, but not the*number of cache fills;
  intercept_ALU_op_ref0 (word64us op_ref_input, word64us op_output, DataPageMetadata*pointer_data_page_metadata):
    for abs and stack object pointers, using put_pointer_space_bits_and_page_overflow_flag( ) merge—the op_ref_input metadata—with the op_output pointer;
    OP: sign-extend (4.2): also fault if the original op_output has information in the bits to be used for Dewdrop meta-data, as those bits will be lost
    OP: subtract-compare or maybe just xor (4.3): unless the op_output is to small to be a pointer, in which case, it can just be interpreted as an int
  observe_memory_access0_ex2( . . . ):
    if (rs1_ref_flag) finish computing the formal target pointer after the add using intercept_ALU_op_ref0( )
    check access alignment
    find the object and subobject metadata for the target
      obj_metadata=DO.get(absptr);
      subobj_metadata=DS.get(absptr)
    find the dword metadata for the target data_dword_metadata=DT.get(rs1_target_dword_aligned);
    OP: subtract (4.4) framepointer_ minus_rs1_ target= framepointer—rst_target_RawPtr; pointing_below_framepointer=framepointer_minus_rs1_target.is_positive( ); pointing_to_current_frame=has_stack_ page_class_id && pointing_below_framepointer;
    OP: subtract (4.5) rs1_val_dnrelto_sf=stack_floor—rs1_target_RawPtr;
Stage MEM: Load from Memory and Buffer any Store to Memory
Using the Dewdrop Interface
  For each category of 64-BIT RISC-V® instructions,
    the instructions in the category are listed; and
    the dewdrop_iface_operations are listed which are called in the implementation of those instructions, giving suggestive arguments and sometimes giving some context of how the result would be used.
Macro Definitions for Register Access
  These macros are used below when register accesses are made.

```
#define REG_VAL (REG)
    dewdrop_iface_intercept_ALU_reg
        ((REG), reg_get(REG), false/*as_raw_address*/);
#define PUT_IMM_OP_VAL(OPCODE, OUTREG, VAL)
    dewdrop_iface_intercept_ALU_op_imm
        ((OPCODE), (OUTREG), (VAL))
#define PUT_IMM_REF_OP_VAL(OPCODE, OUTREG, OUTREG_REFFLAG, VAL)
    dewdrop_iface_intercept_ALU_op_imm_ref
        ((OPCODE), (OUTREG), (OUTREG_REFFLAG), (VAL))
#define PUT_REG_IMM_OP_VAL(OPCODE, INREG, OUTREG, VAL)
    dewdrop_iface_intercept_ALU_op_reg_imm
        ((OPCODE), (INREG), reg_get(INREG), (OUTREG), (VAL))
#define PUT_REG_REG_OP_VAL(OPCODE, INREG1, INREG2, OUTREG, VAL)
    dewdrop_iface_intercept_ALU_op_reg_reg
        ((OPCODE), (INREG1), reg_get(INREG1),
            (INREG2), reg_get(INREG2), (OUTREG), (VAL))
```

These operations are made at register accesses.

```
dewdrop_iface_put_int_reg_written_this_cycle(this_int_reg_id);
dewdrop_iface_put_int_reg_read_this_cycle(this_int_reg_id);
dewdrop_iface_clear_int_regs_read_and_written_this_cycle( );
ret = dewdrop_iface_observe_int_reg_read(i, ret);
dewdrop_iface_observe_int_reg_write(i);
dewdrop_iface_put_float_reg_written_this_cycle(i);
dewdrop_iface_put_float_reg_read_this_cycle(i);
dewdrop_iface_observe_float_reg_write(i);
dewdrop_iface_observe_float_reg_read(i, allow_read);
```

Abstraction of Implementation of Operators
OP_INIM
    instructions: slli, slti, srli, srai, ori, andi, addi, sltiu, xori

```
rs1_val = REG_VAL(rs1);
PUT_REG_IMM_OP_VAL(op_code, rs1, rd, op_output);
```

OP_IMM_32
    instructions: slliw, srliw, sraiw, addiw

```
word64us const rs1_val = REG_VAL(rs1);
PUT_REG_IMM_OP_VAL(int_1reg_OpCode, rs1, rd, op_output);
```

OP
    instructions: sll, slt, mulhu, xor, div, srl, divu, sra, or, rem, and, remu, sltu, add, mul, sub

```
word64us const rs1_val = REG_VAL(rs1);
word64us const rs2_val = REG_VAL(rs2);
PUT_REG_REG_OP_VAL(op_code, rs1, rs2, rd, output);
```

OP_32
    instructions: divw, remw, remuw, addw, mulw, subw, sllw, srlw, divuw, sraw

```
rs1_val_int32 = lo_half_word64us(REG_VAL(rs1));
rs2_val_int32 = lo_half_word64us(REG_VAL(rs2));
PUT_REG_REG_OP_VAL(int_2reg_OpCode, rs1, rs2,
    rd, sign_extended_output);
```

UI
    instructions: auipc, lui
    PUT_IMM_OP_VAL(int_0reg_OpCode, rd, value);
Branch
    instructions: bltu, beq, bne, blt, bge, bgeu

```
word64us const arg1 = REG_VAL(rs1);
word64us const arg2 = REG_VAL(rs2);
dewdrop_iface_observe_control_flow_branch(imm, addr);
```

JUMP
    instructions: jal, jalr

```
dewdrop_iface_observe_control_flow_jump
    (jump_op_code, imm, rs1, rs1_val, rd, addr);
dewdrop_iface_intercept_and_observe_return
    (rs1, rs1_val, rd, reg_get(sp_int_reg_id))
dewdrop_iface_call_construct_base_target(rs1, rs1_val)
dewdrop_iface_intercept_and_observe_call
    (return_address_ref_flag/*output*/,
```

-continued

```
    rs1_val, reg_get(sp_int_reg_id), return_address)
PUT_IMM_REF_OP_VAL
    (int_0reg_OpCode, rd, return_address_ref_flag, ret_target);
dewdrop_iface_pending_put_num_int_args_in_registers_override1( );
dewdrop_iface_pending_put_num_float_args_in_registers_override1( );
dewdrop_iface_call_construct_base_target(rs1, rs1_val)
PUT_IMM_OP_VAL(int_0reg_OpCode, rd, return_address);
```

LOAD
    instructions: lb, lh, lw, ld, lbu, lhu, lwu

```
rd_ref_flag = dewdrop_iface_observe_memory_access
    (imm, rs1, rs1_val, rd, 0/*dummy rd_val*/,
        accessing_written,
        load_MemAccessKind,
        mem_access_width, mem_access_sign,
        mem_access_width_is_original);
dewdrop_iface_get_data_pointer_from_reg_as_
    Target(rs1, rs1_val, imm);
value = dewdrop_iface_space_bits(value1, rd_ref_flag);
dewdrop_iface_pending_put_int_register_ref_flag
    (rd, new_rd_ref_flag, Long_value);
```

STORE
    instructions: sb, sh, sw, sd

```
REG_VAL(rs2);
dewdrop_iface_get_data_pointer_from_reg_as_
    Target(rs1, rs1_val, imm);
dewdrop_iface_intercept_and_observe_store
    (mem_access_width, imm, rs1, rs1_val, rs2, value, target)
```

STORE_FP
    instructions: fsw, fsd

```
dewdrop_iface_get_data_pointer_from_reg_as_
    Target(rs1, rs1_val, imm);
dewdrop_iface_intercept_and_observe_store
    (mem_access_width, imm, rs1, rs1_val, rs2, value, target);
```

AMO
    instructions: amoadd_d, amoadd_w, amoand_d, ammoand_w, amomax_d, amomax_w, ammaxu_d, amomaxu_w, amomin_d, amomin_w, amominu_d, amominu_w, amoor_d, amoor_w, amoswap_d, amoswap_d, amoxor_d, amoxor_w

```
bool const rs1_ref_flag =
    dewdrop_iface_get_int_register_ref_flag(rs1)
Target const target = dewdrop_iface_make_pointer_into_Target
    (rs1_val, 0/*imm*/, rs1_ref_flag);
bool const target_written_flag =
    dewdrop_iface_get_effective_written_flag
        (target.get_addr_of_double_word( ))
rd_ref_flag =
    dewdrop_iface_observe_memory_access
        (0/*imm*/, rs1, rs1_val, rd, 0/*dummy rd_val*/,
            accessing_written, load_MemAccessKind,
            mem_access_width, mem_access_sign,
            mem_access_width_is_original);
dewdrop_iface_pending_put_int_register_ref_flag
    (rd, rd_ref_flag, orig_rd_val);
rd_val = dewdrop_iface_intercept_ALU_value
    (rd_ref_flag, rd_val, false/*as_raw_address*/);
op_output = dewdrop_iface_intercept_and_observe_store_AMO
    (op_code,
```

```
        rs1, rs1_val, rd_ref_flag, orig_rd_val, rs2, rs2_val,
        op_output, accessing_written,
        mem_access_width, mem_access_sign);
```

SYSTEM
  instructions: ecall, csrrw, csrrs, csrrwi, csrrsi
  dewdrop_iface_clear_flags_of_DD_GP_argument_CSRs
    ( );
Common Code to Every Instruction which Delegates to the Above Routines

```
        dewdrop_iface_observe_instruction_start
            (addr, reg_get(sp_int_reg_id));
        dewdrop_iface_observe_instruction_end( );
        dewdrop_iface_pending_update_and_clear( );
        dewdrop_iface_assert_last_cycle_written_of_reg_written_flag_of_\
            int_reg_written_this_cycle_is_this_cycle( );
        reg_get_any_written_reg(written_reg, written_reg_value);
        log_any_written_reg(written_reg, written_reg_value);
```

Instruction Extensions
  Instructions are effectively added to the instruction set without actually adding instructions to the instruction set by implementing effective instructions in hardware
    when the ecall (syscall) instruction in run with certain special negative ecall IDs,
    when certain special control status registers (CSRs) are accessed.
  This is accomplished by delegating to these Dewdrop operations which perform a particular effective instruction depending on the ecall ID or the CSR ID provided.

```
        dewdrop_iface_do_dewdrop_metadata_csrrw
        dewdrop_iface_do_dewdrop_manager_csrrw
        dewdrop_iface_do_spim_syscall
        dewdrop_iface_do_dewdrop_kernel_syscall
        dewdrop_iface_do_dewdrop_aux_dcall
        dewdrop_iface_do_dewdrop_data_dcall
        dewdrop_iface_do_dewdrop_metadata_dcall
        dewdrop_iface_do_dewdrop_manager_dcall
```

Hardware Implemented Kernel Code
  Hardware supported loading and other kernel tasks snakes these further operations.
Generic Support for Hardware-Implemented Syscalls

```
        dewdrop_iface_get_int_register_ref_flag
            (areg_int_reg_id);
        dewdrop_iface_pending_put_int_register_ref_flag
            (int_reg_id, false, 0);
        dewdrop_iface_mark_range_as_written
            (sim_buf_target.get_addr( ), res, false/*ref_flag*/);
        dewdrop_iface_make_pointer_into_Target
            (a1, 0, true*/ref_flag; NOTE: assumption*/);
```

Dangerous Syscalls
  For system calls that might want to require the calling user code have dangerous powers, such as sbrk( ):
    dewdrop_iface_current_danger_flag( );
Loading
  When loading argv, env, aux etc.

```
        dewdrop_iface_get_effective_written_flag(target0.get_addr_of_
            double_word( ))
```

```
        dewdrop_iface_observe_memory_access0
            (0,
             zero_int_reg_id/*dummy rs1*/,
             target + offset,
             container_ref_flag,
             0/*dummy rd*/,
             datum_ref_flag,
             datum_value,
             accessing_written,
             yes_MemAccessInteg,
             store_MemAccessKind,
             d_MemAccessWidth,
             signed_MemAccessSign);
```

Initializing, Finalizing, and Cycling Dewdrop
  Outside the implementation of each instruction, these operations are made.

```
sp_init =
dewdrop_iface_init_dewdrop_observer
    (loader_source, sp_init, loader->get_stack_lo( ));
dewdrop_iface_fini_dewdrop_observer( );
dewdrop_iface_addr_is_text(frame_top_word);
halt_addr = dewdrop_iface_make_dummy_return_pointer(halt_addr);
dewdrop_iface_clear_int_regs_read_and_written_this_cycle( );
dewdrop_iface_clear_float_regs_read_and_written_this_cycle( );
dewdrop_iface_get_int_register_written_flag(r)
dewdrop_iface_put_int_register_written_flag
    (dewdrop_active_state_hidden, ra_int_reg_id, true);
dewdrop_iface_pending_put_int_register_ref_flag
    (sp_int_reg_id, true, sp_init);
dewdrop_iface_show_dewdrop_active_state_if_hidden
    (Loader_source, sp-init);
dewdrop_iface_hide_dewdrop_active_state_if_showing
    (pc, sp, cause_is_intentional);
dewdrop_iface_pending_update_and_clear( );
dewdrop_iface_pending_clear( );
```

Additional Dewdrop Instructions
  Here, the Dewdrop call is listed and CSR operations that allow controlling the additional features of Dewdrop. Most if not all of these dcalls would be implemented by hardware instructions in a hardware-implemented Dewdrop system. These are used in the Dewdrop software simulator. Note that for some explanations are provided, but where the semantics is clear from the name, no further explanation is given.
  Dewdrop ecall operations for modifying the manipulation of data:
    set_next_instruction_danger_may_store_ephem_to_hg:
      dangerous code (code running in a function having a danger-flag set to true) may use this operation to set a next_instruction_danger_may_store_ephem_to_hg
      flag to true, which remains set to true for just one subsequent instruction before being automatically cleared to false by the Dewdrop hardware; when this next_instruction_danger_may_store_ephem_to_hg_
      flag is true, store instructions are allowed to store an ephemeral pointer (alternatively, allowed to store any kind of pointer) to heap-global memory. (In one embodiment, the set_next_instruction_danger_may_store_ephem_to_hg operation sets a next_instruction_danger_may_store_ephem_to_hg_just_put flag, which at the next instruction the Dewdrop hardware clears and then sets the next_instruction_danger_may_store_ephem_to_hg_flag, which at the cycle after that is then cleared; the result being that the next_instruction_danger_may_store_ephem_to_hg flag is set only for one instruction, specifically the next instruction after the set_next_instruction_danger_may_store_ephem_to_hg operation, and is then cleared.).

clear_next_instruction_mem_access_integ: code may use this operation to set a next_instruction_mem_access_integ flag to true, which remains set to true for just one subsequent instruction before being automatically cleared to false by the Dewdrop hardware; when this next_instruction_mem_access_integ flag is true, load and store instructions are allowed to access an object which has a clear integrity flag and are not allowed to access an object which has a set integrity flag. (In one embodiment, the clear_next_instruction_mem_access_integ operation sets a next_instruction_mem_access_integ_just_put flag, which at the next instruction the Dewdrop hardware clears and then sets the next_instruction_mem_access_integ flag, which at the cycle after that is then cleared; the result being that the next_instruction_mem_access_integ flag is set only for one instruction, specifically the next instruction after the clear_next_instruction_mem_access_integ operation, and is then cleared.)

Dewdrop ecall operations for manipulating metadata:
annotate_text_page
addr_is_text
annotate_object: NOTE: this would likely be done in software by several steps, but in the current simulator of the Dewdrop embodiment does it in one step of simulated hardware
assert_user_current_danger_flag
get_default_mod_ownable_for_mod_owner
get_mod_owner_of_function
get_mod_ownable_of_obj
get_mod_suffix_of_obj
get_integrity_flag_of_obj
get_may_read_suff_len_of_obj
put_may_read_suff_len_of_obj
get_writable_flag_of_obj
put_writable_flag_of_obj
get_public_flag_for_data_dword
get_writable_flag_for_data_dword
get_may_write_suff_len_of_obj
put_may_write_suff_len_of_obj
get_my_make_ref_suff_len_of_obj
put_may_make_ref_suff_len_of_obj
put_all_flags_for_data_dword
get_refable_owner_managed_flag_of_obj
get_refable_may_make_ref_flag_of_obj
get_refable_informally_targetable_flag_of_obj
get_refable_version_of_obj
inc_refable_version_of_obj
get_ref_flag_for_data_dword
make_ref_into_structured
get_ref_flag_of_structured
make_perm_ref_into_ephem_ref
idem_make_perm_ref_into_ephern_ref
get_time_addr_of_structured
make_structured_have_time_addr_of_obj_version
idem_put_public_target_flag
idem_put_writable_target_flag Dewdrop CSR operations for manipulating metadata:
get_kind_of_structured: for a structured pointer, return what kind it is
put_flags_for_16_dwords: annotate flags into data for 16 double words at a time
narrow_structured_immediate: narrow a heap-global pointer to point to a subobject and use the immediate subobject representation to do that
narrow_structured_subobj_id_delta: narrow a heap-global pointer to point to a subobject and use the subobject ID representation; further, use an subobject-id delta rather than an absolute subobject-id so that the narrowing does not need to know where it is relative to the start of the object, only relative to its parent object
page_class_alloc: allocate a page class; this could be done in software
get_start_of_range: get the start of the range of an object or subobject
get_is_iterator: return whether this subobject is annotated as an array iterator, rather than as a pointer to an array element
widen_structured_to_improper_subobj: return the whole object from one of its subobjects
set_ok_to_return_flag
put_num_int_args_in_registers
clear_caller_save_reg_except_args: mark all of the caller-save registers as unwritten except those marked as arguments
get_object_size_of_obj
put_num_float_args_in_registers
stack_base_ptr: get or put the stack_base_ptr
get_text_dword_kind_of_text_addr
put_text_dwork_kind_of_text_addr
load_function_metadata
erase_data_dword_metadata_for_raw
stack_floor_ptr: get or put the stack_floor_ptr
get_current_mod_owner
get_caller_mod_owner
assert_caller_is_current_mod_owner
transfer_obj_to_new_owner: change the mod owner of an object and also lower the integrity flag of that object
put_mod_suffix_of_obj
put_integrity_flag_of_obj
put_public_flag_for_data_dword
put_writable_flag_for_data_dword
put_public_writable_flags_for_data_dword
get_written_flag_for_data_dword
set_written_flag_for_data_dword
clear_written_flag_for_data_dword
put_refable_owner_managed_flag_of_obj
put_refable_may_make_ref_flag_of_obj
put_refable_informally_targetable_flag_of_obj
put_refable_version_of_obj
idem_make_structured_into_raw
clear_ref_flag_for_dword
make_abs_structured_into_abs_ref
make_ref_into_raw
obj_version_ceiling_circ_minus_obj_version
get_page_class_iter: if using an internal iterator over the page-classes, return it
get_object_iter: if using an internal iterator over the objects, return it
obj_rotate_version_clock
in_place_make_reg_abs_ref_into_structured_unless_fresh: if a pointer in a register is stale, clear its ref flag
in_place_make_mem_abs_ref_into_structured_unless_fresh: if a pointer in memory is stale, clear its ref flag
get_data_page_iter: if using an internal iterator over pages, return it
make_structured_have_obj_id: attach an object ID to a pointer
idem_make_func_raw_or_structured_into_forward_text_ref callee_save_active_flag
save_restore_callee_save_reg_state Read/write Dewdrop general-purpose CSR operations used for providing additional arguments to other Dewdrop CSR operations:

dewdrop_scratch1_csr
dewdrop_scratch2_csr
dewdrop_arg1_csr
dewdrop_arg2_csr

Dewdrop emit operations for manipulating Dewdrop itself:

get_dewdrop_requested: has the user requested dewdrop?
init_dewdrop
get_dewdrop_active
put_dewdrop_active Dewdrop CSR operations for manipulating Dewdrop itself:

get_dewdrop: is dewdrop on?

For details on some of these functions, see Section "File: ddo_dewdrop_dcall.cc".

Dewdrop Source-to-Source Transform of Pre-Processed) C

These are notes on dewdrop-clang-tools: our source-to-source transformation tools which are based on the prior art Clang/LLVM front-end and which target C source.

Using these Tools to Transform C Code for Running on Dewdrop-RV64

The fastest way to get started with these tools is to use the driver script which acts as a compiler driver. This script is written in Python; see Section "File: xforming-compiler-wrapper.py".

The driver script depends upon the RISCV environment variable being set to the root of the 64-BIT RISC-V® system install directory, and upon the DEWDROP_ROOT environment variable being set to the directory where the dewdrop repos are placed. Simply use the xforming-compiler-wrapper.py script anywhere where you would usually use 64-BIT RISC-V® gcc. The script will attempt to notice and transform any provided source files while simply passing through to GCC any additional arguments. This script is successful as a C compiler to autoconf-based build systems in benchmark repos.

Tools

It is unlikely you will need to use our source-to-source transform tools directly; the xforming-compiler-wrapper.py will run the necessary transforms as part of its mission of turning a C source file into a reloc file.

The following tools for analyzing and transforming C source are provided.

MainlineSequence
ClassAnnotator
AnonymousTypeNamer
Heapifier
IdentPrefixChecker
LineDirectiveRemover
PathToIdentifierEncoder
CallAnnotator If you need fine grained control over how a C file becomes a reloc file and to perform all of the C transforms necessary to provide Dewdrop protections, the MainlineSequence is recommend. While the effect of the MainlineSequence can be provided by running your source code through multiple other tools in sequence, each of these tools will have to independently parse the C code it is given. Because the MainlineSequence can run all of the C transforms with one parse, it is much, much faster than running the tools independently.

If you must run the tools independently, it is recommended that you pass your source code through the following tools in the following order:

1. CallAnnotator
2. ClassAnnotator
3. Heapifier

If you need to use any of the C source-to-source xform tools directly, you must preprocess each translation unit with cpp or gcc-E before sending it to the C transforms.

These tools mostly exist as independent entities for testing; it is useful for testing purposes to focus on one holistic aspect of the source-to-source transformation at a time.

Details on some of these follow.

MainlineSequence

The MainlineSequence performs all of the C-level source-to-source xforms that are needed to prepare the code to be run with Dewdrop protections. It has the effects of running the CallAnnotator, ClassAnnotator, and Heapifier tools one after the other (but is much faster).

ClassAnnotator

The ClassAnnotator performs three basic layers of tasks. The first is creating a number of metadata objects describing the layout and properties of classes to help the Dewdrop system provide protections for the data in the program. The second is to inspect dynamic allocation sites (such as malloc) throughout the program and construct allocator objects for laying out the classes they request. Finally, the calls are transformed to allocation/de-allocation functions to handle Dewdrop concerns that are not present in the original function calls, such as specifying the allocator to be used, transferring module ownership, setting the submodule ID, and setting integrity.

AnonymousTypeNamer

This tool is not used independently in preparing C code to be rm with Dewdrop protections. It, instead, surfaces a code transformation pass used in a few of the other transforms for testing.

The AnonymousTypeNamer takes all anonymous types used in top-level variable declarations (not field declarations) and assigns them generated names. This allows us to print declarations of these types for temporaries. Merely using typeof is not sufficient for Dewdrop purposes; creating temporaries with all const qualifiers stripped is often needed. This tool is used to run tests to ensure that this process is performed correctly.

Heapifier

The Heapifier is somewhat over-narrowly named; as explained later, it is actually responsible for four different transforms:

heapification
stack object protection
pointer narrowing
eliminating stack arguments This tool may be renamed, or functionality factored out of it, at a later time.

The Dewdrop stack protection scheme can only protect stack-allocated objects of a statically-known size smaller than some threshold (currently 512 bytes). The Heapifier transforms the code to allocate any stack object that has dynamic size (such as a VLA or the result of alloca) or has a size larger than that threshold on the heap instead of the stack. It further generates code to initialize the object and deallocate it when the function finishes.

While the Heapifier, by default, will automatically heapify VLAs and calls to alloca, it can be requested that it fault instead by passing the command line arguments— fault_rather_than_heapify_on_vlas and —fault_rather_than_heapify_on_allocas, respectively.

For stack objects below the size threshold, the Heapifier inserts a call to sysdewdrop_narrow_pointer_immediate( ) around any expression that takes the address of the object or a field of the object, including circumstances where an array type decays to a pointer type.

The Heapifier interprets taking the address of a field of an object or an array element as a desire to restrict access of the resulting pointer to the bounds of that field or array element. To satisfy this desire, it thus also inserts calls to sysdewdrop_narrow_pointer_immediate( ) or sysdewdrop_narrow_pointer_subobj_id_delta( ) at any point where the address of the field of an object is taken (including via array to pointer decay).

It can be difficult to distinguish between circumstances in which a user takes the address of an array element, intending to restrict access to only that array element, and circumstances where the user intends to iterate over the elements of an array. For the first circumstance, the Heapifier should issue a narrow call to the one element of the array requested, while in the second, the Heapifier should narrow to the bounds of the whole array. To accomplish this, the Heapifier assumes that taking the address of an array element like so:

&ptr->buf[i]

indicates that the programmer wishes to have the resulting pointer restricted to only element i, while an array to pointer decay like so:

ptr->buf+i indicates that the user wishes to iterate over the array, and thus the resulting pointer should be restricted to the whole bid field.

Because the above two patterns have identical effects in regular C, mis-inference can sometimes occur; the most common pattern of misbehavior is initialization of an iterator with the address of the zero-indexed element like so:

iter=&ptr->buf[0]

The Heapifier issues a warning upon seeing this pattern, which can be upgraded to an error or suppressed via the option—addr_of_element_zero_behavior, The default 64-BIT RISC-V® calling convention passes the first 8 arguments in registers and pushes any further arguments into the callee's stack before performing a function call. Pushing the arguments on the callee's stack poses a problem for the escape analysis Dewdrop uses to enforce stack object time hounds, as this range of space belongs to two stack frames at the same time. Similar split responsibilities across frames arise when a function's return type is too large to fit into two registers, as the space for the returned object is allocated in the callee's stack frame and expected to be read by the caller.

To solve this problem, the Heapifier transforms function calls and function declarations to eliminate stack arguments. The Heapifier transforms any call to a function with more than 8 arguments to use the last argument to point to a buffer of additional arguments allocated in the caller's stack, placing all arguments that do not fit in the registers into this buffer. Additionally, the Heapifier transforms calls to functions with variadic arguments to replace the variadic arguments with a pointer to a buffer in the caller's stack containing the variadic arguments. The Heapifier also creates space for large returned objects in the caller and passes a reference to this space to the callee. These steps allow all calls and returns to and from functions to occur through registers, eliminating split responsibilities for stack space.

IdentPrefixChecker

This tool checks all user-specifiable identifiers and ensures that the given prefix is not found in any of them.

LineDirectiveRemover

All of our C source-to-source transforms delete line directives and GNU line markers from the code they process and replace them with equivalent line markers upon printing the code hack out. This tool is used to test that this process is performed correctly.

PathToIdentifierEncoder

PathToIdentifierEncoder transforms the path to the source file for a particular translation unit into a prefix suitable for prepending onto an identifier. This was previously used for functionality that has since been removed, but could be useful in the future.

CallAnnotator

The Heapifier tool transforms all calls and returns to eliminate stack arguments so all call arguments and return values can be passed through registers. CallAnnotator outputs information describing how many registers are intended to be used as arguments by callers and how many registers are intended to be used as return values by canoes. This is necessary because the Dewdrop hardware is allowed to make reads to registers that are not annotated as intended call arguments or return values return 0 or fault to protect the caller or callee's information.

The CallAnnotator creates special metadata globals indicating the number of registers used for arguments on calls and returns to and from a function. These metadata globals have a mangled name containing the arity information and the function's name (which, in C, will also be its label in asm). These metadata globals are consumed by the Dewdrop assembly transform, dewdrop-asm (dasm), to insert instructions that cause the hardware to allow the contents of those registers to be exposed to the callee or caller, possibly after performing checks upon the contents.

The CallAnnotator produces a metadata global indicating the number of registers used for a return for any function definition it sees, which is always used by dasm to expose return registers to the caller when returning from the ASM function body starting with that label.

The CallAnnotator also creates a metadata global indicating the number of registers used for a call for any function declaration with a prototype that it sees. This is used by dasm to indicate the call arity before any jal to a matching function label. While this will correctly handle any C function call to a statically-known callee with a prototype that does not involve a GCC alias. Dewdrop cannot rely upon dasm for calls through a function pointer, through a GCC alias, or to a function without a prototype. In these circumstances, the CallAnnotator inserts code to set the call arity before the function call, and to reset the call arity at e end of any argument expression to the call that may itself contain a function call.

Tool Command Line Options

Many of the command line options for the source tools are shared between multiple tools. The options that are shared across multiple kinds of tools are provided before moving to those that belong to individual tools.

File Path Options

These file path reporting options are present in all tools:
strip_prefix: Used to indicate a prefix that should be stripped from all paths used in reporting, name mangling, or line numbers, if all of the code that you are transforming lies under some project directory, this can be used to strip the path up to the root of the project for more concise file names.

strip_all_dirs: Like strip_prefix, but states that the entire directory should be stripped off of each file considered, Useful for projects where each source file has a unique name.

Rewriting Options

These rewriting options are present in all tools that perform rewriting:

output: Indicates a directory in which to place the rewritten source files. The rewritten file will be placed at a path from this output directory that is the same as its path from the original root directory, but with the—strip_prefix prefix of that path omitted. For instance, if you rewrite a file living at /home/me/myProject/src/someDir/myFile.c with a—strip_prefix of /home/me/myProject and an output dir of /tmp/tmpOutDir, the rewritten file will be found at /tmp/tmpOutDir/src/someDir/myFile.c line_reporting_strip_prefix: if you would like to use a strip prefix that is different from your regular strip_prefix for line directives, providing a prefix here will take precedence over the—strip_prefix for line directive reporting.

Stalk Metadata Options module_name: Indicates a string that you would like to use to identify the module in which the translation units provided as arguments live. Translation units transformed with the same module name will be considered to live in the same module. If this option is not specified, the translation unit will be given the module name "misc". Module names must only contain alphanumeric characters and the underscore character. The module name must be consistent with the module name specified to the dasm tool; please look at the Readme in the dewdrop-asm repo for more details.

expect_static_metadata_header_already_present: Indicates that the xforms should expect that the Dewdrop header describing the static metadata structures should already be in the code to be transformed. Usually only needed for Dewdrop system libraries.

IdentPrefixChecker Options prefix: The prefix that the IdentPrefixChecker should ensure does not already start some symbol in the program.

ClassAnnotator unexpected_allocation_format_diagnostic_behavior: When the ClassAnnotator sees an allocation site that has a size expression not expressed as a multiple of the sizeof the type being allocated (or, for types ending in a flexible array member, the sizeof the base type plus a multiple of the sizeof the flexible array member's element type), it warns the user. This option may be used to change this diagnostic to an error or suppress it.

unstructured_allocation_diagnostic_behavior: The ClassAnnotator uses the cast on the return from allocation functions (such as malloc or realloc) to determine the sub-object structure that should be used when allocating the object. If such a cast is not present for provides no information, such as a cast to void*) the transforms cannot allocate the object on an allocator that provides sub-object structure. Thus, the transforms issue a warning in this case. This option may be used to change this diagnostic to an error or suppress it.

Implementation Details

The Dewdrop clang tools are built upon the standard Clang tooling framework. The dewdrop-clang-tools binary takes as its first argument a sub-tool to run, and builds a boilerplate ASTFrontendActionFactoty which creates an ASTFrontendAction which creates a sub-tool-specific ASTConsumer. Each of the sub-tools is implemented as the body of an override of ASTConsumer::HandleTranslationUnit, a function called for each translation unit encountered by the tool. Each of these source-to-source xform implementations of HandleTranslationUnit create a DewdropRewriter, pass it to various xform passes implemented as children of Clang's RecursiveASTVisitor, and print out the result from the DewdropRewriter to the output file.

RecursiveASTVistor

The RecursiveASTVisitor is, as its name implies, a visitor for the Clang AST. Constructing one and calling TraverseDecl upon a Clang TranslationUnitDecl will cause each expression, statement, and type use in that translation unit to be visited via a call to the Visit<ASTNode>(ASTNode*) method. The unmodified implementation of RecursiveASTVisitor has trivial bodies for each of the Visit methods, but a custom visitor can easily be created by creating a subclass of RecursiveASTVisitor with an implementation of the desired Visit methods. Although the default order in which sub-nodes are visited relative to their parent node and each other is usually fine, this can be (and, in our tools, sometimes is) overridden by overriding the TraverseASTVisitor's 'Traverse or WalkUpFrom methods, Although the RecursiveASIVisitor performs a pre-order AST traversal by default, the Dewdrop clang tools that perform rewriting often use a postorder traversal (which is requested by overriding the RecursiveASTVisitor::shouldTraversePostOrder( ) method).

DewdropRewriter

The default Clang rewriter is not used, as it exhibits hard-to-reason-about behavior when edits are made to the same range of code in multiple passes. Instead, The Dewdrop system provides its own DewdropRewriter. The DewdropRewriter uses two strategies to minimize complexity:

A limited set of operations is allowed. In general the DewdropRewriter attempts to provide operations that perform tree substitutions on text that corresponds to AST sub-trees, rather than general string substitution: (1) Edits are not allowed to straddle they must speak of disjoint locations or one must nest within the other. (2) If a destructive edit is performed upon a range of code (deleting the original range), all later edits must nest around that range.

All edits are described in terms of locations in the original source code: (1) Each edit is "anchored" to some positive-length range of text. (2) if this range is deleted, so are the edits made to it.

The DewdropRewriter has two basic operations:

nestAround: two ranges of text (of length zero or more) are placed before and after a range of original text and the original code is not otherwise altered.

substitute: A range of text is removed and another range of text is added in its place.

When the DewdropRewriter does a nestAround or substitute on a range of text, it does not immediately perform a string substitution; instead, it records the intended edit in a map from a source range to a collection of edits made at that source range. The source range is sorted by ascending start location and descending end location. Doing this puts larger, earlier ranges first, with later, smaller ranges later, accomplishing a nesting structure. The edits are applied when the substitution has finished and the result is being printed out. Upon adding an edit to the map, the DewdropRewriter checks that the new edit does not straddle an existing edit and that it does not nest within an earlier substitution. If an edit is made to a range that has pre-existing edits:

a nestAround is considered to nest around all prior edits
a substitute is considered to delete all prior edits Types Most of the Clang AST is fairly straightforward in its representation. The distinction Clang makes between QualType-s and Type-s can be confusing, however. Most AST nodes will not point directly at a Type, but will instead contain a QualType. While Type-s contain canonical information about the type name, structure, etc., they will not provide any information about the const, volatile, or restrictness of the type. These additional qualifiers are separated out, so as to not complicate the canonicalization, and are stored alongside the pointer in the QualType structure. There is no source range member in a QualType, and any type location information you may find around it is about the underlying type, not the type with qualifiers.

Compilation Database

If you run one of these tools with just the arguments you might expect (input source files, tool-specific options) you might get the following error:

LLVM ERROR: Could not auto-detect compilation database for file "<filename>" No compilation database found in <directory> or any parent directory json-compilation-database: Error while opening JSON database: No such file or directory This cryptic error message is saying that the tooling API is expecting some information about how you compiled these files. Running the gcc preprocessor before feeding the code to Clang is advided. Therefore, is often not needed to use preprocessor options. One option that is almost always needed is -arch riscv64, as otherwise clang will not know how to parse inline assembly, and may make incorrect guesses about the size of sizeof expressions.

Configuration of Compilation Proper

Configuration of the compile process requires that the prior art gcc compiler be configured; see Sections "File: c-general.aopts", "File: c-opt-offaopts", and "File: dasm-mark-linker-script-globals-as-non-refs.aopts"

Dewdrop Source-to-Source Transform of 64-BIT RISC-V® Assembly (dasm)

These are notes on dewdrop-asm: our source-to-source transformation tools which target assembly files suitable for input to the GNU assembler (gas). These tools use a lexer generated by flex to tokenize the input. The dewdrop-asm (dasm) tools are run through a binary with the filename dasm. The tools are frequently referred to by the shorter name of the binary (dasm) rather than the longer name of the repository.

Using these Tools to Transform Assembly Code for Running on Dewdrop-RV64

The fastest way to get started with these tools is to use the driver script which acts as a compiler driver: see Section "File: xforming-compiler-wrapper.py". If presented with a C file, it will automatically apply both the recommended C source-to-source transforms and the recommended assembly source-to-source transforms. Like the GCC compiler driver, it is sensitive to the extension of its input file: for instance, it knows that a .c file requires C pre-processing, C source-to-source transforms, compilation to assembly, assembly transforms, and assembling to become a .o file, while a .s file requires only assembly transforms and assembly to become a .o file. Thus, this driver script is a convenient option both for C code and for handwritten assembly.

The driver script depends upon the RISCV environment variable being set to the root of the 64-BIT RISC-V® install directory, and upon the DEWDROP_ROOT environment variable being set to the directory where the dewdrop repositories are placed. Simply use the xforming-compiler-wrapper.py script anywhere where you would usually use 64-BIT RISC-V® gcc. The script will attempt to notice and transform any provided source files while simply passing through to CCC any additional arguments. This script has been successful as a C compiler to autoconf-based build systems in benchmark repositories.

Running dasm Directly

It is unlikely you will need to use dasm directly; the xforming-compiler-wrapper.py will run the necessary transforms as part of its mission of turning a C or assembly source file into a reloc file.

If you need to use dasm directly, the standard way of running it is described by the following regex-like pattern:

dasm-in input_file.s-xform insert_stack_floor_lowering_writes=(clever|naive)

insert_saving_of_callee_save_reg_state=(clever|naive)

module_name "some_module_name" output_file.s

For both—insert_stack_floor_lowering_writes and—insert_saving_of_callee_save_reg_state, use the clever mode on optimized assembly and the naive mode on assembly produced by a compiler running with –O0.

The Dewdrop C source-to-source transforms produce metadata and metadata hints that allow dasm to correctly produce instructions and metadata for the classes of globals, the number of arguments passed to functions, the number of values returned from functions, and more. If you are running dasm on assembly that was not the result of compiling C transformed by the MainlineSequence of the dewdrop-clang-tools, you may need to hand-write metadata to have the compiled result of the assembly transforms correctly run.

dasm Hint Metadata

Because dasm transforms ASM code rather than C, it has a more precise understanding of the contents and bounds of globals and functions than the C source-to-source transforms can have. This makes dasm useful tool for inserting metadata globals and instructions describing properties of globals and functions. Unfortunately, some of the higher-level structure of the C code is lost in compilation to assembly, such as the number of arguments a function takes, the number of values it returns, the class of a global, and more. For this reason, the C source-to-source transforms produce metadata globals providing hints to dasm about these lost pieces of higher-level structure. If you wish to transform assembly that was not produced by C run through the MainlineSequence of dewdrop-clang-tools, you may have to hand-write these hints.

These hints are provided as globals with mangled names in special sections. Because all of the information is provided by the mangled name, the data for such globals should be trivial, such as zero 1

These sections are thrown out by the linker script via a/DISCARD/output section, and thus end up taking no space in the final executable.

Many of these mangled names contain e string $s_. This delimiter is used to indicate that a user identifier starts after it.

dewdrop_metadata_is_obj

Uses of C globals declared as extern and C functions declared as extern appear only where they are used in assembly without any declaration code indicating their identity; thus, extern globals and functions are not easily distinguishable from each other in ASM code. The dewdrop_metadata_is_obj hints remedy this ambiguity.

A global defined in the dewdrop_metadata_is_obj section with the prefix:
  _dewdrop_metadata_is_obj$s_
will indicate that the identifier after the $s_should be considered a label describing a data global rather than a function.
dewdrop_metadata_call_arity The Dewdrop hardware prevents unintentional leakage of data from a caller to a callee through argument registers. It accomplishes this for calls by only exposing the number of argument registers indicated by the num_args_in_dwords CSR, making reads to all others either return 0 or fault.

While a C function call site always indicates exactly how many arguments are passed by a caller to a callee, this information is not preserved by standard C compilers when compiling to assembly. While the C source-to-source transforms could insert setting the call arity in all cases, doing so at the C language level is inefficient:
  due to inlining, not all C function calls are realized as calls in ASM and inserting setting the num_args_in_dwords before an inlined call causes wasted cycles and instruction memory
  because the C spec does not specify an order in which call arguments must be evaluated, and because arguments may contain call expressions, it may be necessary to set the num_args_in_dwords multiple times or to perform heavy modifications upon the code performing the call To sidestep these issues, the C xforms only insert setting the num_args_in_dwords on calls through function pointers or to functions without prototypes. For any call to a function that occurs to a statically-known callee, the C xforms instead create a metadata global with the following prefix:
  dewdrop_metadata_call_arity_of_func_name_in_dwords_is_[0-8]_for_$s_
  with the name of the function placed after the $s_ at the end. This global will be placed in the dewdrop_metadata_function_arity section.

If a handwritten assembly file performs a static call to a function label, it may be necessary to write a similar arity metadata global to indicate how many arguments the function intended to pass to its callee. If the function performs a call through a function pointer, or performs a call to the same function label with different numbers of arguments, it may be necessary to hand-write the instruction setting the num_args_in_dwords CSR before the call.
dewdrop_metadata_return_arity The Dewdrop hardware also prevents unintentional leakage of data and leakage of stale stack object references from a callee to a caller through argument registers. Similarly to calls, the number of registers needed to hold a return value is clearly marked in the return type of a C function, but this information is lost during compilation. Because of the escape analysis aspect, the code to indicate register values for return must occur directly before the ret instruction and cannot be precisely inserted at the C language level. Therefore, the C xforms communicate the number of return registers to dasm with a global with the following prefix:
  _dewdrop_metadata_return_arity_of_func_name_in_dwords_is_[0-8]_for_$s_
  with the name of the function placed after the Ss_at the end. This global will be placed in the dewdrop_metadata_function_arity section.

If a handwritten assembly file contains the definition of a function, and that function returns values in registers, it may be necessary to hand-write a metadata global indicating the return arity of that function in the assembly file that defines it.

dewdrop_metadata_noreturn dasm runs static analyses to perform some of its transformations. In doing so, it builds a control flow graph of each function, and assumes that calls to functions generally return. While this is true in general, calls to functions marked with the noreturn attribute at the C language level will not return. If dasm is unaware that a call to a function will not return, this can deeply confuse the model dasm build of the control flow graph, and may cause dasm to stop its static analyses with an error.

To inform dasm about noreturn functions, the C xforms create a metadata global with the following prefix:
  _dewdrop_metadata_noreturn_func_name_$s_
  where the name of the function is after the $s_. This global will be placed in the dewdrop_metadata_function_noreturn section.

If a handwritten assembly file calls a noreturn function, it may be necessary to create a metadata global indicating the noreturn function.
dewdrop_metadata_indicate_module_name Both the C xforms and dasm need to know the name of the module into which they are emitting the functions and globals of a translation unit. To ensure that they use the same module name, the C xforms create a metadata global with the following prefix:
  _dewdrop_metadata_indicate_module_name$s_
  with the module name after the $s_. This global will be placed in the dewdrop_metadata_indicate_module_name section.

Handwritten assembly is not required to contain this metadata global. However, if you wish to restrict a handwritten assembly file so that any changes to its module require a change in the underlying source file (for instance, to force such changes to appear in a code review), this metadata global may be used.
dewdrop_static_class_for Dewdrop needs to understand the internal layout of globals to provide them with sub-object boundary enforcement. This information is available at the C language level and is gone by the time C code is compiled to assembly. The responsibility for emitting global metadata, however, falls to dasm. This is for a number of reasons, including the fact that some globals emitted by C compilers cannot be referred to in a global scope (such as static locals), some translation-unit local globals may be eliminated by the optimizer, and some things that turn out to be represented as global objects in assembly are not obviously globals at the C language level (such as some floating point constants). To communicate the class information of a particular global to dasm, the C xforms generate an alias to the Dewdrop_Metadata_Static_Class instance describing the layout of the global with a name in the following format:
  _dewdrop_static_class_for_
  with the name of the global following the last underscore.

If dasm does not find such an alias for a user global, its default behavior is to emit an error. If the flag—create_naive_static_class_for_arty_global_without_one is passed, however, dasm will instead create a trivial static class object of the appropriate size with no internal sub-object structure.

Handwritten assembly containing global definitions can take one of the following steps to get running:
  If the globals have no interesting internal structure, or if sub-object enforcement of the globals is not required, dasm can be passed—create_naive_static_class_for_any_global_without_one, which will effectively skip sub-object metadata generation for globals in that translation unit The definition of the global can be rewritten into a C file in the same module as the original assembly file and be given linkage. The assembly file can then refer to the label of the global to use it.

The required Dewdrop_Metadata_Static_Class object can be handwritten in the handwritten assembly file alongside a handwritten alias. This can be error-prone, so try one of the other two methods first.

dewdrop_metadata_ref_in_data

C considers the address of a global without linkage or a field of a global without linkage to be a constant expression. As such, the address of the field of a global without linkage may appear in the initializer for another global. Dewdrop considers taking the address of the field of a global as a desire to protect the bounds of that field of that global as a sub-object, and thus this address should be narrowed to the bounds of the field.

When the C initializer containing the address of the field of a global is converted to assembly, the information about which field has had its address taken will be erased, as this will be shown in assembly as just a byte offset from a global label. It is, however, difficult to generate the Dewdrop_Metadata_Ref_In_Data_Offset objects used to indicate which global offsets contain pointers which should be made into references at the C language level. This is because some such globals may having scoping issues (such as static locals), may have linkage (and thus cannot have their address provided as the initializer to a metadata global), or may not have names (such as file-scoped compound literal expressions).

Therefore, the C xforms produce metadata global hints for dasm to use when generating the Dewdrop_Metadata_Ref_In_Data_Offset tables. When the sub-object can be represented with an immediate, the metadata hint has the following prefix pattern:

_dewdrop_metadata_ref_in_data_immediate_subobj_size_[0-9]+_at_offset_[0-9]+_in_global$s_.

with the containing global's name following after the

When the sub-object cannot be represented with an immediate and must be narrowed using a sub-object ID delta, the metadata hint has the following prefix pattern:

_dewdrop_metadata_ref_in_data_delta_(top|bottom)_subobj_delta_[0-9]+_size_[0-9]+_at_offset_[0-9]+_in_ global$s_ with the containing global's name following after the $s_.

Both kinds of hints are placed in the dewdrop_metadata_ref_in_data_subobjects section.

If you have globals in handwritten assembly and you hand-wrote the type information (as was discussed in the section about attaching type information to globals in assembly), and one of those globals is initialized with the address of a field of the other, it may be necessary to hand-write these dewdrop_metadata_ref_in_data_subobjects metadata globals to protect these initializations, Initializing globals with the fields of other globals, however, is very rare, so it is unlikely you will encounter this issue, dewdrop_metadata_public_static dasm infers whether or not a function should be allowed to be called by functions outside the current module based upon whether or not its label is marked as global in the assembly. C functions will be given labels that are global unless they are marked static. The dewdrop_metadata_public_static_hint allows a user to specify that a particular function without linkage should still be able to be called by other modules; this may be desired if, for instance, a function should only be provided to other modules as a function pointer.

To provide this hint for a particular function name, create a global with the following prefix:

_dewdrop_metadata_public_static_$s_ and append the function's name directly after the $s_. This metadata global should be placed in the special section dewdrop_metadata_table_public_static_functions.

Running dasm Directly dasm requires only an input file to run; if given only an input file, it lexes the assembly and does nothing further. To have dasm transform the output, it must be provided the—xform flag.

xform Functionality

When the—xform flag is provided with no additional input, dasm performs all required assembly transforms that do not require a static analysis of the assembly code. This includes the following transforms:

adjusting the alignment of labels: (1) align functions at the dword granularity; (2) align globals less than or equal to half a page in size at the dword granularity; (3) align globals of size greater than half a page in size at the dword granularity;

emitting metadata globals: (1) a Dewdrop_Metadata_Mod_Owner object, which describes the module to which the current translation unit belongs; (2) Dewdrop_Metadata_Global objects to describe the bounds, ownership, accessibility, and class information of global data items; (3) Dewdrop_Metadata_Function objects describing the bounds, ownership, and accessibility of functions; (4) Dewdrop_Metadata_Jump_Target objects, describing text locations in the assembly that may be jumped via an intra-procedural jump or branch; (5) Dewdrop_Metadata_Ref_In_Data_Offset objects, describing locations in initialized globals that are initialized with the addresses of other globals;

replacing calls to memset or memcpy inserted by the compiler with inlined versions of those functions: (1) this is necessary because many of these memset or memcpy functions initialize stack memory, and stack memory must be initialized to have a reference to it be passed to another function;

printing instructions to mark registers as ok_to_return before a return from a function printing instructions to indicate the number of arguments before a jal, call, or tail to a statically-known function label detecting accesses to global data labels and rewriting them to go through the dewdrop_data_array_refs_in_text_table replacing pairs of shifts that clear the least significant bits of a register with an equivalent andi instruction In addition to the above, dasm transforms requiring complex static analysis can be enabled with the—insert_stack_floor_lowering_writes and the—insert_saving_of_ callee_reg_state options.

insert_stack_floor_lowering_wrttes

The Dewdrop stack protection scheme depends upon an escape analysis to ensure that no reference to a stack object outlives the stack object that it points to. Critical to this analysis is a guarantee that a function cannot read uninitialized stack data to retrieve formal references left by previously-called functions that used that stack space.

To efficiently provide this guarantee, the Dewdrop hardware tracks a threshold known as the stack_floor:

The least address for which it and every greater address on the stack has been written by a function that has not yet returned.

Data reads above the stack_floor are allowed, while data reads that are not entirely above the stack floor fault or always return 0 (depending on how the policy is configured).

Data writes that do not end at or after the stack_floor fault.

An instruction that writes data beginning before the current stack_floor and ending at or after it lowers the stack floor to the beginning of the data write.

On a call the stack pointer is not allowed to be lower than the stack_floor, if it is, the hardware issues a fault.

When stack object pointer is made its bounds must be entirely above the stackfloor; otherwise, the hardware faults.

The stack_floor is raised to the current value of sp on a return; this, combined with the fact that sp must equal the Dewdrop-tracked frame pointer on a return means that a return causes the returning-function's stack frame to be entirely below the stack floor (and thus inaccessible).

The above constraints allow one to check in hardware whether a stack location is initialized or not with a single compare. When combined with the Dewdrop frame bounds protections, they further guarantee that no uninitialized stack location may be read. On top of that, one can mark an arbitrarily-sized range at the lower-addressed end of the stack as uninitialized and inaccessible with a single hardware move of an address into the stack_floor.

Unfortunately, these constraints also impose a new data dependency: for an instruction to be allowed to write a stack location, all stack locations at addresses greater than or equal to the addresses written by this instruction must have been written prior to this instruction. This constraint is not followed naturally by standard C compilers, and thus additional action must be taken to make the output of standard C compilers compliant with stack_floor restrictions. The transforms turned on by—insert_stack_floor_lowering_writes performs this stack floor lowering analysis.

There are two modes for the stack floor lowering analysis: naive or clever. One of these modes must be passed after an "=" sign to—insert_stack_floor_lowering_writes. While clever attempts to produce more performant code, it can become confused in the presence of too-complex code, particularly if stack offsets are saved onto the stack and then loaded from the stack into sp. The naive mode, although it usually produces slower assembly with more unnecessary stack writes, can perform its task with less information and is thus more reliable.

The naive mode simply attempts to initialize stack memory anytime sp (the prior art stack pointer) is lowered. In this mode, the stack_floor_lowerer looks for any instruction writing to sp. If the instruction writing sp is adding a positive immediate to the sp (and thus raising the stack pointer) it ignores the instruction. Otherwise, it writes all of the memory between the new value of sp and the old value of sp in descending address order. Assuming that the compiler does not generate code that attempts to read or store data below sp (something that would be a bug, as the 64-BIT RISC-V® spec explicitly warns that the integrity of data stored on the stack below sp is not guaranteed), this will ensure that all data accessed on the stack will be initialized and above the stack floor.

While the naive mode is robust and simple, it does not take advantage of the writes that the user code has already makes to the stack. The clever mode, in contrast, performs an abstract interpretation on the code, reasoning about what ranges of stack memory are guaranteed written, guaranteed unwritten, and required to be written at each instruction. It then uses this information to insert only the writes needed to fill in initialization holes in the original code. In addition, it can often satisfy the requirement that the stack_floor be at or below sp on a call by inserting adds to raise sp to the stack_floor rather than inserting writes to lower the stack_floor to sp.

While the clever mode usually produces faster code, it does not track values stored on the stack, and thus can become confused and fail when sp is filled in with a value retrieved from the stack. While this is rare in optimized code, it is common in code compiled with —O0. For this reason, the xforming-compiler-wrapper.py script runs the stack lowerer in naive mode when it sees C code compiled with —O0 and clever mode otherwise.

insert_saving_of_callee_reg_state

In 64-BIT RISC-V® (and many other architectures) callee-save registers are supposed to have their value preserved across a function call. What this means is that any function that wishes to place a value in a callee-save register must save its original contents before overwriting them and restore those contents before it returns. Without additional mechanism, this means that any function placing a value in a callee-save register is relying upon its callees for its own correctness.

To break this dependency, Dewdrop tracks a dword of state, called the callee_reg_state, tracking which callee-save registers have been saved and to which locations on the stack. The callee_reg_state is itself callee-save, and must be correctly saved and restored by any function that wishes to use any callee-save register. Because this mechanism is added by Dewdrop, however, the regular C compiler will not insert the instructions necessary to save and restore it. The analysis enabled by—insert_saving_of_callee_reg_state introduces the necessary instructions to save and restore the callee_reg_state.

Similar to the stack_floor lowering transform, the callee_reg_state lowering transform comes in two different modes: naive and clever.

The naive analysis simply inserts saving the callee_reg_state at the top of every function and inserts restoring the callee_reg_state before every return or tail call. While this is simple, it is slower than is necessary: not few functions use callee-save registers, and even those that do can have early-return paths that do not use the stack at all.

The clever analysis performs abstract interpretation to insert the saving and restoring of the callee_reg_state only on paths that actually use a callee-save register. While this avoids inducing unnecessary stack traffic for control paths that do not use callee-save registers, it is possible for this analysis to get confused by code that makes complex decisions around whether to save and restore callee-save registers. For GCC, at least, this is vanishingly rare: callee-save registers tend to be saved in one simple basic block that dominates all basic blocks using callee-save registers and restored in a basic block that post-dominates all basic blocks using callee-save registers, making even the clever version of this analysis fairly robust.

Tool Command Line Options

This is a detailed listing of the command line options for dasm. Many have been described earlier in this document; in those cases, the section where the functionality of the option is described is referenced.

xform: Request that the input assembly be transformed. A detailed description of this option can be found in Section "'—xform' functionality".

insert_stack_floor_lowering_writes=(naive|clever):
Requests that stack floor lowering writes be inserted into the xformed program.—xform must also be specified for this option to operate. A more detailed treatment of this option can be found in Section "—insert_stack_floorlowering_writes".

insert_saving_of_callee_reg_state=(naive|clever):
Requests that the dasm xforms insert code to save and restore the callee reg state.—xform must also be specified for this option to operate. A more detailed treatment of this option can be found in Section "—insert_saving_of_callee_reg_state".

create_naive_static_class_for_any_global_without_one:
Modifies the behavior of the—xform flag. Normally, the dasm xforms depend upon the presence of metadata globals to indicate the static classes for globals (see Section "_dewdrop_static_class_for" for more details). This option tells dasm to instead create a trivial static class for the global with the correct size and no sub-objects.

This option is to make it easier to build tests; production code should not use this option.

function_pointer_formality=(informal|formal): Controls whether dasm causes function pointers to be represented with formal or informal pointers. Defaults to formal.

show_lexing: Shows debug information about how dasm lexes the original assembly code.

show_parse_list: Shows debug information about the internal representation of the parsed assembly.

show_initial_cfg: Shows debug information about the control flow graph generated for the static analyses dasm performs before path pruning.

show_straightln_prop_cfg: Shows debug information about the control flow graph generated for the static analyses dasm performs after pruning paths shown to be impossible from constant propagation in straightline code (not following jumps, and considering the state to be unknown at any jump target).

allow_dynamic_jumps: Indicates that dasm should allow dynamic control flow to points not at the tops of functions instead of stopping with an error (the current default behavior), strict: dasm outputs warnings during the course of its execution. This upgrades those warnings to errors.

in: The file that should be used as input to dasm. This option is required.

out: The file to which dasm should send its output. Defaults to stdout

Configuration of Linking

Configuration of the linking process requires that the prior art gcc linker be configured; see Section "File: ddr_riscv.ld-.diff". Note that this file is a diff file: it shows changes to the prior art gcc linker script, not the whole script.

Dewdrop Post-Linking

These are notes on dewdrop-elf-tools: tools for handling ELF files. A post-linker is provided that modifies a linked ELF file so that it may be loaded and run on a Dewdrop-RV64 machine.

Using the dewdrop-elf-tools-xforms

The fastest way to get started with these tools is to use the driver script which acts as a compiler driver: see Section "File: xforming-compiler-wrapper.py". If presented with a list of .o files and .a static libraries, it will act as a linker (similar to how the gcc compiler driver would behave). It will then link together the provided relocations and libraries using 64-BIT RISC-V® gcc and run the dewdrop-elf-tools exe xforms upon the result.

The driver script depends upon the RISCV environment variable being set to the root of the 64-BIT RISC-V® install directory, and upon the DEWDROP_ROOT environment variable being set to the directory where the dewdrop repositories are placed. Simply use the xforming-compiler-wrapper.py script anywhere where you would usually use 64-BIT RISC-V® gcc. The script will attempt to notice and transform any provided source files while simply passing through to GCC any additional arguments. This script is a C compiler to autoconf-based build systems in benchmark repositories.

The exe xforms can be run directly with a command line invocation similar to the following:
dewdrop-elf-tools-exe_xform-in input.exe-out output.exe Internals of the Dewdrop Exe xforms When a user passes the—exe_xform option to the dewdrop-elf-tools, this causes the tools to transform the information in the elf file to support Dewdrop protections before outputting it.

The primary goal the exe transforms do is sorting and uniqing Dewdrop metadata sections. Because the dewdrop C and ASM source-to-source transforms operate before linking has occurred, they are not guaranteed to output metadata in the address-order of the data they annotate. Further, because the source-to-source transforms operate on a per-translation-unit basis, they often produce duplicate metadata in different translation units. Sorting and uniqing metadata in the exe-xforms allows the code that applies annotations at program start to not have to reason about duplicates or perform sorting, reducing complexity and speeding setup time. The exe xforms will also fix pointers pointing at pre-uniqed metadata objects in these sorted and unified sections to point at the canonical representative.

Sections that the exe transforms sort and uniq include:
dewdrop_metadata_mod_owners
dewdrop_metadata_mod_ownable_index
dewdrop_metadata_static_classes
dewdrop_metadata_functions
dewdrop_metadata_globals
dewdrop_metadata_refs_in_data_offsets
dewdrop_data_array_static_allocators
dewdrop_data_array_dynamic_alloc_sub_tables In addition to this sorting and uniqing, the exe xforms also assign module and sub-module IDs to the Dewdrop_Metadata_Mod_Owner objects and the Dewdrop_Metadata_Mod_Ownable_Index objects, respectively set up function metadata headers before functions annotated with a Dewdrop_Metadata_Function object in the .text section dewdrop-elf-tools User Options The following options control the behavior of the dewdrop-elf-tools
cat: Reads the provided exe and prints it back out again. Prints an error if combined with—exe_xform.
exe_xform: Performs the dewdrop exe xforms on the provided exe file. More details can be found in Section "Internals of the dewdrop exe xforms". Prints an error if combined with—cat.
in: The file to read as input. This argument is required.
out: The file at which to place the output. This argument is required for—cat and—exe_xform modes.

Format for Dewdrop Embedded Metadata

Dewdrop static metadata is generated by the Dewdrop source-to-source transforms dewdrop-clang-tools and dewdrop-asm and placed into the C and assembly files that they respectively produce.

Some of this metadata is merely hints from the C transforms to dash. The remaining metadata is co-located with the data that it describes in dewdrop reloc (.o) files, and participates in linking alongside the data (see Section "Configuration of linking"), The metadata is read from the linked executable by the Dewdrop post-loader, dewdrop_lib_sysruntime, during process startup (see Section "The Dewdrop post-load system") to determine how to annotate globals and functions and is read by dewdrop_lib_sysalloc to determine how to configure the objects that it allocates.

This information is communicated by being embedded in additional ELF sections (the prior art ELF format allows for this). The schema/format for the metadata is provided in those ELF sections.

For the schema of dewdrop static metadata is provided in machine-readable form see Section "File: dewdrop_lib_static_meta.data.h".

The semantics in human-readable form is provided below.
Arrays vs Tables

There are essentially two different ways that metadata sections aggregate the data the contain: as arrays or as tables.
Arrays Each element in a Dewdrop metadata array is an object with an identity that is a function of its location in memory. Elements in an array can thus be pointed to directly, but cannot be freely sorted or moved. Arrays may be bounds-checked at the whole-array granularity, or a finer per-element granularity.
Tables Each element in a Dewdrop metadata table is an object with an identity that is independent from its position in memory. This means that these objects cannot be pointed to directly, but may be pointed to via a key that describes the identity of the object. Because their identity is not a function of their position, elements of tables can be sorted and merged freely without confusion. Some tables contain objects with no such identity, and are never pointed to directly or indirectly; these tables must be iterated over to be consumed and cannot be sorted or merged. Tables that are bounds-checked will always be bounds-checked at the whole table granularity, as they will need to be iterated over or binary searched.
Modularity and the dewdrop_metadata_mod_owner Table The modularity aspect of Dewdrop is described in static metadata with the Dewdrop_Metadata_Mod_Owner table. The dewdrop_metadata_mod_owner table contains rows of Dewdrop_MetadataMod_Owner objects.
Identity The primary key of these objects is the module_name, a string indicating the module in a human readable, string-comparable way. Two Dewdrop_Metadata_Mod_Owner objects having the same module_name field describe the same module, and must be merged into one representative object before being used. The dewdrop-asm tool will generate a Dewdrop_Metadata_Mod_Owner object per translation unit it transforms with a—module_name string that is passed on the command line. It is likely that some of these objects will have the same module_name primary key and will be merged during the execution of sysruntime.
Merging Each mod owner object contains a max_sub_module_id field, which indicates the largest sub_module_id used within that translation unit in the module. When two mod owner objects are merged, the largest max_sub_module_id shall be placed in the resulting object.
Protection This table is currently only used by sysruntime during program setup. It will not be used by normal user code, and thus does not need to be bounds checked or made accessible to the user program. Sysruntime annotates this whole section as being one object belonging to nobody and requiring a reference to access it. It does not make a reference available to any other part of the code.
Consumption The Dewdrop_Metadata_Mod_Owner table has no dependencies on other tables.

The Dewdrop_Metadata_Mod_Owner objects are consumed by the Dewdrop sysruntime to lay out the modules in the module ID space as follows: Interpret the 32 bit module_id space as a binary tree, where a particular bit prefix indicates a path to an inner node. Assign each mod owner object a module_id indicating a path to a bushy subtree just large enough to encompass all of the sub_module_ids contained within it. No two module trees may overlap.

To accomplish this assignment, Dewdrop_Metadata_Mod_Owner objects are first sorted in descending order by their max_sub_module_id, allowing the runtime to assign the largest trees of module IDs first. Each Dewdrop_Metadata_Mod_Owner object has its module id assigned to the top of the next subtree that encompasses the number of sub_module_ids it needs, and its mod_owner_suff_len the number of bits describing sub_module_ids.

After this assignment takes place, the mod owner table is re-sorted by its module_name field, so that the assigned module_id values can be looked up by the module_name.
The Arrays Describing Class Info The goal off Dewdrop's static class metadata is to describe the bounds of objects and subobjects in memory.

There are several arrays that describe aspects of class. However, they combine to form one coherent description of the protections that are to be placed on a particular chunk of memory, and thus we describe them together here.
Top Level Class Layout A class in Dewdrop consists of 3 aspects: the length of the top-level object in bytes, the boundaries of subobjects of the object, and the public readable/writable flags on each 64 bit double-word in the object. All of these concepts are united into a top-level class by the Dewdrop_Metadata_Static_Class objects in the dewdrop_metadata_static_classes array.

Class metadata is primarily generated by the C xforms, which use C type information to infer subobject boundaries for the objects of that type. The dasm tool will also generate class metadata in some circumstances, but because it lacks access to C type information, only the length of these dasm-generated classes will be non-trivial.
Length The length of the object is the size in bytes of a particular class. It is described by the length field of the Dewdrop_Metadata_Static_Class class. It is equal to the value calculated by taking the sizeof the C type corresponding to that class and rounding it up to a multiple of 8 bytes. When added to a pointer describing the start of an object, this may be used to calculate and protect the end bound of an object.
Subobjects The subobject bounds are used to describe the subobject protections that should be placed on an instance of a particular class. It is described in the Dewdrop_Metadata_Static_Class object with two fields: a proper_sub_object_bounds_length field, indicating how many subobjects this class has (excluding the top-level object) and a pointer to the start of the subobject bounds list, in the proper_sub_object_bounds_start field.

The memory pointed at by proper_sub_object_bounds_start is an array of length proper_sub_object_bounds_length with element type Dewdrop_Metadata_Proper_Sub_Object_Bound, residing in the dewdrop_metadata_proper_subobject_bounds section. Each Dewdrop_Metadata_Proper_Sub_Object_Bound instance contains a start field, indicating the offset in bytes from the start of the top-level object where the subobject starts, and a length field, indicating the length of the subobject in bytes.

If the proper_sub_object_bounds_length for a particular class is 0 (that is, there are no subobjects), the proper_sub_project_bounds_start field is allowed to be NULL.

Per dword Readable and Writable Flags

The readable and writable flags indicate which swords in the class should be readable or writable outside of the current module. This can be used to allow C++ public fields. For a C object, this information will likely be uniform, being either all public or all private.

The information about the public readable and writable flags is pointed to in Dewdrop_Metadata_Static_Class by the mod_pub_readable_writabable_flag_pairs_start, a pointer into the dewdrop_metadata_bit_vectors table. Because one readable flag and one writable flag is specified per dword in the class, an independent length for the flag array is not needed, and instead the flag array can be calculated with the following expression:

class_length_in_bytes*(1 word/4 bytes)*(2 flags/dword)

which leaves us with a number of flags equal to class_length_in_bytes/2 for the flag array. Thus, the length in bytes of the flag array is class_length_in_bytes/16. Each flag array is dword aligned, and the xform tools will add trailing zeros to the end of flag arrays to ensure that each flag array is a multiple of dwords in size.

The contents of the flag array is interpreted as a series of alternating public readable and public writable flags for increasing dword offsets into the object.

Protection

All of the class metadata arrays will be read only by sysrumtime and sysalloc. As such, accesses to them do not need to be bounds checked, but access from other modules does need to be allowed. Each Dewdrop_Metadata_Static_Class is protected as being its own object anyway, placing them in the nobody module and making them public readable. The dewdrop_metadata_bit_vectors table or the dewdrop_metadata_sub_object_bounds table are not currently read, and thus are not made currently accessible.

Globals and the dewdrop_metadata_globals Table

Dasm emits a Dewdrop_Metadata_Global object for each global seen in a user program describing the bounds and ownership of that global, possibly using class information emitted and associated with the global by the C xforms. All of these Dewdrop_Metadata_Global objects are stored in the dewdrop_metadata_globals table.

Identity

The primary key of the Dewdrop_Metadata_Global table is the global field, which points at the start of the global it describes.

Merging

Sysruntime sorts the Dewdrop_Metadata_Global table by global field and merges instances with the same global field value together. When merging, it consults the is_defn field, which is true if the global described was defined in the translation unit where this occurred. In most circumstances, globals should only be defined once. The one exception is common symbols, which may be defined multiple times. Sysruntime ensures during merging that a global is defined at most once or that its definition resides within the .bss section, and thus it is a common symbol.

Note that it is possible for a global to have zero definitions; this can occur for a linker-introduced global, which will have an entry in the symbol table but will not actually be defined. Sysruntime ignores these entries.

Protection

The dewdrop_metadata_globals table is consumed only by sysruntime, and thus does not need to be bounds checked or made accessible to the user program. The entire section is annotated as one object belonging to the nobody module and requiring a reference; no reference is made available outside of sysruntime.

Consumption

Processing the dewdrop_metadata_globals table requires that the dewdrop_metadata_mod_owners table has already been sorted by module name and that the entries have had their module_id fields assigned.

Sysruntime iterates over each entry in the dewdrop_metadata_globals table after the merge. Most entries result in sysruntime attempting to annotate top-level global bounds on the described global.

To annotate a global described by a Dewdrop_Metadata_Global, sysruntime looks up the module_name foreign key in the dewdrop_metadata_mod_owners table to find the module_id assigned to that module. It reads through the Dewdrop_Metadata_Static_Class field static_class to get the length of the class, and calls sysdewdrop_annotate_object with these parameters. It then takes the resulting reference and stores it over the original pointer contents of the global field.

When sysruntime reads a Dewdrop_Metadata_Global entry, it checks that it does not overlap with the Dewdrop_Metadata_Global entry it last considered. If the global field of the current global is greater than or equal to the global plus the length of the previous global, it annotates the object as described above. If the two objects overlap, they are constants (currently, this is checked by ensuring they are both owned by the nobody module), and they end at the same address (that is, their global plus length fields are equal) then assuming that the linker saved space by making one global a suffix of the other. In this case, the previously saved reference is offset to point at the beginning of the current global and save that reference in the global field. All other overlaps in globals result in a fault.

Functions and the dewdrop_metadata_functions Table dasm emits a Dewdrop_Metadata_Function object describing the bounds, module ownership, and requested permissions for each function it sees in user code. Each of these objects is placed in the dewdrop_metadata_functions table. Note that, due to inlining, there may not be a Dewdrop_Metadata_Function for each C-language function.

Identity

The primary key of the dewdrop_metadata_functions table is the function field of the Dewdrop_Metadata_Function class. This table is, however, never sorted or merged, so this is not extremely important.

Merging

No merging is done on this table.

Protection

The dewdrop_metadata_functions table is consumed only by sysruntime, and thus does not need to be bounds checked or made accessible to the user program. The entire section is annotated as one object belonging to the nobody module and requiring a reference; no reference is made available outside of sysruntime.

Consumption

Processing the dewdrop_metadata functions table requires that the dewdrop_metadata_mod_owners table has already been sorted by module_name and that the entries have had their module_id fields assigned. In the future, it may also be required that this table be processed after the dewdrop_metadata_jump_targets table, so that jump targets at the tops of functions can be upgraded to call targets.

For each entry in the Dewdrop_Metadata_Function table, sysruntime attempts to annotate all of the pages upon which the function resides and to mark the top of the function as a valid call target with a dyn_target_pub or dyn_target_priv Sysrumtime finds the pages upon which a function resides by looking at the address at which the function starts, indicated by the value of the function field, and its length, which is indicated by the value of the length field. The owner module of the function is indicated with the module_name field, which is a foreign key into the dewdrop_metadata_mod_owners table; this key is used to look up the module_id assigned to the module that the function resides in. In addition, the function indicates whether it wishes to be given dangerous powers or be run in an environment where all calls are protected with the danger_requested and the all_calls_protected flags, respectively. All of these metadata are used to call sysdewdrop_annotate_text_page for all pages intersecting the function's address range. If two functions on one page have conflicting metadata in any of the module_name, danger_requested, or all_calls_protected_requested fields, sysruntime will fault on attempting to annotate the second function.

To annotate the function as a valid call target, sysruntime calls the function sysdewdrop_put_dyn_target_kind_of_text_addr on the value of the function field and a dyn target value. To determine the dyn target value, sysruntime looks at the value of the dyn_target_pub field. If it is true, sysruntime will annotate the top of this function with a dyn_target_pub; if not, sysruntime will annotate it with a dyn_target_priv.

Dewdrop_data_array_refs_in_text

When a global is accessed in C source code, the compiler outputs instructions that place the global's address in some register so that the data at that address may be accessed. Because no instruction in 64-BIT RISC-V® has sufficient bits of immediate to directly load the address into a register, riscv-gcc instead outputs instructions that construct this address on the fly using multiple instructions. This means that there is no one static location where this statically-known address lives in the assembly, and thus a fully-formed reference value cannot just be placed into the text and mark it with a per-dword annotation. Either a Dewdrop instruction to bless the constructed address after construction must be called, or a pre-constructed and pre-blessed reference must be loaded from a table. Dewdrop implements the latter. When dasm sees a reference to a global address that will expand to a multi-instruction construction of that address, it replaces that reference with a load of that address from the dewdrop_data_array_refs_in_text section. It also notes how many bytes the reference is offset from the start of the object and places that number in a corresponding entry in the dewdrop_metadata_array_refs_in_text_offsets.

Protection

The dewdrop_data_array_refs_in_text table is accessed both during sysruntime and during the running of the user program. In addition, because it is used to supply refs to the running program, it cannot require that it be accessed using refs. Thus, sysruntime annotates the entire section as a public-readable object belonging to the nobody module which does not require references to access it.

Consumption

Processing the dewdrop_data_array_refs_in_text table requires that the dewdrop_metadata_globals table has had refs to the annotated globals assigned to each of its global fields and that that table be sorted by the global fields.

This array is consumed at two different times: during sysruntime, where its contents are replaced with references corresponding to each pointer entry, and during the running of the program, where its entries are loaded and used.

Sysruntime iterates over the dewdrop_data_array_refs_in_text and the dewdrop_metadata_array_refs_in_text_offsets array simultaneously and, for each pair of corresponding entries, calculates a pointer to the base of the referenced object by subtracting the offset entry from the refs_in_text entry. This base pointer is then looked up in the Dewdrop_Metadata_Global table to find the corresponding reference to the base of the object. Then, the offset is added onto this reference and placed back in the refs_in_text array.

When the program runs, every time a global address would normally be constructed, it is instead loaded from an entry in the dewdrop_data_array_refs_in_text array.

Dewdrop_metadata_table_refs_in_data

When a global is defined, it may be initialized with pointers to other globals. In this circumstance, some mechanism is needed to turn these pointers into refs. For each such appearance of the address of a global in the initialization of another global, dasm outputs a Dewdrop_Metadata_Ref_In_Data_Offset object in the dewdrop_metadata_table_refs_in_data table, with information about where to find the pointer to turn into a ref and how to find the base object to which it refers.

Identity

The entries in this table are neither sorted nor merged; as such, they do not have a sense of identity. They are assumed to be unique, as no global can have two non-trivial initializations.

Merging

Merging not done for this table.

Protection

The dewdrop_metadata_refs_in_data table is consumed only by sysruntime, and thus does not need to be bounds checked or made accessible to the user program. The entire section is annotated as one object belonging to the nobody module and requiring a reference; no reference is made available outside of sysruntime.

Consumption

Processing the dewdrop_data_array_refs_in_data table requires that the dewdrop_metadata_globals table has had refs to the annotated globals assigned to each of its global fields and that that table be sorted by the global fields.

There are two objects involved in each Dewdrop_Metadata_Ref_In_Data_Offset table: a containing object, which is initialized with a pointer to be made into a ref, and a pointed-to object, which is the object pointed into by the pointer that needs to be made into a ref.

Each Dewdrop_Metadata_Ref_In_Data_Offset entry has an object field, which points at the base of the containing object. The value of the object field is looked up in the dewdrop_metadata_globals table to find the reference to the base of the containing object. The value of the offset_into_object field is added onto this reference to advance the reference to the containing object to point to the pointer into the pointed-to object and load that value. The value of the Dewdrop_Metadata_Ref_In_Data_Offset ref_offset field is subtracted from the pointer into the pointed-to object to find the pointer to the base of the pointed-to object. The pointer to the base of the pointed-to object is then looked up in the dewdrop_metadata_globals table to find the reference to the base of the pointed-to object. The ref_offset value is then added onto the reference to the base of the pointed-to object, and the result is then stored back into the containing object.

Dewdrop_metadata_table_jump_targets

Dewdrop restricts control flow by checking that each inter-module call lands on a dyn_target_pub, each intra-module call lands on a dyn_target_pub or dyn_target_priv, and that each jump that is not a call or return lands upon a dyn_target_jump, dyn_target_pub, or dyn_target_priv within the same module. Because dyn_target_pub and dyn_target_priv annotations go only at the tops of functions, it is possible to determine where each dyn_target_pub and dyn_target_priv annotation should be placed by reading the dewdrop_metadata_functions table. This does not suffice for the wide variety of places where a jump may be placed, however, and so an additional structure for noting the addresses that are the targets of jumps is needed.

The dewdrop_metadata_table_jump_targets table is composed of Dewdrop_Metadata_Jump_Target objects. Whenever dasm sees a label that is the target of a jump, it records the address of that label in the jump_target field of a new Dewdrop_Metadata_Jump_Target object.

It also stores a jump_target_active field, which acts as a boolean indicating whether this jump target should actually be marked as a jump target. This is there due to an odd pattern that the GNU assembler can use to accommodate branches to an offset too far away to branch to fit into the branch immediate. The assembler takes the original branch target and places it in a jump instruction directly after the branch. It also inverts the polarity of the branch and makes it branch directly after the jump.

What this pattern means for us is that a minority of branches require jump targets on both the address that they jump to and their fallthrough, but most do not. To prevent from making every fall through a branch target or trying to predict what the assembler will do, the jump_target_active field is filled with the fallthrough address minus the branch address minus 4 bytes. This will equal 0 when the fallthrough actually follows directly after the branch, and non-zero otherwise. Then, in sysruntime, the fallthrough instruction can be set to be a jump target exactly when the assembler alters it to not follow the branch.

Identity

The dewdrop_metadata_table_jump_targets table is not sorted, merged, or searched, and has no concept of identity.

Merging

Not done on this table.

Protection

The dewdrop_metadata_jump_targets table is consumed only by sysruntime, and thus does not need to be bounds checked or made accessible to the user program. The entire section is annotated as one object belonging to the nobody module and requiring a reference; no reference is made available outside of sysruntime.

Consumption

Processing this table does not require any other table to have been set up.

Sysruntime iterates over the Dewdrop_Metadata_Jump_Target objects and, for each one that has a true jump_target_active flag, sets calls sysdewdrop_put_dyn_target_kind_of_text_addr to set dyn_target_jump on the address in the jump_target field. Because the tops of functions are often the targets of jumps, one should take care to perform this annotation before the dewdrop_metadata_functions table is consumed; that way, any addresses that are both the targets of calls and jumps are appropriately upgraded from jump targets to call targets.

Init_array and fini_array

While the init_array and fini_array sections are not data or metadata added by dewdrop, they bear special mention as their contents affect how dewdrop metadata is annotated.

Because the functions in these sections should never be called by any code other than the pre-main CRT0 code, GCC will always give these functions non-extern linkage. Because dasm infers whether a function should be annotated with a dyn_target_pub or a dyn_target_priv annotation based upon whether it has external linkage or not, the Dewdrop_Metadata_Function objects describing these functions will indicate that they should be marked with a dyn_target_priv annotation. This would cause problems if the function were in a different module than CRT0. Thus, sysruntime marks each function in the init_array or the fini_array as being dyn_target_pub, overriding the Dewdrop_Metadata_Function annotation. In the future, one should also insert caller_mod_owner checks to ensure that these functions are called only by the CRT0 module.

Dewdrop_mettadata_table_map_static_class_to_alloc

When you attempt to dynamically allocate memory in a dewdrop-aware program, you must specify an allocator corresponding to the class that you are attempting to allocate. The dewdrop C xforms insert globals into each translation unit to store these allocators, and constructor functions that set up these globals. This setup is achieved by calling either sysalloc_get_static_alloc or sysalloc_get_dynamic_alloc with a pointer to the Dewdrop_Class_Metadata corresponding to the class that the allocator shall allocate.

The dewdrop_table_map_static_class_to_alloc table exists to help fulfill these requests. It is intended to serve as a mapping from classes to allocators, allowing these calls in different translation units passing in equivalent class metadata to receive the same allocator back. However, at this time, this feature is not yet implemented.

Metadata Hints for dasm

Two of the tables that are produced are merely there to provide hints to dasm; dasm removes them after consuming them and they do not appear in the final program. The data contained in these sections are trivial, consisting of a single zero byte. The hints are entirely encoded in the names of the symbols that are placed in these sections.

Dewdrop_metadata_is_obj

When an extern variable or function is compiled from C into assembly, the resulting assembly does not mention the label except at the points where it is used. No .type directives are emitted to indicate whether the label corresponds to a function or an object. Because it is desireable to know which labels correspond to objects when building the dewdrop_data_refs_in_text table, this information is preserved. The C xforms do this by emitting an entry in the dewdrop_metadata_is_obj table whenever they see an extern global variable.

The dewdrop_metadata_is_obj section contains entirely of objects whose labels are prefixed with_dewdrop_metadata_is_obj$s. The remainder of the label after this prefix is the label that is desired to be indicated is an object label.

Dewdrop_metadata_indicate-module_name

The C xforms and dasm both need to know the name of the module they are transforming: the C xforms need to know this to correctly construct dynamic allocator objects, while the dasm xforms need this to indicate the modules in which globals and functions reside. If the C xforms and dasm were run on the same translation unit with different module names, however, confusing runtime errors would result. Thus, a way is needed to enforce that the C xforms and dasm use the same module name for each translation unit they both transform. To do this, the C xforms populate the dewdrop_metadata_indicate_module_name table with the module name it was provided.

The dewdrop_metadata_indicate_module_name table consists of one entry, a global prefixed with_dewdrop_metadata_indicate_module_name$s. The remainder of the global's label is the module name that was used in the C xforms. When dasm transforms the assembly, it can read this label and ensure that the module name it was given on the command line is equal to this one (or, if it was not given a module name on the command line, can use this is the default value).

Cache Locality of Static Metadata/Data Tables

Note that the order of the static metadata/data tables in the linker script concentrates the hot accesses with maximum locality.

Hot: Used Constantly
    dewdrop_data_table_refs_in_text: Note that this table is accessed through pointers after dewdrop_dewdrop_active has been set and so both its start and end must be page-aligned because the meta-data on pointers is not initialized nor is it maintained by pointer arithmetic Warm: Used Making a New Small Object Slab or Large Object
    dewdrop_metadata_static_classes
    dewdrop_metadata_bit_vectors
    dewdrop_Metadata_proper_sub_object_bounds Cold: Used Only at Program Startup or Error Reporting
    dewdrop_metadata_table_map_static_class_to_alloc
    dewdrop_metadata_globals
    dewdrop_metadata_mod_owner_names
    dewdrop_metadata_mod_owners
    dewdrop_metadata_functions
    dewdrop_metadata_table_refs_in_text_offsets
    dewdrop_metadata_table_refs_in_data_offsets
    dewdrop_metadata_table_jump_targets The Dewdrop Post-Load System Dewdrop does a post-loading step after standard loading is done. It is currently done by the user process immediately after start, before the prior art libc CRT0, but Dewdrop post-loading could conceivably be moved into the loader itself, to run after loading but before the process starts. See Section "File: dewdrop_lib_sysruntime.c".

For support for loading the sub-object metadata see Section "File: ddo_dewdrop_import_subobj_subtree.cc".

Modifications to the C Standard Library

Dewdrop does modify the prior art musl liber C-language library, but not in ways that require much thought. These modifications amount to:
    turning off the prior art malloc( ) allocator (see Section "Dewdrop runtime library" below for a replacement),
    modifying some memset( )/memcpy( )/memmove( ) family operations which operate on memory 64-bits at a time instead of 32-bits at a time (otherwise Dewdrop pointers are not copied atomically and the Dewdrop hardware removes their ref-flag),
    providing some memset( )/memcpy( )/memmove( ) family operations (as necessary) which visit addresses downwards instead of upwards and therefore which can be used by (calls to them inserted by) the source-to-source transforms in order to initialize stack objects downwards so that such writes agree with the restrictions imposed by the requirement of the stack_floor to be initialized incrementally downwards,
    modifying CRT0.

The CRT0 modifications, at runtime, amount to:
    running the dewdrop post-loader,
    telling Dewdrop to annotate the runtime arguments (argv, env, aux) as Dewdrop objects (note this could have been done in the loader),
    telling the Dewdrop hardware to go active.

Dewdrop Runtime Library

Technically speaking, Hard Object does not require a runtime library, but the Dewdrop embodiment finds it convenient to have one.

The only really interesting part of it is the heap allocator. The prior art libc malloc( ) allocator is replaced with a new slab allocator system. The source-to-source transforms generate a configuration of a slab allocator per runtime allocated object the size of which is known at static time, and then such an allocator is instantiated the first time such an object is allocated by the program. An array of slab allocators is generated of exponentially growing size which are used to satisfy runtime allocation requests for objects of a size not known at static time.

Figure 48:
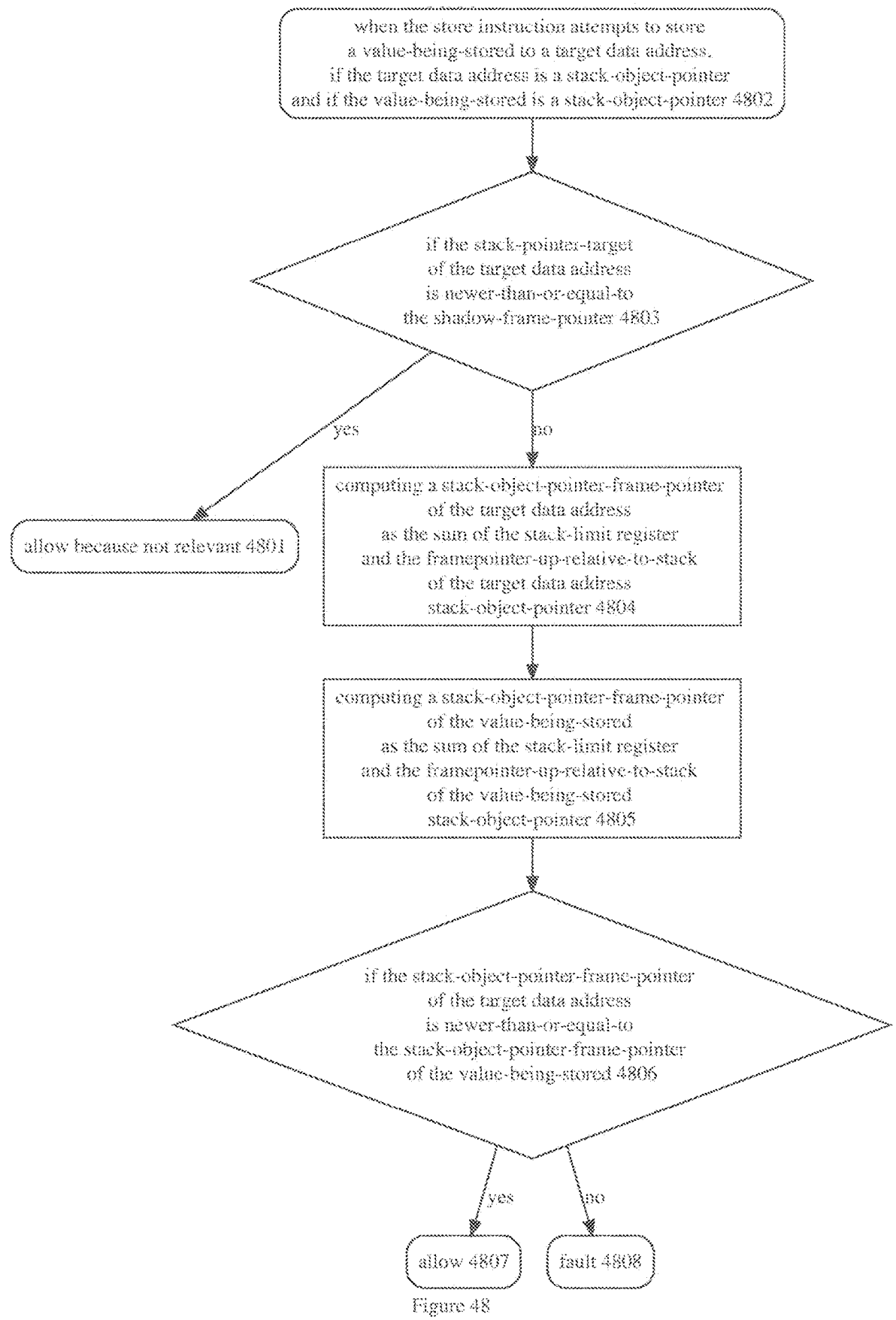
FIG. 48 shows when storing one stack object pointer value-being-stored through another to a target data address, checking if the stack-object-pointer-frame-pointer of the target data address is newer-than-or-equal-to the stack-object-pointer-frame-pointer of the value-being-stored, expressing both value-being-stored and target using a frame-pointer-up-relative-to-stack to express them relative to a stack-limit pointer.

Definitions absolute sub-object-id: a sub-object-id that is unique for the entire object to which it points (rather than being relative to part of it); the sum of the sub-object-id of the absolute-pointer, and the page-subobj-id-abs-base annotated onto the data-page annotated onto the data-page-index of the target-data-address; see FIGS. 32, 33.

absolute-pointer: either an absolute heap/global pointer or a stack-pointer; a pointer into heap-global memory having a target-address/target-data-address or also may be the stack pointer (but not a stack-object pointer); see FIG. 33.

access condition: The conditions under which an access to data at a data address is allowed.

access: The movement of data between a CPU register and a RAM cell at an address: a read or a write, access through a pointer: an access where the data accessed is at an address which is the data at another address, that second address called a pointer. Also called an indirect access.

access width/access-width: the width in bytes of the block of memory accessed during an access to memory (such as a load or a store): in RISC-V 64 these are 1, 2, 4, or 8 bytes; note that a memory access is often required to be aligned, that is, the address accessed must be a multiple of the access width.

accessible stack range: The range of data addresses on the stack that can be accessed; delimited by the frame-pointer register and the stack-limit-ptr register.

accessing data: the act of loading/reading or storing/writing data.

accessing instruction address: The address of an accessing instruction.

accessing instruction: An instruction performing an access to data at a data address.

address: The name of a memory cell; the bits that are placed on the memory bus in order for the CPU to access a cell in memory.

add-subtract-compare: an operation taking three fixed-point arguments A, B, C and computing whether $A+B<=C$; can be implemented using only a single carry; see "three-way add with single fused carry"; see FIG. 68 add-subtract-compare operation: see FIG. 68: a way to perform checking if A+B<=C which is optimized to use only one fused carry, instead of two carries in series as would be required if done the naive way.

allow: doing nothing with respect to the aspects of computation addressed in the given context (or figure); note that all Hard Object checks are conjunctive, so just because one set of checks (in one figure) allow an instruction/operation that does not prevent another set of checks (in another figure) which are also relevant to the same operation from faulting the instruction/operation; that is, an instruction/operation may reach the allow state in many checks (figures) which are relevant to it, and yet still fault because one of the relevant checks (in one figure) reached the fault state.

annotate: To attach or associate one thing X (being annotated) with another thing Y (the annotation), also said as to attach or associate onto one thing X, another thing Y; to associate an annotation with something. To use mathematical language if a map M maps from a domain D to a range R, we may also say: (1) map M annotates an element of R onto an element of D, or (2) map M annotates an element of D with an element of R, or (3) an element of D is annotated by/using map M with an element of R, or (4) an element of D is annotated with an element of R by/using map M, or (5) an element of R is annotated by/using map M onto an element of D, or (6) an element of R is annotated onto an element of D by/using map M. If the map M is implied by context, we may say simply that (7) an element of D is annotated with an element of R or (8) that an element of R is annotated onto an element of D. If R is just the set true or false, then the annotation serves as the indicator function of a set, usually expressible as a predicate P. In this case we may say that an element of D satisfying predicate P is annotated as P (if M maps a domain fruit to a range color, an apple may be annotated with red, but if M maps a domain fruit to the set of red and non-red, we may simply say that the apple is annotated as red rather than with red). Further, in this case we may speak of the annotated predicate adjectivally, that is, instead of an element of D is annotated as P, we may simply refer to such an element compactly and adjectivally as a P D (if the apple is annotated as red, we may refer to it adjectivally as a red apple). One such example in this document is that a register annotated as callee-save may be referred to as a callee-save register.

annotation: An association.

argument: A datum passed to an operation which parameterizes the behavior of the operation. Note that arguments occur in multiple contexts, including but not limited to: (1) instructions take arguments, (2) functions take arguments. This is potentially confusing in the situation of a "call" instruction which (1) as an instruction may take an instruction argument, but (2) as an initiator of a function call, where the function may take its own function arguments.

array of float-register-written-flag-s: plurality of written-flag-s, one corresponding to each float-register; see also unwritten-indicator-datum.

array of int-register-written-flag-s: a plurality of written-flag-s, one corresponding to each register or int-register; see also unwritten-indicator-datum.

array of ok-to-return-flag-s: a plurality of ok-to-return-flag-s, one corresponding to each register or int-register, or perhaps one corresponding to each float-register.

assert (a criterion): to check if a criterion evaluates to true and if not perform some exceptional action, such as issuing a fault.

association: A abstraction indicating a persistent relationship between two things, x and y, where having one thing, x, one may find the other, y. Thing y is said to be "associated with" x "by the association". The terms "relation" and "relationship" are meant to at least encompass, without being limited to, the meaning of the term "relation" as used in the field of Relational Algebra.

bitwise: A function F from two input bits to an output bit applied "bitwise" to two strings of bits means the output is a string of bits and the i-th bit of the output is F applied to (1) the i-th bit of the first input and (2) the i-th bit of the second input.

bitwise exclusive-or (also "bitwise xor" or "bitwise symmetric difference"; also "exclusive-or" or "xor" or "symmetric difference" when it is implied to apply to an entire string of bits and is therefore implied to be bitwise): A function taking two strings as input and producing as output the exclusive-or function applied bitwise: the i-th bit of output is the exclusive-or of the i-th bit of the first input and the i-th bit of the second input.

branch instruction: An instruction which may or may not transfer control depending upon some condition, such as the value of a register. Contrast with "jump instruction", "call instruction" and "return instruction".

cache: a memory that is smaller (and typically faster) than main memory; used to hold a copy of a datum for faster access.

call instruction/call operation: An instruction which initiates a function call; often takes several actions such as pushing the return address onto the stack and then transferring control to the address of the code of the callee function. Control is usually returned to the instruction in the caller after the call instruction at the completion of the function call by use of the return instruction by the callee. See "return instruction", Contrast with "branch instruction", "jump instruction".

call instruction which calls through a function-pointer: an instruction which causes a call operation to occur which results in control transfer to the function pointed to by the function-pointer.

call to a target instruction address: see "call instruction which calls through a function-pointer".

callee mod-owner-id: the module-owner-id of the callee function; see FIG. 6.

callee-save register: a prior-art designation of a register: a function using one may call a callee and if the callee writes to the register then the callee is required to save its value before writing it and restore its value before returning; see FIGS. 49, 50, 51, 52, 55, 56.

callee-save: said of some of the registers of an instruction set architecture: if one of these registers is used, it is the responsibility of the cal lee to save and restore this register's existing value to/from the stack; contrast caller-save callee-save target register; a target register annotated as a callee-save register; see FIGS. 49, 55.

callee-save-or-ra: said of a register; a callee-save register or the return-address (ra) register; see FIG. 70 caller mod-owner-id: the mod-owner-id of the function meta-data of the caller; see FIG. 6.

caller-save: said of some of the registers of an instruction set architecture: if one of these registers is used, it is the responsibility of the caller to save and restore this register's existing value to/from the stack; contrast callee-save check: To evaluate or test a predicate and then take an action based on the result; an 'if' statement.

checking (a predicate): computing the value of a predicate and then taking an action conditional upon the truth value of the result.

clear: said of a bit or flag, to assign its value to zero or lower the flag, or the state of being zero or lowered.

clearing to false (a flag): putting the value of a flag to false.

coarse grain: In the context of granularity, larger quanta.

computer: A self-contained device for computing, usually presenting a well-defined interface.

computing an association (or annotation): An abstract association may be realized using many kinds of mechanisms; computing an association is to use some mechanism to get from one side of an association, a given, to the other side, the associated object of the given, that is, the object related to the given by the association. To realize a declarative association using an imperative mechanism.

condition: A mathematical predicate. Equivalently, a declarative sentence that is either true or false; such a sentence is usually about certain given objects and is then called a "condition on" those objects.

control: An abstract way of referring to the progress of the program counter through the space of (instruction) addresses.

control transfer: By default after the execution of an instruction the program counter increments to the address of the next instruction; a control transfer is any action taken to set the program counter to any value other than this default.

corresponding: (1) annotated with/onto or associated with or mapped to, (2) when a set is ordered it is one-to-one or bijective with the sequence of integers starting at 1 of the same size, and so a subset of one ordered set corresponds to a subset of the integers, and further a subset of another ordered set corresponds to a subset of the first ordered set if they each correspond to the same subset of the integers.

criterion: See "condition".

cross-module-target-flag: see FIG. 10.

current-function-end: see FIG. 25.

current-function-metadata: meta-data annotated onto the current function; see FIG. 19.

current-function-start: the address of the first address of a function; see FIGS. 12, 18, 19, 25.

current-module-id register: A register holding a module-id which is used for access checks against the owner module-id (or ownable module-id) annotated onto a datum when that datum is accessed.

current-module-suff-len register: A register holding an unsigned int of sufficient bits to count from 0 to the maximum possible module-id (inclusive, inclusive). In some embodiments, when a datum is accessed, the access check comparing the current-module-id register against the ownable module-id annotated onto that datum ignores any differences in the suffix of the bitwise exclusive-or computed when comparing the two values where the suffix has the length of the value of this register (that is, the comparison ignores the number of least significant bits of the value of this register).

danger mode meta-datum: an annotation on an instruction address indicating that the instruction at that address runs with more powers than user mode; in one embodiment, the danger mode meta-datum gives kernel mode powers to the instruction at the annotated address. One example is the Hard Object danger bit.

danger-flag: see FIG. 22.

dangerous operation: some operations may be designated as dangerous; see FIG. 22.

dangerous subset of instructions: a subset of instructions or configurations thereof which are dangerous (see "dangerous").

dangerous: We use this term to indicate an instruction (or configuration thereof) which invokes powers beyond those of normal user mode instructions. We introduce this term, as distinct from "kernel" (or "supervisor"), in order to distinguish instructions which may require more privileges (powers) than user mode allows, but may not necessarily require full kernel mode privileges (powers); however in some embodiments, "dangerous" may simply be synonymous with "requiring kernel mode".

data access: An access to data at a data address.

data address: an address of memory for holding data; contrast with instruction address.

data address: Many prior art computer systems partition RAM addresses into "data", those for storing data, and "text", those for storing program instructions; a data address is one address of the first part, that is, the addresses for storing data.

data address set-integrity argument: The argument to the set-integrity operation that is a data address; the operation associates this argument with a new integrity bit.

data address set-owner argument: The argument to the set-owner operation that is a data address; the operation associates this argument with a new owner, data: Bits in a computer not intended to be interpreted directly as instructions by the CPU.

data cache: a cache of data memory (as distinct from instruction memory).

data module-id: A module-id annotated onto a datum or a plurality of data. For example, an identifier associated in the module meta-data table with a data address, allowing the data address to be associated with other meta-data, such as an owner, indirectly through use of the identifier.

data page/data-page: Prior art computer systems organize RAM addresses into pages; a page containing data addresses is a data page. Note that prior art computer systems tend to mark entire pages as completely data or completely text (instruction) pages.

data-page-index: the page-index of a data page; see FIG. 32.

data-pointer: a pointer to data.

data-width of a read/load/write/store operation/instruction: when a load or store operation is done from/to memory, more than one bit of data is transferred at once; the number of bits transferred may be referred to as the width of the operation; typical values are 8, 16, 32, and 64 bits.

datum: singular of data; see entry for data.

destination instruction: See "target instruction".

durable-flag: see FIGS. 1, 8, dynamic jump: a jump the target address of which is found in a register gather than being a constant embedded into the instruction); see FIG. 17.

element: (Mathematics) A member of a set.

exclusive-or (also "xor"): The exclusive-or of two bits is their sum modulo 2.

execution: The act of executing or running a program.

fault: A condition which the CPU of a microprocessor can enter in an exceptional circumstance requiring special handling and suspension of the currently executing program. Usually upon the occurrence of a fault the CPU suspends its execution of the current program and begins executing an fault-handling routine.

finding: See "computing an association".

fine grain: In the context of granularity, smaller quanta.

first num-float-args-in-registers float-register-ids occurring in the order on float-register-ids: given an order on float-register-ids and given a number num-float-args-in-registers, this phrase refers to the first such registers in the order.

first num-int-args-in-registers register-ids occurring in the order on register-ids: given an order on int-register-ids and given a number num-int-args-in-registers, this phrase refers to the first such registers in the order.

fixed-point number: also called an integer; a number represented as a string of hits without a floating point exponent; see FIG. 68 flag: a variable holding a single bit of information; its value may be called true vs false or maybe also be called set vs clear.

float register/float-register: a register which holds a floating point value; contrast with integer register; see FIGS. 63, 64, float-register id/float-register-id: the id corresponding to a float register.

float-register-written-flag: a written-flag of a floating point register; see also unwritten-indicator-datum; see FIGS. 63, 64, flush (from cache): writing data out to a slower/larger level of the memory hierarchy, such as such as from on-chip to main memory or from memory to disk.

for-this-func-flag: see FIG. 56.

frame-done-flag: a per-stack-frame flag not in the callee-save-reg-state which is set when the callee-save-reg-state is restored; limits allowed activity to just what is needed to complete the return of the function; see FIG. 75 frame-pointer register: a prior art register in many architectures, such as RISCV; Hard Object also keeps its own copy called a shadow-frame-pointer; see FIG. 13.

frame-pointer register: The CPU register pointing to the top of the current stack frame.

framepointer-up-relative-to-stack: see FIGS. 14, 46, 48.

func-at-page-start: on a text-page meta-datum a pointer to the top of the function that contains the first instruction on the page.

function refable-version: the refable-version annotated onto a function; see FIG. 11.

function-body-target-flag: see FIG. 15.

function-length: the field of a Function-Metadata indicating the length of the sequence of instructions of the associated function.

function-metadata: meta-data associated with a given function.

function-pointer: a pointer to a function to which control may be transferred by use of a call instruction; in a Hard Object system contains further meta-data.

function-start-to-function-metadata-map: a map which annotates a function-start with a function-Metadata; see FIG. 19.

function-time: a field annotated onto a function pointer and a return pointer; see FIGS. 11, 16.

function-top-offset: when a call constructs the return pointer, that return pointer is annotated with a function-top-offset such that on a return the current-function-start may be reconstructed from that function-top-offset and from the func-at-page-start annotated onto the Text-Page-Metadata of the target program counter of the return pointer.

func-top-flag: see FIGS. 9, 17.

granularity: The level of detail or size of unit or quantum of expression for a computation. See "fine grain" and "coarse grain".

greater-than-or-equal-to: the standard mathematical operation on two numbers returning true exactly one one has greater value than or equal value to that of the other.

Figure 53:
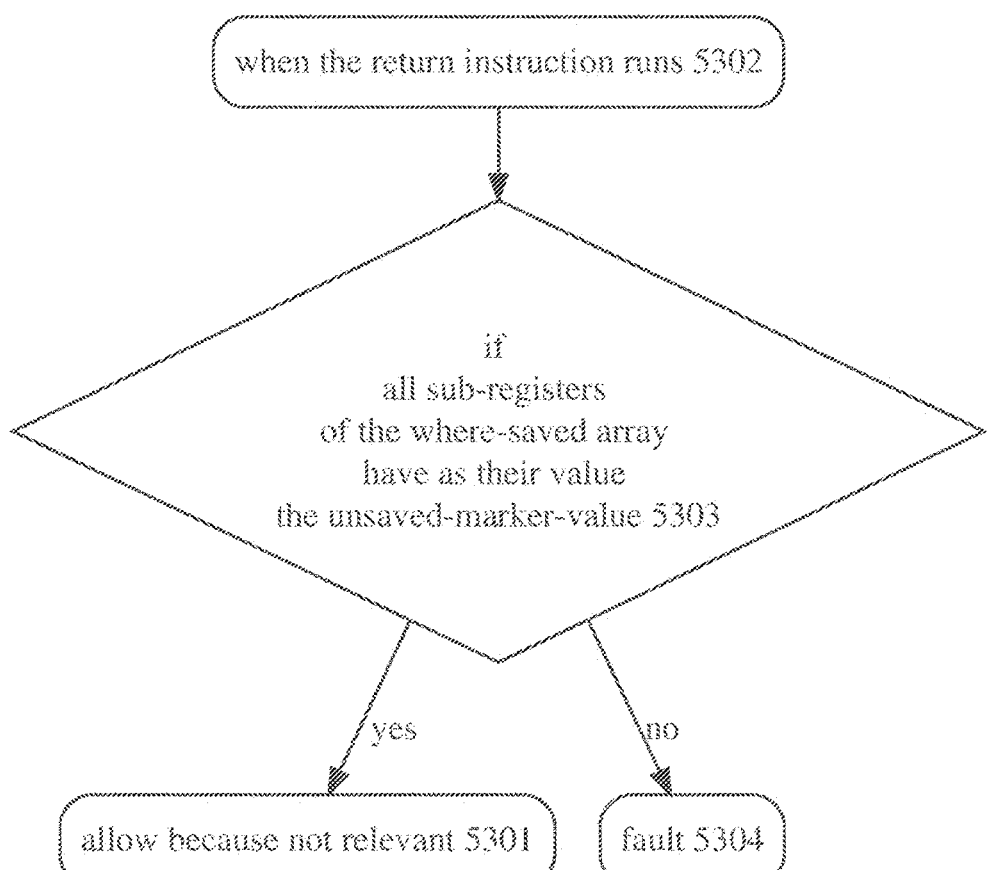
FIG. 53 shows when said return instruction runs, checking if all sub-registers of the where-saved array have value unsaved-marker-value.
Figure 54:
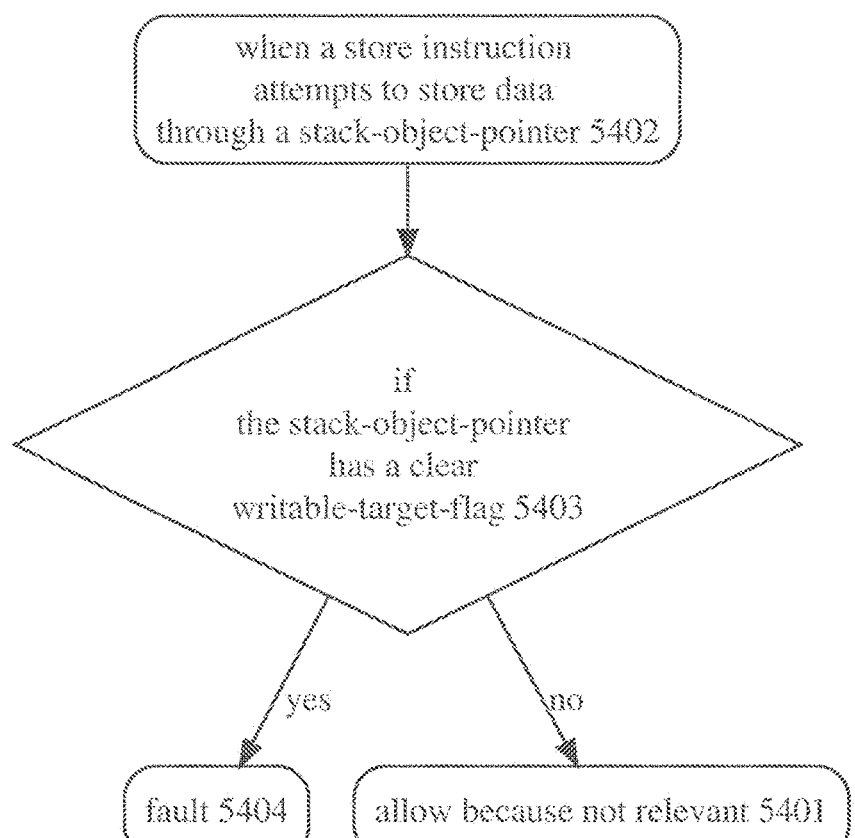
FIG. 54 shows when writing through a stack-object-pointer, checking the pointer has a clear writable-target-flag.
Figure 56C:
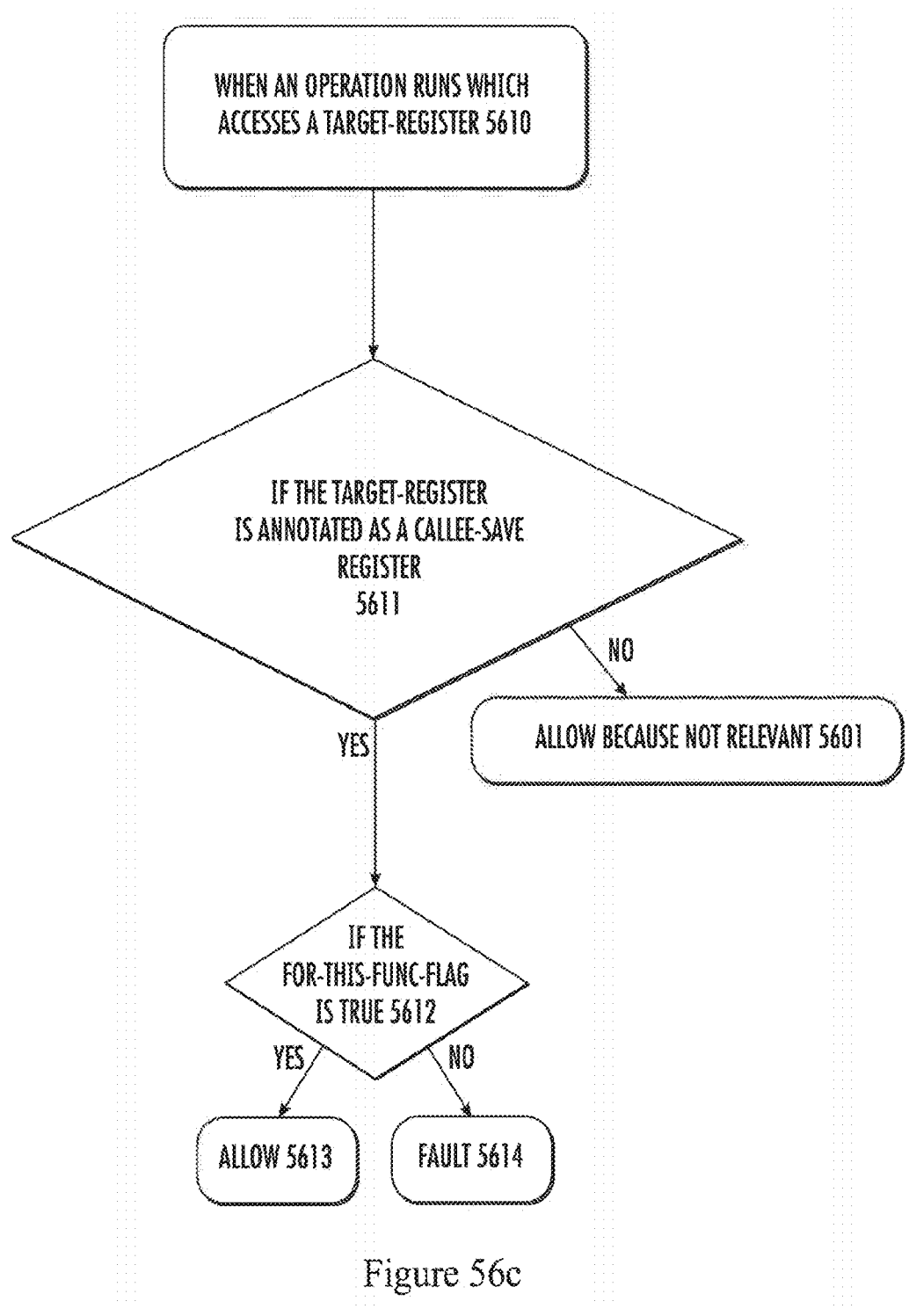
FIG. 56c shows when an operation runs which accesses a target register, if that register is a callee-save register, checking the for-this-func-flag.
Figure 56E:
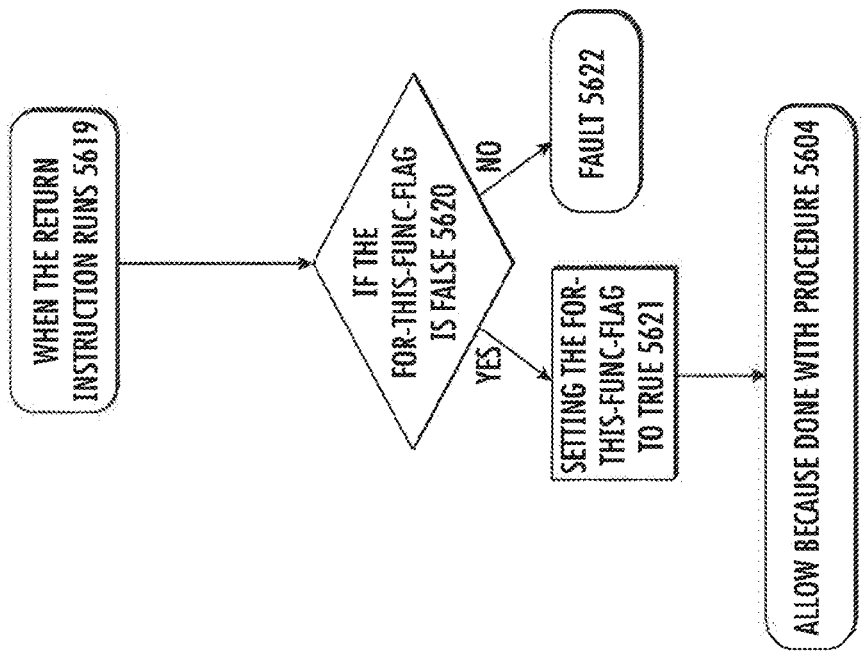
FIG. 56e shows when the return instruction runs, maintaining the for-this-func-flag.
Figure 56D:
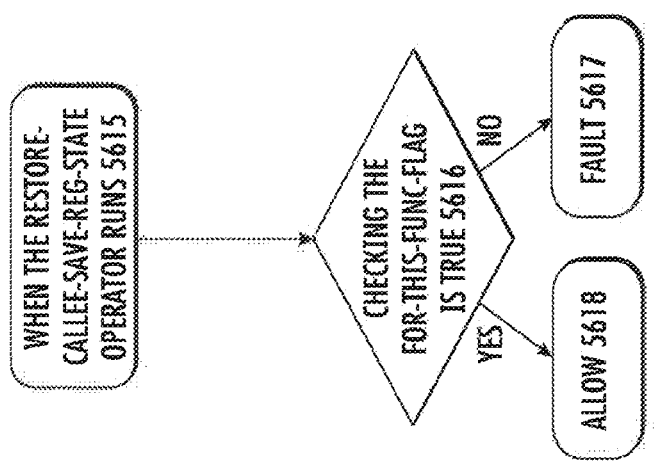
FIG. 56d shows when the restore-callee-save-reg state operator runs, checking the for-this-func-flag is true.
Figure 78:
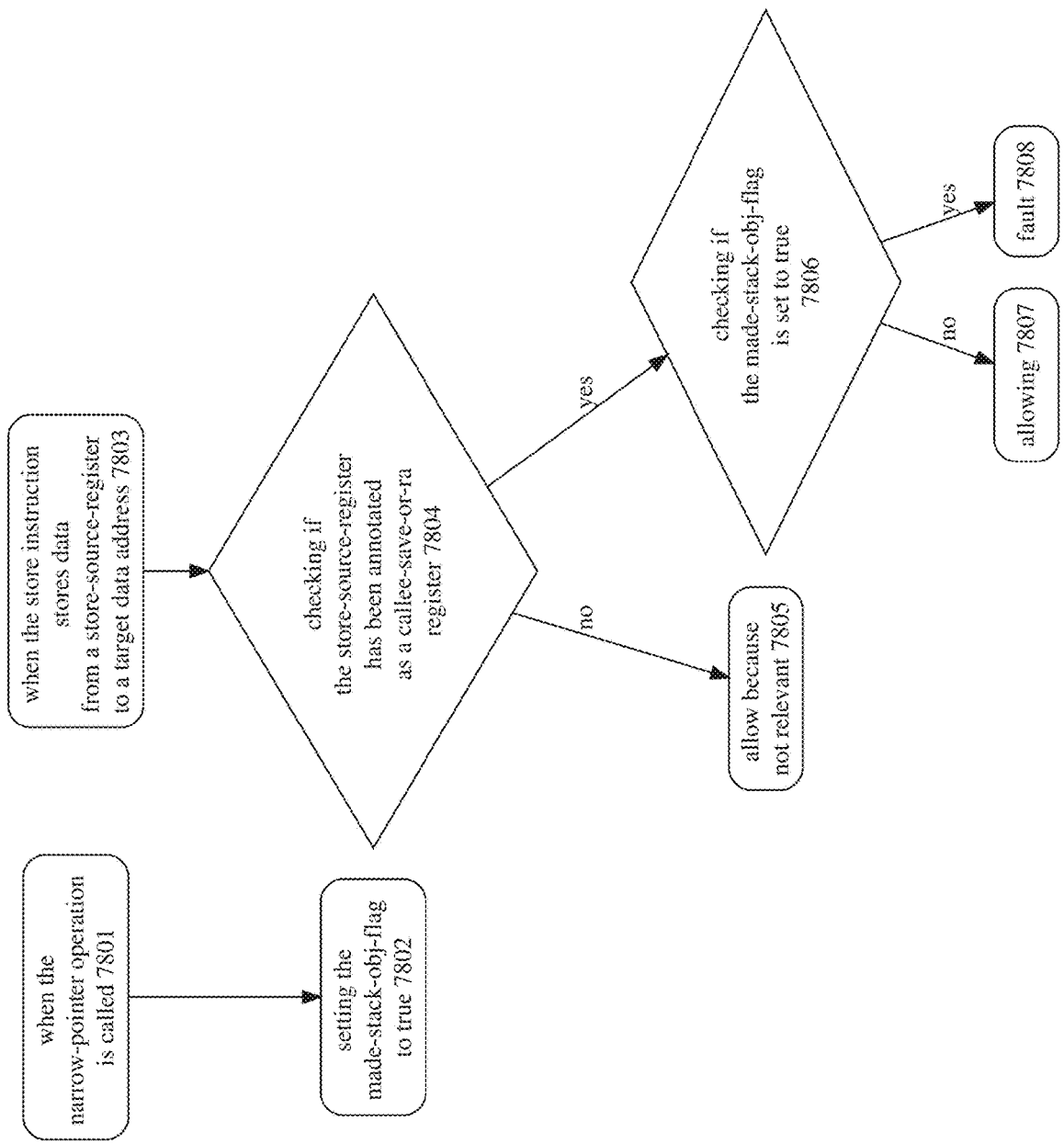
FIG. 78a shows the narrow-pointer operation setting the made-stack-obj-flag.
FIG. 78b shows a set made-stack-obj-flag preventing the storing of a callee-save-or-ra register.
Figure 79:
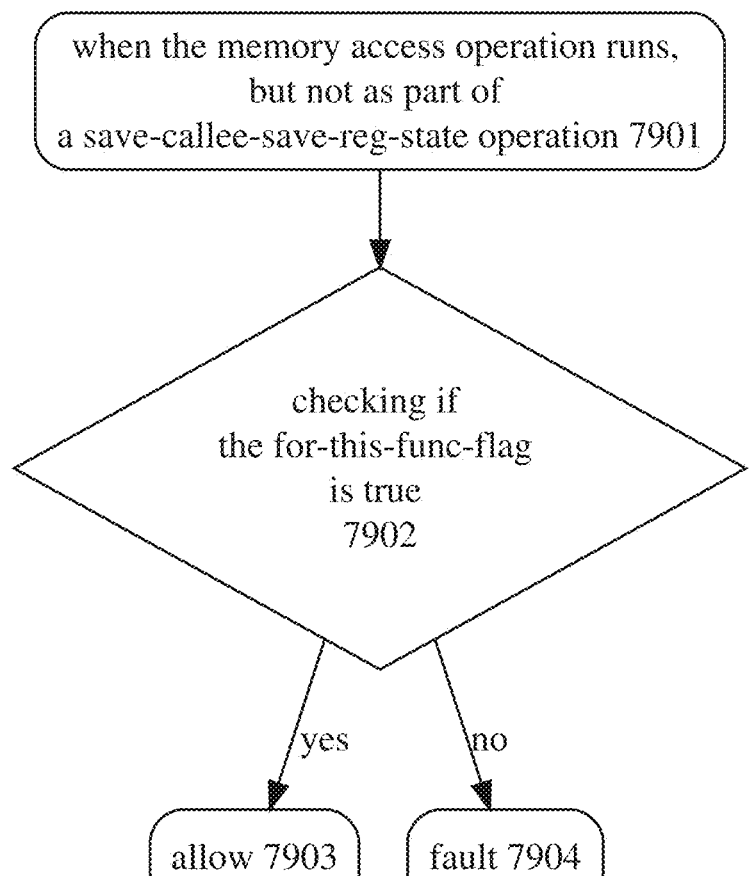
FIG. 79 shows preventing memory access unless the for-this-func-flag is true, unless the memory access is part of a save-callee-save-reg-state operation.

Hard Object core: the additional mechanism added to a chip containing a CPU core which observed and intercepts the CPU core, thereby providing the Hard Object functionality; see FIG. 67.

heap data address: data address where data is kept beyond the lifetime of any particular function call, that is not the stack; also not registers or memory-mapped I/O.

heap-global memory: data memory which stores global objects or heap objects; contrast with stack memory or function memory; see FIGS. 27, 28.

high bit: the most-significant bit to the magnitude of a fixed-point number; see FIG. 68 immediate-dist-to-start: absolute-pointer has an immediate-dist-to-start and an immediate-length; these are expressed at a granularity of the immediate-granularity of the absolute-pointer; see FIGS. 29, 30.

immediate-granularity: absolute-pointer has an immediate-dist-to-start and an immediate-length; these are expressed at a granularity of the immediate-granularity of the absolute-pointer; see FIG. 30.

immediate-length: absolute-pointer has an immediate-list-to-start and an immediate-length; these are expressed at a granularity of the immediate-granularity of the absolute-pointer; see FIGS. 29, 30.

immediate-subobject-end: the sum of the immediate-subobject-start and the immediate-length times the immediate-granularity.

immediate-subobject-start: the sum of the object-start and the immediate-dist-to-start times the immediate-granularity.

index-es being ordered: indexes (such as of registers) considered with respect to an associated order.

init-flags/init-flag-s: flags associated with a collection of registers or data memory which can hold values and which, when set, indicate that the registers or memory hold a well-defined value that may be read in contrast to being in a state where they may not be read; when a member of sub-stack-floor-init-flags, could also be called a sub-stack-floor-init-flag.

instruction address: an address of memory for holding instructions; contrast with data address; see FIG. 24.

instruction argument: An argument to an instruction (as opposed to an argument to a function).

instruction: Bits in a computer meant to be interpreted by the CPU as directions for it to perform one of a predetermined list of manipulations of data, such amount of data usually fixed and such manipulations usually implemented completely in microprocessor hardware.

instruction module-id: A module-id annotated onto an instruction or a plurality of instructions. For example, an identifier associated with an instruction address in a module-id table.

integer register/integer-register: a register that holds an integer value, usually in contrast to a register that holds a floating-point value, a float register.

integrity-bit: A bit of meta-data associated with a data address. This bit is cleared to false whenever the owner of this data address is changed, and can only be set to true again by the new owner. This bit allows a module to recognize a Trojan Horse attack by another module.

int-register id/int-register-id: the id corresponding to a int register.

int-register-written-flag: written-flag associated with an integer-register; see also unwritten-indicator-datum; see FIGS. 57, 58, 59, 60, 61, 62.

inverting bits of X or "~X": for a string of bits, replacing each 0 with 1 and each 1 with 0; see FIG. 68 jump instruction: An instruction which unconditionally transfer control, independent of any condition. Contrast with "branch instruction", "call instruction", and "return instruction".

jump-register (having a target-address/function-pointer): a register which holds the target of a jump instruction, which transfers control to a target-address/function-pointer held at said register.

kernel: Software which runs in kernel mode.

kernel-mode/kernel mode: The mode of a CPU where all instructions are allowed; usually as distinguished from user-mode.

less-than: the standard mathematical operation on two numbers returning true exactly one one has less value than that of the other.

less-than-or-equal-to or "A<=B": said of a pair of numbers; A is less-than-or-equal-to B if A is less-than B or A is equal to B load instruction (having a target (data) address/pointer): an instruction which transfers data from a memory location at a target (data) address/pointer to a register (load-destination-register).

load: to read from a RAM cell.

load-destination-register: see load instruction.

made-stack-obj-flag: a per-stack-frame flag in the callee-save-reg-state set when the first narrow-pointer operation of the function of this frame makes a stack-obj-pointer; see FIG. 78 make-ref instruction/make-reference instruction (having a target instruction address): an instruction/operation which can make a Hard Object reference of/from a target instruction address.

map: As a noun, the embodiment of any abstract association. As a verb, the abstract act of associating. This term is meant to indicate any method for associating elements with one another. Use of this term—and others like it that evoke the context of an association or relationship between elements—is not meant to limit to any particular embodiment. If a map M maps domain D to range R, then when M maps x in D to y in R, we may also say that "map M annotates x with y" or "map M annotates y onto x" or "y is annotated by map M onto x" see "annotate".

map-obj-metadata-table: a table which annotates an object-id with an object-metadatum.

map-subobj-metadata-table: a table which annotates a sub-object-id with a sub-object-metadatum-mem.

map-subobj-topid-to-absolute-subobj-id: a map which annotates an absolute sub-object-id onto an subobj-topid; see FIG. 33.

matches . . . except for the rightmost bits of length: a relation, said to hold of two strings of bits (or integer values): true if the two strings of bits are equal as long as the rightmost bits of both strings of the indicated length are not considered when making the comparison.

matching: Some objects "match" if they satisfy some relation or predicate (where "relation" and "predicate" are as defined elsewhere in this Glossary). Equality is a common example of such a relation; note that matching relations include, but are not limited to, the equality relation.

may-call-suff-len: see FIG. 6.

may-make-ref-suff-len: see FIGS. 5, 7.

may-read-suff-len: see FIG. 3, may-restore-flag: see FIG. 55.

may-write-suff-len: see FIG. 4.

memory access instruction (having a target-data-address): a load instruction or store instruction.

memory access operation: a load or a store from/to memory meta-data: data about data (here "about data" here is meant in the more general sense which means about or annotating any kind of information at all, including instructions). For example, meta-data of data often indicates how said data may be used, including but not limited to encoding access permissions to said data. The plural of meta-datum.

meta-datum: singular of meta-data. See "meta-date".

microprocessor: The core of a modem computer system.

mode: A subset of the abstract state space of a machine. We say a machine is in a particular mode when the state of the machine is in the subset of the state space associated with the mode.

mode of operation: See "mode".

mod-ownable-id: a module-id annotated onto a data memory or an object; see FIGS. 3, 4, 5, 20, 21.

mod-owner-id: a module-id annotated onto instruction memory or a function; see FIGS. 3, 4, 5, 7, 20, 21, 23, 24.

mod-owner-suff-len: see FIG. 21.

module: A subset of instruction addresses all collectively owning and maintaining data as one.

module-id: an identifier for a module.

module-id table: A table associating a module-id with a data address. This mechanism allows a data address to be more easily annotated as the module-id may be annotated instead; this is particularly useful if many data addresses all share the same annotation.

narrow-pointer operation: an operation which makes a new stack-object-pointer, said narrow-pointer operation having a target-pointer parameter and a new-object-size parameter; see FIG. 43.

new integrity set-integrity argument: The integrity bit argument to the set-integrity operation. This is the integrity bit with which the instruction/address pairs comprising (a) the instruction addresses in the subset of instruction addresses argument and (b) the data address argument will be associated after the set-integrity operation.

new owner set-owner argument: The owner module-id argument to the set-owner-module-id operation. This is the owner module-id with which the data address argument will be associated after the set-owner-module-id operation.

newer-than-or-equal-to/newer-than-or-equal-to total order: an order on stack addresses where if a function f( ) calls a function g( ) the stack data (stack frame) of function g( ) is newer than the stack data (stack frame) of function f( ); as we assume that the stack grows down, a stack address X is newer-than-or-equal-to a stack address Y if X is less-than-or-equal-to Y; note further that the newer-than-or-equal-to order is often considered only at the stack frame granularity, where even if X were greater than Y, X would still be newer-than-or-equal-to Y if X and Y were in the same stack frame.

new-module-id argument to the target-pub/priv/jump/return-multi instructions: the target-pub-multi and target-return-multi set the current-module-id register to the value of this argument, whereas the target-prix-multi and target-jump-multi instructions assert that the current-module-id register already has the value of this argument or they fault new-module-suff-len argument to the target-publpriv/jump/return-multi instructions. Multiple sub-module classes per module: owner/ownable separation is used with target-pub/priv/jump/return-multi instructions this argument is used in a way parallel to the new-module-id argument to the target-pub/priv/jump/return-multi instructions, specifically: (a) when the target-pub-multi and target-return-multi set the current-module-id register to the value of the new-module-id argument argument, they also set the current-module-suff-len register to the value of the new-module-suff-len argument and (b) when the target-prix-multi and target-jump-multi instructions assert that the current-module-id register already has the value of the new-module-id argument they also further assert that the current-module-id register already has the value of the new-module-stuff-len argument or they fault.

new-object-size: a parameter of a narrow-pointer operation.

nobody module-id: A special module id value (for example, we could use the number 0); if the current-module-id register is ever set to the nobody module-id, the CPU faults. Note that this value can be useful as the owner (or ownable) module-id annotating data pages that should not be accessed as heap pages by user code, such as stack pages.

num-args parameter: a parameter of a put-num-int-args-in-registers operator (where it is a num-int-args-in-registers value) or a put-nuns-float-args-in-registers operator (where it is a num-float-args-in-registers).

numeric value: the value of a sequence of bits when interpreted as, say, a fixed point number.

num-float-args-in-registers: see num-args parameter; see FIGS. 63, 64.

num-int-args-in-registers: see num-args parameter; see FIGS. 61, 62.

object: a region of data memory; such a region that is interpreted as a semantic unit.

object meta-data: meta-data annotated onto an object; see FIGS. 27, 28.

object range: the range in data memory which is annotated as being the memory of the object; see FIGS. 27, 28.

object-end: the sum of the object-start and the object-length.

object-id: an id annotated onto a heap-global pointer; when accessing an object and sub-object thereof, use the obj-id/subobj-id to look up the object and sub-object meta-data, respectively.

object-length: an object-metadatum has an object-start and an object-length.

object-metadatum: meta-data annotated onto an object.

object-start: an object-metadatum has an object-start and an object-length.

ok-to-call-flag: a flag annotated onto each register, set by a caller to indicate to the call instruction that is ok to for this register to be available to the callee; see FIGS. 59, 60.

ok-to-return-flag-s: a flag annotated onto each register, set by a callee to indicate to the return instruction that is ok to for this register to be available to the caller; see FIGS. 57, 58.

operation: An action comprising the execution of one or more instructions.

operation for making a stack-object-pointer/narrow-pointer operation which makes a new stack-object-pointer: a Hard Object operation for making a stack-obj-pointer from a range of memory on a stack frame: takes two parameters: a target-pointer parameter and a new-object-size parameter ownable-module-id: An identifier annotated onto a data address; it is used during checking of access to the address.

owner module-id: An identifier annotated onto an address (instruction address or a data address); it is used during checking of access to the address; when the current-module-id register is used, the owner module-id annotated onto an instruction address is used to initialize the current-module-id register when control transfers to the instruction address.

owner: Said of a data address: the subset of instruction addresses that (a) controls access to the data address and (b) can give ownership away to another subset of instruction addresses. The exact details of controlling access depend on which embodiment of the Hard Object design is chosen: in one embodiment, data access is restricted to the owner, whereas in others control of the permissions which govern access to the data is restricted to the owner.

owner subset of instruction addresses: Said of a data address: the subset of instruction addresses that (a) controls access to the data address and (b) can give ownership away to another subset of instruction addresses. The exact details of controlling access are a function of which embodiment of the Hard Object design is chosen.

owner-module-suff-len: An unsigned integer of sufficient bits to count from 0 to the maximum possible module-id (inclusive, inclusive) which is annotated onto an instruction address; it is used to update the current-module-suff-len register when control transfers to that instruction address.

page: A prior art unit of partition of a space of memory addresses. See also "page table entry".

page table entry: A prior art mechanism for annotating memory pages with meta-data. Also can mean the meta-data so annotated.

page-class-id: an id annotated on all pages of the same page-class.

page-class-id-map: a map that annotates a page-class-meta-datum onto a page-class-id.

page-class-meta-datum: a meta-datum associated with a page-class.

page-overflow-flag: a flag on a pointer that indicates that it belongs to the page-class of the previous page; see FIG. 28.

page-start-address: on a return putting the current-function-start to the page-start-address of the text-page annotating the target-address of the return-pointer plus the function-top-offset of the return-pointer; see FIG. 12, page-subobj-id-abs-base: see FIG. 32.

partition: (Mathematics) A collection of subsets of a set which (a) are pairwise disjoint and (h) the union of which is the entire set.

point to: We say some data A points to other data B if A contains the address of B. The intent is usually to provide a mechanism to realize an association of B to A.

pointer: a datum that holds the address/location of another datum; similar to having a name for an object.

predicate: a function or program that returns true or false; a predicate is said to define or compute a relation on its input sets Or equivalently their product set) where this relation is the subset of tuples from their product set where that tuple (or equivalently its member elements when presented in tuple order) cause the predicate to return true.

predicating (said of an action): possibly altering, performing, or not performing the action in question depending on some criteria.

product set: A "product set" of two sets A and B is the set of all possible 2-element tuples (pairs) (a, b) where a is an element of A and b is an element of B. A product set of n sets is defined similarly using n-element tuples where for any i the i-th element of any tuple comes from the i-th set.

program: A collection of instructions executed by a computer/microprocessor.

program counter: A special CPU register holding the address (or pointing to) the current instruction being executed.

protected range: the range of a stack frame from the protected-range-bottom to the frame-pointer where callee-save-or-ra registers are saved and where the callee-save-reg-state is stored; protected from access for any other purpose protected-range-bottom: the address of the protected range of a stack frame; see FIG. 73 public-flag: a flag annotated onto an object indicating that it is accessible to all modules; see FIG. 34.

public-target-flag: a flag annotated onto a data pointer indicating that it may be used to access data in one module from another; see FIG. 38.

put-num-float-args-in-registers operator: put the value of the num-float-args-in-registers register; see num-args parameter.

put-num-int-args-in-registers operator: put the value of the see nuns-args num-int-args-in-registers register; see num-args parameter.

raising a fault: suspending the current program and transferring control to a fault handler.

read: (1) read memory: An access to data at a data address that transfers data from the RAM cell indexed by the data address to a CPU register; (2) read a register: an access to a register which transfers data from the register to somewhere else.

refable-version: At an access (read or write) to a data object through the heap/global pointer/reference (a de-reference), the time address of the pointer/reference must match the version of the object or Hard Object raises a fault; when a function is called through a function pointer or returned-to through a return pointer, if the version of the function does not match the time address of the pointer, then Hard Object raises a fault; see FIGS. 2, 16, 26.

ref-flag: a flag annotated onto memory or a register, indicating that the corresponding value in the memory or register is a Hard Object formal pointer; see FIGS. 1, 8, 40.

register: Special memory within the CPU; not general-purpose Random Access Memory (RAM). Registers often have special semantics, such as CPU status registers and the program counter. See also "program counter".

register-id: an id assigned to a register.

relation: Terms "relation" and "relationship" are meant to at least encompass, without being limited to, (1) the meaning of the term "relation" as used in the field of Relational Algebra, (2) the meaning of the term "relation" as used in Mathematics to mean any subset of a product of sets, and (3) the meaning of the term "relation" as used in Computation where some objects are said to satisfy a relation when they make a predicate return true when those objects are provided as the input(s) to the predicate.

restore-call ee-save-reg-state operator: an operator which restores the callee-save-reg-state value from where it is saved on the stack.

restore-callee-save-reg-state operator: operator which restores the callee-save-reg-state from the stack return instruction/return operation: an instruction which transfers control to the caller through a return-pointer; an instruction which causes normal function call termination; often takes several actions such as popping values off of the stack then transferring control to the address that was stored by the return address which was pushed onto the stack by the call instruction which initiated the call, See "call instruction". Contrast with "branch instruction", "jump instruction".

return-address register: a register designated to hold a return address.

return-pointer: a pointer to where a caller should resume after a return; in a Hard Object system contains additional meta-data.

return-register: a register used for returning a value from a callee to a caller.

save-callee-save-reg-state operator: an operator which saves the callee-save-reg-state value to the stack.

save-callee-save-reg-state operator: operator which saves the callee-save-reg-state to the stack; note that doing this includes performing a memory access operation set (a bit or flag): to assign its value to 1 or raise the flag, or the state of being 1 or raised.

set (a variable to a value): to assign a variable to a value.

set: (Mathematics) Usually considered a undefined primitive concept in mathematics; perhaps describable as a containment metaphor where any given thing must be either in the set or not, never neither nor both; the things contained are called elements.

set-integrity operation: An operation that sets the integrity bit associated with a data address.

set-ok-to-call-flag operator: an operator which sets the ok-to-call-flag of a target register-id parameter.

set-owner-module-id operation: An operation that sets flee owner associated with a data address.

set-permission-value operation: An operation that sets the permission value associated with a data address and a set of instruction addresses.

setting to true (a flag): putting the value of a flag to true.

shadow-frame-pointer: the Hard Object system maintains its ow framepointer that cannot be written by user code, the Hard Object framepointer/frame-pointer (or shadow-frame-pointer); if a stack pointer attempts to access the stack, and the access is above the Hard Object framepointer, the access faults; a stack-obj-pointer can allow access above the Hard Object framepointer (if it is passed down to a callee); see FIGS. 44, 45, 46, 66.

significant bits, least: when a machine word is interpreted as a fixed-point number, those bits that contribute least to the magnitude of the number; often depicted as the rightmost bits stack: prior art region of data memory containing stack frames, one for each instance or call to a function and which holds the temporary values of the function; the Hard Object system designates an address as being "in/on the stack" exactly when stack-limit-ptr is less-than-or-equal-to target and target is less-than stack-base-ptr; see FIGS. 40, 41.

stack-base: a target data address is in/on the stack exactly when stack-limit-ptr is less-than-or-equal-to target and target is less-than stack-base-ptr.

stack-base-pointer: see definition of "stack"

stack-floor: an instruction may not access (load from or store to) an address in/on the stack (as delimited by stack-base, exclusive, and stack-limit, inclusive) if any data of the access is below (assuming stack grows down) the stack floor; see FIGS. 65, 66.

stack-limit: a target data address is in/on the stack exactly when stack-limit-ptr: is less-than-or-equal-to target and target is less-than stack-base-ptr; see FIGS. 14, 48.

stack-limit register: A CPU register that points to the maximum allowable extent of the stack; only addresses less than or equal to caller-protect and greater than stack-limit are "in frame". In a usual prior art memory organization it should not change while a particular thread context is executing; however it should be changed by the thread scheduler as a CPU switches from executing one thread to executing another.

stack-limit-pointer: see definition of "stack"

stack-object-floor: on a call, the Hard Object system asserts that the stack pointer must be at or below (less-than-or-equal-to) the stack-obj-floor; contrast with stack-floor; see FIG. 44.

stack-object-pointer: a kind of Hard Object pointer which can be made by a narrow-pointer operation; a stack-object-pointer may allow access to memory above the Hard Object frame-pointer/shadow-frame-pointer; contrast with stack-pointer; see FIGS. 41, 42, 43, 45, 46, 54.

stack-object-pointer: a pointer which usually points to the "top of the stack", that is, the unused memory that can be used to store more data on the stack; delimits the bottom of a stack frame (assuming stack grows down, which is usual); see FIG. 72 stack-object-pointer-frame-pointer: a framepointer annotated onto a stack object pointer; the sum of the value held in stack-limit register and the framepointer-up-relative-to-stack of the stack-object-pointer held in the return-register; see FIGS. 45, 46, 47, 48.

stack-pointer: a prior art pointer into the stack; in a Hard Object system a formal pointer allowing access to addresses on the stack, that is, as delimited by stack-base, exclusive, and stack-limit, inclusive, however the stack-pointer does not allow access to the stack above the Hard Object frame pointer/shadow-frame-pointer; contrast with stack-object-pointer.

stack-pointer-start of a stack-pointer: the stack-pointer-target of the stack-pointer minus the start-dnrelto-pointer-in-bytes of the stack-pointer.

stack-pointer-target of a stack-pointer: the stack-limit-ptr plus the pointer-uprelto-stack-in-bytes of the stack-pointer.

store instruction (having a target (data) address/pointer): an instruction which transfers data (value-being-stored) from a register (store-source-register) to a memory location at a target (data) address/pointer.

store: to write to a RAM cell.

store-source-register: a parameter of a store operation which indicates which register is being stored store-source-register: see store instruction.

sub-object-end: the sum of the sub-object-start and the sub-object-length of the sub-object-metadatum-mem.

sub-object-id: an id annotated onto a heap-global pointer; when accessing an object and sub-object thereof, use the obj-id/subobj-id to look up the object and sub-object metadata, respectively; see FIG. 32.

subobject-length/sub-object-length: annotated onto a sub-object-metadata or a sub-object-metadata-mem; the length of a subobject; see FIGS. 31, 32.

sub-object-metadata-table: see FIG. 33.

sub-object-metadatum-mem: meta-data annotated onto a sub-object as represented in a table in metadata memory.

subobject-offset-from-object-start: the start of this sub-object expressed as an offset from the start of the associated object.

sub-object-start: the sum of the object-start and the sub-object-offset-from-object-start of the sub-object-metadatum-mere; see FIGS. 31, 32.

subobj-topid: Hard Object can represent the sub-object ids for the sub-objects at the top of the sub-object tree (which typically would mirror the C type tree) by numbering the sub-object breadth-first while descending the sub-object tree until some point (such as if the available topids are exhausted) and then recording the mapping from topids to absolute sub-object ids in a map-subobj-topid-to-subobj-id table; see FIG. 33.

sub-register of the where-saved array: see where-saved array; see FIG. 53.

subset: (Mathematics) in the context of another set, a set where all of its elements are also elements of the other set.

subset of data addresses: A subset of all of the data addresses.

subset of instruction addresses: A subset of all of the instruction addresses.

sub-stack-floor-init-flag: see init-flag when a member of sub-stack-floor-init-flags.

sub-stack-floor-init-flags shift operation: after the shift each init-flag correspond to the index that is one less in the order on the index-es than the original index corresponding to the init-flag before the shift, and also makes false the init-flag corresponding to the highest index in the order; this shift is done when lowering the stack-floor as the stack-floor is the origin of the frame of reference of the sub-stack-floor-init-flags.

table: The embodiment of any abstract association. This term is meant to indicate any method for associating elements with one another. Use of this term is meant to suggest an embodiment and is not meant to limit to any particular embodiment.

tag meta-datum: Any data annotating other data in order to make the data it annotates distinct. One example of a tag meta-datum is a target-tag meta-datum.

target data address: The data address in the context of an instruction making an access to target data at a data address.

target instruction address: In the context of control transfer, the instruction address to which a control transfer instruction changes the program counter (or to which control is transferred).

target instruction: an instruction at a target instruction address; see "target instruction address".

target-address: the address of an instruction which accesses memory, such a a load or store (target-data-address), or an instruction which makes a control flow transfer (target-instruction-address, target-text-address), such as a jump or branch target-data-address: the target address in data memory of an operation which accesses data memory, such as a load or a store; see FIG. 32.

target-frame-pointer: the sum of the stack-limit register and the framepointer-up-relative-to-stack of the target data address.

target-pointer-up-relative-to-stack: a field of a stack-object-pointer which for represents the target pointer in coordinates relative to the stack-limit register.

target-size: a field of a stack-object-pointer which indicates the size of the data target; a size-in-bytes, which is a size (or target-size) in units of bytes.

target-start-down-relative-to-pointer: a field of a stack-object-pointer which represents the object start relative to the pointer.

text-data operation: an operation where an instruction at an instruction address operates on a datum/object at a data address, such as read and write text-data-operation-suffix-len: used in conjunction with a text-data operation, when checking module permissions for the text-data operation, a suffix length of bits to ignore between the mod-owner-id of the instruction address of the operation and a mod-ownable-id; for example, when the text-data operation is read, the may-read-suff-len, and when the text-data operation is write, the may-write-suff-len text-page: a prior art page of data annotated as holding program text or instructions.

text-pointer: a pointer to an instruction s opposed to data) or into text memory.

text-text operation: an operation where an instruction at an instruction address operates in a way involving or targeting a second instruction address, such as transferring the second instruction address to a register (taking an address of a function) or transferring control to that second instruction address (calling/returning/jumping)

text-text-operation-suffix-len: used in conjunction with a text-text operation, when checking module permissions for the text-text operation, a suffix length of bits to ignore between the mod-owner-id of the instruction address of the operation and the mod-owner-id of the second instruction address three-way add with single fused carry: an add of three fixed-point numbers using only a single carry; see FIG. 68 time address: annotated onto a function pointer, return pointer, or absolute data pointer which must match the version annotated onto the function or object called, returned to, or accessed through the pointer, or otherwise the access results in a fault; see FIGS. 2, 26.

tuple: An ordered collection of elements. A subset of a product set is a set of tuples where each element of one tuple comes respectively from each set participating in the product set.

unsaved-marker-value: a value which may be stored in a where-saved array sub-register to indicate that the corresponding callee-save register has not been saved; this unsaved-marker-value does not correspond to any target data address; see FIG. 53, unwritten-indicator-datum: a value which is returned to indicate that a read of a register or memory which is annotated by a clear written-flag; see FIGS. 36, 58, 60, 62, 64, user mode/user-mode: The typical mode for the execution of programs on a microprocessor where many "system" instructions are not allowed; usually as distinguished from kernel-mode, value: The bits contained in a register or memory cell. That is, at times when it is clear from context we may say "the program counter", confusing the hardware register with the software (in this case an instruction address) value contained in the register; however when we wish to be explicit, we may refer to (1) the register on one hand, meaning the hardware device, and (2) the value of the register on the other hand, meaning the bits contained in the hardware device.

value-being-stored: see store instruction.

value-frame-pointer: the sum of the stack-limit register and the framepointer-up-relative-to-stack of the value-being-stored stack-object-pointer, version number: a number associated with something which is incremented every time the thing is written; one may check that a thing has not changed if the version number has not changed, as long as one may conclude that the version number has not rolled over.

where-saved array: an array of sub-register-s, (1) each corresponding to a callee-save register and (2) each sub-register having as its value the location (relative to the shadow-frame-pointer) where its corresponding callee-save register has been saved (on the stack), or if its callee-save register has not been saved, then having as its value the unsaved-marker-value; see also unsaved-marker-value; see FIGS. 49, 50, 53.

writable-flag: a flag annotated onto memory indicating that it may be written; see FIG. 35.

writable-target-flag: a flag annotated onto a pointer indicating that a write or store instruction may write to the target address of the pointer; see FIGS. 39, 54.

write: (1) write memory: An access to data at a data address that transfers data to the RAM cell indexed by the data address from a CPU register; also called a store to memory; (2) write a register: An access to a register that transfers data to the register from somewhere else.

write instruction: see store instruction.

write-top: the target data address of the write plus the data-width of the write.

written-flag: a flag annotated onto a register or memory indicating that it has been written; see also unwritten-indicator-datum; see FIGS. 36, 37.

LIST OF REFERENCE NUMBERS AND FIGURES

0101: when a store instruction attempts to store a data-pointer to a data address
0102: if the data address is heap-global memory
0103: if the durable-flag of the data-pointer is set to true
0104: clearing to false the ref-flag annotated onto the data-pointer when storing it, or raising a fault
0105: when a load or store instruction attempts to load or store through a data-pointer
0106: if the ref-flag of the data-pointer is set to true
0107; allow
0108: fault
0109: allow because not relevant
0110: allow
0201: when a memory access instruction attempts to access data through a data-pointer
0202: if the time address of the data-pointer matches the refable-version annotated onto the target-address of the data-pointer
0203: allow
0204: fault
0301: when a read instruction at an instruction address attempts to read data from a target data address
0302: if the mod-owner-id annotated onto the instruction address matches the mod-ownable-id annotated onto the target data address, except for the rightmost bits of length of the may-read-suff-len bits annotated onto the target data address
0303: allow
0304: fault
0401: when a write instruction at an instruction address attempts to write data at a target data address
0402: if the mod-owner-id annotated onto the instruction address matches the mod-ownable-id annotated onto the target data address except for the rightmost bits of length of the may-write-suff-len bits annotated onto the target data address
0403: allow
0404: fault
0501: when a make-reference instruction at an instruction address attempts to make a reference from a target data address
0502: if the mod-owner-id annotated onto the instruction address matches the mod-ownable-id annotated onto the target data address except for the rightmost bits of length of the may-make-ref-suff-len bits annotated onto the target data address
0503: allow
0504: fault
0601: when a call instruction at an instruction address attempts to call to a target instruction address
0602: if the mod-owner-id annotated onto the instruction address matches the mod-owner-id annotated onto the target instruction address, except for the rightmost hits of length of the may-call-suff-len annotated onto the target instruction address

0603: allow
0604: fault
0701: when a make-reference instruction at an instruction address attempts to make a reference from a target instruction address
0702: if the mod-owner-id annotated onto the instruction address matches the mod-owner-id annotated onto the target instruction address, except for the rightmost hits of length of the may-make-ref-suff-len annotated onto the target instruction address
0703: allow
0704: fault
0801: when a store instruction attempts to store a function-pointer to a data address
0802: if the data address is heap-global memory
0803: if the durable-flag of the function-pointer is set to true
0804: clearing to false the ref-flag annotated onto the function-pointer when storing it, or raising a fault
0805: when a call instruction attempts to call through a function-pointer
0806: if the ref-flag of the function-pointer is set to true
0807: allow
0808: allow
0809: fault
0810: allow because not relevant
0901: when a call or jump instruction attempts to call or jump through a function-pointer
0902: if the func-top-flag annotated onto the target-address of the function-pointer is set to true
0903: allow
0904: fault
1001: when a call or jump instruction at an instruction address attempts to call or jump through a function-pointer
1002: if the mod-owner-id annotated onto the instruction address matches the mod-owner-id annotated onto the target-address of the function-pointer
1003: if the cross-module-target-flag of the function-pointer is set to true
1004: allow
1005: fault
1101: when a call or jump instruction attempts to call or jump through a function-pointer
1102: if the function-time of the function-pointer matches the refable-version annotated onto the target-address of the function-pointer
1103: allow
1104: fault
1201: allow because done with procedure
1202: when a return instruction returns through a return-pointer
1201 if the function-top-offset of the return-pointer is zero
1204: putting the current-function-start to the func-at-page-start of the text-page of the target-address of the return-pointer
1205: putting the current-function-start to the page-start-address of the text-page annotating the target-address of the return-pointer plus the function-top-offset of the return-pointer
1301: allow because done with procedure
1302: when a return instruction returns through a return-pointer
1303: putting the frame-pointer register to the value of the framepointer of the return-pointer
1401: allow because done with procedure
1402: when a return instruction returns through a return-pointer
1403: putting the frame-pointer register to the value of the framepointer-up-relative-to-stack of the return-pointer plus the value of the stack-limit register
1501: when a jump instruction attempts to jump through a function-pointer
1502: if the func-top-flag annotated onto the target-address of the function-pointer is set to true
1503: if the function-body-target-flag of the function-pointer is set to true
1504: allow
1505: fault
1601: when a return instruction attempts to return through a return-pointer
1602: if the function-time of the return-pointer matches the refable-version annotated onto the target-address of the return-pointer
1603: allow
1604: fault
1701: when a call or jump instruction attempts to transfer control to a target-address
1702: if the intra-func-dyn-target-flag annotated onto the target-address is set to true
1703: allow
1704: fault
1801: allow because done with procedure
1802: when a call instruction transfers control to a target-address
1803: putting the current-function-start to the target-address
1901: allow because done with procedure
1902: after a call instruction or a return instruction puts the current-function-start to the target-address
1903: putting the value of the current-function-metadata to the function-metadata annotated by the function-start-to-function-metadata-map onto the current-function-start
2001: when a memory access instruction at an instruction address attempts to access a datum at a target-data address
2002: if the mod-owner-id of the current-function-metadata matches the mod-ownable-id annotated onto the target-data address
2003: allow
2004: fault
2101: when a memory access instruction at an instruction address attempts to access a datum at a target-data address
2102: if the mod-owner-id of the current-function-metadata matches the mod-ownable-id annotated onto the target-data address, except for the rightmost bits of length of the mod-owner-suff-len of the current-function-metadata
2103: allow
2104: fault
2201: when the dangerous operation runs
2202: if the danger-flag of the current-function-metadata is set to true
2203: allow
2204: fault
2301: when the call instruction attempts to call to a target instruction address
2302: if the mod-owner-id of the current-function-metadata matches the mod-owner-id of the function-metadata annotated by the function-start-to-function-metadata-map onto the target instruction address, except for the rightmost bits of length of the may-call-suff-len of the function-metadata annotated onto the target instruction address

2303: allow

2304: fault

2401: when the make-ref instruction attempts to make a reference of a target instruction address

2402: if the mod-owner-id of the current-function-metadata matches the mod-owner-id of the function-metadata annotated by the function-start-to-function-metadata-map onto the target instruction address, except for the rightmost bits of length of the may-make-ref-suff-len of the function-metadata annotated onto the target instruction address

2403: allow

2404: fault

2501: allow because done with procedure

2502: after a call instruction or a return instruction puts the value of the current-function-metadata

2503: when an instruction at an instruction address attempts to run

2504: putting the value of the current-function-end to be the current-function-start plus the function-length of the current-function-metadata

2505: if the instruction address is greater-than-or-equal-to the current-function-start and the instruction address plus the access-width is less-than-or-equal-to the current-function-end

2506: allow

2507: fault

2601: when a call instruction attempts to call through a function-pointer

2602: if the time-address of the function-pointer matches the refable-version of the function-metadata annotated by the function-start-to-function-metadata-map onto the target-address of the function-pointer

2603: allow

2604: fault

2701: when a memory-access instruction attempts to access data at a target-address through an absolute-pointer

2702: finding the data-page meta-datum annotated onto the data-page-index of the target-address

2703: finding the page-class-id of the data-page meta-datum

2704: finding the page-class-meta-datum annotated onto the page-class-id using the page-class-id-map

2705: finding the map-obj-metadata-table annotated onto the page-class-meta-datum

2706: finding the object-metadatum annotated by the map-obj-metadata-table onto the object-id of the absolute-pointer

2707: finding the object-start and object-length of the object-metadatum

2708: computing an object-end as the sum of the object-start and the object-length

2709: if the target-address of the absolute-pointer is greater-than-or-equal-to the object-start

2710: if the target-address of the absolute-pointer plus the access-width is less-than-or-equal-to the object-end

2711: allow

2712: fault

2801: when a memory-access instruction attempts to access data at a target-address through an absolute-pointer

2802: if the page-overflow-flag of the absolute-pointer is set to true

2803: computing an effective data-page-index as the value of the data-page-index of the target-address minus one

2804: putting an effective data-page-index to be the value of the data-page-index of the target-address

2805: finding the data-page meta-datum annotated onto the effective data-page-index

2806: finding the page-class-id of the data-page meta-datum

2807: finding the page-class-meta-datum annotated onto the page-class-id using the page-class-id-map

2808: finding the map-obj-metadata-table annotated onto the page-class-meta-datum

2809: finding the object-metadatum annotated by the map-obj-metadata-table onto the object-id of the absolute-pointer

2810: finding the object-start and object-length of the object-metadatum

2811: computing an object-end as the sum of the object-start and the object-length

2812: if the target-address of the absolute-pointer is greater-than-or-equal-to the object-start

2813: if the target-address of the absolute-pointer plus the access-width is less-than-or-equal-to the object-end

2814: allow

2815: fault

2901: when a memory-access instruction attempts to access data at a target-address through an absolute-pointer

2902: finding the data-page meta-datum annotated onto the data-page-index of the target-address

2903: finding the page-class-id of the data-page meta-datum

2904: finding the page-class-meta-datum annotated onto the page-class-id using the page-class-id-map

2905: finding the map-obj-metadata-table annotated onto the page-class-meta-datum

2906: finding the object-metadatum annotated by the map-obj-metadata-table onto the object-id of the absolute-pointer

2907: finding the object-start and object-length of the object-metadatum

2908: computing an immediate-subobject-start as the sum of the object-start and the immediate-dist-to-start of the absolute-pointer

2909: computing an immediate-subobject-end as the sum of the immediate-subobject-start and the immediate-length of the absolute-pointer

2910: if the target-address of the absolute-pointer is greater-than-or-equal-to the immediate-subobject-start

2911: if the target-address of the absolute-pointer plus the access-width is less-than-or-equal-to the immediate-subobject-end

2912: allow

2913: fault

3001: when a memory-access instruction attempts to access data at a target-address through an absolute-pointer

3002: finding the data-page meta-datum annotated onto the data-page-index of the target-address

3003: finding the page-class-id of the data-page meta-datum

3004: finding the page-class-meta-datum annotated onto the page-class-id using the page-class-id-map

3005: finding the map-obj-metadata-table annotated onto the page-class-meta-datum

3006: finding the object-metadatum annotated by the map-obj-metadata-table onto the object-id of the absolute-pointer

3007: finding the object-start and object-length of the object-metadatum

3008: computing an immediate-subobject-start as the sum of the object-start and the immediate-dist-to-start of the absolute-pointer times the immediate-granularity of the absolute-pointer

3009: computing an immediate-subobject-end as the sum of the immediate-subobject-start and the immediate-length of the absolute-pointer times the immediate-granularity of the absolute-pointer

3010: if the target-address of the absolute-pointer is greater-than-or-equal-to the immediate-subobject-start

3011: if the target-address of the absolute-pointer plus the access-width is less-than-or-equal-to the immediate-subobject-end

3012: allow

3013: fault

3101: when a memory-access instruction attempts to access data at a target-address through an absolute-pointer

3102: fault

3103: allow

3104: finding the data-page meta-datum annotated onto the data-page-index of the target-address

3105: finding the page-class-id of the data-page meta-datum

3106: finding the pace-class-meta-datum annotated onto the page-class-id using the page-class-id-map

3107: finding the map-subobj-metadata-table annotated onto the page-class-meta-datum

3108: finding the subobj-metadata-table annotated by the map-subobj-metadata-table onto the object-id of the absolute-pointer

3109: finding the sub-object-metadatum-mem annotated by the subobj-metadata-table onto the sub-object-id of the absolute-pointer

3110: computing a sub-object-start as the sum of the object-start of the object-metadatum and the subobject-offset-from-object-start of the sub-object-metadatum-mem

3111: computing a sub-object-end as the sum of the sub-object-start and the sub-object-length of the sub-object-metadatum-mem

3112: if the target-address of the absolute-pointer is greater-than-or-equal-to the sub-object-start

3111: if the target-address of the absolute-pointer plus the access-width is less-than-or-equal-to the sub-object-end

3201: when a memory-access instruction attempts to access data at a target-address through an absolute-pointer

3202: fault

3203: allow

3204: finding the data-page meta-datum annotated onto the data-page-index of the target-address

3205: finding the page-class-id of the data-page meta-datum

3206: finding the page-class-meta-datum annotated onto the page-class-id using the page-class-id-map

3207: finding the map-subobj-metadata-table annotated onto the page-class-meta-datum

3208: finding the subobj-metadata-table annotated by the map-subobj-metadata-table onto the object-id of the absolute-pointer

3209: computing an absolute sub-object-id as the sum of the sub-object-id of the absolute-pointer, and the page-subobj-id-abs-base annotated onto the data-page meta-datum annotated onto the data-page-index of the target-address

3210: finding the sub-object-metadatum-mem annotated by the subobj-metadata-table onto the absolute sub-object-id

3211: computing a sub-object-start as the sum of the object-start of the object-metadatum and the subobject-offset-from-object-start of the sub-object-metadatum-mem

3212: computing a sub-object-end as the sum of the sub-object-start and the sub-object-length of the sub-object-metadatum-mem

3213: if the target-address of the absolute-pointer is greater-than-or-equal-to the sub-object-start

3214: if the target-address of the absolute-pointer plus the access-width is less-than-or-equal-to the sub-object-end

3301: when a memory-access instruction attempts to access data at a target-address through an absolute-pointer

3302: fault

3303: allow

3304: finding the data-page meta-datum annotated onto the data-page-index of the target-address

3305: finding the page-class-id of the data-page meta-datum

3306: finding the page-class-meta-datum annotated onto the page-class-id using the page-class-id-map

3307: finding the map-subobj-metadata-table annotated onto the page-class-meta-datum

3308: finding the subobj-metadata-table annotated by the map-subobj-metadata-table onto the object-id of the absolute-pointer

3309: finding the absolute sub-object-id annotated by the map-subobj-topid-to-absolute-subobj-id of the sub-object-metadata-table from the subobj-topid of the absolute-pointer

3310: finding the sub-object-metadatum-mem annotated by the subobj-metadata-table onto the absolute sub-object-id

3311: computing a sub-object-start as the sum of the object-start of the object-metadatum and the subobject-offset-from-object-start of the sub-object-metadatum-mem

3312: computing a sub-object-end as the sum of the sub-object-start and the sub-object-length of the sub-object-metadatum-mem

3313: if the target-address of the absolute-pointer is greater-than-or-equal-to the sub-object-start

3314: if the target-address of the absolute-pointer plus the access-width is less-than-or-equal-to the sub-object-end

3401: when a memory-access instruction at an instruction address attempts to access data at a target data address

3402: if the mod-owner-id annotated onto the instruction address equals the mod-ownable-id annotated onto the target data address

3403: if the public-flag annotated onto the target data address is set to true

3404: allow

3405: fault

3501: when a write instruction attempts to write data to a target data address 3502: if the writable-flag annotated onto the target data address is set to true
3503: allow
3504: fault
3601: allow because done with procedure
3602: when a write instruction attempts to write data to a target data addresss
3603: setting the written-flag annotated onto the target data address to true
3604: when a read instruction attempts to read data from a target data address
3605: if the written-flag annotated onto the target data address is set to true
3606: allow
3607: fault
3701: allow because done with procedure
3702: when a write instruction attempts to write data to a target data address
3703: setting the written-flag annotated onto the target data address to true
3704: when a read instruction attempts to read data from a target data address
3705: if the written-flag annotated onto the target data address is set to true
3706: making the read instruction read the unwritten-indicator-datum instead of the data at the target data address
3707: allow
3801: when a memory-access instruction at an instruction address attempts to access data through an absolute-pointer
3802: if the mod-owner-id annotated onto the instruction address equals the mod-ownable-id annotated onto the target-data-address of the absolute-pointer
3803: if the public-target-flag annotated onto the absolute-pointer is set to true
3804: allow
3805: fault
3901: when a write instruction attempts to write data through an absolute-pointer
3902: if the writable-target-flag annotated onto the absolute-pointer is set to true
3903: allow
3904: fault
4001: allow because not relevant
4002: when a memory-access instruction attempts to access data through a data-pointer
4003: if the data-pointer points to a data address that is annotated as stack memory
4004: if the data-pointer is annotated with a ref-flag that is set to true
4005: allow
4006: fault
4101: when a memory access instruction at an instruction address attempts to access data through a stack-object-pointer
4102: if the stack-limit-pointer is less-than-or-equal-to the stack-pointer-target of the stack-object-pointer
4103: if the stack-pointer-target of the stack-object-pointer plus the access-width is less-than-or-equal-to the stack-base-pointer
4104: if the stack-pointer-start of the stack-object-pointer is less-than-or-equal-to the stack-pointer-target of the stack-object-pointer
4105: if the stack-pointer-target of the stack-object-pointer plus the access-width is less-than-or-equal-to the stack-pointer-start of the stack-object-pointer plus the size-in-bytes of the stack-object-pointer
4106: allow
4107: fault
4201: allow because not relevant
4202: when a store instruction attempts to store a value-being-stored to a target data address
4203: if the value-being-stored is a stack-object-pointer and the target data address is annotated as heap-global memory
4204: fault
4301: allow because done with procedure
4302: when the narrow-pointer operation is called with a target-pointer parameter value and a new-object-size parameter value
4303: putting the new stack-object-floor to the minimum of the current stack-object-floor value, the target-pointer parameter value of the narrow-pointer operation, and protected-range-bottom
4304: when the call instruction runs
4305: if the stack-pointer is less-than-or-equal-to the stack-object-floor
4306: allow
4307: fault
4401: allow because done with procedure
4402: when the return instruction runs
4401: putting the stack-object-floor to the value the shadow-frame-pointer has at the start of the return instruction
4501: when the return instruction runs, if the value held in the return-register is a stack-object-pointer
4502: if the stack-object-pointer-frame-pointer of the stack-object-pointer is newer-than-or-equal-to the shadow-frame-pointer
4503: fault or clear the ref-flag on the return-register
4504: allow
4601: when the return instruction runs, if the value held in the return-register is a stack-object-pointer
4602: computing a stack-object-pointer-frame-pointer as the sum of the value held in stack-limit register and the framepointer-up-relative-to-stack of the stack-object-pointer held in the return-register
4603: if the stack-object-pointer-frame-pointer is newer-than-or-equal-to the shadow-frame-pointer
4604: allow
4605: fault
4701: allow because not relevant
4702: when the store instruction attempts to store a value-being-stored to a target data address, if the target data address is a stack-object-pointer and if the value-being-stored is a stack-object-pointer
4703: if the stack-pointer-target of the target data address is newer-than-or-equal-to the shadow-frame-pointer
4704: if the stack-object-pointer-frame-pointer of the target data address is newer-than-or-equal-to the stack-object-pointer-frame-pointer of the value-being-stored
4705: allow
4706: fault
4801: allow because not relevant
4802: when the store instruction attempts to store a value-being-stored to a target data address, if the target data address is a stack-object-pointer and if the value-being-stored is a stack-object-pointer
4803: if the stack-pointer-target of the target data address is newer-than-or-equal-to the shadow-frame-pointer
4804: computing a stack-object-pointer-frame-pointer of the target data address as the sum of the stack-limit register and the framepointer-up-relative-to-stack of the target data address stack-object-pointer

4805: computing a stack-object-pointer-frame-pointer of the value-being-stored as the sum of the stack-limit register and the framepointer-up-relative-to-stack of the value-being-stored stack-object-pointer

4806: if the stack-object-pointer-frame-pointer of the target data address is newer-than-or-equal-to the stack-object-pointer-frame-pointer of the value-being-stored

4807: allow

4808: fault

4901: allow because not relevant

4902: allow because not relevant

4903: allow because not relevant

4904: allow because done with procedure

4905: when the store instruction stores data from a store-source-register to a target data address

4906: if the store-source-register has been annotated as a callee-save register

4907: if the sub-register of the where-saved array corresponding to the store-source-register has as its value the unsaved-marker-value

4908: putting the target data address into the sub-register of the where-saved array corresponding to the store-source-register

4909: when an operation other than the store instruction runs which reads a target register

4910: if the target register has been annotated as a callee-save register

4911: if the sub-register of the where-saved array corresponding to the target register has as its value the unsaved-marker-value

4912: allow

4913: fault

5001: allow because not relevant

5002: allow because not relevant

5003: allow because done with procedure

5004: when the load instruction loads data to a load-destination-register from a target data address

5005: if the load-destination-register has been annotated as a callee-save register

5006: if the sub-register of the where-saved array corresponding to the load-destination-register has as its value the target data address

5007: recording the unsaved-marker-value into the sub-register of the where-saved array corresponding to the load-destination-register

5101: allow because not relevant

5102: allow because not relevant

5103: when the load instruction loads data to a load-destination-register from a target data address

5104: if any sub-register of the where-saved array has as its value the target data address

5105: if that sub-register of the where-saved array corresponds to a register other than the load-destination-register of the load instruction

5106: fault

5201: allow because not relevant

5202: when the store instruction stores data to a target data address

5203: if any sub-register of the where-saved array has as its value the target data address

5204: fault

5301: allow because not relevant

5302: when the return instruction runs

5301: if all sub-registers of the where-saved array have as their value the unsaved-marker-value

5304: fault

5401: allow because not relevant

5402: when a store instruction attempts to store data through a stack-object-pointer

5403: if the stack-object-pointer has a clear writable-target-flag

5404: fault

5501: allow because done with procedure

5502: when an operation runs which writes a callee-save target register, and the sub-register of the where-saved array corresponding to the callee-save target register has the unsaved-marker-value

5503: clearing the may-restore-flag to false

5504: when the restore-callee-save-reg-state operator runs

5505: if the may-restore-flag is true

5506: allow

5507: fault

5601: allow because not relevant

5602: allow because done with procedure

5603: allow because done with procedure

5604: allow because done with procedure

5605: when the call instruction runs

5606: if the for-this-func-flag is true

5607: clearing the for-this-fun-flag to false

5608: when the save-call ee-save-reg-state operator runs

5625: fault

5609: setting the for-this-func-flag to true

5610: when an operation runs which accesses a target register

5611: if the target register is annotated as a callee-save register

5612: if the for-this-func-flag is true

5613: allow

5614: fault

5615: when the restore-callee-save-reg-state operator runs

5616: checking the for-this-func-flag is true

5617: fault

5618: allow

5619: when the return instruction runs

5620: if the for-this-func-flag is false

5621: setting the for-this-func-flag to true

5622: fault

5623: fault

5624: checking if the for-this-func-flag is true

5625: fault

5701: allow because not relevant

5702: allow because done with procedure

5703: allow because done with procedure

5704: when an operator runs which reads the value of a target register, the target register having a target register id.

5705: if the int-register-written-flag corresponding to the target register id in the array of int-register-written-flag-s is false

5706: when the set-ok-to-return-flag operator is called with a target register-id parameter value

5707: setting the ok-to-return-flag in the array of ok-to-return-flag-s corresponding to the integer register having the target register-id parameter value

5708: when the return instruction runs

5709: clearing to false any int-register-written-flag-s which correspond to any register-ids which correspond to a false ok-to-return-flag

5710: fault

5801: allow because not relevant

5802: allow because done with procedure

5803: allow because done with procedure

5804: allow because done with procedure
5805: when an operator runs which reads the value of a target register, the target register having a target register id
5806: if the int-register-written-flag corresponding to the target register id in the array of int-register-written-flag-s is false
5807: reading the unwritten-indicator-datum value instead of the value in the target register
5808: when the set-ok-to-return-slag operator is called with a target register-id parameter value
5809: setting the ok-to-return-flag in the array of old-to-return-flag-s corresponding to the integer register having the target register-id parameter value
5810: when the return instruction runs
5811: clearing to false any int-register-written-flag-s which correspond to any register-ids which correspond to a false ok-to-return-flag
5901: allow because not relevant
5902: allow because done with procedure
5903: allow because done with procedure
5904: when an operator runs which reads the value of a target register, the target register having a target register id
5905: if the int-register-written-flag corresponding to the target register id in the array of int-register-written-flag-s is false
5906: when the set-ok-to-call-flag operator is called with a target register-id parameter value
5907: setting the ok-to-call-flag in the array of ok-to-call-flag-s corresponding to the integer register having the target register-id parameter value
5908: when the call instruction runs
5909: clearing to false any int-register-written-flag-s which correspond to any register-ids which correspond to a false ok-to-call-flag
5910: fault
6001: allow because not relevant
6002: allow because done with procedure
6003: allow because done with procedure
6004: allow because done with procedure
6005: when an operator runs which reads the value of a target register, the target register having a target register id
6006: if the int-register-written-flag corresponding to the target register id in the array of int-register-written-flag-s is false
6007: reading the unwritten-indicator-datum instead of the value in the target register
6008: when the set-ok-to-call-flag operator is called with a target register-id parameter value
6009: setting the ok-to-call-flag in the array of ok-to-call-flag-s corresponding to the integer register having the target register-id parameter value
6010: when the call instruction runs
6011: clearing to false any int-register-written-flag-s which correspond to any register-ids which correspond to a false ok-to-call-flag
6101: allow because not relevant
6102: allow because done with procedure
6103: allow because done with procedure
6104: when an operator runs which reads the value of a target register, the target register having a target register id
6105: if the int-register-written-flag corresponding to the target register id in the array of int-register-written-flag-s is false
6106: when the put-nuns-int-args-in-registers operator is called with a num-args parameter value
6107: putting the num-int-args-in-registers value to the n-args parameter value
6108: when the call instruction runs
6109: clearing to false any int-register-written-flag-s which correspond to the first num-int-args-in-registers register-ids occurring in the order on register-ids
6110: fault
6201: allow because not relevant
6202: allow because done with procedure
6203: allow because done with procedure
6204: allow because done with procedure
6205: when an operator runs which reads the value of a target register, the target register having a target register id
6206: if the int-register-written-flag corresponding to the target register id in the array of int-register-written-flag-s is false
6207: reading the unwritten-indicator-datum instead of the value in the target register
6208: when the put-num-int-args-in-registers operator is called with a num-args parameter value
6209: putting the num-int-args-in-registers value to the num-args parameter value
6210: when the call instruction runs
6211: clearing to false any int-register-written-flag-s which correspond to the first num-int-args-in-registers register-ids occurring in the order on register-ids
6301: allow because not relevant
6302: allow because done with procedure
6303: allow because done with procedure
6304: when an operator runs which reads the value of a target float-register, the target float-register having a target float-register id
6305: if the float-register-written-flag corresponding to the target float-register id in the array of float-register-written-flag-s is false
6306: when the put-num-float-args-in-registers operator is called with a num-args parameter value
6307: put the num-float-args-in-registers value to the num-args parameter value
6308: when the call instruction runs
6309: clearing to false any float-register-written-flag-s which correspond to the first num-float-args-in-registers float-register-ids occurring in the order on float-register-ids
6310: fault
6401: allow because not relevant
6402: allow because done with procedure
6403: allow because done with procedure
6404: allow because done with procedure
6405: when an operator runs which reads the value of a target float-register, the target float-register having a target float-register id.
6406: if the float-register-written-flag corresponding to the target float-register id in the array of float-register-written-flag-s is false
6407: reading the unwritten-indicator-datum instead of the value in the target float-register
6408: when the put-num-f oat-, s-in-registers operator is called with a nuns-args parameter value
6409: putting the num-float-ares-in-registers value to the num-args parameter value

6410: when the call instruction runs
6411: clearing to false any float-register-written-flag-s which correspond to the first num-float-args-in-registers float-register-ids occurring in the order on float-register-ids
6501: allow because not relevant
6502: allow because not relevant
6501: allow because done with procedure
6504: when a write instruction writes data having a data width to a target data address
6505: if the target data address of the write plus the data width of the write equals the stack-floor
6506: putting the stack-floor to the target data address
6507: when a read instruction attempts to read data from a target data address
6508: if the target data address is greater-than-or-equal-to the stack floor
6509: fault
6601: allow because done with procedure
6602: when the return instruction runs
6603: putting the stack-floor to the value of the shadow-frame-pointer
6701: CPU processor core
6702: Hard Object core
6801: when checking if A+B<=C using add-subtract-compare
6802: look up (~B+2) from a table
6803: compute ~A by inverting the bits of A
6804: do a three-way add: C+~A+(B+2) using a single fused carry
6805: check the high bit of the result
6806: allow because done with procedure
6901: when a memory access instruction at an instruction address attempts to access data through a stack-pointer
6902: if the stack-limit-pointer is less-than-or-equal-to the target-address of the stack-pointer
6903: if the target-address of the stack-pointer plus the access-width is less-than-or-equal-to the stack-base-pointer
6904: if the target-address of the stack-pointer plus the access-width is less-than-or-equal-to the shadow-frame-pointer
6905: allow
6906: fault
7001: when the store instruction runs
7002: checking if the register being stored is a callee-save-or-ra register
7003: if so, checking if the for-this-func-flag is true
7004: if not, raising a fault
7005: if so, allowing because done with procedure
7101: when the load instruction runs
7102: checking if the register being loaded is a callee-save-or-ra register
7103: if so, checking if the for-this-func-flag is true
7104: if not, raising a fault
7105: if so, allowing because done with procedure
7201: when the operation for making a stack-object-pointer runs
7202: checking if the for-this-func-flag is true
7203: if not, raising a fault
7204: if so, allowing because done with procedure
7301: when the narrow-pointer operation is called with a target-pointer parameter value and a new-object-size parameter value
7302: checking if the target-pointer parameter value plus the new-object-size parameter value is less-than-or-equal-to the protected-range-bottom
7301 if so, allowing
7304: if not, raising a fault
7401: when the narrow-pointer operation is called with a target-pointer parameter value and a new-object-size parameter value
7402: checking if the stack-floor is less-than-or-equal-to the target-pointer parameter
7403: if so, allowing
7404: if not, raising a fault
7501: when the save-callee-save-reg-state operation runs
7502: checking if the frame-done-flag is false
7503: if not, raising a fault
7504: if so, allowing
7505: when the restore-callee-save-reg-state operator runs
7506: checking the frame_done_flag is false
7507: if not, raising a fault
7508: if so, setting the frame_done_flag to=true and allowing
7601: when the call operation runs
7602: checking if the frame-done-flag is false
7603: if so, allowing
7604: if not, then raising a fault
7605: when the return operation runs
7606: clearing the frame_done_flag to false
7701: when the memory access operation runs
7702: checking if the frame-done-flag is false
7703: if so, allowing
7704: if not, then raising a fault
7801: when the narrow-pointer operation is called
7802: setting the made-stack-obj-flag to true
7803: when the store instruction stores data from a store-source-register to a target data address
7804: checking if the store-source-register has been annotated as a callee-save register
7805: if not, allowing because not relevant
7806: if so, checking if the made-stack-obj-flag is set to true
7807: if not, allowing
7808: if so, then raising a fault
7901: when the memory access operation runs, but not as part of a save-callee-save-reg-state operation
7902: checking if the for-this-func-flag is true
7903: if so, allowing
7904: if not, then raising a fault Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method for regulating an execution of a program on a computer, said method comprising:
providing said computer with an absolute-pointer, said absolute-pointer comprising a target-address and an object-id, said target-address comprising a target address data-page-index and a target address data-page-offset,
providing said computer with data addresses, said data addresses comprising a data address data-page-index and a data address data-page-offset, some of said data addresses comprising data,
annotating some of said data-page indexes with a data-page meta-datum, at least one of said data-page meta-datum comprising a page-class-id,
annotating at least one of said page-class-ids with a page-class-meta-datum using a page-class-id-map, annotating at least one page-class-meta-datum with a map-object-metadata-table, said map-object-metadata-table annotating said object-id with an object-metadatum comprised of metadata,
providing at least one said object-metadatum with an object-start and an object-length,
providing said computer with a memory-access instruction which accesses data at said target-address through said absolute-pointer,
when a memory-access instruction attempts to access data at said target-address through said absolute-pointer, performing the following steps:
  finding said data-page meta-datum annotated onto said target address data-page-index,
  finding said page-class-id of said data-page meta-datum,
  finding said page-class-meta-datum annotated onto said page-class-id using said page-class-id-map,
  finding said map-object-metadata-table annotated onto said page-class-meta-datum,
  finding said object-metadatum annotated by said map-object-metadata-table onto said object-id of said absolute-pointer,
  finding said object-start and object-length of said object-metadatum,
  computing an object-end as a sum of said object-start and said object-length,
  checking if said target-address of said absolute-pointer is greater than or equal to said object-start,
  if said target-address of said absolute-pointer is not greater than or equal to said object-start, raising a fault,
  if said target-address of said absolute pointer is greater than or equal to said object start, checking if said target-address of said absolute-pointer plus an access-width is less than or equal to said object-end,
  if said target-address of said absolute-pointer plus said access-width is not less than or equal to said object-end, raising a fault.

2. The method of claim 1, the method further comprising:
providing said absolute-pointer with a page-overflow-flag,
when a memory-access instruction attempts to access data at said target-address through said absolute-pointer, further performing the following steps:
  checking if said page-overflow-flag of said absolute-pointer is set to true,
  if said page-overflow-flag of said absolute-pointer is set to true, computing an effective target address data-page-index as a value of said target address data-page-index minus one,
  if said page-overflow-flag of said absolute-pointer is not set to true, putting an effective target address data-page-index to be said value of said target address data-page-index,
  when finding said data-page meta-datum, instead finding said data-page meta-datum annotated onto said effective target address data-page-index,
  finding said page-class-id of said data-page meta-datum,
  finding said page-class-meta-datum annotated onto said page-class-id using said page-class-id-map,
  finding said map-object-metadata-table annotated onto said page-class-meta-datum,
  finding said object-metadatum annotated by said map-object-metadata-table onto said object-id of said absolute-pointer,
  finding said object-start and said object-length of said object-metadatum,
  computing said object-end as the sum of said object-start and said object-length,
  checking if said target-address of said absolute-pointer is greater-than-or-equal-to said object-start,
  if said target-address of said absolute-pointer is not greater-than-or-equal-to said object-start, raising a fault,
  if said target-address of said absolute-pointer is greater-than-or-equal-to said object-start, checking if said target-address of said absolute-pointer plus said access-width is less-than-or-equal-to said object-end,
  if said target-address of said absolute-pointer plus said access-width is not less-than-or-equal-to said object-end, raising a fault.

3. The method of claim 1, the method further comprising:
providing said absolute-pointer with a sub-object-id,
annotating at least one said page-class-meta-datum with a map-sub-object-metadata-table,
using at least one said map-sub-object-metadata-table to annotate said object-id with a sub-object-metadata-table,
using at least one said sub-object-metadata-table to annotate said sub-object-id with a sub-object-metadatum-memory,
providing at least one said data-page meta-datum with a page-sub-object-id-absolute-base,
providing at least one said sub-object-metadatum-memory with a sub-object-offset from said object-start and a sub-object-length,
when a memory-access instruction attempts to access data at said target-address through said absolute-pointer, further performing the following steps:
  finding said data-page meta-datum annotated onto said target address data-page-index,
  finding said page-class-id of said data-page meta-datum,
  finding said page-class-meta-datum annotated onto said page-class-id using said page-class-id-map,
  finding said map-sub-object-metadata-table annotated onto said page-class-meta-datum,
  finding said sub-object-metadata-table annotated by said map-sub-object-metadata-table onto said object-id of said absolute-pointer,
  computing an absolute sub-object-id as the sum of said sub-object-id of said absolute-pointer and said page-sub-object-absolute-base annotated onto said data-page meta-datum annotated onto said target address data-page-index,
  finding said sub-object-metadatum-mem annotated by said sub-object-metadata-table onto said absolute sub-object-id,
  computing a sub-object-start as the sum of said object-start of said object-metadatum and said sub-object-offset-from-object-start of said sub-object-metadatum-memory,
  computing a sub-object-end as the sum of said sub-object-start and said sub-object-length of said sub-object-metadatum-memory,
  checking if said target-address of said absolute-pointer is greater-than-or-equal-to said sub-object-start,
  if said target-address of said absolute-pointer is not greater-than-or-equal-to said sub-object-start, raising a fault,
  checking if said target-address of said absolute-pointer plus said access-width is less-than-or-equal-to said sub-object-end, if said target-address of said absolute-pointer plus said access-width is not less-than-or-equal-to said sub-object-end, raising a fault.

\* \* \* \* \*